US012050859B2

(12) United States Patent
Dvorak et al.

(10) Patent No.: US 12,050,859 B2
(45) **Date of Patent: *Jul. 30, 2024**

(54) METHOD AND SYSTEM FOR IMPROVED 2D ORDERING OF OUTPUT FROM SPREADSHEET ANALYTICAL FUNCTIONS

(71) Applicant: Adaptam Inc., Palo Alto, CA (US)

(72) Inventors: Robert E. Dvorak, Portola Valley, CA (US); Yuriy Garin, San Carlos, CA (US); Alexey Verkhovskiy, Calgary (CA)

(73) Assignee: Adaptam Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,934

(22) Filed: Sep. 6, 2022

(65) Prior Publication Data

US 2023/0075557 A1 Mar. 9, 2023

Related U.S. Application Data

(60) Provisional application No. 63/240,828, filed on Sep. 3, 2021.

(51) Int. Cl.
*G06F 40/18* (2020.01)
*G06F 40/103* (2020.01)

(52) U.S. Cl.
CPC ............ *G06F 40/18* (2020.01); *G06F 40/103* (2020.01)

(58) Field of Classification Search
CPC ............................... G06F 40/18; G06F 40/103
See application file for complete search history.

(56) References Cited

U.S. PATENT DOCUMENTS

| | | | | |
|---|---|---|---|---|
| 5,604,854 | A * | 2/1997 | Glassey | G06F 40/18 715/788 |
| 6,626,959 | B1 | 9/2003 | Moise et al. | |
| 7,747,939 | B2 | 6/2010 | Thanu et al. | |
| 8,726,143 | B2 | 5/2014 | Simkhay et al. | |
| 9,037,959 | B2 | 5/2015 | Rapp et al. | |
| 9,430,469 | B2 | 8/2016 | Am et al. | |
| 9,817,876 | B2 | 11/2017 | Demonsant et al. | |

(Continued)

OTHER PUBLICATIONS

Sroka et al, Translating Relational Queries into Spreadsheets, IEEE, Transactions on Knowledge and Data Engineering, vol. 27, No. 8, Aug. 2015, 13 pages.

(Continued)

*Primary Examiner* — Thu V Huynh
(74) *Attorney, Agent, or Firm* — Haynes Beffel & Wolfeld LLP; Ernest J. Beffel, Jr.

(57) ABSTRACT

The disclosed technology creates a family of (predefined formula) spreadsheet functions which allows users to create programming loop equivalents in their regular spreadsheet cells employing familiar range functions (e.g., SUM, COUNT, MIN, MAX, etc.) with data filtering and output selection. The data can be sourced from multiple cells within the spreadsheet or a broad spectrum of numeric, date and text data not stored in a spreadsheet, including data not discretely defined. The technology disclosed can use as inputs either cell ranges or Non-Spreadsheet Cell (NSC) data formulas. The capability allows users to specify standardized or highly custom calculations capable of executing millions of loops through a (predefined formula) spreadsheet function.

25 Claims, 129 Drawing Sheets

(56) References Cited

U.S. PATENT DOCUMENTS

| | | | |
|---|---|---|---|
| 10,114,812 | B1 | 10/2018 | Ghaddar |
| 10,466,867 | B2 | 11/2019 | Boucher et al. |
| 10,515,145 | B2 | 12/2019 | Canton et al. |
| 10,545,953 | B2 | 1/2020 | Becker et al. |
| 10,628,634 | B1 | 4/2020 | Ghaddar |
| 10,699,068 | B2 | 6/2020 | Gross et al. |
| 10,789,414 | B2 | 9/2020 | Schoedl |
| 10,877,633 | B2 | 12/2020 | Boucher et al. |
| 10,983,670 | B2 | 4/2021 | Boucher et al. |
| 11,222,171 | B2 | 1/2022 | Zhang et al. |
| 2003/0056181 | A1 | 3/2003 | Marathe |
| 2006/0271841 | A1 | 11/2006 | Thanu et al. |
| 2009/0319880 | A1 | 12/2009 | Collie et al. |
| 2010/0269092 | A1* | 10/2010 | Dorman ................ G06Q 40/02 715/219 |
| 2013/0145244 | A1 | 6/2013 | Rothschiller et al. |
| 2013/0159832 | A1 | 6/2013 | Ingargiola et al. |
| 2015/0370433 | A1 | 12/2015 | Lam et al. |
| 2016/0378842 | A1 | 12/2016 | Demonsant et al. |
| 2017/0220543 | A1 | 8/2017 | Canton et al. |
| 2017/0315683 | A1 | 11/2017 | Boucher et al. |
| 2017/0315967 | A1 | 11/2017 | Boucher et al. |
| 2017/0315979 | A1 | 11/2017 | Boucher et al. |
| 2018/0239748 | A1 | 8/2018 | Zhang et al. |
| 2018/0260374 | A1 | 9/2018 | Sobhy Deraz et al. |
| 2019/0340219 | A1 | 11/2019 | Schoedl |
| 2020/0004799 | A1 | 1/2020 | Gross et al. |
| 2020/0004811 | A1 | 1/2020 | Gross et al. |
| 2020/0004812 | A1 | 1/2020 | Gross et al. |
| 2020/0081586 | A1 | 3/2020 | Boucher et al. |
| 2020/0257852 | A1 | 8/2020 | Canton et al. |
| 2020/0285694 | A1 | 9/2020 | Nield |
| 2020/0302013 | A1* | 9/2020 | Stegmaier ............... G06F 40/18 |
| 2021/0081405 | A1 | 3/2021 | Zarras |
| 2021/0286479 | A1 | 9/2021 | Boucher et al. |
| 2021/0311595 | A1 | 10/2021 | Boucher et al. |

OTHER PUBLICATIONS

Collie et al., Power Pivot and Power BI: The Excel user's guide to DAX, Power Query, Power BI & Power Pivot in Excel 2010-2016. United States: Holy Macro! Books. ISBN: 978-1-61547-039-6 (Year:2016) (Year: 2016).

Yundt, What's the difference between array and range in Excel?, Quora, dated Dec. 2, 2019, 4 pages.

U.S. Appl. No. 17/374,898, filed Jul. 13, 2021, US2022/0012416A1, Jan. 13, 2022, Allowed.

U.S. Appl. No. 17/374,901, filed Jul. 13, 2021, US2022/0012417A1, Jan. 13, 2022, Allowed.

* cited by examiner

FIG. 1A
Excel steps
1. Talk with IT to get the desired data
2. Get the data download csv from IT
3. Import the csv into Excel
4. Locate in Excel the desired data
5. Sort the data by date, cancer, country, test and type ascending as shown below
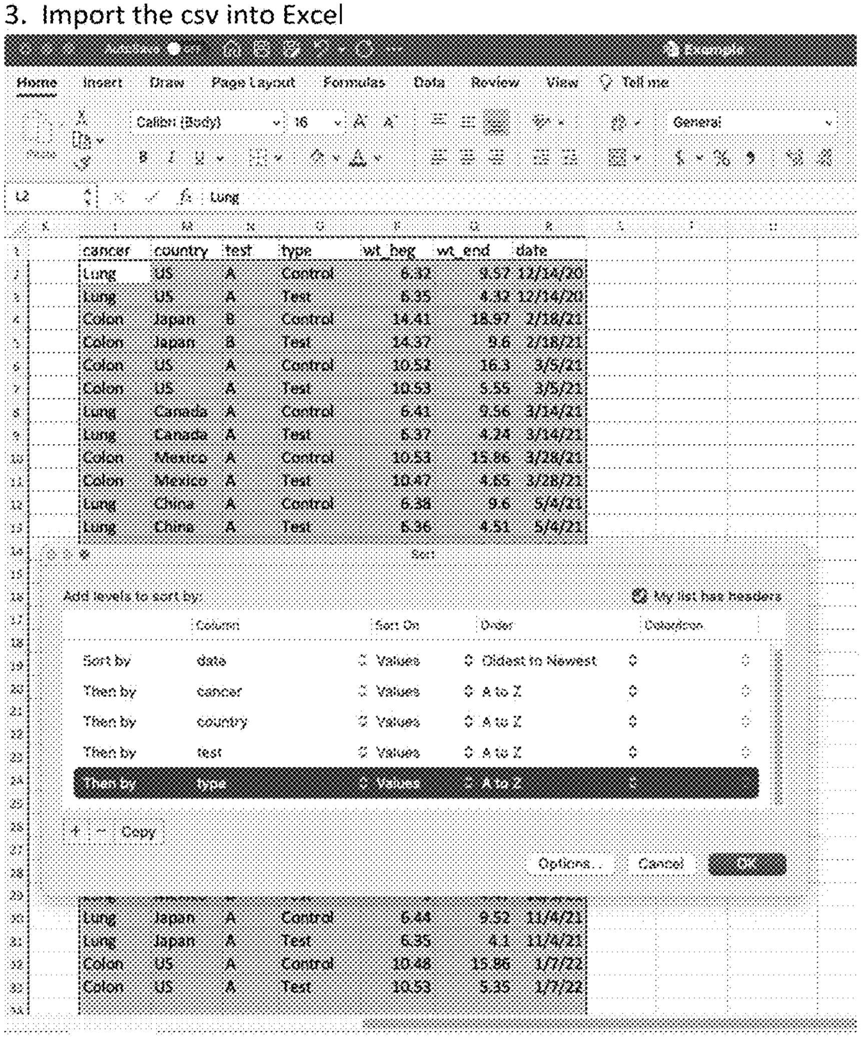
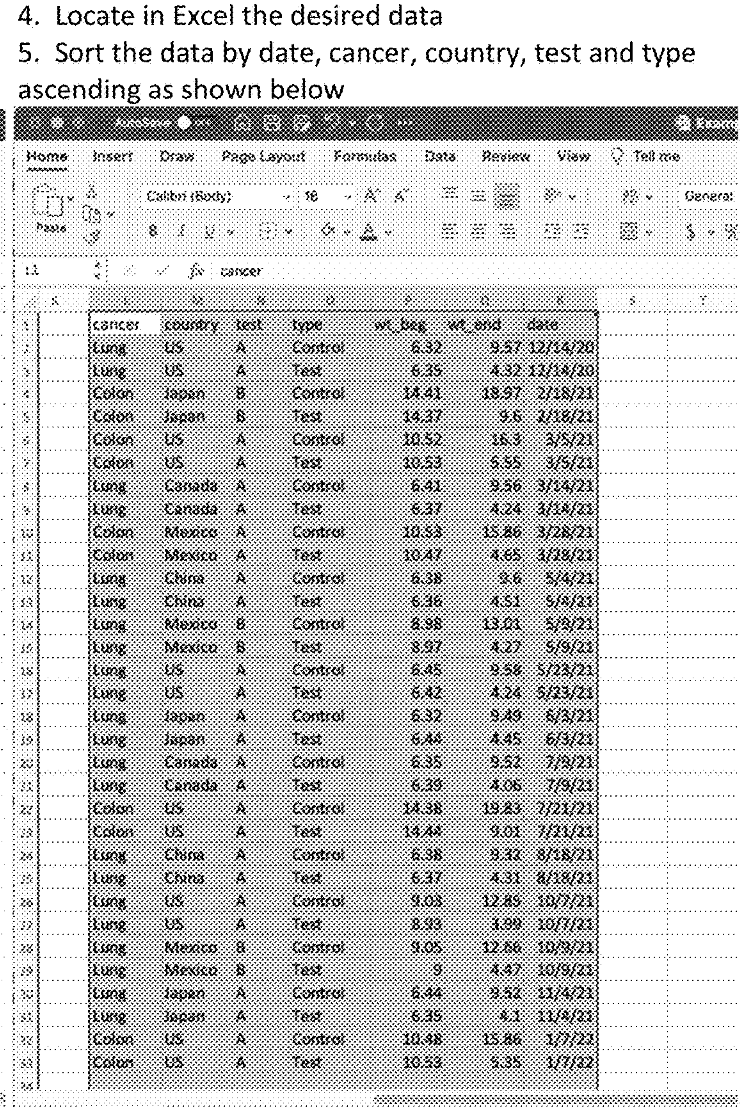

FIG. 1B

6. Copy the sorted data omitting the dates not between 1/1/21 and 12/31/21 to put it where the analyses will be done

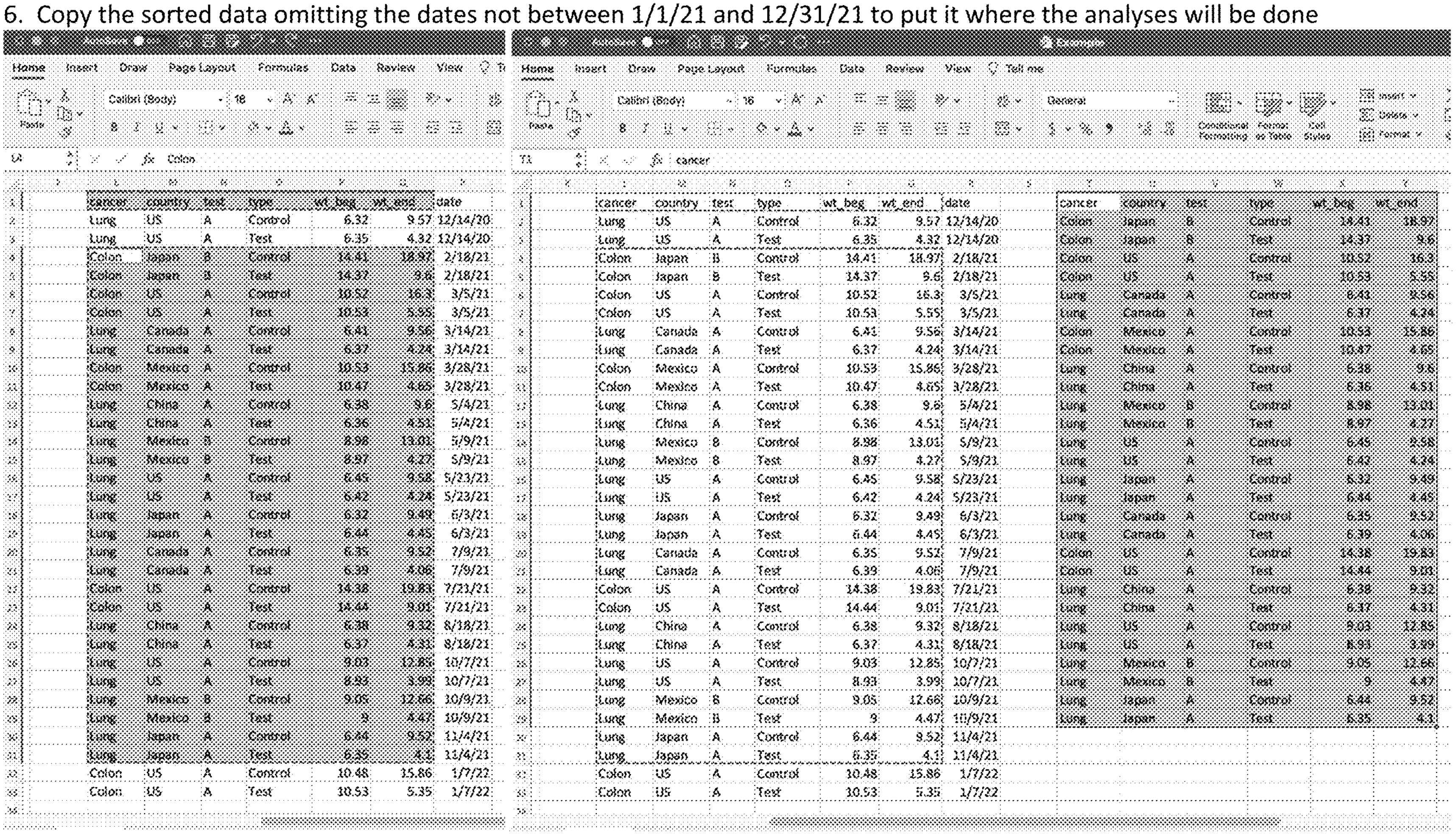

| cancer | country | test | type | wt_beg | wt_end | date |
|---|---|---|---|---|---|---|
| Lung | US | A | Control | 6.32 | 9.57 | 12/14/20 |
| Lung | US | A | Test | 6.35 | 4.32 | 12/14/20 |
| Colon | Japan | B | Control | 14.41 | 18.97 | 2/18/21 |
| Colon | Japan | B | Test | 14.37 | 9.6 | 2/18/21 |
| Colon | US | A | Control | 10.52 | 16.3 | 3/5/21 |
| Colon | US | A | Test | 10.53 | 5.55 | 3/5/21 |
| Lung | Canada | A | Control | 6.41 | 9.56 | 3/14/21 |
| Lung | Canada | A | Test | 6.37 | 4.24 | 3/14/21 |
| Colon | Mexico | A | Control | 10.53 | 15.86 | 3/28/21 |
| Colon | Mexico | A | Test | 10.47 | 4.65 | 3/28/21 |
| Lung | China | A | Control | 6.38 | 9.6 | 5/4/21 |
| Lung | China | A | Test | 6.36 | 4.51 | 5/4/21 |
| Lung | Mexico | B | Control | 8.98 | 13.01 | 5/9/21 |
| Lung | Mexico | B | Test | 8.97 | 4.27 | 5/9/21 |
| Lung | US | A | Control | 6.45 | 9.58 | 5/23/21 |
| Lung | US | A | Test | 6.42 | 4.24 | 5/23/21 |
| Lung | Japan | A | Control | 6.32 | 9.49 | 6/3/21 |
| Lung | Japan | A | Test | 6.44 | 4.45 | 6/3/21 |
| Lung | Canada | A | Control | 6.35 | 9.52 | 7/9/21 |
| Lung | Canada | A | Test | 6.39 | 4.06 | 7/9/21 |
| Colon | US | A | Control | 14.38 | 19.83 | 7/21/21 |
| Colon | US | A | Test | 14.44 | 9.01 | 7/21/21 |
| Lung | China | A | Control | 6.38 | 9.32 | 8/18/21 |
| Lung | China | A | Test | 6.37 | 4.31 | 8/18/21 |
| Lung | US | A | Control | 9.03 | 12.85 | 10/7/21 |
| Lung | US | A | Test | 8.93 | 3.99 | 10/7/21 |
| Lung | Mexico | B | Control | 9.05 | 12.66 | 10/9/21 |
| Lung | Mexico | B | Test | 9 | 4.47 | 10/9/21 |
| Lung | Japan | A | Control | 6.44 | 9.52 | 11/4/21 |
| Lung | Japan | A | Test | 6.35 | 4.1 | 11/4/21 |
| Colon | US | A | Control | 10.48 | 15.86 | 1/7/22 |
| Colon | US | A | Test | 10.53 | 5.35 | 1/7/22 |

| cancer | country | test | type | wt_beg | wt_end | date |
|---|---|---|---|---|---|---|
| Lung | US | A | Control | 6.32 | 9.57 | 12/14/20 |
| Lung | US | A | Test | 6.35 | 4.32 | 12/14/20 |
| Colon | Japan | B | Control | 14.41 | 18.97 | 2/18/21 |
| Colon | Japan | B | Test | 14.37 | 9.6 | 2/18/21 |
| Colon | US | A | Control | 10.52 | 16.3 | 3/5/21 |
| Colon | US | A | Test | 10.53 | 5.55 | 3/5/21 |
| Lung | Canada | A | Control | 6.41 | 9.56 | 3/14/21 |
| Lung | Canada | A | Test | 6.37 | 4.24 | 3/14/21 |
| Colon | Mexico | A | Control | 10.53 | 15.86 | 3/28/21 |
| Colon | Mexico | A | Test | 10.47 | 4.65 | 3/28/21 |
| Lung | China | A | Control | 6.38 | 9.6 | 5/4/21 |
| Lung | China | A | Test | 6.36 | 4.51 | 5/4/21 |
| Lung | Mexico | B | Control | 8.98 | 13.01 | 5/9/21 |
| Lung | Mexico | B | Test | 8.97 | 4.27 | 5/9/21 |
| Lung | US | A | Control | 6.45 | 9.58 | 5/23/21 |
| Lung | US | A | Test | 6.42 | 4.24 | 5/23/21 |
| Lung | Japan | A | Control | 6.32 | 9.49 | 6/3/21 |
| Lung | Japan | A | Test | 6.44 | 4.45 | 6/3/21 |
| Lung | Canada | A | Control | 6.35 | 9.52 | 7/9/21 |
| Lung | Canada | A | Test | 6.39 | 4.06 | 7/9/21 |
| Colon | US | A | Control | 14.38 | 19.83 | 7/21/21 |
| Colon | US | A | Test | 14.44 | 9.01 | 7/21/21 |
| Lung | China | A | Control | 6.38 | 9.32 | 8/18/21 |
| Lung | China | A | Test | 6.37 | 4.31 | 8/18/21 |
| Lung | US | A | Control | 9.03 | 12.85 | 10/7/21 |
| Lung | US | A | Test | 8.93 | 3.99 | 10/7/21 |
| Lung | Mexico | B | Control | 9.05 | 12.66 | 10/9/21 |
| Lung | Mexico | B | Test | 9 | 4.47 | 10/9/21 |
| Lung | Japan | A | Control | 6.44 | 9.52 | 11/4/21 |
| Lung | Japan | A | Test | 6.35 | 4.1 | 11/4/21 |
| Colon | US | A | Control | 10.48 | 15.86 | 1/7/22 |
| Colon | US | A | Test | 10.53 | 5.35 | 1/7/22 |

| cancer | country | test | type | wt_beg | wt_end |
|---|---|---|---|---|---|
| Colon | Japan | B | Control | 14.41 | 18.97 |
| Colon | Japan | B | Test | 14.37 | 9.6 |
| Colon | US | A | Control | 10.52 | 16.3 |
| Colon | US | A | Test | 10.53 | 5.55 |
| Lung | Canada | A | Control | 6.41 | 9.56 |
| Lung | Canada | A | Test | 6.37 | 4.24 |
| Colon | Mexico | A | Control | 10.53 | 15.86 |
| Colon | Mexico | A | Test | 10.47 | 4.65 |
| Lung | China | A | Control | 6.38 | 9.6 |
| Lung | China | A | Test | 6.36 | 4.51 |
| Lung | Mexico | B | Control | 8.98 | 13.01 |
| Lung | Mexico | B | Test | 8.97 | 4.27 |
| Lung | US | A | Control | 6.45 | 9.58 |
| Lung | US | A | Test | 6.42 | 4.24 |
| Lung | Japan | A | Control | 6.32 | 9.49 |
| Lung | Japan | A | Test | 6.44 | 4.45 |
| Lung | Canada | A | Control | 6.35 | 9.52 |
| Lung | Canada | A | Test | 6.39 | 4.06 |
| Colon | US | A | Control | 14.38 | 19.83 |
| Colon | US | A | Test | 14.44 | 9.01 |
| Lung | China | A | Control | 6.38 | 9.32 |
| Lung | China | A | Test | 6.37 | 4.31 |
| Lung | US | A | Control | 9.03 | 12.85 |
| Lung | US | A | Test | 8.93 | 3.99 |
| Lung | Mexico | B | Control | 9.05 | 12.66 |
| Lung | Mexico | B | Test | 9 | 4.47 |
| Lung | Japan | A | Control | 6.44 | 9.52 |
| Lung | Japan | A | Test | 6.35 | 4.1 |

7. Resort the columns by cancer, country, test and type to create the calculation loops 8. Create the (SUM(wt_end)-SUM(wt_beg))/SUM(wt_beg) formula for the first calculation loop which is in this case one row.

9. Copy paste that formula to next calculation loop that only has one row.
10. Copy paste that formula to next calculation loop that only has one row.

FIG. 2C

11. Copy paste that formula to next calculation loop that only has one row.

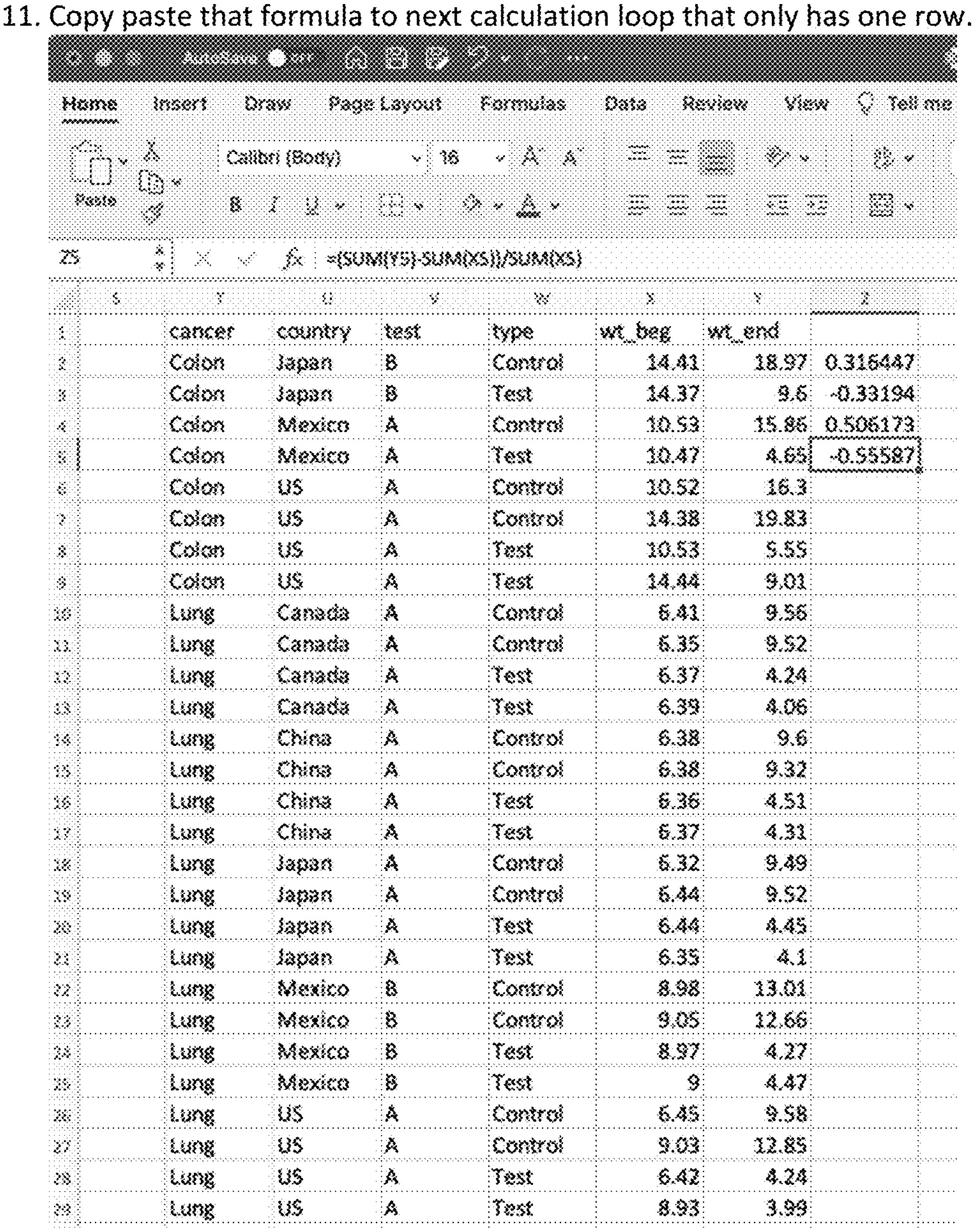

| | S | T | U | V | W | X | Y | Z |
|---|---|---|---|---|---|---|---|---|
| 1 | | cancer | country | test | type | wt_beg | wt_end | |
| 2 | | Colon | Japan | B | Control | 14.41 | 18.97 | 0.316447 |
| 3 | | Colon | Japan | B | Test | 14.37 | 9.6 | -0.33194 |
| 4 | | Colon | Mexico | A | Control | 10.53 | 15.86 | 0.506173 |
| 5 | | Colon | Mexico | A | Test | 10.47 | 4.65 | -0.55587 |
| 6 | | Colon | US | A | Control | 10.52 | 16.3 | |
| 7 | | Colon | US | A | Control | 14.38 | 19.83 | |
| 8 | | Colon | US | A | Test | 10.53 | 5.55 | |
| 9 | | Colon | US | A | Test | 14.44 | 9.01 | |
| 10 | | Lung | Canada | A | Control | 6.41 | 9.56 | |
| 11 | | Lung | Canada | A | Control | 6.35 | 9.52 | |
| 12 | | Lung | Canada | A | Test | 6.37 | 4.24 | |
| 13 | | Lung | Canada | A | Test | 6.39 | 4.06 | |
| 14 | | Lung | China | A | Control | 6.38 | 9.6 | |
| 15 | | Lung | China | A | Control | 6.38 | 9.32 | |
| 16 | | Lung | China | A | Test | 6.36 | 4.51 | |
| 17 | | Lung | China | A | Test | 6.37 | 4.31 | |
| 18 | | Lung | Japan | A | Control | 6.32 | 9.49 | |
| 19 | | Lung | Japan | A | Control | 6.44 | 9.52 | |
| 20 | | Lung | Japan | A | Test | 6.44 | 4.45 | |
| 21 | | Lung | Japan | A | Test | 6.35 | 4.1 | |
| 22 | | Lung | Mexico | B | Control | 8.98 | 13.01 | |
| 23 | | Lung | Mexico | B | Control | 9.05 | 12.66 | |
| 24 | | Lung | Mexico | B | Test | 8.97 | 4.27 | |
| 25 | | Lung | Mexico | B | Test | 9 | 4.47 | |
| 26 | | Lung | US | A | Control | 6.45 | 9.58 | |
| 27 | | Lung | US | A | Control | 9.03 | 12.85 | |
| 28 | | Lung | US | A | Test | 6.42 | 4.24 | |
| 29 | | Lung | US | A | Test | 8.93 | 3.99 | |

FIG. 3A
12. Copy paste that formula to next calculation loop and then modify it so the SUMs work over the loop and then once hitting enter (or return on a Mac) ignore the warning because the formula is different than the one above
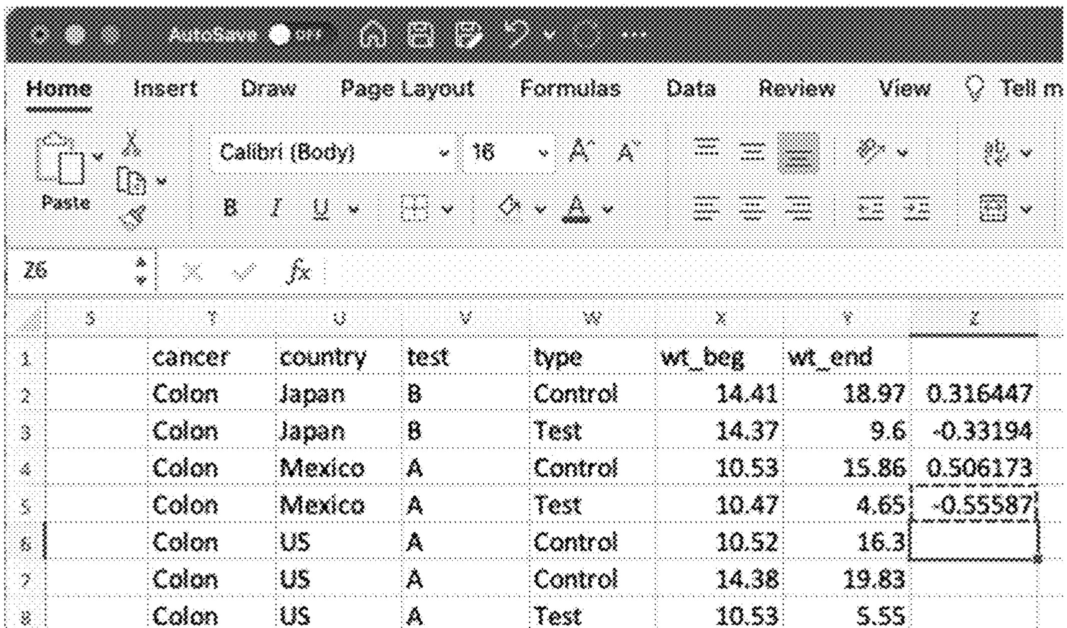
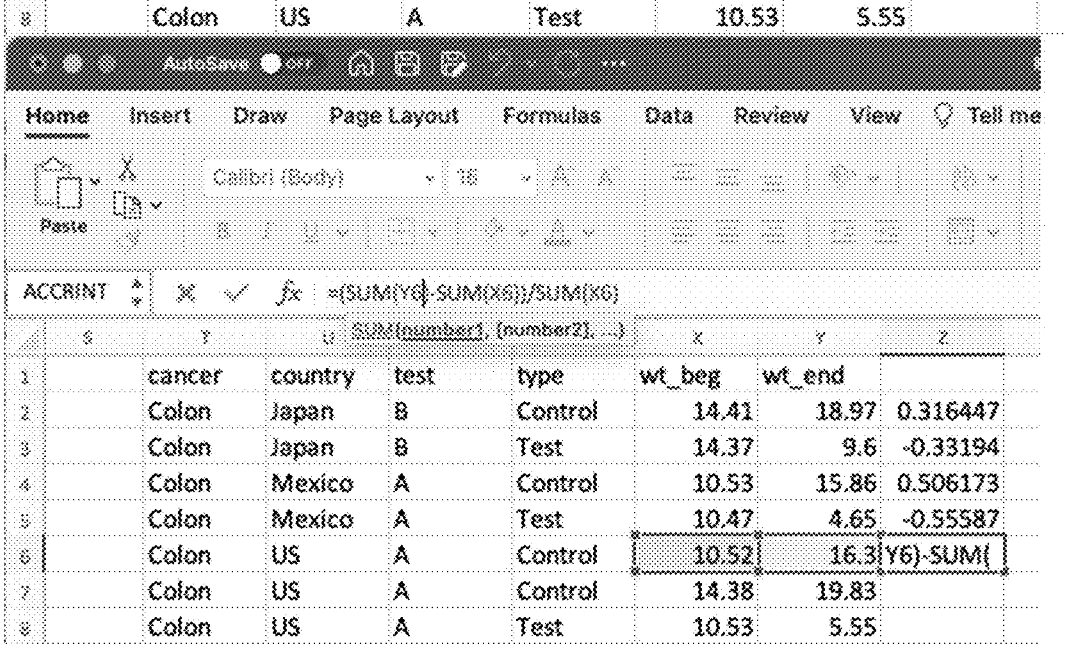

FIG. 3C

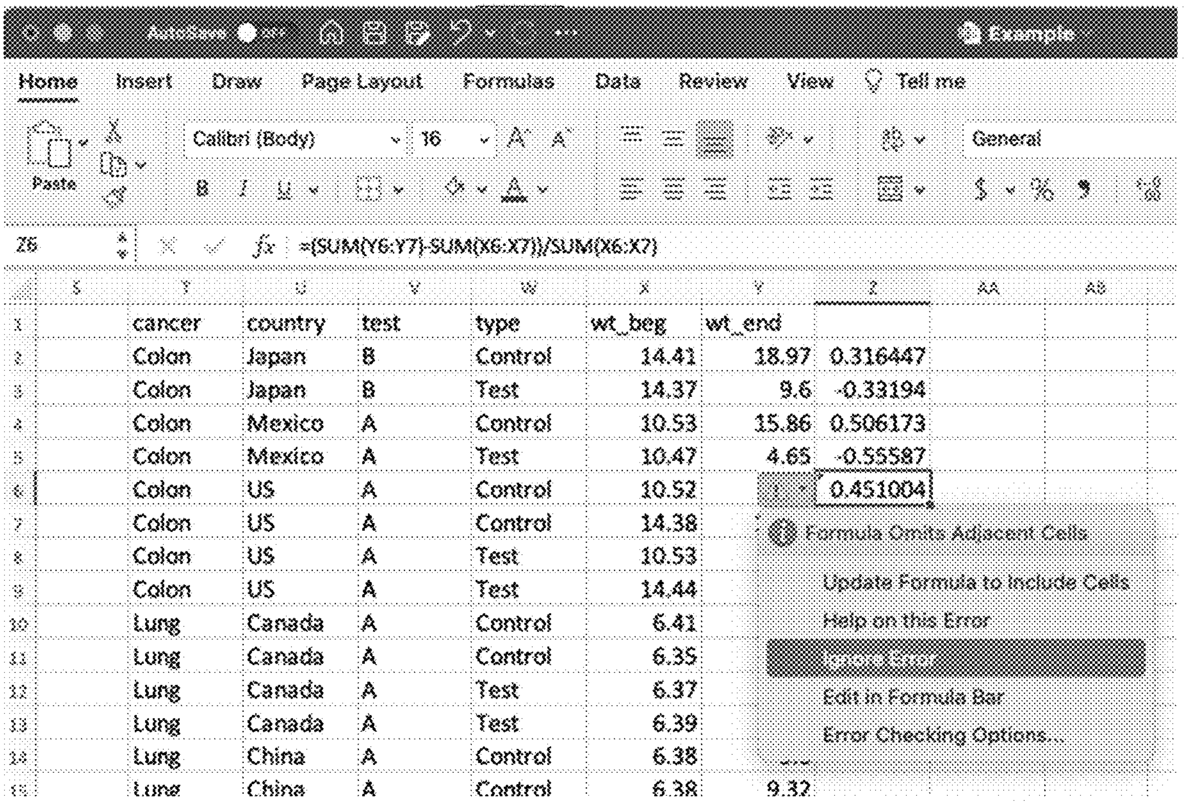

13. Copy paste that formula to next calculation loop that has two rows.
14. Copy paste that formula to next calculation loop that has two rows.
15. Copy paste that formula to next calculation loop that has two rows.
16. Copy paste that formula to next calculation loop that has two rows.
17. Copy paste that formula to next calculation loop that has two rows.
18. Copy paste that formula to next calculation loop that has two rows.
19. Copy paste that formula to next calculation loop that has two rows.
20. Copy paste that formula to next calculation loop that has two rows.
21. Copy paste that formula to next calculation loop that has two rows.
22. Copy paste that formula to next calculation loop that has two rows.
23. Copy paste that formula to next calculation loop that has two rows.

FIG. 4A

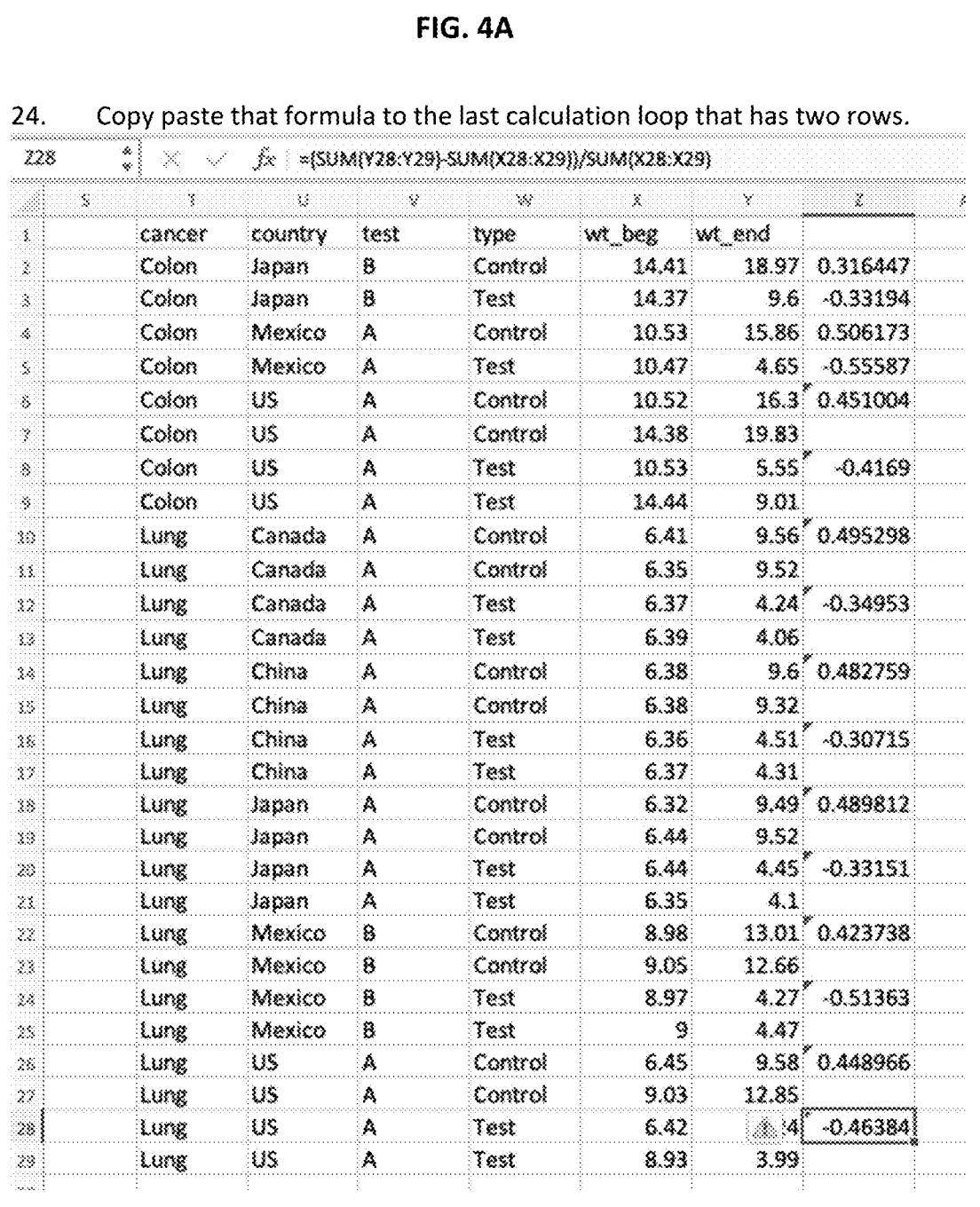

24. Copy paste that formula to the last calculation loop that has two rows.

Z28 =(SUM(Y28:Y29)-SUM(X28:X29))/SUM(X28:X29)

| | S | T | U | V | W | X | Y | Z |
|---|---|---|---|---|---|---|---|---|
| 1 | | cancer | country | test | type | wt_beg | wt_end | |
| 2 | | Colon | Japan | B | Control | 14.41 | 18.97 | 0.316447 |
| 3 | | Colon | Japan | B | Test | 14.37 | 9.6 | -0.33194 |
| 4 | | Colon | Mexico | A | Control | 10.53 | 15.86 | 0.506173 |
| 5 | | Colon | Mexico | A | Test | 10.47 | 4.65 | -0.55587 |
| 6 | | Colon | US | A | Control | 10.52 | 16.3 | 0.451004 |
| 7 | | Colon | US | A | Control | 14.38 | 19.83 | |
| 8 | | Colon | US | A | Test | 10.53 | 5.55 | -0.4169 |
| 9 | | Colon | US | A | Test | 14.44 | 9.01 | |
| 10 | | Lung | Canada | A | Control | 6.41 | 9.56 | 0.495298 |
| 11 | | Lung | Canada | A | Control | 6.35 | 9.52 | |
| 12 | | Lung | Canada | A | Test | 6.37 | 4.24 | -0.34953 |
| 13 | | Lung | Canada | A | Test | 6.39 | 4.06 | |
| 14 | | Lung | China | A | Control | 6.38 | 9.6 | 0.482759 |
| 15 | | Lung | China | A | Control | 6.38 | 9.32 | |
| 16 | | Lung | China | A | Test | 6.36 | 4.51 | -0.30715 |
| 17 | | Lung | China | A | Test | 6.37 | 4.31 | |
| 18 | | Lung | Japan | A | Control | 6.32 | 9.49 | 0.489812 |
| 19 | | Lung | Japan | A | Control | 6.44 | 9.52 | |
| 20 | | Lung | Japan | A | Test | 6.44 | 4.45 | -0.33151 |
| 21 | | Lung | Japan | A | Test | 6.35 | 4.1 | |
| 22 | | Lung | Mexico | B | Control | 8.98 | 13.01 | 0.423738 |
| 23 | | Lung | Mexico | B | Control | 9.05 | 12.66 | |
| 24 | | Lung | Mexico | B | Test | 8.97 | 4.27 | -0.51363 |
| 25 | | Lung | Mexico | B | Test | 9 | 4.47 | |
| 26 | | Lung | US | A | Control | 6.45 | 9.58 | 0.448966 |
| 27 | | Lung | US | A | Control | 9.03 | 12.85 | |
| 28 | | Lung | US | A | Test | 6.42 | [illegible]4 | -0.46384 |
| 29 | | Lung | US | A | Test | 8.93 | 3.99 | |

FIG. 4B

25. Input the vertical headings from the values in the loop combinations.

| | A | B | C | D | E | F |
|---|---|---|---|---|---|---|
| 1 | | | | | | |
| 2 | | | | | | |
| 3 | | | | | | |
| 4 | Colon | Japan | | | | |
| 5 | Colon | Mexico | | | | |
| 6 | Colon | US | | | | |
| 7 | Lung | Canada | | | | |
| 8 | Lung | China | | | | |
| 9 | Lung | Japan | | | | |
| 10 | Lung | Mexico | | | | |
| 11 | Lung | US | | | | |

26. Input the horizontal headings from the values in the loop combinations.

| | A | B | C | D | E | F |
|---|---|---|---|---|---|---|
| 1 | | | A | A | B | B |
| 2 | | | Control | Test | Control | Test |
| 3 | | | | | | |
| 4 | Colon | Japan | | | | |
| 5 | Colon | Mexico | | | | |
| 6 | Colon | US | | | | |
| 7 | Lung | Canada | | | | |
| 8 | Lung | China | | | | |
| 9 | Lung | Japan | | | | |
| 10 | Lung | Mexico | | | | |
| 11 | Lung | US | | | | |

Figure 4D:
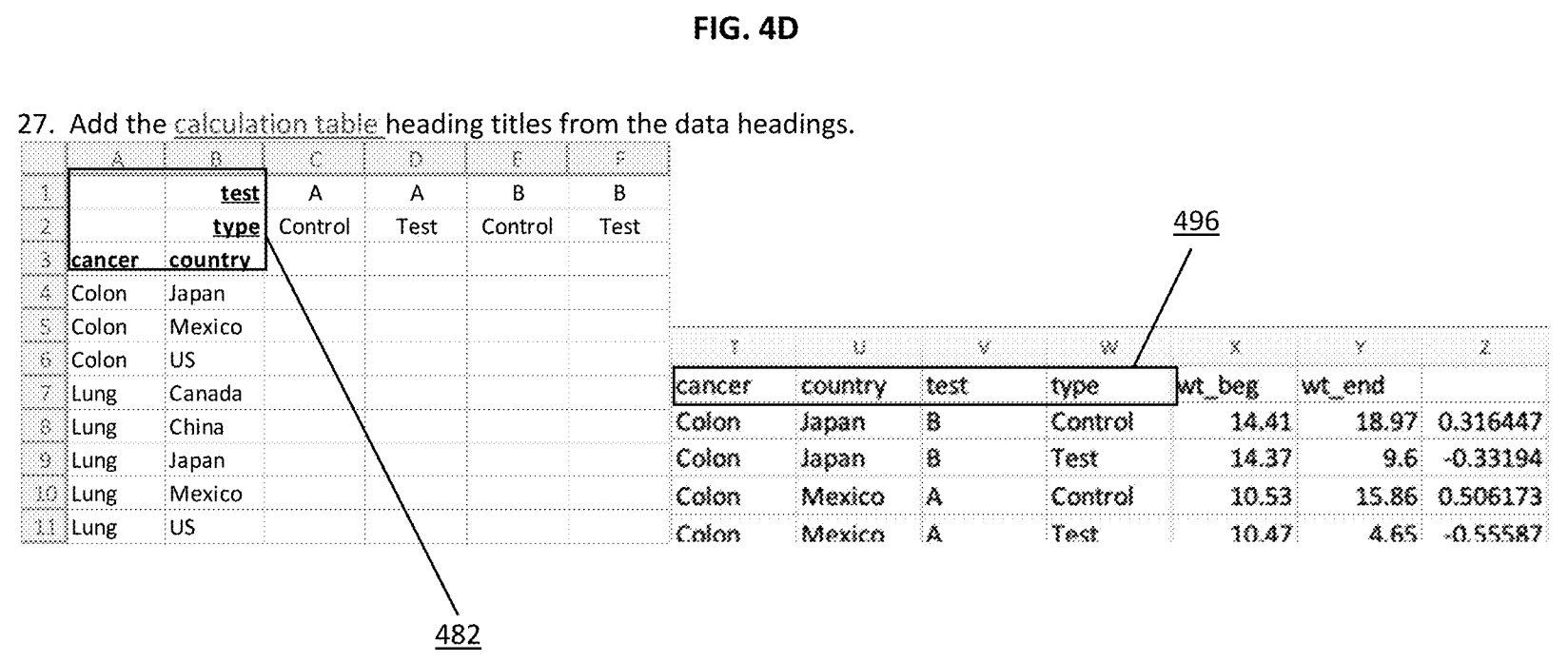

27. Add the calculation table heading titles from the data headings.

| | A | B | C | D | E | F |
|---|---|---|---|---|---|---|
| 1 | | test | A | A | B | B |
| 2 | | type | Control | Test | Control | Test |
| 3 | cancer | country | | | | |
| 4 | Colon | Japan | | | | |
| 5 | Colon | Mexico | | | | |
| 6 | Colon | US | | | | |
| 7 | Lung | Canada | | | | |
| 8 | Lung | China | | | | |
| 9 | Lung | Japan | | | | |
| 10 | Lung | Mexico | | | | |
| 11 | Lung | US | | | | |

482

| T | U | V | W | X | Y | Z |
|---|---|---|---|---|---|---|
| cancer | country | test | type | wt_beg | wt_end | |
| Colon | Japan | B | Control | 14.41 | 18.97 | 0.316447 |
| Colon | Japan | B | Test | 14.37 | 9.6 | -0.33194 |
| Colon | Mexico | A | Control | 10.53 | 15.86 | 0.506173 |
| Colon | Mexico | A | Test | 10.47 | 4.65 | -0.55587 |

28. Reference the value in the 2D calculation table cell 524 to the correct calculated value 539 or value copy paste 539 into the cell 524

| | A | B | C | D | E | F |
|---|---|---|---|---|---|---|
| 1 | | **test** | A | A | B | B |
| 2 | | **type** | Control | Test | Control | Test |
| 3 | **cancer** | **country** | | | | |
| 4 | Colon | Japan | | | 31.6% | |
| 5 | Colon | Mexico | | | | |
| 6 | Colon | US | | | | |
| 7 | Lung | Canada | | | | |
| 8 | Lung | China | | | | |
| 9 | Lung | Japan | | | | |
| 10 | Lung | Mexico | | | | |
| 11 | Lung | US | | | | |

524

539

| T | U | V | W | X | Y | Z |
|---|---|---|---|---|---|---|
| cancer | country | test | type | wt_beg | wt_end | |
| Colon | Japan | B | Control | 14.41 | 18.97 | 0.316447 |
| Colon | Japan | B | Test | 14.37 | 9.6 | -0.33194 |
| Colon | Mexico | A | Control | 10.53 | 15.86 | 0.506173 |
| Colon | Mexico | A | Test | 10.47 | 4.65 | -0.55587 |

29. Replicate the actions in step 28 for the next 2D table value.
30. Replicate the actions in step 28 for the next 2D table value.
31. Replicate the actions in step 28 for the next 2D table value.
32. Replicate the actions in step 28 for the next 2D table value.
33. Replicate the actions in step 28 for the next 2D table value.
34. Replicate the actions in step 28 for the next 2D table value.
35. Replicate the actions in step 28 for the next 2D table value.

FIG. 5B

36. Replicate the actions in step 28 for the next 2D table value.
37. Replicate the actions in step 28 for the next 2D table value.
38. Replicate the actions in step 28 for the next 2D table value.
39. Replicate the actions in step 28 for the next 2D table value.
40. Replicate the actions in step 28 for the next 2D table value.
41. Replicate the actions in step 28 for the next 2D table value.
42. Replicate the actions in step 28 for the next 2D table value.
43. Replicate the actions in step 28 for the next 2D table value.
44. Replicate the actions in step 28 for the last 2D table value 594.

| | A | B | C | D | E | F |
|---|---|---|---|---|---|---|
| 1 | | **test** | A | A | B | B |
| 2 | | **type** | Control | Test | Control | Test |
| 3 | **cancer** | **country** | | | | |
| 4 | Colon | Japan | | | 31.6% | -33.2% |
| 5 | Colon | Mexico | 50.6% | -55.6% | | |
| 6 | Colon | US | 45.1% | -41.7% | | |
| 7 | Lung | Canada | 49.5% | -35.0% | | |
| 8 | Lung | China | 48.3% | -30.7% | | |
| 9 | Lung | Japan | 49.0% | -33.2% | | |
| 10 | Lung | Mexico | | | 42.4% | -51.4% |
| 11 | Lung | US | 44.9% | -46.4% | | |

594

Excel steps using a Pivot Table

1. Talk with IT to get the desired data
2. Get the data download csv from IT
3. Import the csv into Excel
4. Locate in Excel the desired data
5. Click insert Pivot Table
6. Select range of data to use in the Pivot table (shown below)

7. Choose where to put the Pivot table (shown below).

8. Put wt_end into the SUM Values (shown below in 14)
9. Put wt_end into the SUM values (shown below in 14)
10. Put cancer into Rows (shown below in 14).
11. Put country into Rows (shown below in 14).
12. Put test into Columns (shown below in 14).
13. Put type into Columns (shown below in 14).

15. Deselect the unwanted dates to get the values for 2021

16. Input the vertical headings for the calculated values.

17. Input the horizontal headings for the calculated values.

FIG. 9A

19. Create the formula for calculating the (SUM(wt_end)-SUM(wt_beg))/SUM(wt_beg) formula using the values from the Pivot table above for the first populated cell.

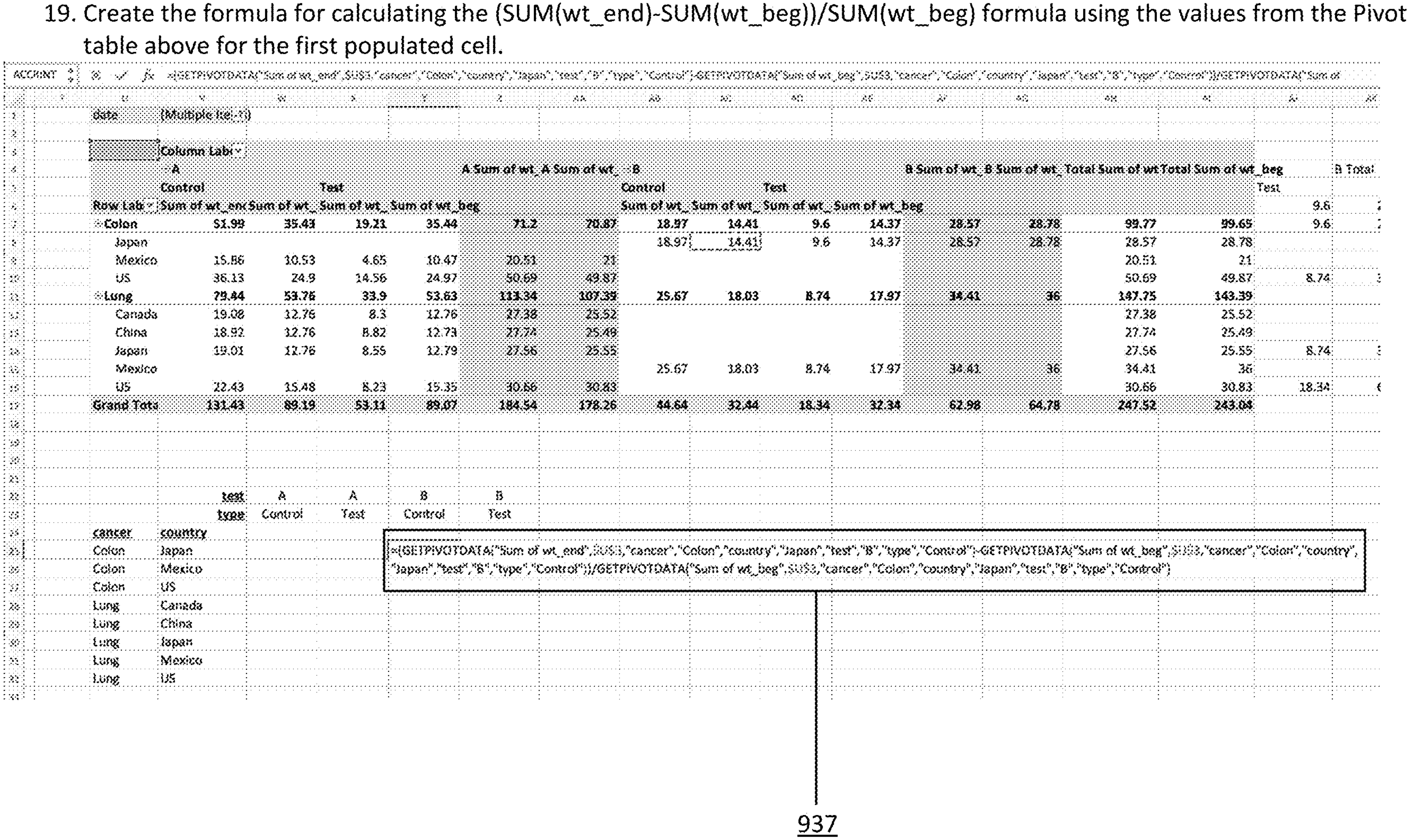

=(GETPIVOTDATA("Sum of wt_end",$U$3,"cancer","Colon","country","Japan","test","B","type","Control")-GETPIVOTDATA("Sum of wt_beg",$U$3,"cancer","Colon","country","Japan","test","B","type","Control"))/GETPIVOTDATA("Sum of

| | | | | | | | | | | | | | | | |
|---|---|---|---|---|---|---|---|---|---|---|---|---|---|---|---|
| date | (Multiple Items) | | | | | | | | | | | | | | |
| | Column Labels | | | | | | | | | | | | | | |
| | A | | | | A Sum of wt_ | A Sum of wt_ | B | | | | B Sum of wt_ | B Sum of wt_ | Total Sum of wt | Total Sum of wt_beg | B Total |
| | Control | | Test | | | | Control | | Test | | | | | | Test |
| Row Labels | Sum of wt_end | Sum of wt_ | Sum of wt_ | Sum of wt_beg | | | Sum of wt_ | Sum of wt_ | Sum of wt_ | Sum of wt_beg | | | | | 9.6 |
| Colon | 51.99 | 35.43 | 19.21 | 35.44 | 71.2 | 70.87 | 18.97 | 14.41 | 9.6 | 14.37 | 28.57 | 28.78 | 99.77 | 99.65 | 9.6 |
| Japan | | | | | | | 18.97 | 14.41 | 9.6 | 14.37 | 28.57 | 28.78 | 28.57 | 28.78 | |
| Mexico | 15.86 | 10.53 | 4.65 | 10.47 | 20.51 | 21 | | | | | | | 20.51 | 21 | |
| US | 36.13 | 24.9 | 14.56 | 24.97 | 50.69 | 49.87 | | | | | | | 50.69 | 49.87 | 8.74 |
| Lung | 79.44 | 53.76 | 33.9 | 53.63 | 113.34 | 107.39 | 25.67 | 18.03 | 8.74 | 17.97 | 34.41 | 36 | 147.75 | 143.39 | |
| Canada | 19.08 | 12.76 | 8.3 | 12.76 | 27.38 | 25.52 | | | | | | | 27.38 | 25.52 | |
| China | 18.92 | 12.76 | 8.82 | 12.73 | 27.74 | 25.49 | | | | | | | 27.74 | 25.49 | |
| Japan | 19.01 | 12.76 | 8.55 | 12.79 | 27.56 | 25.55 | | | | | | | 27.56 | 25.55 | 8.74 |
| Mexico | | | | | | | 25.67 | 18.03 | 8.74 | 17.97 | 34.41 | 36 | 34.41 | 36 | |
| US | 22.43 | 15.48 | 8.23 | 15.35 | 30.66 | 30.83 | | | | | | | 30.66 | 30.83 | 18.34 |
| Grand Total | 131.43 | 89.19 | 53.11 | 89.07 | 184.54 | 178.26 | 44.64 | 32.44 | 18.34 | 32.34 | 62.98 | 64.78 | 247.52 | 243.04 | |

| | | | | | |
|---|---|---|---|---|---|
| | test | A | A | B | B |
| | type | Control | Test | Control | Test |
| cancer | country | | | | |
| Colon | Japan | | | | |
| Colon | Mexico | | | | |
| Colon | US | | | | |
| Lung | Canada | | | | |
| Lung | China | | | | |
| Lung | Japan | | | | |
| Lung | Mexico | | | | |
| Lung | US | | | | |

=(GETPIVOTDATA("Sum of wt_end",$U$3,"cancer","Colon","country","Japan","test","B","type","Control")-GETPIVOTDATA("Sum of wt_beg",$U$3,"cancer","Colon","country","Japan","test","B","type","Control"))/GETPIVOTDATA("Sum of wt_beg",$U$3,"cancer","Colon","country","Japan","test","B","type","Control")

20. Create the second formula, as you cannot do a simple copy paste of pivot table calculated values in a formula (could do cube formula conversion, which is somewhat complicated, but then disrupts future changes or could copy paste the values in the pivot table and run the calculations off of that copy but would also disrupt future changes to the filters or otherwise).
21. Create the third formula.
22. Create the fourth formula.
23. Create the fifth formula.
24. Create the sixth formula.
25. Create the seventh formula.
26. Create the eighth formula.
27. Create the ninth formula.
28. Create the tenth formula.
29. Create the eleventh formula.
30. Create the twelfth formula.
31. Create the thirteenth formula.
32. Create the fourteenth formula.
33. Create the fifteenth formula.

FIG. 10

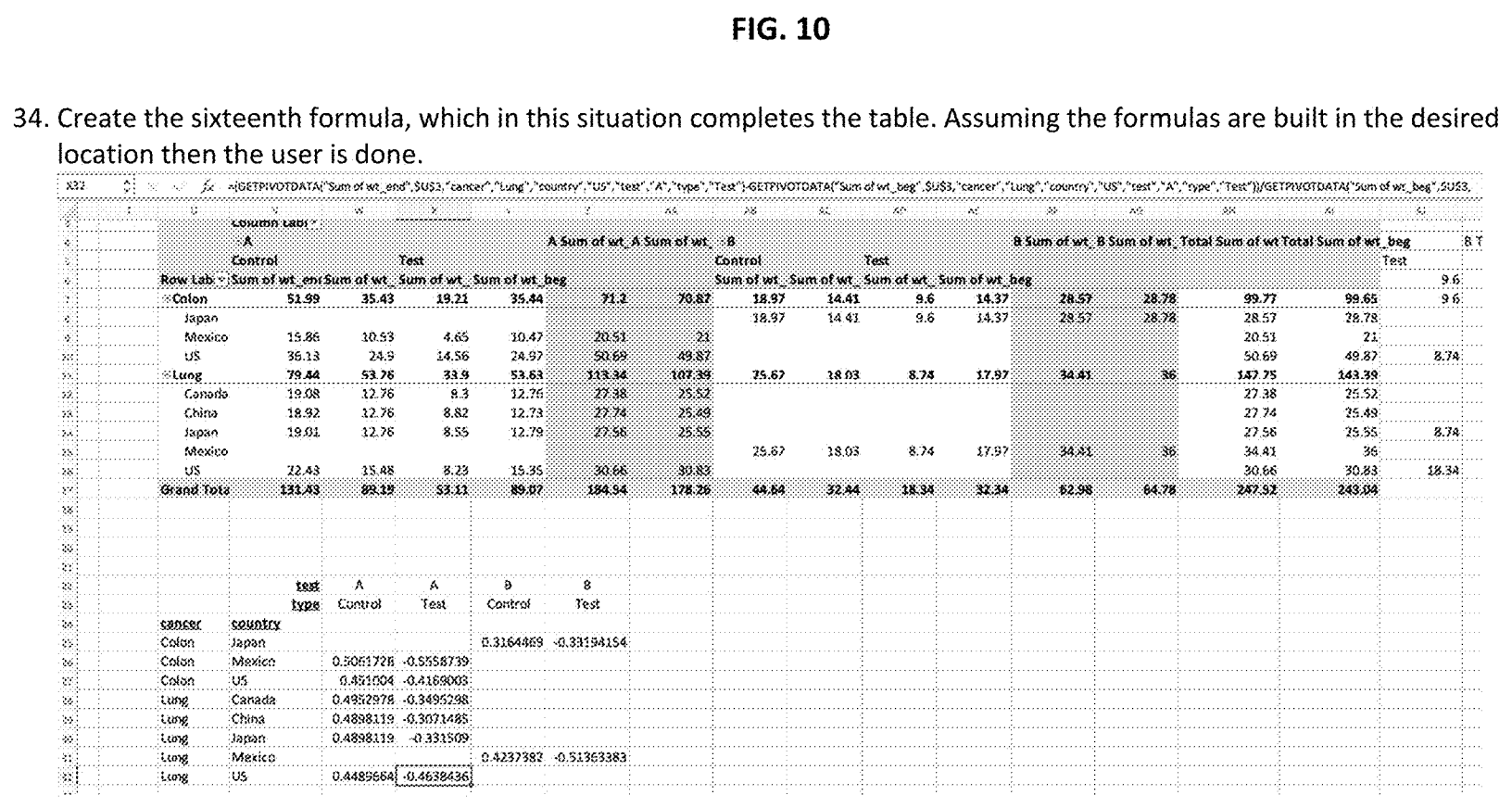

34. Create the sixteenth formula, which in this situation completes the table. Assuming the formulas are built in the desired location then the user is done.

X32 =(GETPIVOTDATA("Sum of wt_end",$U$3,"cancer","Lung","country","US","test","A","type","Test")-GETPIVOTDATA("Sum of wt_beg",$U$3,"cancer","Lung","country","US","test","A","type","Test"))/GETPIVOTDATA("Sum of wt_beg",$U$3,

| | Column Labels | | | | | | | | | | | | | | | |
|---|---|---|---|---|---|---|---|---|---|---|---|---|---|---|---|---|
| | A | | | | A Sum of wt_ | A Sum of wt_ | B | | | | B Sum of wt_ | B Sum of wt_ | Total Sum of wt | Total Sum of wt_beg | | B T |
| | Control | | Test | | | | Control | | Test | | | | | | Test | |
| Row Labels | Sum of wt_end | Sum of wt_ | Sum of wt_ | Sum of wt_beg | | | Sum of wt_ | Sum of wt_ | Sum of wt_ | Sum of wt_beg | | | | | 9.6 | |
| Colon | 51.99 | 35.43 | 19.21 | 35.44 | 71.2 | 70.87 | 18.97 | 14.41 | 9.6 | 14.37 | 28.57 | 28.78 | 99.77 | 99.65 | 9.6 | |
| Japan | | | | | | | 18.97 | 14.41 | 9.6 | 14.37 | 28.57 | 28.78 | 28.57 | 28.78 | | |
| Mexico | 15.86 | 10.53 | 4.65 | 10.47 | 20.51 | 21 | | | | | | | 20.51 | 21 | | |
| US | 36.13 | 24.9 | 14.56 | 24.97 | 50.69 | 49.87 | | | | | | | 50.69 | 49.87 | 8.74 | |
| Lung | 79.44 | 53.76 | 33.9 | 53.63 | 113.34 | 107.39 | 25.67 | 18.03 | 8.74 | 17.97 | 34.41 | 36 | 147.75 | 143.39 | | |
| Canada | 19.08 | 12.76 | 8.3 | 12.76 | 27.38 | 25.52 | | | | | | | 27.38 | 25.52 | | |
| China | 18.92 | 12.76 | 8.82 | 12.73 | 27.74 | 25.49 | | | | | | | 27.74 | 25.49 | | |
| Japan | 19.01 | 12.76 | 8.55 | 12.79 | 27.56 | 25.55 | | | | | | | 27.56 | 25.55 | 8.74 | |
| Mexico | | | | | | | 25.67 | 18.03 | 8.74 | 17.97 | 34.41 | 36 | 34.41 | 36 | | |
| US | 22.43 | 15.48 | 8.23 | 15.35 | 30.66 | 30.83 | | | | | | | 30.66 | 30.83 | 18.34 | |
| Grand Total | 131.43 | 89.19 | 53.11 | 89.07 | 184.94 | 178.26 | 44.64 | 32.44 | 18.34 | 32.34 | 62.98 | 64.78 | 247.92 | 243.04 | | |

| | test | A | A | B | B |
|---|---|---|---|---|---|
| | type | Control | Test | Control | Test |
| cancer | country | | | | |
| Colon | Japan | | | 0.3164469 | -0.33194154 |
| Colon | Mexico | 0.5061728 | -0.5558739 | | |
| Colon | US | 0.451004 | -0.4169003 | | |
| Lung | Canada | 0.4952978 | -0.3495298 | | |
| Lung | China | 0.4898119 | -0.3071485 | | |
| Lung | Japan | 0.4898119 | -0.331509 | | |
| Lung | Mexico | | | 0.4237382 | -0.51363383 |
| Lung | US | 0.4489664 | -0.4638436 | | |

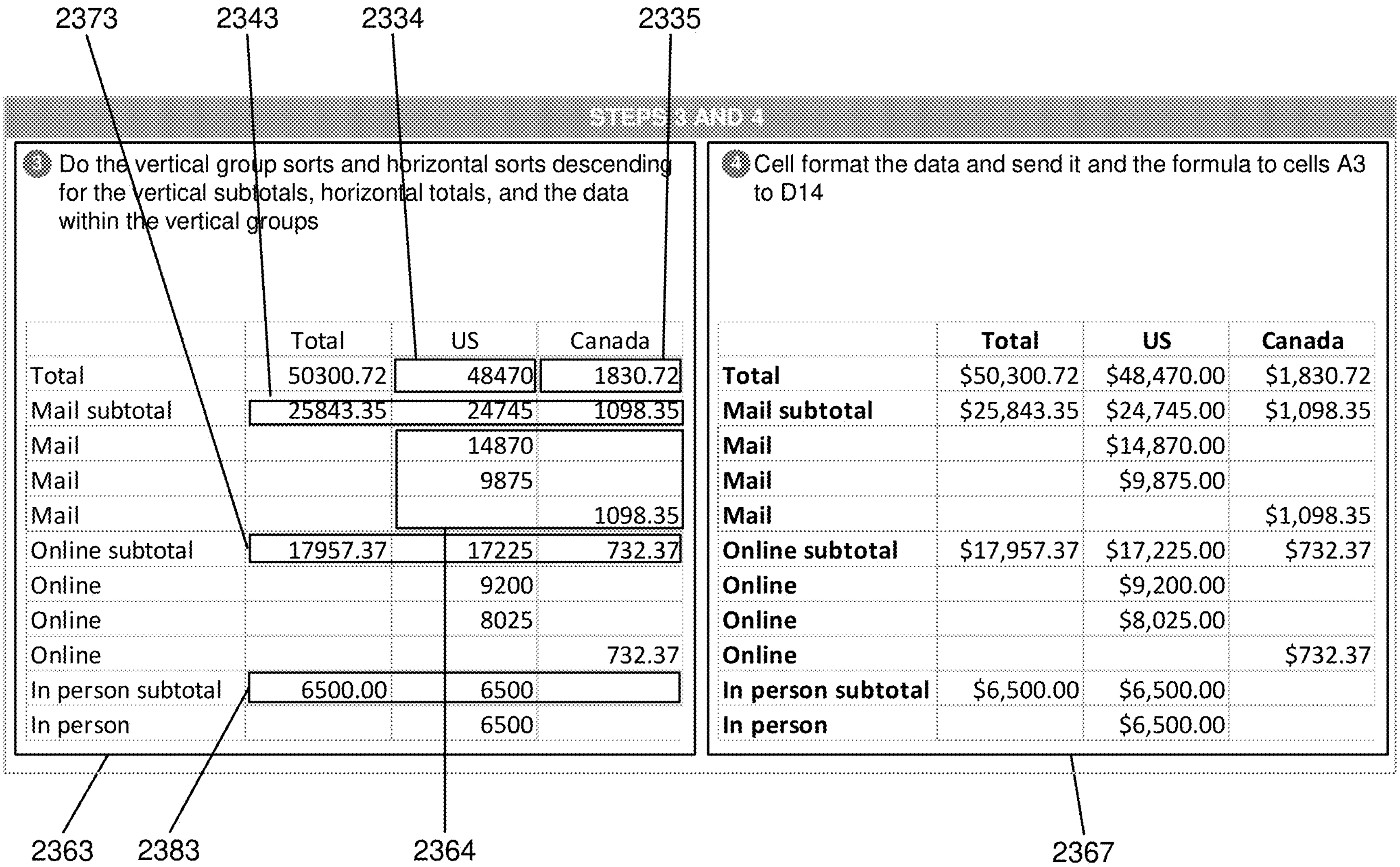

③ Do the vertical group sorts and horizontal sorts descending for the vertical subtotals, horizontal totals, and the data within the vertical groups

| | Total | US | Canada |
|---|---|---|---|
| Total | 50300.72 | 48470 | 1830.72 |
| Mail subtotal | 25843.35 | 24745 | 1098.35 |
| Mail | | 14870 | |
| Mail | | 9875 | |
| Mail | | | 1098.35 |
| Online subtotal | 17957.37 | 17225 | 732.37 |
| Online | | 9200 | |
| Online | | 8025 | |
| Online | | | 732.37 |
| In person subtotal | 6500.00 | 6500 | |
| In person | | 6500 | |

④ Cell format the data and send it and the formula to cells A3 to D14

| | **Total** | **US** | **Canada** |
|---|---|---|---|
| **Total** | $50,300.72 | $48,470.00 | $1,830.72 |
| **Mail subtotal** | $25,843.35 | $24,745.00 | $1,098.35 |
| **Mail** | | $14,870.00 | |
| **Mail** | | $9,875.00 | |
| **Mail** | | | $1,098.35 |
| **Online subtotal** | $17,957.37 | $17,225.00 | $732.37 |
| **Online** | | $9,200.00 | |
| **Online** | | $8,025.00 | |
| **Online** | | | $732.37 |
| **In person subtotal** | $6,500.00 | $6,500.00 | |
| **In person** | | $6,500.00 | |

FIG. 23

A3 =WRITE_2D(H1:H22,K1:K22|I1:I22,J1:J22|M1:M22|L1:L22{'1/1/20'..12/31/20'}|TOTALS[V_TSL_AVE]) — 2415

| | A | B | C | D | E | F | G | H | I | J | K | L | M |
|---|---|---|---|---|---|---|---|---|---|---|---|---|---|
| 1 | Test end cancerous growth weight | | | | | | | Colon | A | Control | US | 12/15/19 | 15.85 |
| 2 | | | | | | | | Colon | A | Test | US | 12/15/19 | 5.57 |
| 3 | | | A | A | B | B | | Colon | A | Control | US | 1/15/20 | 15.7 |
| 4 | | | Control | Test | Control | Test | | Colon | A | Test | US | 1/15/20 | 5.66 |
| 5 | Colon | Japan | | | 19.9 | | | Lung | B | Control | Japan | 1/28/20 | 12.72 |
| 6 | Colon | Japan | | | | 9.4 | | Lung | B | Test | Japan | 1/28/20 | 4.31 |
| 7 | Colon | Japan average | | | 19.9 | 9.4 | | Colon | B | Control | Japan | 2/24/20 | 19.9 |
| 8 | Colon | US | 15.70 | | | | | Colon | B | Test | Japan | 2/24/20 | 9.4 |
| 9 | Colon | US | 15.86 | | | | | Colon | A | Control | US | 3/5/20 | 15.87 |
| 10 | Colon | US | 15.87 | | | | | Colon | A | Test | US | 3/5/20 | 5.45 |
| 11 | Colon | US | | 5.35 | | | | Lung | B | Control | US | 4/5/20 | 13.17 |
| 12 | Colon | US | | 5.45 | | | | Lung | B | Test | US | 4/5/20 | 4.03 |
| 13 | Colon | US | | 5.66 | | | | Colon | A | Control | US | 6/25/20 | 15.86 |
| 14 | Colon | US average | 15.81 | 5.49 | 19.9 | 9.4 | | Colon | A | Test | US | 6/25/20 | 5.35 |
| 15 | Colon | average | 15.81 | 5.49 | 19.9 | 9.4 | | Lung | A | Control | US | 9/14/20 | 9.57 |
| 16 | Lung | Japan | | | 12.72 | | | Lung | A | Test | US | 9/14/20 | 4.32 |
| 17 | Lung | Japan | | | | 4.31 | | Colon | B | Control | Japan | 2/18/21 | 18.97 |
| 18 | Lung | Japan average | | | | | | Colon | B | Test | Japan | 2/18/21 | 9.6 |
| 19 | Lung | US | 9.57 | | | | | Colon | A | Control | US | 3/5/21 | 16.3 |
| 20 | Lung | US | | 4.32 | | | | Colon | A | Test | US | 3/5/21 | 5.55 |
| 21 | Lung | US | | | 13.17 | | | Lung | A | Control | Canada | 3/14/21 | 9.56 |
| 22 | Lung | US | | | | 4.03 | | Lung | A | Test | Canada | 3/14/21 | 4.24 |
| 23 | Lung | US average | 9.57 | 4.32 | 13.17 | 4.03 | | | | | | | |
| 24 | Lung | average | 9.57 | 4.32 | 12.95 | 4.17 | | | | | | | |
| 25 | Total | average | 14.25 | 5.20 | 15.26 | 5.91 | | | | | | | |
| 26 | | | | | | | | | | | | | |
| 27 | | | | | | | | | | | | | |

STEPS 1 AND 2

1 Retrieves the data from the cells to use formulaically

| H1:H22 | I1:I22 | J1:J22 | K1:K22 | L1:L22 | M1:M22 |
|---|---|---|---|---|---|
| Colon | A | Control | US | 12/15/19 | 15.85 |
| Colon | A | Test | US | 12/15/19 | 5.57 |
| Colon | A | Control | US | 1/15/20 | 15.7 |
| Colon | A | Test | US | 1/15/20 | 5.66 |
| Lung | B | Control | Japan | 1/28/20 | 12.72 |
| Lung | B | Test | Japan | 1/28/20 | 4.31 |
| Colon | B | Control | Japan | 2/24/20 | 19.9 |
| Colon | B | Test | Japan | 2/24/20 | 9.4 |
| Colon | A | Control | US | 3/5/20 | 15.87 |
| Colon | A | Test | US | 3/5/20 | 5.45 |
| Lung | B | Control | US | 4/5/20 | 13.17 |
| Lung | B | Test | US | 4/5/20 | 4.03 |
| Colon | A | Control | US | 6/25/20 | 15.86 |
| Colon | A | Test | US | 6/25/20 | 5.35 |
| Lung | A | Control | US | 9/14/20 | 9.57 |
| Lung | A | Test | US | 9/14/20 | 4.32 |
| Colon | B | Control | Japan | 2/18/21 | 18.97 |
| Colon | B | Test | Japan | 2/18/21 | 9.6 |
| Colon | A | Control | US | 3/5/21 | 16.3 |
| Colon | A | Test | US | 3/5/21 | 5.55 |
| Lung | A | Control | Canada | 3/14/21 | 9.56 |
| Lung | A | Test | Canada | 3/14/21 | 4.24 |

2 Constrain (filter) the data to dates between and including 1/1/20 and 12/31/20

| H1:H22 | I1:I22 | J1:J22 | K1:K22 | L1:L22 | M1:M22 |
|---|---|---|---|---|---|
| | | | | | |
| | | | | | |
| Colon | A | Control | US | 1/15/20 | 15.7 |
| Colon | A | Test | US | 1/15/20 | 5.66 |
| Lung | B | Control | Japan | 1/28/20 | 12.72 |
| Lung | B | Test | Japan | 1/28/20 | 4.31 |
| Colon | B | Control | Japan | 2/24/20 | 19.9 |
| Colon | B | Test | Japan | 2/24/20 | 9.4 |
| Colon | A | Control | US | 3/5/20 | 15.87 |
| Colon | A | Test | US | 3/5/20 | 5.45 |
| Lung | B | Control | US | 4/5/20 | 13.17 |
| Lung | B | Test | US | 4/5/20 | 4.03 |
| Colon | A | Control | US | 6/25/20 | 15.86 |
| Colon | A | Test | US | 6/25/20 | 5.35 |
| Lung | A | Control | US | 9/14/20 | 9.57 |
| Lung | A | Test | US | 9/14/20 | 4.32 |

STEPS 3 AND 4

③ 2D setup and sort the data inserting the Vertical average totals and subtotals last

| | | A | A | B | B |
|---|---|---|---|---|---|
| | | Control | Test | Control | Test |
| Colon | Japan | | | 19.9 | |
| Colon | Japan | | | | 9.4 |
| Colon Japan average | | | | 19.9 | 9.4 |
| Colon | US | 15.70 | | | |
| Colon | US | 15.86 | | | |
| Colon | US | 15.87 | | | |
| Colon | US | | 5.35 | | |
| Colon | US | | 5.45 | | |
| Colon | US | | 5.66 | | |
| Colon US average | | 15.81 | 5.49 | 19.9 | 9.4 |
| Colon average | | 15.81 | 5.49 | 19.9 | 9.4 |
| Lung | Japan | | | 12.72 | |
| Lung | Japan | | | | 4.31 |
| Lung Japan average | | | | | |
| Lung | US | 9.57 | | | |
| Lung | US | | 4.32 | | |
| Lung | US | | | 13.17 | |
| Lung | US | | | | 4.03 |
| Lung US average | | 9.57 | 4.32 | 13.17 | 4.03 |
| Lung average | | 9.57 | 4.32 | 12.95 | 4.17 |
| Total average | | 14.25 | 5.20 | 15.26 | 5.91 |

2733, 2743, 2753, 2763, 2773, 2783, 2793, 2753

④ Cell format the data and send it and the formula to cells A3 to F26

| | | **A** | **A** | **B** | **B** |
|---|---|---|---|---|---|
| | | **Control** | **Test** | **Control** | **Test** |
| **Colon** | **Japan** | | | 19.9 | |
| **Colon** | **Japan** | | | | 9.4 |
| **Colon Japan average** | | | | 19.9 | 9.4 |
| **Colon** | **US** | 15.70 | | | |
| **Colon** | **US** | 15.86 | | | |
| **Colon** | **US** | 15.87 | | | |
| **Colon** | **US** | | 5.35 | | |
| **Colon** | **US** | | 5.45 | | |
| **Colon** | **US** | | 5.66 | | |
| **Colon US average** | | 15.81 | 5.49 | 19.9 | 9.4 |
| **Colon average** | | 15.81 | 5.49 | 19.9 | 9.4 |
| **Lung** | **Japan** | | | 12.72 | |
| **Lung** | **Japan** | | | | 4.31 |
| **Lung Japan average** | | | | | |
| **Lung** | **US** | 9.57 | | | |
| **Lung** | **US** | | 4.32 | | |
| **Lung** | **US** | | | 13.17 | |
| **Lung** | **US** | | | | 4.03 |
| **Lung US average** | | 9.57 | 4.32 | 13.17 | 4.03 |
| **Lung average** | | 9.57 | 4.32 | 12.95 | 4.17 |
| **Total average** | | 14.25 | 5.20 | 15.26 | 5.91 |

| | Canada | Canada | Mexico | Mexico | US | US | US |
|---|---|---|---|---|---|---|---|
| | 1 | 2 | 1 | 2 | 1 | 2 | 3 |
| 6/7/21 | $3,249.70 | $1,548.50 | | | $7,345.00 | $6,700.00 | $12,980.00 |
| 6/8/21 | | $3,091.30 | $651.54 | | $6,895.00 | | $14,655.00 |
| 6/9/21 | | | | | | | |
| 6/10/21 | | | | | | | |
| 6/11/21 | $2,187.40 | | | $839.35 | $10,789.00 | $8,835.00 | |
| 6/12/21 | | $703.67 | | | $1,200.00 | | |
| 6/13/21 | | | | | | | |
| 6/14/21 | | $2,458.70 | | | | | |
| 6/15/21 | | | | | | | |
| 6/16/21 | | | $1,041.60 | | $5,975.00 | $9,540.00 | $9,860.00 |
| 6/17/21 | | | | | | | |
| 6/18/21 | | | | | | | $11,090.00 |
| 6/19/21 | | | | | | | |
| 6/20/21 | | $488.34 | | | | $1,250.00 | |

STEP 1

1 Retrieves all the data for the NSC formulaic data fields

| country | region | date | all_don |
|---|---|---|---|
| Canada | 1 | 6/7/21 | 3249.7 |
| Canada | 2 | 6/7/21 | 1548.5 |
| US | 1 | 6/7/21 | 7345 |
| US | 2 | 6/7/21 | 6700 |
| US | 3 | 6/7/21 | 12980 |
| Canada | 2 | 6/8/21 | 3091.3 |
| Mexico | 1 | 6/8/21 | 651.54 |
| US | 1 | 6/8/21 | 6895 |
| US | 3 | 6/9/21 | 14655 |
| Canada | 1 | 6/11/21 | 2187.4 |
| Mexico | 2 | 6/11/21 | 839.35 |
| US | 1 | 6/11/21 | 10780 |
| US | 2 | 6/11/21 | 8835 |
| Canada | 2 | 6/12/21 | 703.67 |
| US | 1 | 6/12/21 | 1200 |
| Canada | 2 | 6/14/21 | 2458.7 |
| Mexico | 1 | 6/16/21 | 1041.6 |
| US | 1 | 6/16/21 | 5975 |
| US | 2 | 6/16/21 | 9540 |
| US | 3 | 6/16/21 | 9860 |
| US | 3 | 6/18/21 | 11090 |
| Canada | 2 | 6/20/19 | 488.34 |
| US | 2 | 6/20/19 | 1250 |

STEPS 2 AND 3

2 2D setup and sort the data ascending (default) for date on the vertical axis and country and region combinations on the horizontal axis

| | Canada | Canada | Mexico | Mexico | US | US | US |
|---|---|---|---|---|---|---|---|
| | 1 | 2 | 1 | 2 | 1 | 2 | 3 |
| 6/7/21 | 3249.7 | 1548.5 | | | 7345 | 6700 | 12980 |
| 6/8/21 | | 3091.3 | 651.54 | | 6895 | | |
| 6/9/21 | | | | | | | 14655 |
| 6/11/21 | 2187.4 | | | 839.35 | 10789 | 8835 | |
| 6/12/21 | | 703.67 | | | 1200 | | |
| 6/14/21 | | 2458.7 | | | | | |
| 6/16/21 | | | 1041.6 | | 5975 | 9540 | 9860 |
| 6/18/21 | | | | | | | 11090 |
| 6/20/21 | | 488.34 | | | | 1250 | |

3043

3 Fill in the missing dates between the specified dates of 6/7/21 through 6/20/21

| | Canada | Canada | Mexico | Mexico | US | US | US |
|---|---|---|---|---|---|---|---|
| | 1 | 2 | 1 | 2 | 1 | 2 | 3 |
| 6/7/21 | 3249.7 | 1548.5 | | | 7345 | 6700 | 12980 |
| 6/8/21 | | 3091.3 | 651.54 | | 6895 | | |
| 6/9/21 | | | | | | | 14655 |
| 6/10/21 | | | | | | | |
| 6/11/21 | 2187.4 | | | 839.35 | 10789 | 8835 | |
| 6/12/21 | | 703.67 | | | 1200 | | |
| 6/13/21 | | | | | | | |
| 6/14/21 | | 2458.7 | | | | | |
| 6/15/21 | | | | | | | |
| 6/16/21 | | | 1041.6 | | 5975 | 9540 | 9860 |
| 6/17/21 | | | | | | | |
| 6/18/21 | | | | | | | 11090 |
| 6/19/21 | | | | | | | |
| 6/20/21 | | 488.34 | | | | 1250 | |

STEP 4

4 Cell format the data and send it and the formula to cells A2 to H17

| | Canada | Canada | Mexico | Mexico | US | US | US |
|---|---|---|---|---|---|---|---|
| | 1 | 2 | 1 | 2 | 1 | 2 | 3 |
| 6/7/21 | $3,249.70 | $1,548.50 | | | $7,345.00 | $6,700.00 | $12,980.00 |
| 6/8/21 | | $3,091.30 | $651.54 | | $6,895.00 | | $14,655.00 |
| 6/9/21 | | | | | | | |
| 6/10/21 | | | | | | | |
| 6/11/21 | $2,187.40 | | | $839.35 | $10,789.00 | $8,835.00 | |
| 6/12/21 | | $703.67 | | | $1,200.00 | | |
| 6/13/21 | | | | | | | |
| 6/14/21 | | $2,458.70 | | | | | |
| 6/15/21 | | | | | | | |
| 6/16/21 | | | $1,041.60 | | $5,975.00 | $9,540.00 | $9,860.00 |
| 6/17/21 | | | | | | | |
| 6/18/21 | | | | | | | $11,090.00 |
| 6/19/21 | | | | | | | |
| 6/20/21 | | $488.34 | | | | $1,250.00 | |

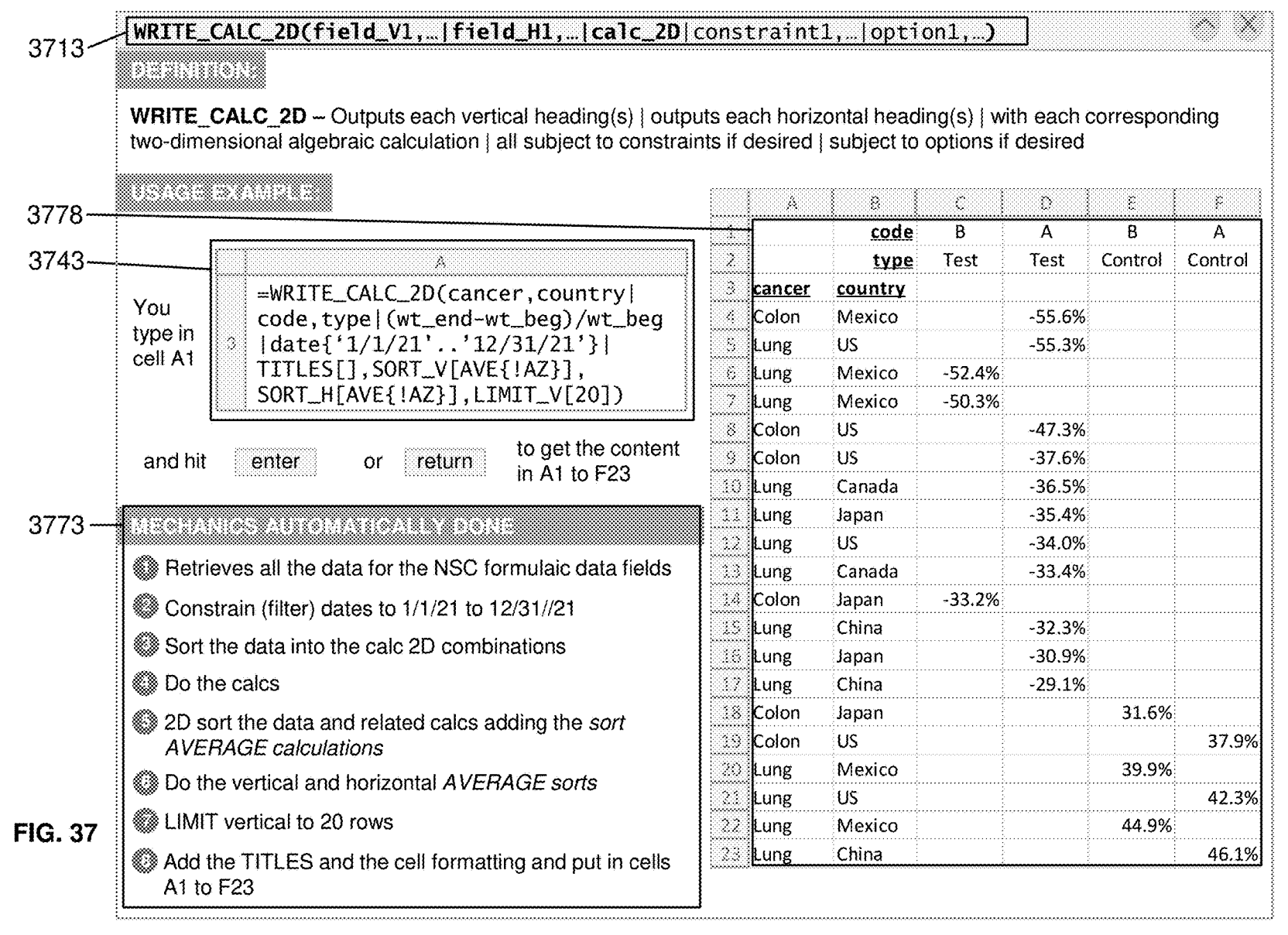

3713 — WRITE_CALC_2D(field_V1,..|field_H1,..|calc_2D|constraint1,..|option1,..)

DEFINITION:

WRITE_CALC_2D – Outputs each vertical heading(s) | outputs each horizontal heading(s) | with each corresponding two-dimensional algebraic calculation | all subject to constraints if desired | subject to options if desired

USAGE EXAMPLE:

3743 — You type in cell A1

```
=WRITE_CALC_2D(cancer,country|
code,type|(wt_end-wt_beg)/wt_beg
|date{'1/1/21'..'12/31/21'}|
TITLES[],SORT_V[AVE{!AZ}],
SORT_H[AVE{!AZ}],LIMIT_V[20])
```

and hit enter or return to get the content in A1 to F23

3778

| | A | B | C | D | E | F |
|---|---|---|---|---|---|---|
| 1 | | **code** | B | A | B | A |
| 2 | | **type** | Test | Test | Control | Control |
| 3 | **cancer** | **country** | | | | |
| 4 | Colon | Mexico | | -55.6% | | |
| 5 | Lung | US | | -55.3% | | |
| 6 | Lung | Mexico | -52.4% | | | |
| 7 | Lung | Mexico | -50.3% | | | |
| 8 | Colon | US | | -47.3% | | |
| 9 | Colon | US | | -37.6% | | |
| 10 | Lung | Canada | | -36.5% | | |
| 11 | Lung | Japan | | -35.4% | | |
| 12 | Lung | US | | -34.0% | | |
| 13 | Lung | Canada | | -33.4% | | |
| 14 | Colon | Japan | -33.2% | | | |
| 15 | Lung | China | | -32.3% | | |
| 16 | Lung | Japan | | -30.9% | | |
| 17 | Lung | China | | -29.1% | | |
| 18 | Colon | Japan | | | 31.6% | |
| 19 | Colon | US | | | | 37.9% |
| 20 | Lung | Mexico | | | 39.9% | |
| 21 | Lung | US | | | | 42.3% |
| 22 | Lung | Mexico | | | 44.9% | |
| 23 | Lung | China | | | | 46.1% |

3773 — MECHANICS AUTOMATICALLY DONE

1. Retrieves all the data for the NSC formulaic data fields
2. Constrain (filter) dates to 1/1/21 to 12/31//21
3. Sort the data into the calc 2D combinations
4. Do the calcs
5. 2D sort the data and related calcs adding the *sort AVERAGE calculations*
6. Do the vertical and horizontal *AVERAGE sorts*
7. LIMIT vertical to 20 rows
8. Add the TITLES and the cell formatting and put in cells A1 to F23

FIG. 37

Retrieves all the data for the NSC formulaic data fields

| date | cancer | country | code | type | wt_beg | wt_end |
|---|---|---|---|---|---|---|
| 12/14/20 | Lung | US | A | Control | 6.32 | 9.57 |
| 12/14/20 | Lung | US | A | Test | 6.35 | 4.32 |
| 2/18/21 | Colon | Japan | B | Control | 14.41 | 18.97 |
| 2/18/21 | Colon | Japan | B | Test | 14.37 | 9.6 |
| 3/5/21 | Colon | US | A | Control | 10.52 | 16.3 |
| 3/5/21 | Colon | US | A | Test | 10.53 | 5.55 |
| 3/14/21 | Lung | Canada | A | Control | 6.41 | 9.56 |
| 3/14/21 | Lung | Canada | A | Test | 6.37 | 4.24 |
| 3/28/21 | Colon | Mexico | A | Control | 10.53 | 15.86 |
| 3/28/21 | Colon | Mexico | A | Test | 10.47 | 4.65 |
| 5/4/21 | Lung | China | A | Control | 6.38 | 9.6 |
| 5/4/21 | Lung | China | A | Test | 6.36 | 4.51 |
| 5/9/21 | Lung | Mexico | B | Control | 8.98 | 13.01 |
| 5/9/21 | Lung | Mexico | B | Test | 8.97 | 4.27 |
| 5/23/21 | Lung | US | A | Control | 6.45 | 9.58 |
| 5/23/21 | Lung | US | A | Test | 6.42 | 4.24 |
| 6/3/21 | Lung | Japan | A | Control | 6.32 | 9.49 |
| 6/3/21 | Lung | Japan | A | Test | 6.44 | 4.45 |
| 7/9/21 | Lung | Canada | A | Control | 6.35 | 9.52 |
| 7/9/21 | Lung | Canada | A | Test | 6.39 | 4.06 |
| 7/21/21 | Colon | US | A | Control | 14.38 | 19.83 |
| 7/21/21 | Colon | US | A | Test | 14.44 | 9.01 |
| 8/18/21 | Lung | China | A | Control | 6.38 | 9.32 |
| 8/18/21 | Lung | China | A | Test | 6.37 | 4.31 |
| 10/7/21 | Lung | US | A | Control | 9.03 | 12.85 |
| 10/7/21 | Lung | US | A | Test | 8.93 | 3.99 |
| 10/9/21 | Lung | Mexico | B | Control | 9.05 | 12.66 |
| 10/9/21 | Lung | Mexico | B | Test | 9 | 4.47 |
| 11/4/21 | Lung | Japan | A | Control | 6.44 | 9.52 |
| 11/4/21 | Lung | Japan | A | Test | 6.35 | 4.1 |
| 1/7/22 | Colon | US | A | Control | 10.48 | 15.86 |
| 1/7/22 | Colon | US | A | Test | 10.53 | 5.35 |

Constrain (filter) dates to 1/1/21 to 12/31//21

| date | cancer | country | code | type | wt_beg | wt_end |
|---|---|---|---|---|---|---|
| | | | | | | |
| | | | | | | |
| 2/18/21 | Colon | Japan | B | Control | 14.41 | 18.97 |
| 2/18/21 | Colon | Japan | B | Test | 14.37 | 9.6 |
| 3/5/21 | Colon | US | A | Control | 10.52 | 16.3 |
| 3/5/21 | Colon | US | A | Test | 10.53 | 5.55 |
| 3/14/21 | Lung | Canada | A | Control | 6.41 | 9.56 |
| 3/14/21 | Lung | Canada | A | Test | 6.37 | 4.24 |
| 3/28/21 | Colon | Mexico | A | Control | 10.53 | 15.86 |
| 3/28/21 | Colon | Mexico | A | Test | 10.47 | 4.65 |
| 5/4/21 | Lung | China | A | Control | 6.38 | 9.6 |
| 5/4/21 | Lung | China | A | Test | 6.36 | 4.51 |
| 5/9/21 | Lung | Mexico | B | Control | 8.98 | 13.01 |
| 5/9/21 | Lung | Mexico | B | Test | 8.97 | 4.27 |
| 5/23/21 | Lung | US | A | Control | 6.45 | 9.58 |
| 5/23/21 | Lung | US | A | Test | 6.42 | 4.24 |
| 6/3/21 | Lung | Japan | A | Control | 6.32 | 9.49 |
| 6/3/21 | Lung | Japan | A | Test | 6.44 | 4.45 |
| 7/9/21 | Lung | Canada | A | Control | 6.35 | 9.52 |
| 7/9/21 | Lung | Canada | A | Test | 6.39 | 4.06 |
| 7/21/21 | Colon | US | A | Control | 14.38 | 19.83 |
| 7/21/21 | Colon | US | A | Test | 14.44 | 9.01 |
| 8/18/21 | Lung | China | A | Control | 6.38 | 9.32 |
| 8/18/21 | Lung | China | A | Test | 6.37 | 4.31 |
| 10/7/21 | Lung | US | A | Control | 9.03 | 12.85 |
| 10/7/21 | Lung | US | A | Test | 8.93 | 3.99 |
| 10/9/21 | Lung | Mexico | B | Control | 9.05 | 12.66 |
| 10/9/21 | Lung | Mexico | B | Test | 9 | 4.47 |
| 11/4/21 | Lung | Japan | A | Control | 6.44 | 9.52 |
| 11/4/21 | Lung | Japan | A | Test | 6.35 | 4.1 |
| | | | | | | |
| | | | | | | |

Sort the data into the calc 2D combinations

| cancer | country | code | type | wt_beg | wt_end |
|---|---|---|---|---|---|
| Colon | Japan | B | Control | 14.41 | 18.97 |
| Colon | Japan | B | Test | 14.37 | 9.6 |
| Colon | Mexico | A | Control | 10.53 | 15.86 |
| Colon | Mexico | A | Test | 10.47 | 4.65 |
| Colon | US | A | Control | 10.52 | 16.3 |
| Colon | US | A | Control | 14.38 | 19.83 |
| Colon | US | A | Test | 10.53 | 5.55 |
| Colon | US | A | Test | 14.44 | 9.01 |
| Lung | Canada | A | Control | 6.41 | 9.56 |
| Lung | Canada | A | Control | 6.35 | 9.52 |
| Lung | Canada | A | Test | 6.37 | 4.24 |
| Lung | Canada | A | Test | 6.39 | 4.06 |
| Lung | China | A | Control | 6.38 | 9.6 |
| Lung | China | A | Control | 6.38 | 9.32 |
| Lung | China | A | Test | 6.36 | 4.51 |
| Lung | China | A | Test | 6.37 | 4.31 |
| Lung | Japan | A | Control | 6.32 | 9.49 |
| Lung | Japan | A | Control | 6.44 | 9.52 |
| Lung | Japan | A | Test | 6.44 | 4.45 |
| Lung | Japan | A | Test | 6.35 | 4.1 |
| Lung | Mexico | B | Control | 8.98 | 13.01 |
| Lung | Mexico | B | Control | 9.05 | 12.66 |
| Lung | Mexico | B | Test | 8.97 | 4.27 |
| Lung | Mexico | B | Test | 9 | 4.47 |
| Lung | US | A | Control | 6.45 | 9.58 |
| Lung | US | A | Control | 9.03 | 12.85 |
| Lung | US | A | Test | 6.42 | 4.24 |
| Lung | US | A | Test | 8.93 | 3.99 |

Do the calcs

3959

3957

| cancer | country | code | type | (wt_beg-wt_end)/wt_beg |
|---|---|---|---|---|
| Colon | Japan | B | Control | 0.316446912 |
| Colon | Japan | B | Test | -0.331941545 |
| Colon | Mexico | A | Control | 0.50617284 |
| Colon | Mexico | A | Test | -0.555873926 |
| Colon | US | A | Control | 0.549429658 |
| Colon | US | A | Control | 0.378998609 |
| Colon | US | A | Test | -0.472934473 |
| Colon | US | A | Test | -0.376038781 |
| Lung | Canada | A | Control | 0.491419657 |
| Lung | Canada | A | Control | 0.499212598 |
| Lung | Canada | A | Test | -0.334379906 |
| Lung | Canada | A | Test | -0.364632238 |
| Lung | China | A | Control | 0.504702194 |
| Lung | China | A | Control | 0.460815047 |
| Lung | China | A | Test | -0.290880503 |
| Lung | China | A | Test | -0.323390895 |
| Lung | Japan | A | Control | 0.501582278 |
| Lung | Japan | A | Control | 0.47826087 |
| Lung | Japan | A | Test | -0.309006211 |
| Lung | Japan | A | Test | -0.354330709 |
| Lung | Mexico | B | Control | 0.448775056 |
| Lung | Mexico | B | Control | 0.398895028 |
| Lung | Mexico | B | Test | -0.523968785 |
| Lung | Mexico | B | Test | -0.503333333 |
| Lung | US | A | Control | 0.485271318 |
| Lung | US | A | Control | 0.42303433 |
| Lung | US | A | Test | -0.339563863 |
| Lung | US | A | Test | -0.553191489 |

FIG. 39

2D sort the data and related calcs adding the *sort AVERAGE calculations*

| | | A Control | A Test | B Control | B Test | *AVERAGE* |
|---|---|---|---|---|---|---|
| Colon | Japan | | | 0.316446912 | | *0.316446912* |
| Colon | Japan | | | | -0.331941545 | *-0.33194154* |
| Colon | Mexico | 0.50617284 | | | | *0.50617284* |
| Colon | Mexico | | -0.555873926 | | | *-0.55587393* |
| Colon | US | 0.549429658 | | | | *0.549429658* |
| Colon | US | 0.378998609 | | | | *0.378998609* |
| Colon | US | | -0.472934473 | | | *-0.47293447* |
| Colon | US | | -0.376038781 | | | *-0.37603878* |
| Lung | Canada | 0.491419657 | | | | *0.491419657* |
| Lung | Canada | 0.499212598 | | | | *0.499212598* |
| Lung | Canada | | -0.334379906 | | | *-0.33437991* |
| Lung | Canada | | -0.364632238 | | | *-0.36463224* |
| Lung | China | 0.504702194 | | | | *0.504702194* |
| Lung | China | 0.460815047 | | | | *0.460815047* |
| Lung | China | | -0.290880503 | | | *-0.2908805* |
| Lung | China | | -0.323390895 | | | *-0.32339089* |
| Lung | Japan | 0.501582278 | | | | *0.501582278* |
| Lung | Japan | 0.47826087 | | | | *0.47826087* |
| Lung | Japan | | -0.309006211 | | | *-0.30900621* |
| Lung | Japan | | -0.354330709 | | | *-0.35433071* |
| Lung | Mexico | | | 0.448775056 | | *0.448775056* |
| Lung | Mexico | | | 0.398895028 | | *0.398895028* |
| Lung | Mexico | | | | -0.523968785 | *-0.52396878* |
| Lung | Mexico | | | | -0.503333333 | *-0.50333333* |
| Lung | US | 0.485271318 | | | | *0.485271318* |
| Lung | US | 0.42303433 | | | | *0.42303433* |
| Lung | US | | -0.339563863 | | | *-0.33956386* |
| Lung | US | | -0.553191489 | | | *-0.55319149* |
| *AVERAGE* | | *0.479899945* | *-0.388565727* | *0.388038998* | *-0.453081221* | |

Do the vertical and horizontal *AVERAGE sorts*

4154 4158 4194

| | | B | A | B | A | *AVERAGE* |
|---|---|---|---|---|---|---|
| | | Test | Test | Control | Control | |
| Colon | Mexico | | -0.555873926 | | | *-0.55587393* |
| Lung | US | | -0.553191489 | | | *-0.55319149* |
| Lung | Mexico | -0.523968785 | | | | *-0.52396878* |
| Lung | Mexico | -0.503333333 | | | | *-0.50333333* |
| Colon | US | | -0.472934473 | | | *-0.47293447* |
| Colon | US | | -0.376038781 | | | *-0.37603878* |
| Lung | Canada | | -0.364632238 | | | *-0.36463224* |
| Lung | Japan | | -0.354330709 | | | *-0.35433071* |
| Lung | US | | -0.339563863 | | | *-0.33956386* |
| Lung | Canada | | -0.334379906 | | | *-0.33437991* |
| Colon | Japan | -0.331941545 | | | | *-0.33194154* |
| Lung | China | | -0.323390895 | | | *-0.32339089* |
| Lung | Japan | | -0.309006211 | | | *-0.30900621* |
| Lung | China | | -0.290880503 | | | *-0.2908805* |
| Colon | Japan | | | 0.316446912 | | *0.316446912* |
| Colon | US | | | | 0.378998609 | *0.378998609* |
| Lung | Mexico | | | 0.398895028 | | *0.398895028* |
| Lung | US | | | | 0.42303433 | *0.42303433* |
| Lung | Mexico | | | 0.448775056 | | *0.448775056* |
| Lung | China | | | | 0.460815047 | *0.460815047* |
| Lung | Japan | | | | 0.47826087 | *0.47826087* |
| Lung | US | | | | 0.485271318 | *0.485271318* |
| Lung | Canada | | | | 0.491419657 | *0.491419657* |
| Lung | Canada | | | | 0.499212598 | *0.499212598* |
| Lung | Japan | | | | 0.501582278 | *0.501582278* |
| Lung | China | | | | 0.504702194 | *0.504702194* |
| Colon | Mexico | | | | 0.50617284 | *0.50617284* |
| Colon | US | | | | 0.549429658 | *0.549429658* |
| *AVERAGE* | | *-0.453081221* | *-0.388565727* | *0.388038998* | *0.479899945* | |

FIG. 41

LIMIT vertical to 20 rows

| | | B Test | A Test | B Control | A Control |
|---|---|---|---|---|---|
| Colon | Mexico | | -0.555873926 | | |
| Lung | US | | -0.553191489 | | |
| Lung | Mexico | -0.523968785 | | | |
| Lung | Mexico | -0.503333333 | | | |
| Colon | US | | -0.472934473 | | |
| Colon | US | | -0.376038781 | | |
| Lung | Canada | | -0.364632238 | | |
| Lung | Japan | | -0.354330709 | | |
| Lung | US | | -0.339563863 | | |
| Lung | Canada | | -0.334379906 | | |
| Colon | Japan | -0.331941545 | | | |
| Lung | China | | -0.323390895 | | |
| Lung | Japan | | -0.309006211 | | |
| Lung | China | | -0.290880503 | | |
| Colon | Japan | | | 0.316446912 | |
| Colon | US | | | | 0.378998609 |
| Lung | Mexico | | | 0.398895028 | |
| Lung | US | | | | 0.42303433 |
| Lung | Mexico | | | 0.448775056 | |
| Lung | China | | | | 0.460815047 |
| Lung | Japan | | | | 0.47826087 |
| Lung | US | | | | 0.485271318 |
| Lung | Canada | | | | 0.491419657 |
| Lung | Canada | | | | 0.499212598 |
| Lung | Japan | | | | 0.50158227 |
| Lung | China | | | | 0.504702194 |
| Colon | Mexico | | | | 0.50617284 |
| Colon | US | | | | 0.549429658 |

Add the TITLES and the cell formatting and put in cells A1 to F23

4323 4326 4356

| | code | B | A | B | A |
|---|---|---|---|---|---|
| | type | Test | Test | Control | Control |
| cancer | country | | | | |
| Colon | Mexico | | -55.6% | | |
| Lung | US | | -55.3% | | |
| Lung | Mexico | -52.4% | | | |
| Lung | Mexico | -50.3% | | | |
| Colon | US | | -47.3% | | |
| Colon | US | | -37.6% | | |
| Lung | Canada | | -36.5% | | |
| Lung | Japan | | -35.4% | | |
| Lung | US | | -34.0% | | |
| Lung | Canada | | -33.4% | | |
| Colon | Japan | -33.2% | | | |
| Lung | China | | -32.3% | | |
| Lung | Japan | | -30.9% | | |
| Lung | China | | -29.1% | | |
| Colon | Japan | | | 31.6% | |
| Colon | US | | | | 37.9% |
| Lung | Mexico | | | 39.9% | |
| Lung | US | | | | 42.3% |
| Lung | Mexico | | | 44.9% | |
| Lung | China | | | | 46.1% |

FIG. 43

| country | type | donate |
|---|---|---|
| US | Mail | 2350 |
| Canada | Online | 288.87 |
| US | Online | 3900 |
| US | Online | 2750 |
| Canada | Online | 467.91 |
| US | Mail | 2500 |
| US | Online | 4500 |
| US | Mail | 2450 |
| Canada | Online | 348.73 |
| US | Mail | 6400 |

| country | type | donate |
|---|---|---|
| Canada | Online | 288.87 |
| Canada | Online | 348.73 |
| Canada | Online | 467.91 |
| US | Mail | 2350 |
| US | Mail | 2450 |
| US | Mail | 2500 |
| US | Mail | 6400 |
| US | Online | 2750 |
| US | Online | 3900 |
| US | Online | 4500 |

| country | type | donate |
|---|---|---|
| Canada | Online | 1105.5 |
| US | Mail | 13700 |
| US | Online | 11150 |

| | Mail | Online |
|---|---|---|
| Canada | | 1105.51 |
| US | 13700 | 11150 |

| | Mail | Online |
|---|---|---|
| Canada | | $1,105.51 |
| US | $13,700.00 | $11,150.00 |

Retrieves all the data for the NSC formulaic data fields

| date | cancer | country | code | type | wt_beg | wt_end |
|---|---|---|---|---|---|---|
| 12/14/20 | Lung | US | A | Control | 6.32 | 9.57 |
| 12/14/20 | Lung | US | A | Test | 6.35 | 4.32 |
| 2/18/21 | Colon | Japan | B | Control | 14.41 | 18.97 |
| 2/18/21 | Colon | Japan | B | Test | 14.37 | 9.6 |
| 3/5/21 | Colon | US | A | Control | 10.52 | 16.3 |
| 3/5/21 | Colon | US | A | Test | 10.53 | 5.55 |
| 3/14/21 | Lung | Canada | A | Control | 6.41 | 9.56 |
| 3/14/21 | Lung | Canada | A | Test | 6.37 | 4.24 |
| 3/28/21 | Colon | Mexico | A | Control | 10.53 | 15.86 |
| 3/28/21 | Colon | Mexico | A | Test | 10.47 | 4.65 |
| 5/4/21 | Lung | China | A | Control | 6.38 | 9.6 |
| 5/4/21 | Lung | China | A | Test | 6.36 | 4.51 |
| 5/9/21 | Lung | Mexico | B | Control | 8.98 | 13.01 |
| 5/9/21 | Lung | Mexico | B | Test | 8.97 | 4.27 |
| 5/23/21 | Lung | US | A | Control | 6.45 | 9.58 |
| 5/23/21 | Lung | US | A | Test | 6.42 | 4.24 |
| 6/3/21 | Lung | Japan | A | Control | 6.32 | 9.49 |
| 6/3/21 | Lung | Japan | A | Test | 6.44 | 4.45 |
| 7/9/21 | Lung | Canada | A | Control | 6.35 | 9.52 |
| 7/9/21 | Lung | Canada | A | Test | 6.39 | 4.06 |
| 7/21/21 | Colon | US | A | Control | 14.38 | 19.83 |
| 7/21/21 | Colon | US | A | Test | 14.44 | 9.01 |
| 8/18/21 | Lung | China | A | Control | 6.38 | 9.32 |
| 8/18/21 | Lung | China | A | Test | 6.37 | 4.31 |
| 10/7/21 | Lung | US | A | Control | 9.03 | 12.85 |
| 10/7/21 | Lung | US | A | Test | 8.93 | 3.99 |
| 10/9/21 | Lung | Mexico | B | Control | 9.05 | 12.66 |
| 10/9/21 | Lung | Mexico | B | Test | 9 | 4.47 |
| 11/4/21 | Lung | Japan | A | Control | 6.44 | 9.52 |
| 11/4/21 | Lung | Japan | A | Test | 6.35 | 4.1 |
| 1/7/22 | Colon | US | A | Control | 10.48 | 15.86 |
| 1/7/22 | Colon | US | A | Test | 10.53 | 5.35 |

Constrain (filter) dates to 1/1/21 to 12/31//21

| date | cancer | country | code | type | wt_beg | wt_end |
|---|---|---|---|---|---|---|
| | | | | | | |
| | | | | | | |
| 2/18/21 | Colon | Japan | B | Control | 14.41 | 18.97 |
| 2/18/21 | Colon | Japan | B | Test | 14.37 | 9.6 |
| 3/5/21 | Colon | US | A | Control | 10.52 | 16.3 |
| 3/5/21 | Colon | US | A | Test | 10.53 | 5.55 |
| 3/14/21 | Lung | Canada | A | Control | 6.41 | 9.56 |
| 3/14/21 | Lung | Canada | A | Test | 6.37 | 4.24 |
| 3/28/21 | Colon | Mexico | A | Control | 10.53 | 15.86 |
| 3/28/21 | Colon | Mexico | A | Test | 10.47 | 4.65 |
| 5/4/21 | Lung | China | A | Control | 6.38 | 9.6 |
| 5/4/21 | Lung | China | A | Test | 6.36 | 4.51 |
| 5/9/21 | Lung | Mexico | B | Control | 8.98 | 13.01 |
| 5/9/21 | Lung | Mexico | B | Test | 8.97 | 4.27 |
| 5/23/21 | Lung | US | A | Control | 6.45 | 9.58 |
| 5/23/21 | Lung | US | A | Test | 6.42 | 4.24 |
| 6/3/21 | Lung | Japan | A | Control | 6.32 | 9.49 |
| 6/3/21 | Lung | Japan | A | Test | 6.44 | 4.45 |
| 7/9/21 | Lung | Canada | A | Control | 6.35 | 9.52 |
| 7/9/21 | Lung | Canada | A | Test | 6.39 | 4.06 |
| 7/21/21 | Colon | US | A | Control | 14.38 | 19.83 |
| 7/21/21 | Colon | US | A | Test | 14.44 | 9.01 |
| 8/18/21 | Lung | China | A | Control | 6.38 | 9.32 |
| 8/18/21 | Lung | China | A | Test | 6.37 | 4.31 |
| 10/7/21 | Lung | US | A | Control | 9.03 | 12.85 |
| 10/7/21 | Lung | US | A | Test | 8.93 | 3.99 |
| 10/9/21 | Lung | Mexico | B | Control | 9.05 | 12.66 |
| 10/9/21 | Lung | Mexico | B | Test | 9 | 4.47 |
| 11/4/21 | Lung | Japan | A | Control | 6.44 | 9.52 |
| 11/4/21 | Lung | Japan | A | Test | 6.35 | 4.1 |
| | | | | | | |
| | | | | | | |

Sort the data into the calc loops

| cancer | country | code | type | wt_beg | wt_end |
|---|---|---|---|---|---|
| Colon | Japan | B | Control | 14.41 | 18.97 |
| Colon | Japan | B | Test | 14.37 | 9.6 |
| Colon | Mexico | A | Control | 10.53 | 15.86 |
| Colon | Mexico | A | Test | 10.47 | 4.65 |
| Colon | US | A | Control | 10.52 | 16.3 |
| Colon | US | A | Control | 14.38 | 19.83 |
| Colon | US | A | Test | 10.53 | 5.55 |
| Colon | US | A | Test | 14.44 | 9.01 |
| Lung | Canada | A | Control | 6.41 | 9.56 |
| Lung | Canada | A | Control | 6.35 | 9.52 |
| Lung | Canada | A | Test | 6.37 | 4.24 |
| Lung | Canada | A | Test | 6.39 | 4.06 |
| Lung | China | A | Control | 6.38 | 9.6 |
| Lung | China | A | Control | 6.38 | 9.32 |
| Lung | China | A | Test | 6.36 | 4.51 |
| Lung | China | A | Test | 6.37 | 4.31 |
| Lung | Japan | A | Control | 6.32 | 9.49 |
| Lung | Japan | A | Control | 6.44 | 9.52 |
| Lung | Japan | A | Test | 6.44 | 4.45 |
| Lung | Japan | A | Test | 6.35 | 4.1 |
| Lung | Mexico | B | Control | 8.98 | 13.01 |
| Lung | Mexico | B | Control | 9.05 | 12.66 |
| Lung | Mexico | B | Test | 8.97 | 4.27 |
| Lung | Mexico | B | Test | 9 | 4.47 |
| Lung | US | A | Control | 6.45 | 9.58 |
| Lung | US | A | Control | 9.03 | 12.85 |
| Lung | US | A | Test | 6.42 | 4.24 |
| Lung | US | A | Test | 8.93 | 3.99 |

4734

4733

4753

Do the loop calcs

| cancer | country | code | type | (SUM(wt_beg)-SUM(wt_end))/SUM(wt_beg) |
|---|---|---|---|---|
| Colon | Japan | B | Control | 0.316446912 |
| Colon | Japan | B | Test | -0.331941545 |
| Colon | Mexico | A | Control | 0.50617284 |
| Colon | Mexico | A | Test | -0.555873926 |
| Colon | US | A | Control | 0.451004016 |
| Colon | US | A | Test | -0.41690028 |
| Lung | Canada | A | Control | 0.495297806 |
| Lung | Canada | A | Test | -0.349529781 |
| Lung | China | A | Control | 0.482758621 |
| Lung | China | A | Test | -0.307148468 |
| Lung | Japan | A | Control | 0.489811912 |
| Lung | Japan | A | Test | -0.331508991 |
| Lung | Mexico | B | Control | 0.423738214 |
| Lung | Mexico | B | Test | -0.513633834 |
| Lung | US | A | Control | 0.448966408 |
| Lung | US | A | Test | -0.463843648 |

2D sort the data and related calcs adding the titles with the titles formatting 4833 4836 4843 4846

| | code | A | A | B | B |
|---|---|---|---|---|---|
| | type | Control | Test | Control | Test |
| cancer | country | | | | |
| Colon | Japan | | | 0.316446912 | -0.331941545 |
| Colon | Mexico | 0.50617284 | -0.555873926 | | |
| Colon | US | 0.451004016 | -0.41690028 | | |
| Lung | Canada | 0.495297806 | -0.349529781 | | |
| Lung | China | 0.482758621 | -0.307148468 | | |
| Lung | Japan | 0.489811912 | -0.331508991 | | |
| Lung | Mexico | | | 0.423738214 | -0.513633834 |
| Lung | US | 0.448966408 | -0.463843648 | | |

Add the cell formatting and place the values and formula in cells A1 to F11

4875 4885

| | code | A | A | B | B |
|---|---|---|---|---|---|
| | type | Control | Test | Control | Test |
| cancer | country | | | | |
| Colon | Japan | | | 31.6% | -33.2% |
| Colon | Mexico | 50.6% | -55.6% | | |
| Colon | US | 45.1% | -41.7% | | |
| Lung | Canada | 49.5% | -35.0% | | |
| Lung | China | 48.3% | -30.7% | | |
| Lung | Japan | 49.0% | -33.2% | | |
| Lung | Mexico | | | 42.4% | -51.4% |
| Lung | US | 44.9% | -46.4% | | |

FIG. 48

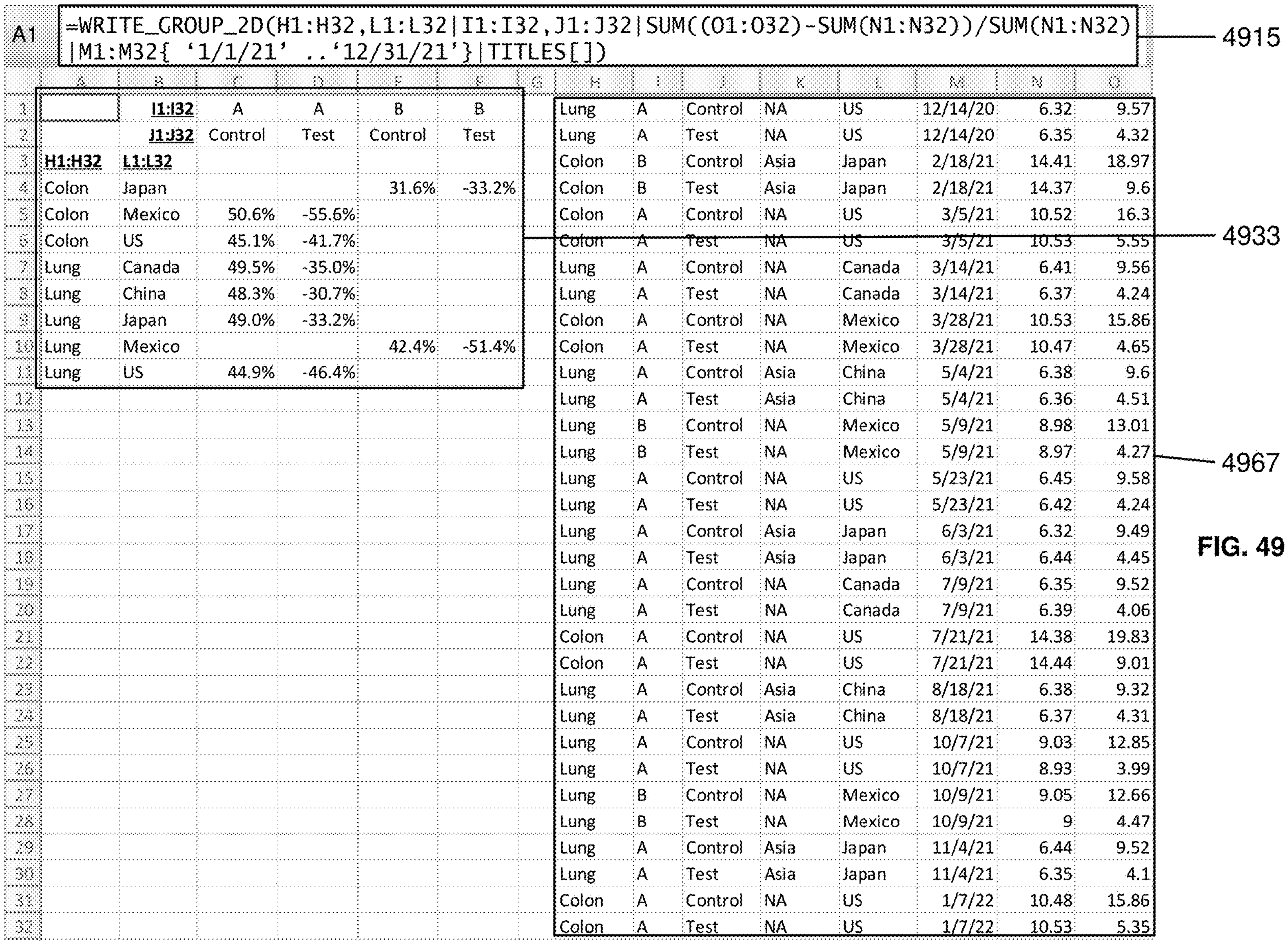

A1 =WRITE_GROUP_2D(H1:H32,L1:L32|I1:I32,J1:J32|SUM((O1:O32)-SUM(N1:N32))/SUM(N1:N32)|M1:M32{ '1/1/21' ..'12/31/21'}|TITLES[])

| | A | B | C | D | E | F | G | H | I | J | K | L | M | N | O |
|---|---|---|---|---|---|---|---|---|---|---|---|---|---|---|---|
| 1 | | I1:I32 | A | A | B | B | | Lung | A | Control | NA | US | 12/14/20 | 6.32 | 9.57 |
| 2 | | J1:J32 | Control | Test | Control | Test | | Lung | A | Test | NA | US | 12/14/20 | 6.35 | 4.32 |
| 3 | H1:H32 | L1:L32 | | | | | | Colon | B | Control | Asia | Japan | 2/18/21 | 14.41 | 18.97 |
| 4 | Colon | Japan | | | 31.6% | -33.2% | | Colon | B | Test | Asia | Japan | 2/18/21 | 14.37 | 9.6 |
| 5 | Colon | Mexico | 50.6% | -55.6% | | | | Colon | A | Control | NA | US | 3/5/21 | 10.52 | 16.3 |
| 6 | Colon | US | 45.1% | -41.7% | | | | Colon | A | Test | NA | US | 3/5/21 | 10.53 | 5.55 |
| 7 | Lung | Canada | 49.5% | -35.0% | | | | Lung | A | Control | NA | Canada | 3/14/21 | 6.41 | 9.56 |
| 8 | Lung | China | 48.3% | -30.7% | | | | Lung | A | Test | NA | Canada | 3/14/21 | 6.37 | 4.24 |
| 9 | Lung | Japan | 49.0% | -33.2% | | | | Colon | A | Control | NA | Mexico | 3/28/21 | 10.53 | 15.86 |
| 10 | Lung | Mexico | | | 42.4% | -51.4% | | Colon | A | Test | NA | Mexico | 3/28/21 | 10.47 | 4.65 |
| 11 | Lung | US | 44.9% | -46.4% | | | | Lung | A | Control | Asia | China | 5/4/21 | 6.38 | 9.6 |
| 12 | | | | | | | | Lung | A | Test | Asia | China | 5/4/21 | 6.36 | 4.51 |
| 13 | | | | | | | | Lung | B | Control | NA | Mexico | 5/9/21 | 8.98 | 13.01 |
| 14 | | | | | | | | Lung | B | Test | NA | Mexico | 5/9/21 | 8.97 | 4.27 |
| 15 | | | | | | | | Lung | A | Control | NA | US | 5/23/21 | 6.45 | 9.58 |
| 16 | | | | | | | | Lung | A | Test | NA | US | 5/23/21 | 6.42 | 4.24 |
| 17 | | | | | | | | Lung | A | Control | Asia | Japan | 6/3/21 | 6.32 | 9.49 |
| 18 | | | | | | | | Lung | A | Test | Asia | Japan | 6/3/21 | 6.44 | 4.45 |
| 19 | | | | | | | | Lung | A | Control | NA | Canada | 7/9/21 | 6.35 | 9.52 |
| 20 | | | | | | | | Lung | A | Test | NA | Canada | 7/9/21 | 6.39 | 4.06 |
| 21 | | | | | | | | Colon | A | Control | NA | US | 7/21/21 | 14.38 | 19.83 |
| 22 | | | | | | | | Colon | A | Test | NA | US | 7/21/21 | 14.44 | 9.01 |
| 23 | | | | | | | | Lung | A | Control | Asia | China | 8/18/21 | 6.38 | 9.32 |
| 24 | | | | | | | | Lung | A | Test | Asia | China | 8/18/21 | 6.37 | 4.31 |
| 25 | | | | | | | | Lung | A | Control | NA | US | 10/7/21 | 9.03 | 12.85 |
| 26 | | | | | | | | Lung | A | Test | NA | US | 10/7/21 | 8.93 | 3.99 |
| 27 | | | | | | | | Lung | B | Control | NA | Mexico | 10/9/21 | 9.05 | 12.66 |
| 28 | | | | | | | | Lung | B | Test | NA | Mexico | 10/9/21 | 9 | 4.47 |
| 29 | | | | | | | | Lung | A | Control | Asia | Japan | 11/4/21 | 6.44 | 9.52 |
| 30 | | | | | | | | Lung | A | Test | Asia | Japan | 11/4/21 | 6.35 | 4.1 |
| 31 | | | | | | | | Colon | A | Control | NA | US | 1/7/22 | 10.48 | 15.86 |
| 32 | | | | | | | | Colon | A | Test | NA | US | 1/7/22 | 10.53 | 5.35 |

1 Retrieves all the data for the NSC formulaic data fields

| type | continent | country | donate |
|---|---|---|---|
| Online | Europe | Germany | 204.32 |
| Online | NA | US | 750 |
| Mail | Europe | France | 172.4 |
| Online | NA | US | 425 |
| Mail | Asia | China | 350.5 |
| Online | Europe | Germany | 477.43 |
| Online | NA | Canada | 108.47 |
| Online | Asia | Japan | 624.87 |
| Mail | Europe | UK | 590.1 |
| Online | Asia | Japan | 244.32 |
| Online | Europe | UK | 340.43 |
| Mail | NA | US | 2200 |
| Online | Europe | Germany | 347.98 |
| Mail | NA | Canada | 274.65 |
| Online | NA | US | 75 |

5255

5235

2 Sorts the data into the combined vertical and horizontal loops

| continent | country | type | donate |
|---|---|---|---|
| Asia | China | Mail | 350.5 |
| Asia | Japan | Online | 624.87 |
| Asia | Japan | Online | 244.32 |
| Europe | France | Mail | 172.4 |
| Europe | Germany | Online | 204.32 |
| Europe | Germany | Online | 477.43 |
| Europe | Germany | Online | 347.98 |
| Europe | UK | Mail | 590.1 |
| Europe | UK | Online | 340.43 |
| NA | Canada | Mail | 274.65 |
| NA | Canada | Online | 108.47 |
| NA | US | Mail | 2200 |
| NA | US | Online | 750 |
| NA | US | Online | 425 |
| NA | US | Online | 75 |

5258

5238

5269

5239

3 Do the COUNT loop calculations

| continent | country | type | COUNT( donate{}) |
|---|---|---|---|
| Asia | China | Mail | 1 |
| Asia | Japan | Online | 2 |
| | | | |
| Europe | France | Mail | 1 |
| Europe | Germany | Online | 3 |
| | | | |
| | | | |
| Europe | UK | Mail | 1 |
| Europe | UK | Online | 1 |
| NA | Canada | Mail | 1 |
| NA | Canada | Online | 1 |
| NA | US | Mail | 1 |
| NA | US | Online | 3 |
| | | | |
| | | | |

1 Retrieves all the data for the NSC formulaic data fields

| type | continent | country | donate |
|---|---|---|---|
| Online | Europe | Germany | 204.32 |
| Online | NA | US | 750 |
| Mail | Europe | France | 172.4 |
| Online | NA | US | 425 |
| Mail | Asia | China | 350.5 |
| Online | Europe | Germany | 477.43 |
| Online | NA | Canada | 108.47 |
| Online | Asia | Japan | 624.87 |
| Mail | Europe | UK | 590.1 |
| Online | Asia | Japan | 244.32 |
| Online | Europe | UK | 340.43 |
| Mail | NA | US | 2200 |
| Online | Europe | Germany | 347.98 |
| Mail | NA | Canada | 274.65 |
| Online | NA | US | 75 |

2 Sorts the data into the combined vertical and horizontal loops

| continent | country | type | donate |
|---|---|---|---|
| Asia | China | Mail | 350.5 |
| Asia | Japan | Online | 624.87 |
| Asia | Japan | Online | 244.32 |
| Europe | France | Mail | 172.4 |
| Europe | Germany | Online | 204.32 |
| Europe | Germany | Online | 477.43 |
| Europe | Germany | Online | 347.98 |
| Europe | UK | Mail | 590.1 |
| Europe | UK | Online | 340.43 |
| NA | Canada | Mail | 274.65 |
| NA | Canada | Online | 108.47 |
| NA | US | Mail | 2200 |
| NA | US | Online | 750 |
| NA | US | Online | 425 |
| NA | US | Online | 75 |

3 Do the COUNT loop calculations, dividing the count of each of the double vertical loops by the count of its single vertical loop

| continent | country | type | COUNT(donate{})/ COUNT(donate{ !LOOP_V1} |
|---|---|---|---|
| Asia | China | Mail | 0.333333333 |
| Asia | Japan | Online | 0.666666667 |
| | | | |
| Europe | France | Mail | 0.166666667 |
| Europe | Germany | Online | 0.5 |
| | | | |
| | | | |
| Europe | UK | Mail | 0.166666667 |
| Europe | UK | Online | 0.166666667 |
| NA | Canada | Mail | 0.166666667 |
| NA | Canada | Online | 0.166666667 |
| NA | US | Mail | 0.166666667 |
| NA | US | Online | 0.5 |
| | | | |
| | | | |

① Retrieves all the data for the NSC formulaic data fields

| type | continent | country | donate |
|---|---|---|---|
| Online | Europe | Germany | 204.32 |
| Online | NA | US | 750 |
| Mail | Europe | France | 172.4 |
| Online | NA | US | 425 |
| Mail | Asia | China | 350.5 |
| Online | Europe | Germany | 477.43 |
| Online | NA | Canada | 108.47 |
| Online | Asia | Japan | 624.87 |
| Mail | Europe | UK | 590.1 |
| Online | Asia | Japan | 244.32 |
| Online | Europe | UK | 340.43 |
| Mail | NA | US | 2200 |
| Online | Europe | Germany | 347.98 |
| Mail | NA | Canada | 274.65 |
| Online | NA | US | 75 |

② Sorts the data into the combined vertical and horizontal loops

| continent | country | type | donate |
|---|---|---|---|
| Asia | China | Mail | 350.5 |
| Asia | Japan | Online | 624.87 |
| Asia | Japan | Online | 244.32 |
| Europe | France | Mail | 172.4 |
| Europe | Germany | Online | 204.32 |
| Europe | Germany | Online | 477.43 |
| Europe | Germany | Online | 347.98 |
| Europe | UK | Mail | 590.1 |
| Europe | UK | Online | 340.43 |
| NA | Canada | Mail | 274.65 |
| NA | Canada | Online | 108.47 |
| NA | US | Mail | 2200 |
| NA | US | Online | 750 |
| NA | US | Online | 425 |
| NA | US | Online | 75 |

③ Do the COUNT loop calculations, dividing the count of each of the double vertical loops by the count of ALL donate values (not loop related)

| continent | country | type | COUNT(donate{})/ COUNT(donate{ !ALL}) |
|---|---|---|---|
| Asia | China | Mail | 0.066666667 |
| Asia | Japan | Online | 0.133333333 |
| | | | |
| Europe | France | Mail | 0.066666667 |
| Europe | Germany | Online | 0.2 |
| | | | |
| | | | |
| Europe | UK | Mail | 0.066666667 |
| Europe | UK | Online | 0.066666667 |
| NA | Canada | Mail | 0.066666667 |
| NA | Canada | Online | 0.066666667 |
| NA | US | Mail | 0.066666667 |
| NA | US | Online | 0.2 |
| | | | |
| | | | |

2D sort the data and related calcs adding the vertical subtotals and horizontal Totals

| | | Mail | Online | Total |
|---|---|---|---|---|
| Asia | China | 0.06666667 | | |
| | Japan | | 0.13333333 | |
| | subtotal | | | |
| Europe | France | 0.06666667 | | |
| | Germany | | 0.2 | |
| | UK | 0.06666667 | 0.06666667 | |
| | subtotal | | | |
| NA | Canada | 0.06666667 | 0.06666667 | |
| | US | 0.06666667 | 0.2 | |
| | subtotal | | | |
| Total | | | | |

6063

Do the Totals and subtotals calculations

| | | Mail | Online | Total |
|---|---|---|---|---|
| Asia | China | 0.06666667 | | 0.06666667 |
| | Japan | | 0.13333333 | 0.13333333 |
| | subtotal | 0.06666667 | 0.13333333 | 0.2 |
| Europe | France | 0.06666667 | | 0.06666667 |
| | Germany | | 0.2 | 0.2 |
| | UK | 0.06666667 | 0.06666667 | 0.13333333 |
| | subtotal | 0.13333333 | 0.26666667 | 0.4 |
| NA | Canada | 0.06666667 | 0.06666667 | 0.13333333 |
| | US | 0.06666667 | 0.2 | 0.26666667 |
| | subtotal | 0.13333333 | 0.26666667 | 0.4 |
| Total | | 0.33333333 | 0.66666667 | 1 |

Do the Totals and subtotals calculations

| | | Mail | Online | Total |
|---|---|---|---|---|
| Asia | China | 0.06666667 | | 0.06666667 |
| | Japan | | 0.13333333 | 0.13333333 |
| | subtotal | 0.06666667 | 0.13333333 | 0.2 |
| Europe | France | 0.06666667 | | 0.06666667 |
| | Germany | | 0.2 | 0.2 |
| | UK | 0.06666667 | 0.06666667 | 0.13333333 |
| | subtotal | 0.13333333 | 0.26666667 | 0.4 |
| NA | Canada | 0.06666667 | 0.06666667 | 0.13333333 |
| | US | 0.06666667 | 0.2 | 0.26666667 |
| | subtotal | 0.13333333 | 0.26666667 | 0.4 |
| Total | | 0.33333333 | 0.66666667 | 1 |

Cell format the data, totals, subtotals and their headings and send it and the formula to cells A1 to E12

| | | **Mail** | **Online** | **Total** |
|---|---|---|---|---|
| **Asia** | **China** | 6.7% | 0.0% | 6.7% |
| | **Japan** | 0.0% | 13.3% | 13.3% |
| | **subtotal** | 6.7% | 13.3% | 20.0% |
| **Europe** | **France** | 6.7% | 0.0% | 6.7% |
| | **Germany** | 0.0% | 20.0% | 20.0% |
| | **UK** | 6.7% | 6.7% | 13.3% |
| | **subtotal** | 13.3% | 26.7% | 40.0% |
| **NA** | **Canada** | 6.7% | 6.7% | 13.3% |
| | **US** | 6.7% | 20.0% | 26.7% |
| | **subtotal** | 13.3% | 26.7% | 40.0% |
| **Total** | | 33.3% | 66.7% | 100.0% |

FIG. 61

1 Retrieves all the data for the NSC formulaic data fields

| date | country | type | donate |
|---|---|---|---|
| 1/30/21 | Canada | Online | 204.32 |
| 2/2/21 | Canada | Online | 189.34 |
| 2/3/21 | US | Mail | 750 |
| 2/3/21 | Mexico | Online | 425.23 |
| 2/3/21 | US | Mail | 480 |
| 2/4/21 | US | Online | 880 |
| 2/4/21 | Canada | Online | 108.47 |
| 2/4/21 | Canada | Online | 624.87 |
| 2/6/21 | US | Mail | 900 |
| 2/6/21 | US | Online | 350 |
| 2/6/21 | US | Online | 650 |
| 2/6/21 | US | Mail | 2200 |
| 2/6/21 | Mexico | Online | 347.98 |
| 2/8/21 | Canada | Mail | 274.65 |
| 2/8/21 | US | Online | 95 |

6343

2 Constrain (filter) the data to dates between and including 2/1/21 and 2/7/21

| date | country | type | donate |
|---|---|---|---|
| | | | |
| 2/2/21 | Canada | Online | 189.34 |
| 2/3/21 | US | Mail | 750 |
| 2/3/21 | Mexico | Online | 425.23 |
| 2/3/21 | US | Mail | 480 |
| 2/4/21 | US | Online | 880 |
| 2/4/21 | Canada | Online | 108.47 |
| 2/4/21 | Canada | Online | 624.87 |
| 2/6/21 | US | Mail | 900 |
| 2/6/21 | US | Online | 350 |
| 2/6/21 | US | Online | 650 |
| 2/6/21 | US | Mail | 2200 |
| 2/6/21 | Mexico | Online | 347.98 |
| | | | |
| | | | |

Sort the data into the calc loops

| date | country | type | donate |
|---|---|---|---|
| 2/2/21 | Canada | Online | 189.34 |
| 2/3/21 | Mexico | Online | 425.23 |
| 2/3/21 | US | Mail | 750 |
| 2/3/21 | US | Mail | 480 |
| 2/4/21 | Canada | Online | 108.47 |
| 2/4/21 | Canada | Online | 624.87 |
| 2/4/21 | US | Online | 880 |
| 2/6/21 | Mexico | Online | 347.98 |
| 2/6/21 | US | Mail | 900 |
| 2/6/21 | US | Mail | 2200 |
| 2/6/21 | US | Online | 350 |
| 2/6/21 | US | Online | 650 |

6453

Do the loop calcs

| date | country | type | SUM( donate{}) |
|---|---|---|---|
| 2/2/21 | Canada | Online | 189.34 |
| 2/3/21 | Mexico | Online | 425.23 |
| 2/3/21 | US | Mail | 1230 |
| | | | |
| 2/4/21 | Canada | Online | 733.34 |
| | | | |
| 2/4/21 | US | Online | 880 |
| 2/6/21 | Mexico | Online | 347.98 |
| 2/6/21 | US | Mail | 3100 |
| | | | |
| 2/6/21 | US | Online | 1000 |
| | | | |

① Retrieves all the data for the NSC formulaic data fields

| country | donate | date |
|---|---|---|
| France | 934 | 7/9/21 |
| Spain | 1240 | 7/9/21 |
| France | 1341 | 7/9/21 |
| Spain | 539 | 7/9/21 |
| France | 726 | 7/9/21 |
| Spain | 963 | 7/10/21 |
| France | 522 | 7/10/21 |
| Spain | 1418 | 7/12/21 |
| Spain | 525 | 7/12/21 |
| Spain | 1724 | 7/13/21 |
| France | 943 | 7/13/21 |
| France | 1394 | 7/13/21 |
| Spain | 1725 | 7/13/21 |
| France | 916 | 7/13/21 |
| France | 1268 | 7/16/21 |
| Spain | 827 | 7/16/21 |
| France | 826 | 7/16/21 |
| France | 1006 | 7/16/21 |
| Spain | 1124 | 7/17/21 |
| Spain | 357 | 7/17/21 |
| Spain | 1507 | 7/18/21 |
| France | 936 | 7/18/21 |
| Spain | 179 | 7/18/21 |
| Spain | 2683 | 7/19/21 |
| France | 2573 | 7/19/21 |
| Spain | 1557 | 7/19/21 |
| France | 1494 | 7/20/21 |

② Sort the data into the calc loops

| date | country | donate |
|---|---|---|
| 7/9/21 | France | 1341 |
| 7/9/21 | France | 726 |
| 7/9/21 | France | 934 |
| 7/9/21 | Spain | 1240 |
| 7/9/21 | Spain | 539 |
| 7/10/21 | France | 522 |
| 7/10/21 | Spain | 963 |
| 7/12/21 | Spain | 1418 |
| 7/12/21 | Spain | 525 |
| 7/13/21 | France | 1394 |
| 7/13/21 | France | 943 |
| 7/13/21 | France | 916 |
| 7/13/21 | Spain | 1724 |
| 7/13/21 | Spain | 1725 |
| 7/16/21 | France | 1268 |
| 7/16/21 | France | 826 |
| 7/16/21 | France | 1006 |
| 7/16/21 | Spain | 827 |
| 7/17/21 | Spain | 1124 |
| 7/17/21 | Spain | 357 |
| 7/18/21 | France | 936 |
| 7/18/21 | Spain | 1507 |
| 7/18/21 | Spain | 179 |
| 7/19/21 | France | 2573 |
| 7/19/21 | Spain | 2683 |
| 7/19/21 | Spain | 1557 |
| 7/20/21 | France | 1494 |

③ Do the loop calcs

| date | country | SUM(donate) |
|---|---|---|
| 7/9/21 | France | 3001 |
| | | |
| | | |
| 7/9/21 | Spain | 1779 |
| | | |
| 7/10/21 | France | 522 |
| 7/10/21 | Spain | 963 |
| 7/12/21 | Spain | 1943 |
| | | |
| 7/13/21 | France | 3253 |
| | | |
| | | |
| 7/13/21 | Spain | 3449 |
| | | |
| 7/16/21 | France | 3100 |
| | | |
| | | |
| 7/16/21 | Spain | 827 |
| 7/17/21 | Spain | 1481 |
| | | |
| 7/18/21 | France | 936 |
| 7/18/21 | Spain | 1686 |
| | | |
| 7/19/21 | France | 2573 |
| 7/19/21 | Spain | 4240 |
| | | |
| 7/20/21 | France | 1494 |

| | A | B | C |
|---|---|---|---|
| 1 | | France | Spain |
| 2 | 7/13/21 | $3,253.00 | $3,449.00 |
| 3 | 7/16/21 | $3,100.00 | $827.00 |
| 4 | 7/9/21 | $3,001.00 | $1,779.00 |
| 5 | 7/19/21 | $2,573.00 | $4,240.00 |
| 6 | 7/20/21 | $1,494.00 | |
| 7 | 7/18/21 | $936.00 | $1,686.00 |
| 8 | 7/10/21 | $522.00 | $963.00 |
| 9 | 7/17/21 | | $1,481.00 |
| 10 | 7/12/21 | | $1,943.00 |

7153

1 Retrieves all the data for the NSC formulaic data fields

| country | donate | date |
|---|---|---|
| France | 934 | 7/9/21 |
| Spain | 1240 | 7/9/21 |
| France | 1341 | 7/9/21 |
| Spain | 539 | 7/9/21 |
| France | 726 | 7/9/21 |
| Spain | 963 | 7/10/21 |
| France | 522 | 7/10/21 |
| Spain | 1418 | 7/12/21 |
| Spain | 525 | 7/12/21 |
| Spain | 1724 | 7/13/21 |
| France | 943 | 7/13/21 |
| France | 1394 | 7/13/21 |
| Spain | 1725 | 7/13/21 |
| France | 916 | 7/13/21 |
| France | 1268 | 7/16/21 |
| Spain | 827 | 7/16/21 |
| France | 826 | 7/16/21 |
| France | 1006 | 7/16/21 |
| Spain | 1124 | 7/17/21 |
| Spain | 357 | 7/17/21 |
| Spain | 1507 | 7/18/21 |
| France | 936 | 7/18/21 |
| Spain | 179 | 7/18/21 |
| Spain | 2683 | 7/19/21 |
| France | 2573 | 7/19/21 |
| Spain | 1557 | 7/19/21 |
| France | 1494 | 7/20/21 |

7155

2 Sort the data into the calc loops

| date | country | donate |
|---|---|---|
| 7/9/21 | France | 1341 |
| 7/9/21 | France | 726 |
| 7/9/21 | France | 934 |
| 7/9/21 | Spain | 1240 |
| 7/9/21 | Spain | 539 |
| 7/10/21 | France | 522 |
| 7/10/21 | Spain | 963 |
| 7/12/21 | Spain | 1418 |
| 7/12/21 | Spain | 525 |
| 7/13/21 | France | 1394 |
| 7/13/21 | France | 943 |
| 7/13/21 | France | 916 |
| 7/13/21 | Spain | 1724 |
| 7/13/21 | Spain | 1725 |
| 7/16/21 | France | 1268 |
| 7/16/21 | France | 826 |
| 7/16/21 | France | 1006 |
| 7/16/21 | Spain | 827 |
| 7/17/21 | Spain | 1124 |
| 7/17/21 | Spain | 357 |
| 7/18/21 | France | 936 |
| 7/18/21 | Spain | 1507 |
| 7/18/21 | Spain | 179 |
| 7/19/21 | France | 2573 |
| 7/19/21 | Spain | 2683 |
| 7/19/21 | Spain | 1557 |
| 7/20/21 | France | 1494 |

7157

3 Do the loop calcs

| date | country | donate |
|---|---|---|
| 7/9/21 | France | 3001 |
| | | |
| | | |
| 7/9/21 | Spain | 1779 |
| | | |
| 7/10/21 | France | 522 |
| 7/10/21 | Spain | 963 |
| 7/12/21 | Spain | 1943 |
| | | |
| 7/13/21 | France | 3253 |
| | | |
| | | |
| 7/13/21 | Spain | 3449 |
| | | |
| 7/16/21 | France | 3100 |
| | | |
| | | |
| 7/16/21 | Spain | 827 |
| 7/17/21 | Spain | 1481 |
| | | |
| 7/18/21 | France | 936 |
| 7/18/21 | Spain | 1686 |
| | | |
| 7/19/21 | France | 2573 |
| 7/19/21 | Spain | 4240 |
| | | |
| 7/20/21 | France | 1494 |

2D sort the data and related calcs

| | France | Spain |
|---|---|---|
| 7/9/21 | 3001 | 1779 |
| 7/10/21 | 522 | 963 |
| 7/12/21 | | 1943 |
| 7/13/21 | 3253 | 3449 |
| 7/16/21 | 3100 | 827 |
| 7/17/21 | | 1481 |
| 7/18/21 | 936 | 1686 |
| 7/19/21 | 2573 | 4240 |
| 7/20/21 | 1494 | |

7254

Resort the data vertically descending for SUM(donate{country{"France"}) values, otherwise default

| | France | Spain |
|---|---|---|
| 7/13/21 | 3253 | 3449 |
| 7/16/21 | 3100 | 827 |
| 7/9/21 | 3001 | 1779 |
| 7/19/21 | 2573 | 4240 |
| 7/20/21 | 1494 | |
| 7/18/21 | 936 | 1686 |
| 7/10/21 | 522 | 963 |
| 7/17/21 | | 1481 |
| 7/12/21 | | 1943 |

7253 7256

7258

Cell format the data and put it with the formula into cells A1 to C10

| | France | Spain |
|---|---|---|
| 7/13/21 | $3,253.00 | $3,449.00 |
| 7/16/21 | $3,100.00 | $827.00 |
| 7/9/21 | $3,001.00 | $1,779.00 |
| 7/19/21 | $2,573.00 | $4,240.00 |
| 7/20/21 | $1,494.00 | |
| 7/18/21 | $936.00 | $1,686.00 |
| 7/10/21 | $522.00 | $963.00 |
| 7/17/21 | | $1,481.00 |
| 7/12/21 | | $1,943.00 |

Retrieves all the data for the NSC formulaic data fields

*Table one*

| country_1 | fee_1 |
|---|---|
| France | 0.0105 |
| Spain | 0.0095 |

*Table two*

| country | donate | date |
|---|---|---|
| France | 934 | 7/9/21 |
| Spain | 1240 | 7/9/21 |
| France | 1341 | 7/9/21 |
| Spain | 539 | 7/9/21 |
| France | 726 | 7/9/21 |
| Spain | 963 | 7/10/21 |
| France | 522 | 7/10/21 |
| Spain | 1418 | 7/12/21 |
| Spain | 525 | 7/12/21 |
| Spain | 1724 | 7/13/21 |
| France | 943 | 7/13/21 |
| France | 1394 | 7/13/21 |
| Spain | 1725 | 7/13/21 |
| France | 916 | 7/13/21 |
| France | 1268 | 7/16/21 |
| Spain | 827 | 7/16/21 |
| France | 826 | 7/16/21 |
| France | 1006 | 7/16/21 |
| Spain | 1124 | 7/17/21 |
| Spain | 357 | 7/17/21 |
| Spain | 1507 | 7/18/21 |
| France | 936 | 7/18/21 |
| Spain | 179 | 7/18/21 |
| Spain | 2683 | 7/19/21 |
| France | 2573 | 7/19/21 |
| Spain | 1557 | 7/19/21 |
| France | 1494 | 7/20/21 |

7458

Sort the data into the calc loops

| date | country | donate |
|---|---|---|
| 7/9/21 | France | 1341 |
| 7/9/21 | France | 726 |
| 7/9/21 | France | 934 |
| 7/9/21 | Spain | 1240 |
| 7/9/21 | Spain | 539 |
| 7/10/21 | France | 522 |
| 7/10/21 | Spain | 963 |
| 7/12/21 | Spain | 1418 |
| 7/12/21 | Spain | 525 |
| 7/13/21 | France | 1394 |
| 7/13/21 | France | 943 |
| 7/13/21 | France | 916 |
| 7/13/21 | Spain | 1724 |
| 7/13/21 | Spain | 1725 |
| 7/16/21 | France | 1268 |
| 7/16/21 | France | 826 |
| 7/16/21 | France | 1006 |
| 7/16/21 | Spain | 827 |
| 7/17/21 | Spain | 1124 |
| 7/17/21 | Spain | 357 |
| 7/18/21 | France | 936 |
| 7/18/21 | Spain | 1507 |
| 7/18/21 | Spain | 179 |
| 7/19/21 | France | 2573 |
| 7/19/21 | Spain | 2683 |
| 7/19/21 | Spain | 1557 |
| 7/20/21 | France | 1494 |

FIG. 74

Calculate each term of the loop calcs

| date | country | (1-fee_1{country_1{country}}) | SUM(donate) | 10 | SQRT(E5) |
|---|---|---|---|---|---|
| 7/9/21 | France | 0.9895 | 3001 | 10 | 1.532971 |
| 7/9/21 | Spain | 0.9905 | 1779 | 10 | 1.532971 |
| 7/10/21 | France | 0.9895 | 522 | 10 | 1.532971 |
| 7/10/21 | Spain | 0.9905 | 963 | 10 | 1.532971 |
| 7/12/21 | Spain | 0.9905 | 1943 | 10 | 1.532971 |
| 7/13/21 | France | 0.9895 | 3253 | 10 | 1.532971 |
| 7/13/21 | Spain | 0.9905 | 3449 | 10 | 1.532971 |
| 7/16/21 | France | 0.9895 | 3100 | 10 | 1.532971 |
| 7/16/21 | Spain | 0.9905 | 827 | 10 | 1.532971 |
| 7/17/21 | Spain | 0.9905 | 1481 | 10 | 1.532971 |
| 7/18/21 | France | 0.9895 | 936 | 10 | 1.532971 |
| 7/18/21 | Spain | 0.9905 | 1686 | 10 | 1.532971 |
| 7/19/21 | France | 0.9895 | 2573 | 10 | 1.532971 |
| 7/19/21 | Spain | 0.9905 | 4240 | 10 | 1.532971 |
| 7/20/21 | France | 0.9895 | 1494 | 10 | 1.532971 |

7554

Does the loop calcs

| date | country | calc_2D |
|---|---|---|
| 7/9/21 | France | 2957.957 |
| 7/9/21 | Spain | 1750.567 |
| 7/10/21 | France | 504.986 |
| 7/10/21 | Spain | 942.3185 |
| 7/12/21 | Spain | 1913.009 |
| 7/13/21 | France | 3207.311 |
| 7/13/21 | Spain | 3404.702 |
| 7/16/21 | France | 3055.917 |
| 7/16/21 | Spain | 807.6105 |
| 7/17/21 | Spain | 1455.398 |
| 7/18/21 | France | 914.639 |
| 7/18/21 | Spain | 1658.45 |
| 7/19/21 | France | 2534.451 |
| 7/19/21 | Spain | 4188.187 |
| 7/20/21 | France | 1466.78 |

2D sorts the data and related calcs

| | France | Spain |
|---|---|---|
| 7/9/21 | 2957.957 | 1750.567 |
| 7/10/21 | 504.986 | 942.3185 |
| 7/12/21 | | 1913.009 |
| 7/13/21 | 3207.311 | 3404.702 |
| 7/16/21 | 3055.917 | 807.6105 |
| 7/17/21 | | 1455.398 |
| 7/18/21 | 914.639 | 1658.45 |
| 7/19/21 | 2534.451 | 4188.187 |
| 7/20/21 | 1466.78 | |

7653

Add the cell formatting and place the values and formula in cells A1 to C10

| | France | Spain |
|---|---|---|
| 7/9/21 | $2,957.96 | $1,750.57 |
| 7/10/21 | $504.99 | $942.32 |
| 7/12/21 | | $1,913.01 |
| 7/13/21 | $3,207.31 | $3,404.70 |
| 7/16/21 | $3,055.92 | $807.61 |
| 7/17/21 | | $1,455.40 |
| 7/18/21 | $914.64 | $1,658.45 |
| 7/19/21 | $2,534.45 | $4,188.19 |
| 7/20/21 | $1,466.78 | |

EXAMPLES OF RANGE OR ARRAY SPREADSHEET FUNCTIONS

| FUNCTION | VARIANTS |
|---|---|
| AVEDEV | |
| AVERAGE | all variants (e.g., A, IF and IFS) |
| COUNT | all variants (e.g., A, BLANK, IF and IFS) |
| GEOMEAN | |
| HARMEAN | |
| LARGE | |
| MAX | all variants including DMAX |
| MEDIAN | |
| MIN | all variants including DMIN |
| PERCENTILE | all variants |
| PERCENTRANK | all variants |
| QUARTILE | All variants |
| SMALL | |
| STDEV | all variants including DSTDEV and its variants |
| SUM | All variants including DSUM |
| VAR | all variants including DVAR and its variants |

FIG. 78

Retrieves all the data for the NSC formulaic data fields

| type | continent | country | from | donate |
|---|---|---|---|---|
| Online | Europe | Germany | Individual | 204.32 |
| Online | NA | US | Individual | 750 |
| Mail | Europe | France | Individual | 172.4 |
| Online | NA | US | Institute | 2500 |
| Online | NA | US | Individual | 425 |
| Mail | Europe | UK | Institute | 1202.3 |
| Online | Europe | Germany | Individual | 477.43 |
| Online | NA | Canada | Individual | 108.47 |
| Online | Europe | Germany | Individual | 1874.5 |
| Mail | Europe | UK | Individual | 590.1 |
| Mail | Europe | France | Institute | 868.4 |
| Online | Europe | Germany | Institute | 1896.4 |
| Online | Europe | UK | Individual | 340.43 |
| Mail | NA | US | Institute | 3400 |
| Mail | NA | US | Individual | 2200 |
| Online | Europe | Germany | Individual | 347.98 |
| Online | Europe | UK | Institute | 2289.5 |
| Mail | NA | Canada | Individual | 274.65 |
| Online | NA | US | Institute | 750 |

8253

Sorts the data so it supports doing the different loop calculations

| continent | from | country | type | donate |
|---|---|---|---|---|
| Europe | Individual | France | Mail | 172.4 |
| Europe | Individual | Germany | Online | 204.32 |
| Europe | Individual | Germany | Online | 477.43 |
| Europe | Individual | Germany | Online | 1874.5 |
| Europe | Individual | Germany | Online | 347.98 |
| Europe | Individual | UK | Mail | 590.1 |
| Europe | Individual | UK | Online | 340.43 |
| Europe | Institute | France | Mail | 868.4 |
| Europe | Institute | Germany | Online | 1896.4 |
| Europe | Institute | UK | Mail | 1202.3 |
| Europe | Institute | UK | Online | 2289.5 |
| NA | Individual | Canada | Mail | 274.65 |
| NA | Individual | Canada | Online | 108.47 |
| NA | Individual | US | Mail | 2200 |
| NA | Individual | US | Online | 750 |
| NA | Individual | US | Online | 425 |
| NA | Institute | US | Mail | 750 |
| NA | Institute | US | Mail | 3400 |
| NA | Institute | US | Online | 2500 |

A5 =WRITE_CALC_2D(date|type,country|donate-donate*E1-fees-SUM(E2:G2)-SQRT(E3)||TOTALS[V_MTH_L{date},V_TL,H_TSL],TITLES[ ])

| Net donations | | | % fee = | 0.25% | | |
|---|---|---|---|---|---|---|
| | | | Fixed fees = | 0.34 | 0.45 | 0.03 |
| | | | Squared fee = | 1.02 | | |

| type | Mail | | | Online | | | | Total |
|---|---|---|---|---|---|---|---|---|
| country | Canada | US | subtotal | Canada | Mexico | US | subtotal | |
| date | | | | | | | | |
| 4/2/21 | | $2,091.90 | $2,091.90 | $679.83 | | $845.19 | $1,525.01 | $3,616.91 |
| 4/7/21 | | | $0.00 | | $431.99 | | $431.99 | $431.99 |
| 4/15/21 | | | $0.00 | | | $446.81 | $446.81 | $446.81 |
| 4/18/21 | | | $0.00 | | | $72.85 | $72.85 | $72.85 |
| 4/28/21 | | | $0.00 | $371.38 | | | $371.38 | $371.38 |
| April | $0.00 | $2,091.90 | $2,091.90 | $1,051.21 | $431.99 | $1,364.84 | $2,848.05 | $4,939.95 |
| 5/3/21 | | | $0.00 | | | $97.78 | $97.78 | $97.78 |
| 5/7/21 | | $1,743.04 | $1,743.04 | | | | $0.00 | $1,743.04 |
| 5/14/21 | | | $0.00 | | $386.17 | $396.94 | $783.11 | $783.11 |
| 5/23/21 | $434.83 | | $434.83 | | | $481.73 | $481.73 | $916.56 |
| 5/24/21 | | | $0.00 | $386.23 | | | $386.23 | $386.23 |
| 5/30/21 | | | $0.00 | | | | $0.00 | $0.00 |
| May | $434.83 | $1,743.04 | $2,177.87 | $386.23 | $386.17 | $976.45 | $1,748.84 | $3,926.71 |
| 6/1/21 | | | $0.00 | | | $671.14 | $671.14 | $671.14 |
| 6/9/21 | | $3,238.71 | $3,238.71 | | | | $0.00 | $3,238.71 |
| 6/13/21 | | | $0.00 | $486.23 | $322.25 | | $808.47 | $808.47 |
| 6/19/21 | | $2,790.10 | $2,790.10 | | | | $0.00 | $2,790.10 |
| 6/22/21 | | | $0.00 | $406.08 | | | $406.08 | $406.08 |
| 6/24/21 | $1,226.01 | | $1,226.01 | | | | $0.00 | $1,226.01 |
| 6/30/21 | | $3,487.98 | $3,487.98 | | | $596.36 | $596.36 | $4,084.34 |
| June | $1,226.01 | $9,516.79 | $10,742.80 | $892.30 | $322.25 | $1,267.50 | $2,482.05 | $13,224.85 |
| Total | $1,660.84 | $13,351.72 | $15,012.56 | $2,329.74 | $1,140.40 | $3,608.79 | $7,078.94 | $22,091.50 |

| country | type | donate | fees | date |
|---|---|---|---|---|
| US | Online | 850 | 0.86 | 4/2/21 |
| US | Mail | 2100 | 1.02 | 4/2/21 |
| Canada | Online | 684.32 | 0.95 | 4/2/21 |
| Mexico | Online | 435.67 | 0.76 | 4/7/21 |
| US | Online | 450 | 0.24 | 4/15/21 |
| US | Online | 75 | 0.13 | 4/18/21 |
| Canada | Online | 374.46 | 0.31 | 4/28/21 |
| US | Online | 100 | 0.14 | 5/3/21 |
| US | Mail | 1750 | 0.76 | 5/7/21 |
| Mexico | Online | 389.43 | 0.46 | 5/14/21 |
| US | Online | 400 | 0.23 | 5/14/21 |
| Canada | Mail | 438.32 | 0.56 | 5/23/21 |
| US | Online | 485 | 0.23 | 5/24/21 |
| Canada | Online | 389.32 | 0.29 | 5/30/21 |
| US | Online | 675 | 0.34 | 6/1/21 |
| US | Mail | 3250 | 1.34 | 6/9/21 |
| Mexico | Online | 325.22 | 0.33 | 6/13/21 |
| Canada | Online | 489.76 | 0.48 | 6/13/21 |
| US | Mail | 2800 | 1.07 | 6/19/21 |
| Canada | Online | 409.41 | 0.48 | 6/22/21 |
| Canada | Mail | 1231.9 | 0.98 | 6/24/21 |
| US | Online | 600 | 0.31 | 6/30/21 |
| US | Mail | 3500 | 1.44 | 6/30/21 |

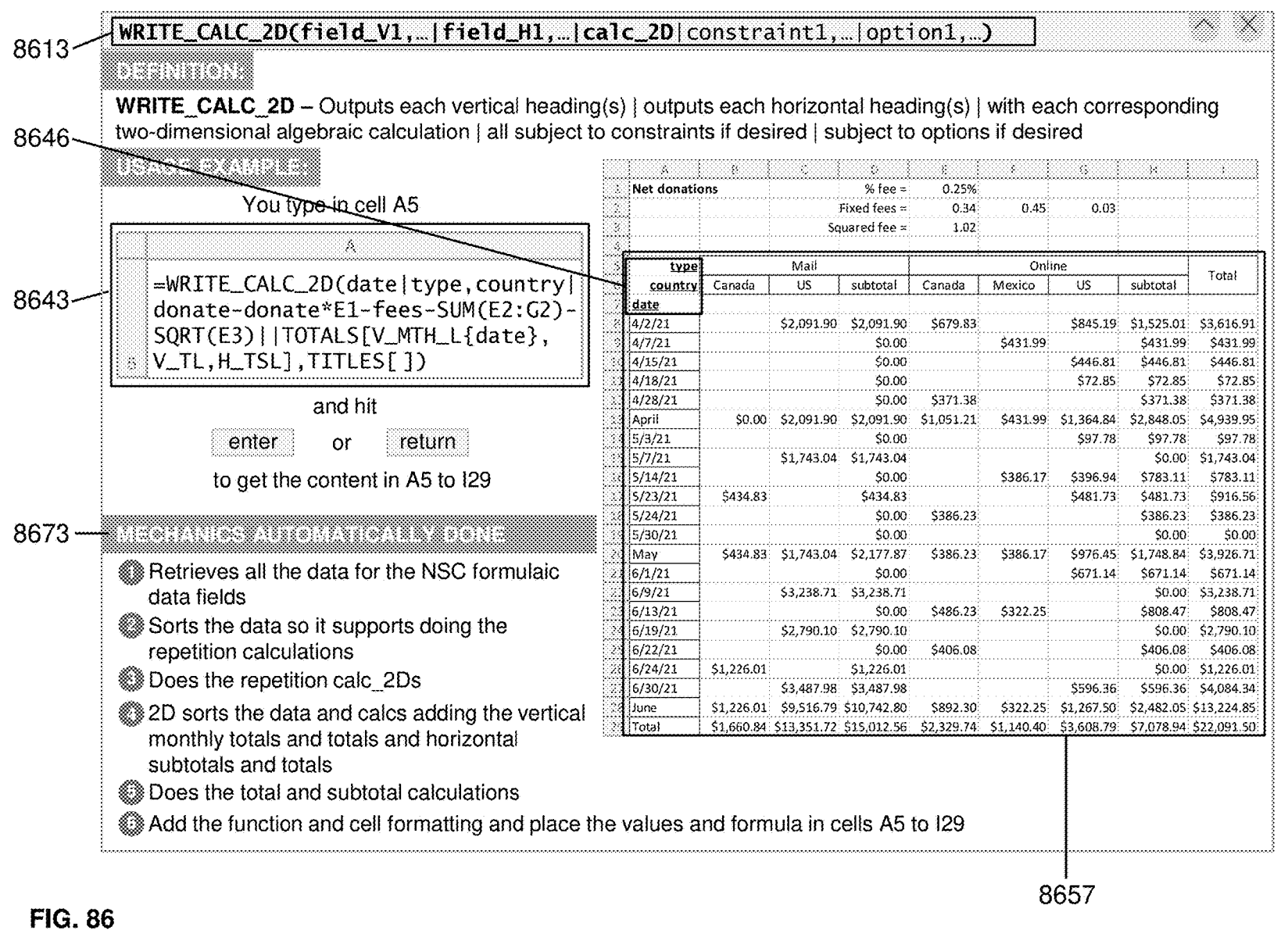

8613 WRITE_CALC_2D(field_V1,…|field_H1,…|calc_2D|constraint1,…|option1,…)

DEFINITION:

WRITE_CALC_2D – Outputs each vertical heading(s) | outputs each horizontal heading(s) | with each corresponding two-dimensional algebraic calculation | all subject to constraints if desired | subject to options if desired

8646

USAGE EXAMPLE:

You type in cell A5

8643

```
=WRITE_CALC_2D(date|type,country|
donate-donate*E1-fees-SUM(E2:G2)-
SQRT(E3)||TOTALS[V_MTH_L{date},
V_TL,H_TSL],TITLES[])
```

and hit enter or return to get the content in A5 to I29

| | | | | | | | | |
|---|---|---|---|---|---|---|---|---|
| Net donations | | | % fee = | 0.25% | | | | |
| | | | Fixed fees = | 0.34 | 0.45 | 0.03 | | |
| | | | Squared fee = | 1.02 | | | | |

| type | Mail | | | Online | | | | Total |
|---|---|---|---|---|---|---|---|---|
| country | Canada | US | subtotal | Canada | Mexico | US | subtotal | |
| date | | | | | | | | |
| 4/2/21 | | $2,091.90 | $2,091.90 | $679.83 | | $845.19 | $1,525.01 | $3,616.91 |
| 4/7/21 | | | $0.00 | | $431.99 | | $431.99 | $431.99 |
| 4/15/21 | | | $0.00 | | | $446.81 | $446.81 | $446.81 |
| 4/18/21 | | | $0.00 | | | $72.85 | $72.85 | $72.85 |
| 4/28/21 | | | $0.00 | $371.38 | | | $371.38 | $371.38 |
| April | $0.00 | $2,091.90 | $2,091.90 | $1,051.21 | $431.99 | $1,364.84 | $2,848.05 | $4,939.95 |
| 5/3/21 | | | $0.00 | | | $97.78 | $97.78 | $97.78 |
| 5/7/21 | | $1,743.04 | $1,743.04 | | | | $0.00 | $1,743.04 |
| 5/14/21 | | | $0.00 | | $386.17 | $396.94 | $783.11 | $783.11 |
| 5/23/21 | $434.83 | | $434.83 | | | $481.73 | $481.73 | $916.56 |
| 5/24/21 | | | $0.00 | $386.23 | | | $386.23 | $386.23 |
| 5/30/21 | | | $0.00 | | | | $0.00 | $0.00 |
| May | $434.83 | $1,743.04 | $2,177.87 | $386.23 | $386.17 | $976.45 | $1,748.84 | $3,926.71 |
| 6/1/21 | | | $0.00 | | | $671.14 | $671.14 | $671.14 |
| 6/9/21 | | $3,238.71 | $3,238.71 | | | | $0.00 | $3,238.71 |
| 6/13/21 | | | $0.00 | $486.23 | $322.25 | | $808.47 | $808.47 |
| 6/19/21 | | $2,790.10 | $2,790.10 | | | | $0.00 | $2,790.10 |
| 6/22/21 | | | $0.00 | $406.08 | | | $406.08 | $406.08 |
| 6/24/21 | $1,226.01 | | $1,226.01 | | | | $0.00 | $1,226.01 |
| 6/30/21 | | $3,487.98 | $3,487.98 | | | $596.36 | $596.36 | $4,084.34 |
| June | $1,226.01 | $9,516.79 | $10,742.80 | $892.30 | $322.25 | $1,267.50 | $2,482.05 | $13,224.85 |
| Total | $1,660.84 | $13,351.72 | $15,012.56 | $2,329.74 | $1,140.40 | $3,608.79 | $7,078.94 | $22,091.50 |

8657

8673 MECHANICS AUTOMATICALLY DONE

1. Retrieves all the data for the NSC formulaic data fields
2. Sorts the data so it supports doing the repetition calculations
3. Does the repetition calc_2Ds
4. 2D sorts the data and calcs adding the vertical monthly totals and totals and horizontal subtotals and totals
5. Does the total and subtotal calculations
6. Add the function and cell formatting and place the values and formula in cells A5 to I29

FIG. 86

Retrieves all the data for the NSC formulaic data fields

| country | type | donate | fees | date |
|---|---|---|---|---|
| US | Online | 850 | 0.86 | 4/2/21 |
| US | Mail | 2100 | 1.02 | 4/2/21 |
| Canada | Online | 684.32 | 0.95 | 4/2/21 |
| Mexico | Online | 435.67 | 0.76 | 4/7/21 |
| US | Online | 450 | 0.24 | 4/15/21 |
| US | Online | 75 | 0.13 | 4/18/21 |
| Canada | Online | 374.46 | 0.31 | 4/28/21 |
| US | Online | 100 | 0.14 | 5/3/21 |
| US | Mail | 1750 | 0.76 | 5/7/21 |
| Mexico | Online | 389.43 | 0.46 | 5/14/21 |
| US | Online | 400 | 0.23 | 5/14/21 |
| Canada | Mail | 438.32 | 0.56 | 5/23/21 |
| US | Online | 485 | 0.23 | 5/24/21 |
| Canada | Online | 389.32 | 0.29 | 5/30/21 |
| US | Online | 675 | 0.34 | 6/1/21 |
| US | Mail | 3250 | 1.34 | 6/9/21 |
| Mexico | Online | 325.22 | 0.33 | 6/13/21 |
| Canada | Online | 489.76 | 0.48 | 6/13/21 |
| US | Mail | 2800 | 1.07 | 6/19/21 |
| Canada | Online | 409.41 | 0.48 | 6/22/21 |
| Canada | Mail | 1231.9 | 0.98 | 6/24/21 |
| US | Online | 600 | 0.31 | 6/30/21 |
| US | Mail | 3500 | 1.44 | 6/30/21 |

8753

Sorts the data so it supports doing the repetition calculations

| date | type | country | donate | fees |
|---|---|---|---|---|
| 4/2/21 | Mail | US | 2100 | 1.02 |
| 4/2/21 | Online | Canada | 684.32 | 0.95 |
| 4/2/21 | Online | US | 850 | 0.86 |
| 4/7/21 | Online | Mexico | 435.67 | 0.76 |
| 4/15/21 | Online | US | 450 | 0.24 |
| 4/18/21 | Online | US | 75 | 0.13 |
| 4/28/21 | Online | Canada | 374.46 | 0.31 |
| 5/3/21 | Online | US | 100 | 0.14 |
| 5/7/21 | Mail | US | 1750 | 0.76 |
| 5/14/21 | Online | Mexico | 389.43 | 0.46 |
| 5/14/21 | Online | US | 400 | 0.23 |
| 5/23/21 | Mail | Canada | 438.32 | 0.56 |
| 5/24/21 | Online | US | 485 | 0.23 |
| 5/30/21 | Online | Canada | 389.32 | 0.29 |
| 6/1/21 | Online | US | 675 | 0.34 |
| 6/9/21 | Mail | US | 3250 | 1.34 |
| 6/13/21 | Online | Canada | 489.76 | 0.48 |
| 6/13/21 | Online | Mexico | 325.22 | 0.33 |
| 6/19/21 | Mail | US | 2800 | 1.07 |
| 6/22/21 | Online | Canada | 409.41 | 0.48 |
| 6/24/21 | Mail | Canada | 1231.9 | 0.98 |
| 6/30/21 | Mail | US | 3500 | 1.44 |
| 6/30/21 | Online | US | 600 | 0.31 |

Does the repetition calc_2Ds

| date | type | country | CALC_2D |
|---|---|---|---|
| 4/2/21 | Mail | US | 2091.9 |
| 4/2/21 | Online | Canada | 679.8292 |
| 4/2/21 | Online | US | 845.185 |
| 4/7/21 | Online | Mexico | 431.9909 |
| 4/15/21 | Online | US | 446.805 |
| 4/18/21 | Online | US | 72.85255 |
| 4/28/21 | Online | Canada | 371.3839 |
| 5/3/21 | Online | US | 97.78005 |
| 5/7/21 | Mail | US | 1743.035 |
| 5/14/21 | Online | Mexico | 386.1665 |
| 5/14/21 | Online | US | 396.94 |
| 5/23/21 | Mail | Canada | 434.8342 |
| 5/24/21 | Online | US | 481.7275 |
| 5/30/21 | Online | Canada | 386.2267 |
| 6/1/21 | Online | US | 671.1425 |
| 6/9/21 | Mail | US | 3238.705 |
| 6/13/21 | Online | Canada | 486.2256 |
| 6/13/21 | Online | Mexico | 322.247 |
| 6/19/21 | Mail | US | 2790.1 |
| 6/22/21 | Online | Canada | 406.0765 |
| 6/24/21 | Mail | Canada | 1226.01 |
| 6/30/21 | Mail | US | 3487.98 |
| 6/30/21 | Online | US | 596.36 |

2D sorts the data and calcs adding the vertical monthly totals and totals and horizontal subtotals and totals

| | Mail Canada | Mail US | Mail subtotal | Online Canada | Online Mexico | Online US | Online subtotal | Total |
|---|---|---|---|---|---|---|---|---|
| 4/2/21 | | 2091.9 | | 679.8292 | | 845.185 | | |
| 4/7/21 | | | | | 431.9909 | | | |
| 4/15/21 | | | | | | 446.805 | | |
| 4/18/21 | | | | | | 72.85255 | | |
| 4/28/21 | | | | 371.3839 | | | | |
| April | | | | | | | | |
| 5/3/21 | | | | | | 97.78005 | | |
| 5/7/21 | | 1743.04 | | | | | | |
| 5/14/21 | | | | | 386.1665 | 396.94 | | |
| 5/23/21 | 434.8342 | | | | | 481.7275 | | |
| 5/24/21 | | | | 386.2267 | | | | |
| 5/30/21 | | | | | | | | |
| May | | | | | | | | |
| 6/1/21 | | | | | | 671.1425 | | |
| 6/9/21 | | 3238.705 | | | | | | |
| 6/13/21 | | | | 486.2256 | 322.247 | | | |
| 6/19/21 | | 2790.1 | | | | | | |
| 6/22/21 | | | | 406.0765 | | | | |
| 6/24/21 | 1226.01 | | | | | | | |
| 6/30/21 | | 3487.98 | | | | 596.36 | | |
| June | | | | | | | | |
| Total | | | | | | | | |

Figure 89:
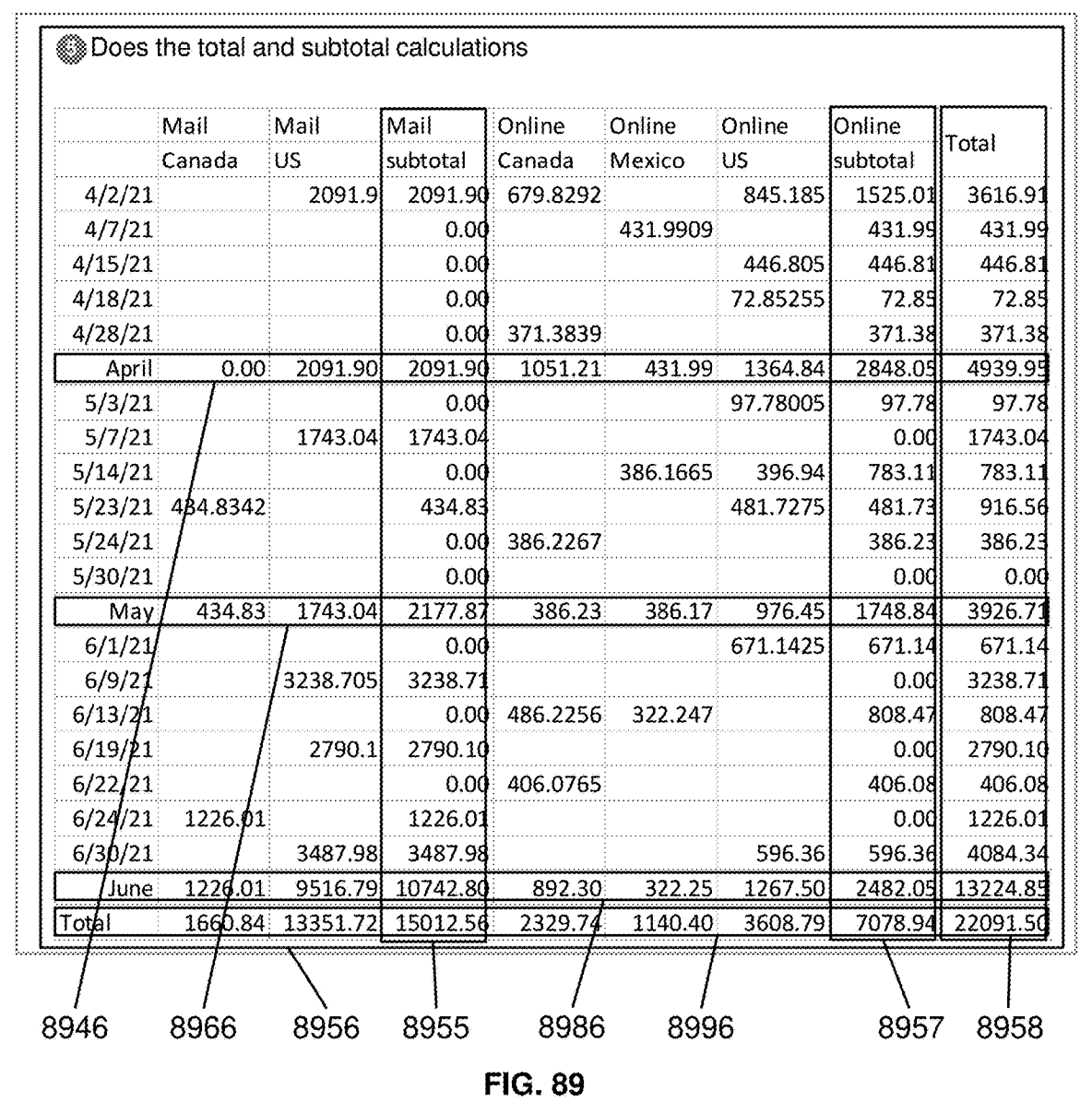

Does the total and subtotal calculations

| | Mail Canada | Mail US | Mail subtotal | Online Canada | Online Mexico | Online US | Online subtotal | Total |
|---|---|---|---|---|---|---|---|---|
| 4/2/21 | | 2091.9 | 2091.90 | 679.8292 | | 845.185 | 1525.01 | 3616.91 |
| 4/7/21 | | | 0.00 | | 431.9909 | | 431.99 | 431.99 |
| 4/15/21 | | | 0.00 | | | 446.805 | 446.81 | 446.81 |
| 4/18/21 | | | 0.00 | | | 72.85255 | 72.85 | 72.85 |
| 4/28/21 | | | 0.00 | 371.3839 | | | 371.38 | 371.38 |
| April | 0.00 | 2091.90 | 2091.90 | 1051.21 | 431.99 | 1364.84 | 2848.05 | 4939.95 |
| 5/3/21 | | | 0.00 | | | 97.78005 | 97.78 | 97.78 |
| 5/7/21 | | 1743.04 | 1743.04 | | | | 0.00 | 1743.04 |
| 5/14/21 | | | 0.00 | | 386.1665 | 396.94 | 783.11 | 783.11 |
| 5/23/21 | 434.8342 | | 434.83 | | | 481.7275 | 481.73 | 916.56 |
| 5/24/21 | | | 0.00 | 386.2267 | | | 386.23 | 386.23 |
| 5/30/21 | | | 0.00 | | | | 0.00 | 0.00 |
| May | 434.83 | 1743.04 | 2177.87 | 386.23 | 386.17 | 976.45 | 1748.84 | 3926.71 |
| 6/1/21 | | | 0.00 | | | 671.1425 | 671.14 | 671.14 |
| 6/9/21 | | 3238.705 | 3238.71 | | | | 0.00 | 3238.71 |
| 6/13/21 | | | 0.00 | 486.2256 | 322.247 | | 808.47 | 808.47 |
| 6/19/21 | | 2790.1 | 2790.10 | | | | 0.00 | 2790.10 |
| 6/22/21 | | | 0.00 | 406.0765 | | | 406.08 | 406.08 |
| 6/24/21 | 1226.01 | | 1226.01 | | | | 0.00 | 1226.01 |
| 6/30/21 | | 3487.98 | 3487.98 | | | 596.36 | 596.36 | 4084.34 |
| June | 1226.01 | 9516.79 | 10742.80 | 892.30 | 322.25 | 1267.50 | 2482.05 | 13224.85 |
| Total | 1660.84 | 13351.72 | 15012.56 | 2329.74 | 1140.40 | 3608.79 | 7078.94 | 22091.50 |

Add the function and cell formatting and place the values and formula in cells A5 to I29

| type | Mail | | | Online | | | | Total |
|---|---|---|---|---|---|---|---|---|
| country | Canada | US | subtotal | Canada | Mexico | US | subtotal | |
| date | | | | | | | | |
| 4/2/21 | | $2,091.90 | $2,091.90 | $679.83 | | $845.19 | $1,525.01 | $3,616.91 |
| 4/7/21 | | | $0.00 | | $431.99 | | $431.99 | $431.99 |
| 4/15/21 | | | $0.00 | | | $446.81 | $446.81 | $446.81 |
| 4/18/21 | | | $0.00 | | | $72.85 | $72.85 | $72.85 |
| 4/28/21 | | | $0.00 | $371.38 | | | $371.38 | $371.38 |
| April | $0.00 | $2,091.90 | $2,091.90 | $1,051.21 | $431.99 | $1,364.84 | $2,848.05 | $4,939.95 |
| 5/3/21 | | | $0.00 | | | $97.78 | $97.78 | $97.78 |
| 5/7/21 | | $1,743.04 | $1,743.04 | | | | $0.00 | $1,743.04 |
| 5/14/21 | | | $0.00 | | $386.17 | $396.94 | $783.11 | $783.11 |
| 5/23/21 | $434.83 | | $434.83 | | | $481.73 | $481.73 | $916.56 |
| 5/24/21 | | | $0.00 | $386.23 | | | $386.23 | $386.23 |
| 5/30/21 | | | $0.00 | | | | $0.00 | $0.00 |
| May | $434.83 | $1,743.04 | $2,177.87 | $386.23 | $386.17 | $976.45 | $1,748.84 | $3,926.71 |
| 6/1/21 | | | $0.00 | | | $671.14 | $671.14 | $671.14 |
| 6/9/21 | | $3,238.71 | $3,238.71 | | | | $0.00 | $3,238.71 |
| 6/13/21 | | | $0.00 | $486.23 | $322.25 | | $808.47 | $808.47 |
| 6/19/21 | | $2,790.10 | $2,790.10 | | | | $0.00 | $2,790.10 |
| 6/22/21 | | | $0.00 | $406.08 | | | $406.08 | $406.08 |
| 6/24/21 | $1,226.01 | | $1,226.01 | | | | $0.00 | $1,226.01 |
| 6/30/21 | | $3,487.98 | $3,487.98 | | | $596.36 | $596.36 | $4,084.34 |
| June | $1,226.01 | $9,516.79 | $10,742.80 | $892.30 | $322.25 | $1,267.50 | $2,482.05 | $13,224.85 |
| Total | $1,660.84 | $13,351.72 | $15,012.56 | $2,329.74 | $1,140.40 | $3,608.79 | $7,078.94 | $22,091.50 |

Retrieves all the data for the NSC formulaic data fields

| type | country | donate |
|---|---|---|
| Mail | France | 1250 |
| Mail | France | 1800 |
| Online | Spain | 450 |
| Online | France | 575 |
| Online | Spain | 350 |
| Mail | Spain | 980 |
| Online | France | 250 |
| Online | Spain | 425 |
| Mail | Spain | 500 |
| Online | Spain | 400 |
| Online | France | 350 |
| Online | France | 300 |
| Mail | France | 450 |
| Online | France | 500 |

Sorts the data loop equivalents ascending (default)

| country | type | donate |
|---|---|---|
| France | Mail | 450 |
| France | Mail | 1250 |
| France | Mail | 1800 |
| France | Online | 250 |
| France | Online | 300 |
| France | Online | 350 |
| France | Online | 500 |
| France | Online | 575 |
| Spain | Mail | 500 |
| Spain | Mail | 980 |
| Spain | Online | 350 |
| Spain | Online | 400 |
| Spain | Online | 425 |
| Spain | Online | 450 |

9475

Does each of the SUM calculations

| country | type | SUM(donate{>500}) | SUM(donate) |
|---|---|---|---|
| France | Mail | 3050 | 3500 |
| | | | |
| | | | |
| France | Online | 575 | 1975 |
| | | | |
| | | | |
| | | | |
| | | | |
| Spain | Mail | 980 | 1480 |
| | | | |
| Spain | Online | 0 | 1625 |
| | | | |
| | | | |
| | | | |

9476 9477

Does the calc_2D calcs SUM(donate>500)/SUM(donate)

| country | type | calc_2D |
|---|---|---|
| France | Mail | 0.87143 |
| | | |
| | | |
| France | Online | 0.29114 |
| | | |
| | | |
| | | |
| | | |
| Spain | Mail | 0.66216 |
| | | |
| Spain | Online | 0 |
| | | |
| | | |
| | | |

① Retrieves all the data for the NSC formulaic data fields

| country | donate | date |
|---|---|---|
| France | 934 | 7/9/21 |
| Spain | 1240 | 7/9/21 |
| France | 1341 | 7/9/21 |
| Spain | 539 | 7/9/21 |
| France | 726 | 7/9/21 |
| Spain | 963 | 7/10/21 |
| France | 522 | 7/10/21 |
| Spain | 1418 | 7/12/21 |
| Spain | 525 | 7/12/21 |
| Spain | 1724 | 7/13/21 |
| France | 943 | 7/13/21 |
| France | 1394 | 7/13/21 |
| Spain | 1725 | 7/13/21 |
| France | 916 | 7/13/21 |
| France | 1268 | 7/16/21 |
| Spain | 827 | 7/16/21 |
| France | 826 | 7/16/21 |
| France | 1006 | 7/16/21 |
| Spain | 1124 | 7/17/21 |
| Spain | 357 | 7/17/21 |
| Spain | 1507 | 7/18/21 |
| France | 936 | 7/18/21 |
| Spain | 179 | 7/18/21 |
| Spain | 2683 | 7/19/21 |
| France | 2573 | 7/19/21 |
| Spain | 1557 | 7/19/21 |
| France | 1494 | 7/20/21 |

9955

② Sort the data into the calc loops

| date | country | donate |
|---|---|---|
| 7/9/21 | France | 1341 |
| 7/9/21 | France | 726 |
| 7/9/21 | France | 934 |
| 7/9/21 | Spain | 1240 |
| 7/9/21 | Spain | 539 |
| 7/10/21 | France | 522 |
| 7/10/21 | Spain | 963 |
| 7/12/21 | Spain | 1418 |
| 7/12/21 | Spain | 525 |
| 7/13/21 | France | 1394 |
| 7/13/21 | France | 943 |
| 7/13/21 | France | 916 |
| 7/13/21 | Spain | 1724 |
| 7/13/21 | Spain | 1725 |
| 7/16/21 | France | 1268 |
| 7/16/21 | France | 826 |
| 7/16/21 | France | 1006 |
| 7/16/21 | Spain | 827 |
| 7/17/21 | Spain | 1124 |
| 7/17/21 | Spain | 357 |
| 7/18/21 | France | 936 |
| 7/18/21 | Spain | 1507 |
| 7/18/21 | Spain | 179 |
| 7/19/21 | France | 2573 |
| 7/19/21 | Spain | 2683 |
| 7/19/21 | Spain | 1557 |
| 7/20/21 | France | 1494 |

③ Do the loop calcs

| date | country | SUM(donate) |
|---|---|---|
| 7/9/21 | France | 3001 |
| | | |
| | | |
| 7/9/21 | Spain | 1779 |
| | | |
| 7/10/21 | France | 522 |
| 7/10/21 | Spain | 963 |
| 7/12/21 | Spain | 1943 |
| | | |
| 7/13/21 | France | 3253 |
| | | |
| | | |
| 7/13/21 | Spain | 3449 |
| | | |
| 7/16/21 | France | 3100 |
| | | |
| | | |
| 7/16/21 | Spain | 827 |
| 7/17/21 | Spain | 1481 |
| | | |
| 7/18/21 | France | 936 |
| 7/18/21 | Spain | 1686 |
| | | |
| 7/19/21 | France | 2573 |
| 7/19/21 | Spain | 4240 |
| | | |
| 7/20/21 | France | 1494 |

Retrieves all the data for the NSC formulaic data fields

| country | donate | date |
|---|---|---|
| France | 934 | 7/9/21 |
| Spain | 1240 | 7/9/21 |
| France | 1341 | 7/9/21 |
| Spain | 539 | 7/9/21 |
| France | 726 | 7/9/21 |
| Spain | 963 | 7/10/21 |
| France | 522 | 7/10/21 |
| Spain | 1418 | 7/12/21 |
| Spain | 525 | 7/12/21 |
| Spain | 1724 | 7/13/21 |
| France | 943 | 7/13/21 |
| France | 1394 | 7/13/21 |
| Spain | 1725 | 7/13/21 |
| France | 916 | 7/13/21 |
| France | 1268 | 7/16/21 |
| Spain | 827 | 7/16/21 |
| France | 826 | 7/16/21 |
| France | 1006 | 7/16/21 |
| Spain | 1124 | 7/17/21 |
| Spain | 357 | 7/17/21 |
| Spain | 1507 | 7/18/21 |
| France | 936 | 7/18/21 |
| Spain | 179 | 7/18/21 |
| Spain | 2683 | 7/19/21 |
| France | 2573 | 7/19/21 |
| Spain | 1557 | 7/19/21 |
| France | 1494 | 7/20/21 |

10255

Sort the data into the calc loops

| date | country | donate |
|---|---|---|
| 7/9/21 | France | 1341 |
| 7/9/21 | France | 726 |
| 7/9/21 | France | 934 |
| 7/9/21 | Spain | 1240 |
| 7/9/21 | Spain | 539 |
| 7/10/21 | France | 522 |
| 7/10/21 | Spain | 963 |
| 7/12/21 | Spain | 1418 |
| 7/12/21 | Spain | 525 |
| 7/13/21 | France | 1394 |
| 7/13/21 | France | 943 |
| 7/13/21 | France | 916 |
| 7/13/21 | Spain | 1724 |
| 7/13/21 | Spain | 1725 |
| 7/16/21 | France | 1268 |
| 7/16/21 | France | 826 |
| 7/16/21 | France | 1006 |
| 7/16/21 | Spain | 827 |
| 7/17/21 | Spain | 1124 |
| 7/17/21 | Spain | 357 |
| 7/18/21 | France | 936 |
| 7/18/21 | Spain | 1507 |
| 7/18/21 | Spain | 179 |
| 7/19/21 | France | 2573 |
| 7/19/21 | Spain | 2683 |
| 7/19/21 | Spain | 1557 |
| 7/20/21 | France | 1494 |

Do the calc_2D sums

| date | country | SUM(donate) |
|---|---|---|
| 7/9/21 | France | 3001 |
| | | |
| | | |
| 7/9/21 | Spain | 1779 |
| | | |
| 7/10/21 | France | 522 |
| 7/10/21 | Spain | 963 |
| 7/12/21 | Spain | 1943 |
| | | |
| 7/13/21 | France | 3253 |
| | | |
| | | |
| 7/13/21 | Spain | 3449 |
| | | |
| 7/16/21 | France | 3100 |
| | | |
| | | |
| 7/16/21 | Spain | 827 |
| 7/17/21 | Spain | 1481 |
| | | |
| 7/18/21 | France | 936 |
| 7/18/21 | Spain | 1686 |
| | | |
| 7/19/21 | France | 2573 |
| 7/19/21 | Spain | 4240 |
| | | |
| 7/20/21 | France | 1494 |

2D sorts the data and related calcs

| | France | Spain |
|---|---|---|
| 7/9/21 | 3001 | 1779 |
| 7/10/21 | 522 | 963 |
| 7/12/21 | | 1943 |
| 7/13/21 | 3253 | 3449 |
| 7/16/21 | 3100 | 827 |
| 7/17/21 | | 1481 |
| 7/18/21 | 936 | 1686 |
| 7/19/21 | 2573 | 4240 |
| 7/20/21 | 1494 | |

10354

Calculates the vertical SUM(calc_2D) values

| | France | Spain | *SUM( calc_2D)* |
|---|---|---|---|
| 7/9/21 | 3001 | 1779 | *4780* |
| 7/10/21 | 522 | 963 | *1485* |
| 7/12/21 | | 1943 | *1943* |
| 7/13/21 | 3253 | 3449 | *6702* |
| 7/16/21 | 3100 | 827 | *3927* |
| 7/17/21 | | 1481 | *1481* |
| 7/18/21 | 936 | 1686 | *2622* |
| 7/19/21 | 2573 | 4240 | *6813* |
| 7/20/21 | 1494 | | *1494* |

10348 10357

LIMIT (filter/constrain) values to those with SUM(calc_2D)>2500

| | France | Spain | *SUM( calc_2D)* |
|---|---|---|---|
| 7/9/21 | 3001 | 1779 | *4780* |
| | | | |
| | | | |
| 7/13/21 | 3253 | 3449 | *6702* |
| 7/16/21 | 3100 | 827 | *3927* |
| | | | |
| 7/18/21 | 936 | 1686 | *2622* |
| 7/19/21 | 2573 | 4240 | *6813* |
| | | | |

6 LIMIT (filter/constrain) values to those with SUM(calc_2D)>2500

| | France | Spain | *SUM( calc_2D)* |
|---|---|---|---|
| 7/9/21 | 3001 | 1779 | *4780* |
| | | | |
| | | | |
| 7/13/21 | 3253 | 3449 | *6702* |
| 7/16/21 | 3100 | 827 | *3927* |
| | | | |
| 7/18/21 | 936 | 1686 | *2622* |
| 7/19/21 | 2573 | 4240 | *6813* |
| | | | |

7 Cell format the results and put them with the formula into cells A1 to C6

| | France | Spain |
|---|---|---|
| 7/9/21 | $3,001.00 | $1,779.00 |
| 7/13/21 | $3,253.00 | $3,449.00 |
| 7/16/21 | $3,100.00 | $827.00 |
| 7/18/21 | $936.00 | $1,686.00 |
| 7/19/21 | $2,573.00 | $4,240.00 |

FIG. 104

Retrieves all the data for the NSC formulaic data fields

| id | country | cancer | type | wt_beg | wt_end |
|---|---|---|---|---|---|
| 44179 | US | Lung | Control | 6.32 | 9.57 |
| 44179 | US | Lung | Test | 6.35 | 4.32 |
| 44260 | US | Colon | Control | 10.52 | 16.3 |
| 44260 | US | Colon | Test | 10.53 | 5.55 |
| 44269 | Canada | Lung | Control | 6.41 | 9.56 |
| 44269 | Canada | Lung | Test | 6.37 | 4.24 |
| 44283 | Mexico | Colon | Control | 10.53 | 15.86 |
| 44283 | Mexico | Colon | Test | 10.47 | 4.65 |
| 44320 | China | Lung | Control | 6.38 | 9.6 |
| 44320 | China | Lung | Test | 6.36 | 4.51 |
| 44339 | US | Lung | Control | 6.45 | 9.58 |
| 44339 | US | Lung | Test | 6.42 | 4.24 |
| 44350 | Japan | Lung | Control | 6.32 | 9.49 |
| 44350 | Japan | Lung | Test | 6.44 | 4.45 |
| 44386 | Canada | Lung | Control | 6.35 | 9.52 |
| 44386 | Canada | Lung | Test | 6.39 | 4.06 |
| 44398 | US | Colon | Control | 14.38 | 19.83 |
| 44398 | US | Colon | Test | 14.44 | 9.01 |
| 44426 | China | Lung | Control | 6.38 | 9.32 |
| 44426 | China | Lung | Test | 6.37 | 4.31 |
| 44476 | US | Lung | Control | 9.03 | 12.85 |
| 44476 | US | Lung | Test | 8.93 | 3.99 |
| 44504 | Japan | Lung | Control | 6.44 | 9.52 |
| 44504 | Japan | Lung | Test | 6.35 | 4.1 |
| 44568 | US | Colon | Control | 10.48 | 15.86 |
| 44568 | US | Colon | Test | 10.53 | 5.35 |

10653

Sorts the data into the calc 2D repetitions

| cancer | country | id | type | wt_beg | wt_end |
|---|---|---|---|---|---|
| Colon | Mexico | 44283 | Control | 10.53 | 15.86 |
| Colon | Mexico | 44283 | Test | 10.47 | 4.65 |
| Colon | US | 44260 | Control | 10.52 | 16.3 |
| Colon | US | 44260 | Test | 10.53 | 5.55 |
| Colon | US | 44398 | Control | 14.38 | 19.83 |
| Colon | US | 44398 | Test | 14.44 | 9.01 |
| Colon | US | 44568 | Control | 10.48 | 15.86 |
| Colon | US | 44568 | Test | 10.53 | 5.35 |
| Lung | Canada | 44269 | Control | 6.41 | 9.56 |
| Lung | Canada | 44269 | Test | 6.37 | 4.24 |
| Lung | Canada | 44386 | Control | 6.35 | 9.52 |
| Lung | Canada | 44386 | Test | 6.39 | 4.06 |
| Lung | China | 44320 | Control | 6.38 | 9.6 |
| Lung | China | 44320 | Test | 6.36 | 4.51 |
| Lung | China | 44426 | Control | 6.38 | 9.32 |
| Lung | China | 44426 | Test | 6.37 | 4.31 |
| Lung | Japan | 44350 | Control | 6.32 | 9.49 |
| Lung | Japan | 44350 | Test | 6.44 | 4.45 |
| Lung | Japan | 44504 | Control | 6.44 | 9.52 |
| Lung | Japan | 44504 | Test | 6.35 | 4.1 |
| Lung | US | 44179 | Control | 6.32 | 9.57 |
| Lung | US | 44179 | Test | 6.35 | 4.32 |
| Lung | US | 44339 | Control | 6.45 | 9.58 |
| Lung | US | 44339 | Test | 6.42 | 4.24 |
| Lung | US | 44476 | Control | 9.03 | 12.85 |
| Lung | US | 44476 | Test | 8.93 | 3.99 |

Do the calc_2D calculations

| cancer | country | id | type | (wt_beg-wt_end)/wt_beg |
|---|---|---|---|---|
| Colon | Mexico | 44283 | Control | 0.50617284 |
| Colon | Mexico | 44283 | Test | -0.555873926 |
| Colon | US | 44260 | Control | 0.549429658 |
| Colon | US | 44260 | Test | -0.472934473 |
| Colon | US | 44398 | Control | 0.378998609 |
| Colon | US | 44398 | Test | -0.376038781 |
| Colon | US | 44568 | Control | 0.513358779 |
| Colon | US | 44568 | Test | -0.491927825 |
| Lung | Canada | 44269 | Control | 0.491419657 |
| Lung | Canada | 44269 | Test | -0.334379906 |
| Lung | Canada | 44386 | Control | 0.499212598 |
| Lung | Canada | 44386 | Test | -0.364632238 |
| Lung | China | 44320 | Control | 0.504702194 |
| Lung | China | 44320 | Test | -0.290880503 |
| Lung | China | 44426 | Control | 0.460815047 |
| Lung | China | 44426 | Test | -0.323390895 |
| Lung | Japan | 44350 | Control | 0.501582278 |
| Lung | Japan | 44350 | Test | -0.309006211 |
| Lung | Japan | 44504 | Control | 0.47826087 |
| Lung | Japan | 44504 | Test | -0.354330709 |
| Lung | US | 44179 | Control | 0.514240506 |
| Lung | US | 44179 | Test | -0.319685039 |
| Lung | US | 44339 | Control | 0.485271318 |
| Lung | US | 44339 | Test | -0.339563863 |
| Lung | US | 44476 | Control | 0.42303433 |
| Lung | US | 44476 | Test | -0.553191489 |

10757

2D sort the data and related calcs

| | | | Control | Test |
|---|---|---|---|---|
| Colon | Mexico | 44283 | 0.50617284 | -0.555873926 |
| Colon | US | 44260 | 0.549429658 | -0.472934473 |
| Colon | US | 44398 | 0.378998609 | -0.376038781 |
| Colon | US | 44568 | 0.513358779 | -0.491927825 |
| Lung | Canada | 44269 | 0.491419657 | -0.334379906 |
| Lung | Canada | 44386 | 0.499212598 | -0.364632238 |
| Lung | China | 44320 | 0.504702194 | -0.290880503 |
| Lung | China | 44426 | 0.460815047 | -0.323390895 |
| Lung | Japan | 44350 | 0.501582278 | -0.309006211 |
| Lung | Japan | 44504 | 0.47826087 | -0.354330709 |
| Lung | US | 44179 | 0.514240506 | -0.319685039 |
| Lung | US | 44339 | 0.485271318 | -0.339563863 |
| Lung | US | 44476 | 0.42303433 | -0.553191489 |

Add the calc_2D{type{"Test"}}-calc_2D{type{"Control"}} calculations

| | | | Control | Test | calc_2D{type{"Test"}}-calc_2D{type{"Control"}} |
|---|---|---|---|---|---|
| Colon | Mexico | 44283 | 0.50617284 | -0.555873926 | -1.062046765 |
| Colon | US | 44260 | 0.549429658 | -0.472934473 | -1.022364131 |
| Colon | US | 44398 | 0.378998609 | -0.376038781 | -0.75503739 |
| Colon | US | 44568 | 0.513358779 | -0.491927825 | -1.005286604 |
| Lung | Canada | 44269 | 0.491419657 | -0.334379906 | -0.825799563 |
| Lung | Canada | 44386 | 0.499212598 | -0.364632238 | -0.863844836 |
| Lung | China | 44320 | 0.504702194 | -0.290880503 | -0.795582698 |
| Lung | China | 44426 | 0.460815047 | -0.323390895 | -0.784205942 |
| Lung | Japan | 44350 | 0.501582278 | -0.309006211 | -0.81058849 |
| Lung | Japan | 44504 | 0.47826087 | -0.354330709 | -0.832591578 |
| Lung | US | 44179 | 0.514240506 | -0.319685039 | -0.833925546 |
| Lung | US | 44339 | 0.485271318 | -0.339563863 | -0.824835181 |
| Lung | US | 44476 | 0.42303433 | -0.553191489 | -0.976225819 |

10864

10857

Do the vertical calc_2D{type{"Test"}}-calc_2D{type{"Control"}} calculation sorts ascending

10866

| | | | Control | Test | calc_2D{type{"Test"}}-calc_2D{type{"Control"}} |
|---|---|---|---|---|---|
| Colon | Mexico | 44283 | 0.50617284 | -0.555873926 | -1.062046765 |
| Colon | US | 44260 | 0.549429658 | -0.472934473 | -1.022364131 |
| Colon | US | 44568 | 0.513358779 | -0.491927825 | -1.005286604 |
| Lung | US | 44476 | 0.42303433 | -0.553191489 | -0.976225819 |
| Lung | Canada | 44386 | 0.499212598 | -0.364632238 | -0.863844836 |
| Lung | US | 44179 | 0.514240506 | -0.319685039 | -0.833925546 |
| Lung | Japan | 44504 | 0.47826087 | -0.354330709 | -0.832591578 |
| Lung | Canada | 44269 | 0.491419657 | -0.334379906 | -0.825799563 |
| Lung | US | 44339 | 0.485271318 | -0.339563863 | -0.824835181 |
| Lung | Japan | 44350 | 0.501582278 | -0.309006211 | -0.81058849 |
| Lung | China | 44320 | 0.504702194 | -0.290880503 | -0.795582698 |
| Lung | China | 44426 | 0.460815047 | -0.323390895 | -0.784205942 |
| Colon | US | 44398 | 0.378998609 | -0.376038781 | -0.75503739 |

Figure 109:
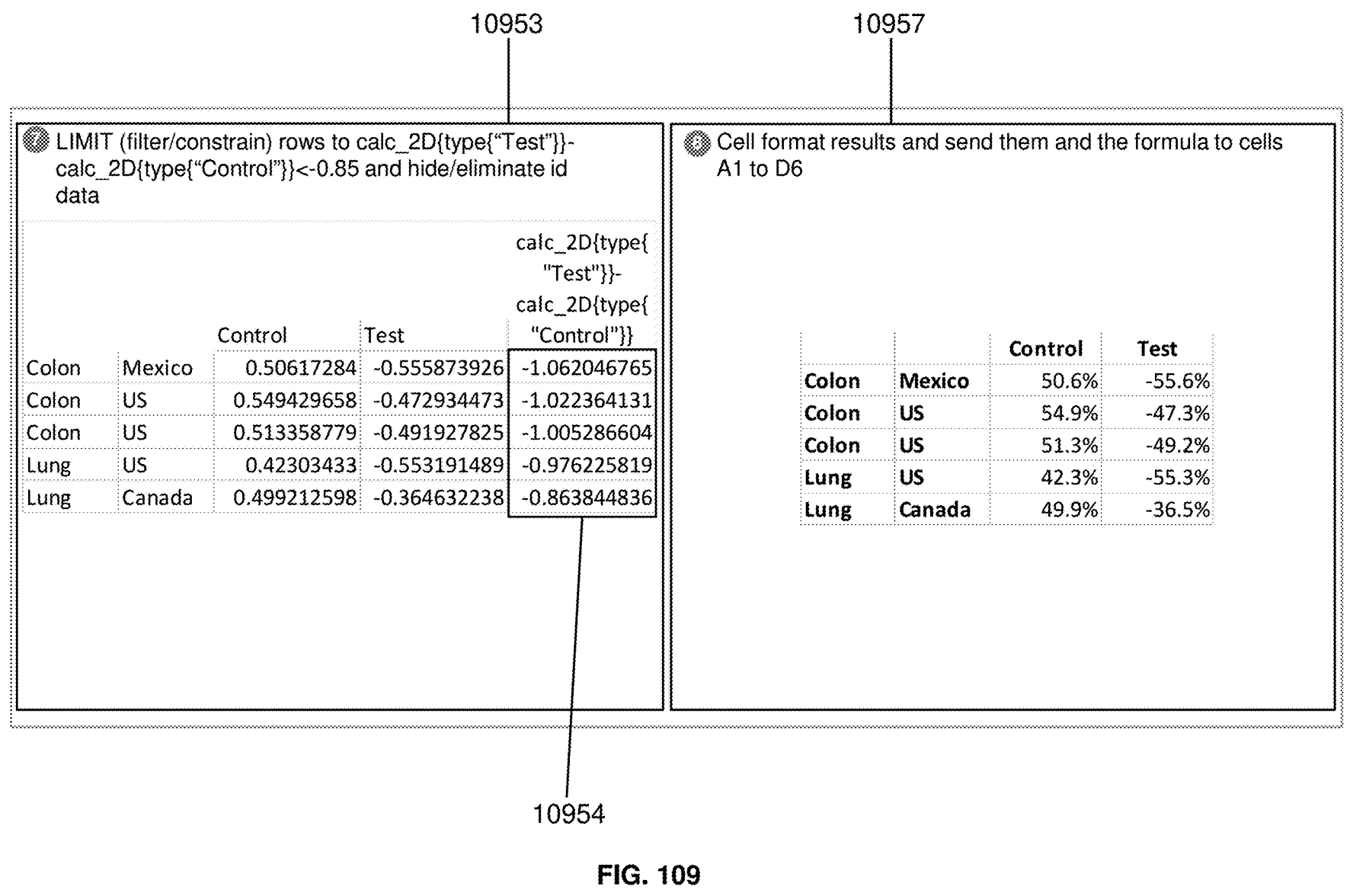

LIMIT (filter/constrain) rows to calc_2D{type{“Test”}}-calc_2D{type{“Control”}}<-0.85 and hide/eliminate id data

| | | Control | Test | calc_2D{type{"Test"}}-calc_2D{type{"Control"}} |
|---|---|---|---|---|
| Colon | Mexico | 0.50617284 | -0.555873926 | -1.062046765 |
| Colon | US | 0.549429658 | -0.472934473 | -1.022364131 |
| Colon | US | 0.513358779 | -0.491927825 | -1.005286604 |
| Lung | US | 0.42303433 | -0.553191489 | -0.976225819 |
| Lung | Canada | 0.499212598 | -0.364632238 | -0.863844836 |

10954

10957

Cell format results and send them and the formula to cells A1 to D6

| | | Control | Test |
|---|---|---|---|
| Colon | Mexico | 50.6% | -55.6% |
| Colon | US | 54.9% | -47.3% |
| Colon | US | 51.3% | -49.2% |
| Lung | US | 42.3% | -55.3% |
| Lung | Canada | 49.9% | -36.5% |

Retrieves all the data for the NSC formulaic data fields

| country | year | quarter | donate |
|---|---|---|---|
| Canada | 2020 | Q1 | 1386.32 |
| Canada | 2020 | Q1 | 2287.3 |
| Canada | 2020 | Q2 | 1109.87 |
| Canada | 2020 | Q2 | 1250.32 |
| Canada | 2021 | Q1 | 1108.47 |
| Canada | 2021 | Q1 | 1438.98 |
| Canada | 2021 | Q2 | 1274.65 |
| Canada | 2021 | Q2 | 1898.33 |
| US | 2020 | Q1 | 13500 |
| US | 2020 | Q1 | 8500 |
| US | 2020 | Q2 | 12750 |
| US | 2020 | Q2 | 17900 |
| US | 2021 | Q1 | 11870 |
| US | 2021 | Q1 | 16200 |
| US | 2021 | Q1 | 3200 |
| US | 2021 | Q2 | 14855 |
| US | 2021 | Q2 | 17450 |
| US | 2021 | Q2 | 2850 |
| US | 2021 | Q2 | 1200 |

Sorts the data into the combined vertical and horizontal groups (loop equivalents) with all the data for the calculations

| country | quarter | year | donate | year | donate |
|---|---|---|---|---|---|
| Canada | Q1 | 2021 | 1108.47 | 2020 | 1386.32 |
| Canada | Q1 | 2021 | 1438.98 | 2020 | 2287.3 |
| Canada | Q2 | 2021 | 1274.65 | 2020 | 1109.87 |
| Canada | Q2 | 2021 | 1898.33 | 2020 | 1250.32 |
| US | Q1 | 2021 | 11870 | 2020 | 13500 |
| US | Q1 | 2021 | 16200 | 2020 | 8500 |
| US | Q1 | 2021 | 3200 | | |
| US | Q2 | 2021 | 14855 | 2020 | 12750 |
| US | Q2 | 2021 | 17450 | 2020 | 17900 |
| US | Q2 | 2021 | 2850 | | |
| US | Q2 | 2021 | 1200 | | |

Does each of the group (loop equivalent) SUM calculations

| country | quarter | year | SUM(donate) | year | SUM(donate{year {!LOOP-1}}) |
|---|---|---|---|---|---|
| Canada | Q1 | 2021 | 2547.45 | 2020 | 3673.62 |
| | | | | | |
| Canada | Q2 | 2021 | 3172.98 | 2020 | 2360.19 |
| | | | | | |
| US | Q1 | 2021 | 31270 | 2020 | 22000 |
| | | | | | |
| | | | | | |
| US | Q2 | 2021 | 36355 | 2020 | 30650 |
| | | | | | |
| | | | | | |
| | | | | | |

115
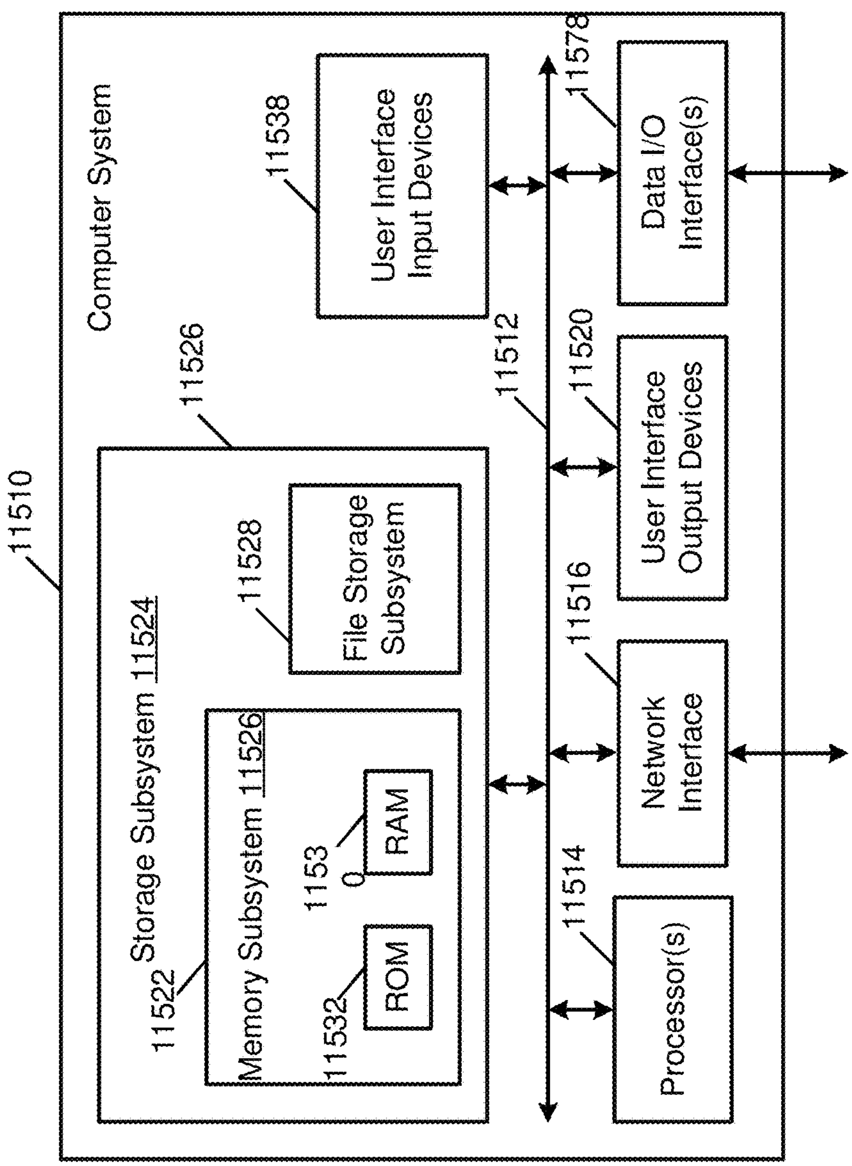
Fig. 115 Computer System

METHOD AND SYSTEM FOR IMPROVED 2D ORDERING OF OUTPUT FROM SPREADSHEET ANALYTICAL FUNCTIONS

PRIORITY APPLICATION

This application claims priority to and the benefit of U.S. Provisional Application No. 63/240,828 titled "Method and System for Improved 2D Ordering of Output from Spreadsheet Analytical Functions," filed 3 Sep. 2021. The priority application is incorporated by reference herein.

RELATED APPLICATIONS

This application is related to and incorporates by reference the following applications:

U.S. application Ser. No. 16/031,339, titled "Methods and Systems for Providing Selective Multi-Way Replication and Atomization of Cell Blocks and Other Elements in Spreadsheets and Presentations," filed Jul. 10, 2018, now U.S. Pat. No. 11,182,548, issued Nov. 23, 2021, which claims the benefit of U.S. Provisional Application No. 62/530,835, filed Jul. 10, 2017, U.S. application Ser. No. 16/031,379, titled "Methods and Systems for Connecting a Spreadsheet to External Data Sources with Formulaic Specification of Data Retrieval," filed 10 Jul. 2018, now U.S. Pat. No. 11,354,494, issued Jun. 7, 2022, which claims the benefit of U.S. Provisional Application No. 62/530,786, filed Jul. 10, 2017, U.S. application Ser. No. 16/031,759, titled, "Methods and Systems for Connecting a Spreadsheet to External Data Sources with Temporal Replication of Cell Blocks," filed Jul. 10, 2018, now U.S. Pat. No. 11,017,165, issued May 25, 2021, which claims the benefit of U.S. Provisional Patent Application No. 62/530,794, filed on Jul. 10, 2017, and U.S. application Ser. No. 16/191,402, titled, "Methods and Systems for Connecting A Spreadsheet to External Data Sources with Ordered Formulaic Specification of Data Retrieved" filed Nov. 14, 2018, now U.S. Pat. No. 11,036, 929, issued Jun. 15, 2021, which claims the benefit of U.S. Provisional Patent Application No. 62/586,719," filed on Nov. 15, 2017.

U.S. application Ser. No. 17/359,430, titled, "Methods and Systems for Constructing a Complex Formula in a Spreadsheet Cell," filed Jun. 25, 2021, which claims the benefit of U.S. Provisional Patent Application No. 63/044, 990", filed Jun. 26, 2020.

U.S. application Ser. No. 17/359,418, titled "Methods and Systems for Presenting Drop-Down, Pop-Up or Other Presentation of a Multi-Value Data Set in a Spreadsheet Cell," filed Jun. 25, 2021, which claims the benefit of U.S. Provisional Patent Application No. 63/044,989, filed 26 Jun. 2020.

U.S. application Ser. No. 17/374,898, titled "Method and System for Improved Spreadsheet Analytical Functioning," filed Jul. 13, 2021, which claims the benefit of U.S. Provisional Patent Application No. 63/051,280, filed Jul. 13, 2020.

U.S. application Ser. No. 17/374,901, titled "Method and System for Improved Ordering of Output from Spreadsheet Analytical Functions," filed Jul. 13, 2021, which claims the benefit of U.S. Provisional Patent Application No. 63/051, 283, filed Jul. 13, 2020.

U.S. application Ser. No. 17/752,814 titled "Method and System for Spreadsheet Error Identification and Avoidance," filed May 24, 2022, which claims the benefit of U.S. Provisional Patent Application No. 63/192,475, titled May 24, 2021.

BACKGROUND

Today's spreadsheets have a very broad range of prebuilt functions (predefined formulas), e.g., SUM, COUNT, MIN, and STDEV, designed to simplify analytics for users. However, a fundamental capability of most programming languages, the loop, which allows users to execute one or more calculations repeatedly is missing from spreadsheet functions. A specialized capability called the Pivot table does a very limited set of user defined repetitive calculations. However, while virtually all spreadsheet users employ functions in their analytics, a much smaller subset know how to use a Pivot Table. Also, Pivot Tables are very limited in the types of calculations they can perform, e.g., the number of functions they can use, the combination of functions, the involvement of algebraic operators and the ordering and ranking of outcomes.

Accordingly, an opportunity arises to allow all spreadsheet users to solve repetitive calculation problems by writing a prebuilt functional formula that heretofore would have required the many steps of setting up a Pivot Table, doing that and additional operations, or programming in the spreadsheets' embedded programming language. It brings an important capability to the large number of spreadsheet users who know how to set up a function (e.g., SUM) but do not know how to set up Pivot Tables or program in the embedded programming language. It also is a huge aid for the Pivot table and embedded programming capable users as the time and effort to solve repetitive calculation problems can be dramatically reduced. Our previously described technology makes it incredibly easy to solve one-dimensional problems requiring repetitive evaluations (i.e., programming loops) and tailored presentation of the outcomes, and is outstanding for problems with results involving ordering of outcomes (e.g., largest to smallest, first to last) as part of answering user questions or requires the broad range of functions or algebraic formulas not supported by Pivot Tables. Our added technology extends those capabilities to two-dimensional (2D) problems.

SUMMARY

The disclosed technology creates a family of (predefined formula) prebuilt spreadsheet functions which allows users to create programming loop equivalents in their regular spreadsheet cells employing familiar range functions (e.g., SUM, COUNT, MIN, MAX, etc.) and/or algebraic operations with data filtering and output ordering and selection for two-dimensional problems. The data can be sourced from multiple cells within the spreadsheet or a broad spectrum of numeric, date and text data not stored in a spreadsheet, including data not discretely defined. The technology disclosed can use as inputs either cell ranges or Non-Spreadsheet Cell (NSC) data formulas. The capability allows users to specify standardized or highly custom calculations capable of executing millions of loops through a (predefined formula) spreadsheet function.

One embodiment of our disclosed technology replicates the functionality of a two-dimensional Pivot Table created through a spreadsheet function (predefined formula) for the purpose of two-dimensionally organizing data from cells or external data sources. Usage is made much more straightforward and familiar using inputs and outputs in regular cells not requiring Pivot Table learnings, ribbons, menus, dropdowns, selections and more selections and Cube Function conversions of the Pivot Table results (for additional use). The disclosed technology supports single and multivariable compound loops on both output dimensions. Those loops can display the data vertically or horizontally collapsed or not. The disclosed functions allow users to easily add constraints (filters) that alter the data presented to meet their needs. It allows many alternatives on ordering the output including calculation result rankings which override the loop order. The disclosed technology allows users to highly customize what gets displayed in the cells from the loops and their calculations.

Another embodiment of our disclosed technology creates a predefined formula spreadsheet function that supports single and multivariable two-dimensional compound loops doing one calculation for each progression of the loop (e.g., using an algebraic formula) or the entire loop (e.g., using a range or array function) and outputting one or more of those calculation results to one or more spreadsheet cells in a two-dimensional layout. Those calculations use one or more loop progression data values but are not limited to only those values (e.g., using data inputs not within the loop data). The disclosed functions allow users to easily add constraints (filters) that alter the data presented and the calculations done to meet their needs. It allows many alternatives on ordering the output including calculation result rankings which override the loop progression order on one or both dimensions. The disclosed technology allows users to highly customize what gets displayed in the cells from the loops and their calculations.

Particular aspects of the technology disclosed are described in the claims, specification, and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1A through FIG. 5B examples a low skilled user solving a problem in Microsoft Excel.

FIG. 6A through FIG. 10 examples a higher skilled Pivot Table knowledgeable user solving the same problem in Microsoft Excel.

FIG. 20 through FIG. 23 examples the capabilities of several previous embodiments using cell data as the formulaic data source (WRITE_2D).

FIG. 24 through FIG. 27 examples our technology creating average value total and subtotal values for a WRITE 2D formula using cell data and a constraint (filter).

FIG. 28 through FIG. 31 examples our technology supporting the easy automatic filling of missing dates in a two-dimensional data transformation (WRITE_2D).

FIG. 37 through FIG. 43 examples our two-dimensional algebraic calculation technology supporting compound vertical and horizontal headings, generating titles, sorting by average calculations, limiting outputs and constraining (filtering) results using NSC formulaic data fields (WRITE_CALC_2D).

FIG. 45 through FIG. 48 examples our spreadsheet function technology doing two-dimensional group (loop) calculations with compound headings, constraints (filters) and TITLES using NSC formulaic data (WRITE_GROUP_2D).

FIG. 49 through FIG. 50 examples our spreadsheet function technology doing two-dimensional group (loop) calculations with compound headings, constraints (filters) and TITLES using cell sourced formulaic data (WRITE_GROUP_2D).

FIG. 51 through FIG. 53 examples our spreadsheet function technology doing two-dimensional group (loop) calculations with compound headings having totals and subtotals (WRITE_GROUP_2D).

FIG. 54 through FIG. 57 examples our spreadsheet function technology doing two-dimensional group (loop) calculations where the range or array functions in the looped calculations use different loop values, i.e., different loops (WRITE_GROUP_2D).

FIG. 58 through FIG. 61 examples our spreadsheet function technology doing two-dimensional group (loop) calculations where one range or array function does not use loop values (WRITE_GROUP_2D).

FIG. 62 through FIG. 65 examples our spreadsheet function technology doing two-dimensional group (loop) calculations supporting date filling and custom heading title creation (WRITE_GROUP_2D).

FIG. 66 through FIG. 69 examples our spreadsheet function technology doing two-dimensional group (loop) calculations supporting calculated sorting and output limitation (WRITE_GROUP_2D).

FIG. 70 through FIG. 72 examples our spreadsheet function technology doing two-dimensional group (loop) calculations supporting sorting by the calc_2D values (WRITE_GROUP_2D).

FIG. 73 through FIG. 76 examples our spreadsheet function technology doing two-dimensional group (loop) calculations supporting joining data across data sets or tables and in the calculations using non-range/array functions, using cell references, using constant inputs, and including algebraic operators (WRITE_GROUP_2D).

FIG. 78 examples a set of the range or array spreadsheet functions which work in our technology.

FIG. 81 through FIG. 84 examples our spreadsheet function technology doing two-dimensional group (loop) calculations where the range or array functions evaluating the loops use different loops (WRITE_GROUP_2D).

FIG. 85 through FIG. 90 examples our two-dimensional algebraic calculation technology using spreadsheet cell sourced data supporting non-nested subtotals (e.g., Months), titles, and the use of non-formulaic data, normal cell ranges in functions, and non-range/array functions (WRITE_CALC_2D).

FIG. 93 through FIG. 95 examples our spreadsheet function technology doing two-dimensional group (loop) calculations constraining (filtering) formulaic data values within part of the group equivalent loop calculations (WRITE_GROUP_2D).

FIG. 98 through FIG. 100 examples our technology limiting the group (loop equivalent) 2D calculated values to a user specified value (WRITE_GROUP_2D).

FIG. 101 through FIG. 104 examples our technology limiting the rows based on a summation of the calc_2D values, result of a result limitation (WRITE_GROUP_2D).

FIG. 105 through FIG. 109 examples our technology hiding values and sorting and limiting the values based on algebraic calculations using the values of the two-dimensional algebraic calculations—result of a result sorting and limitation (WRITE_CALC_2D).

FIG. 112 through FIG. 114 examples our spreadsheet function technology doing two-dimensional group (loop) calculations constraining (filtering) formulaic data values within one of the headings and using a cell reference input and auto generating heading titles (WRITE_GROUP_2D).

FIG. 115 depicts an example computer system that can be used to implement aspects of the technology disclosed.

DETAILED DESCRIPTION

Figure 2A:
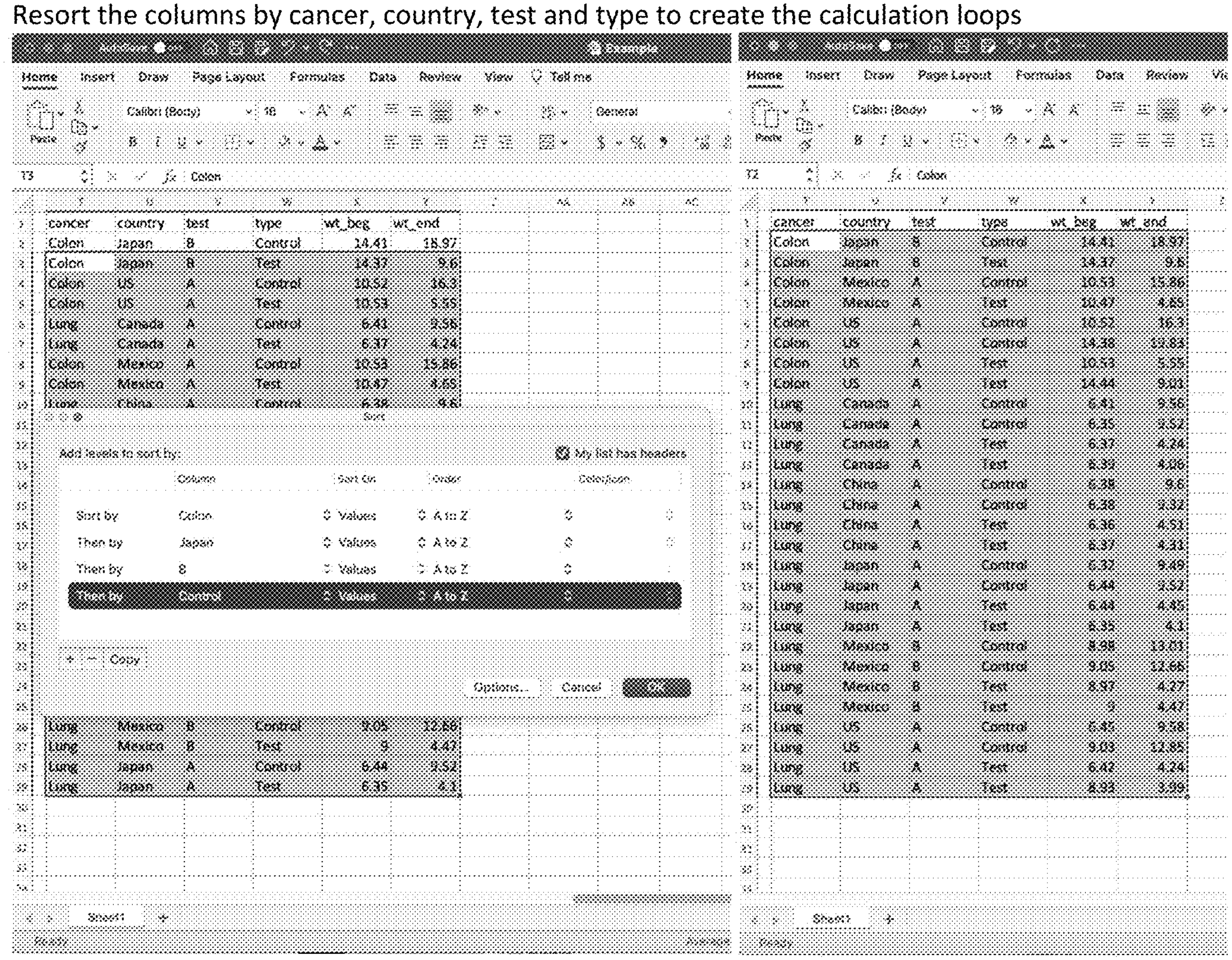
Figure 2B:
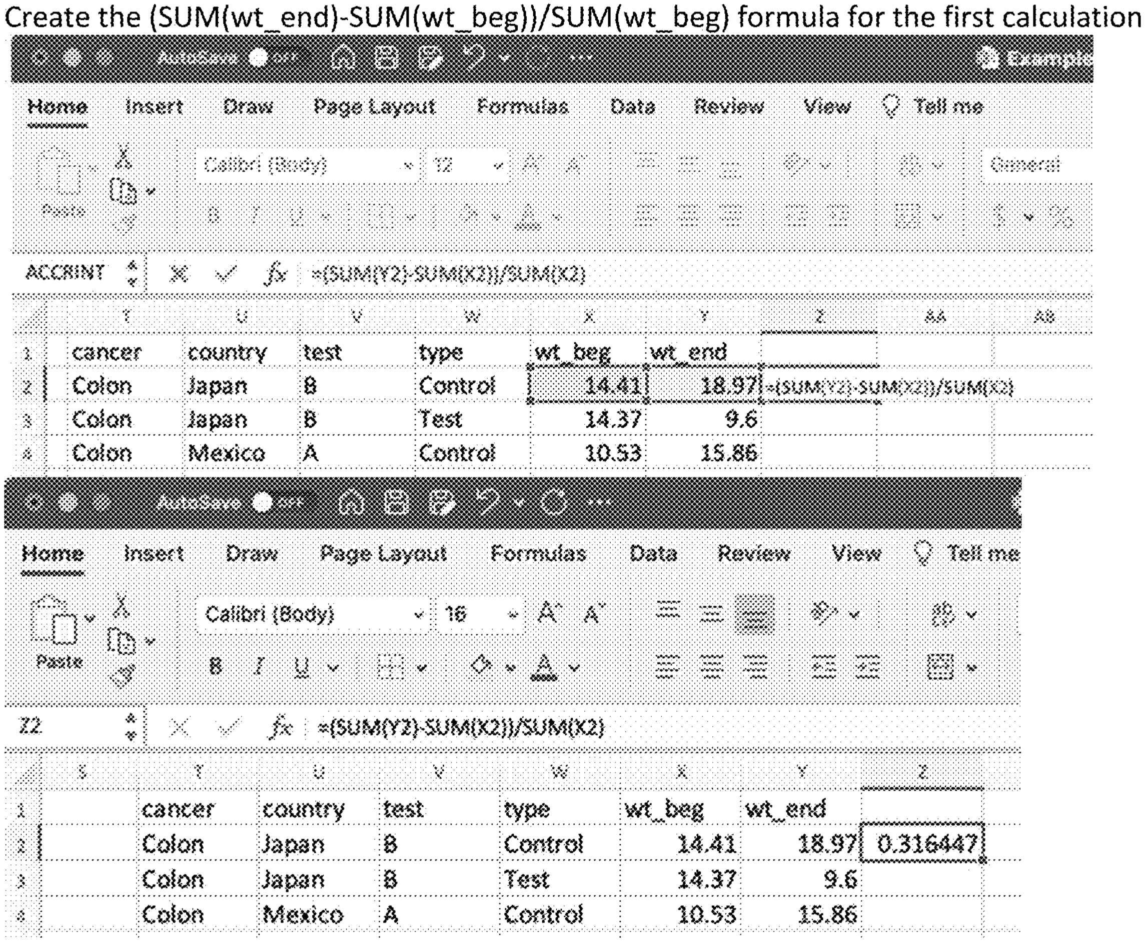
Figure 3B:
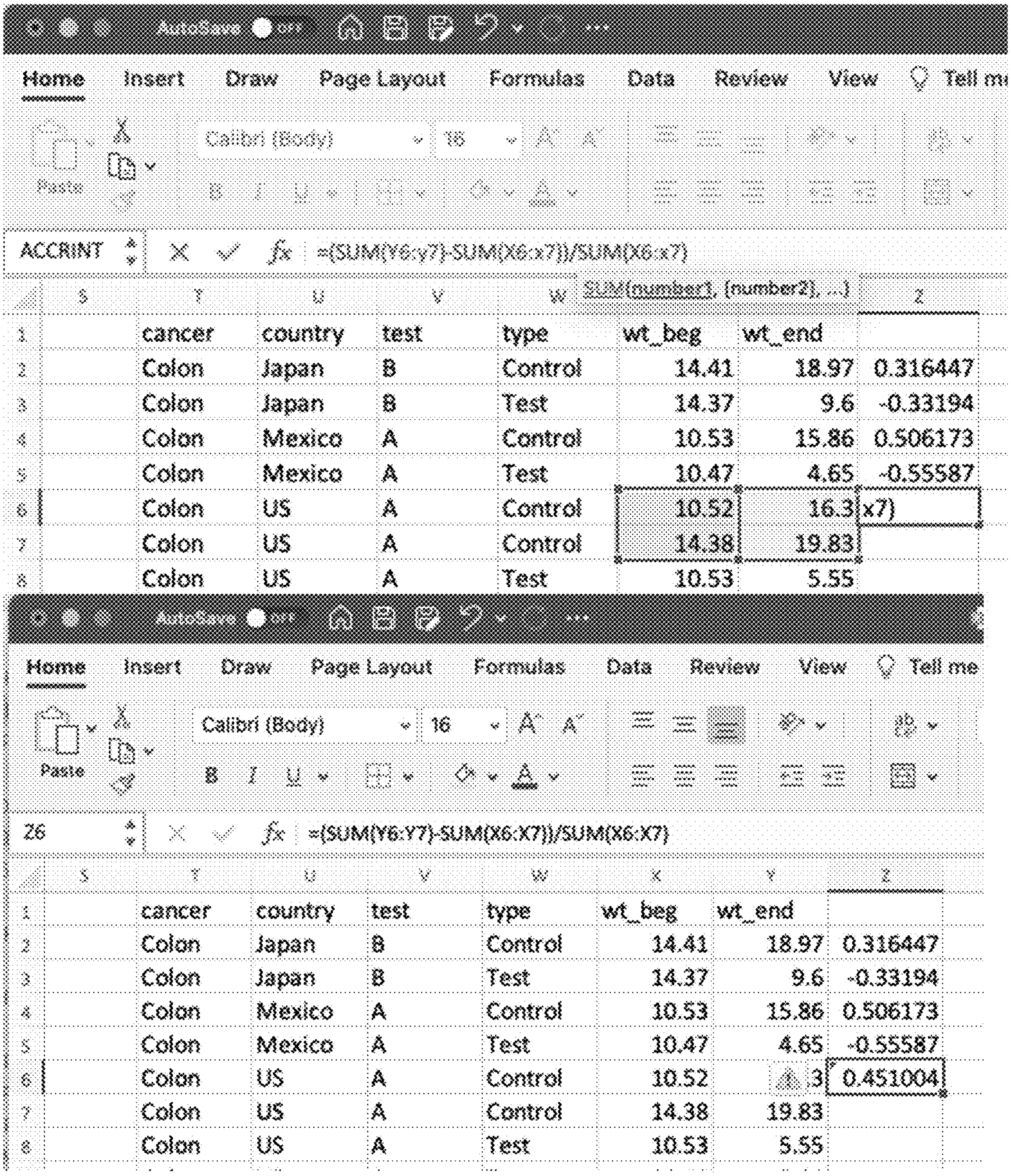

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers, and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With their added capabilities, spreadsheet applications have become substantially more complicated. The data manipulation and embedded programming language capabilities can be very powerful but are complicated to learn and therefore they are used by a very small fraction of the spreadsheet application user base. There are other advanced capabilities including Pivot Tables, Power Pivot and Power Query that allow users to manipulate data in spreadsheet overlays and processes from which formulas and cells can be extracted by further capabilities such as Cube Functions (e.g., for Pivot Tables). These capabilities require users to learn very different interfaces, and operations that operate very separately from their regular cell activities. As such only a fraction of users knows these capabilities which require learning and remembering very different operations. All this complexity has led to over a hundred books and thousands of online videos that have been published to help users understand the capabilities of Excel alone.

Spreadsheet providers like Microsoft Excel and Google Sheets cater to the specialized needs of users through many capabilities including vast numbers of spreadsheet functions (e.g., built in predefined formulas including SUM, COUNT and MIN). Microsoft Excel includes more than four hundred and fifty built-in (prebuilt) functions and Google Sheets over four hundred. These built-in functions make operations desired by users dramatically simpler and are used by virtually every user.

The formulaically defined Non-Spreadsheet Cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to create one prebuilt function formula that accomplishes as much or more as Pivot Tables. The disclosed technology goes beyond existing Pivot Table technologies to include additional filters, sorting, calculated fields, types of calculations, use of functions in the calculations and multi-table calculations. More customizable versions of our disclosed technology allow users to go even further, beyond what is possible in the limited formulas and functions available in Pivot Tables and set up more elaborate sortation (e.g., ordering or ranking) and evaluation of the looped calculations constructed by the user. Our technology allows users to do things not possible in Pivot Tables requiring further work with Pivot Table outcomes or programming in the embedded spreadsheet programming language. And as will be exampled our technology takes numerous activities in the current spreadsheet technologies and simplifies them into single formulas. To illustrate the current spreadsheet prior art we will take a simple repetitive calculation and example doing it first for users who do not know how to do Pivot Tables and then second for those that do know how to use Pivot Tables.

Existing Spreadsheet Limitations

Because Microsoft Excel has the broadest capabilities of the available spreadsheets, we will example user activities with it. Google Sheets and many of the other available spreadsheets have subsets of the Functions and Pivot Table capabilities available within Microsoft Excel and while there are differences, generally operate in similar manner.

We will example a very simple situation of a cancer researcher who wants to evaluate the results of two different tests (A or B), each of which has two types of tests (Test and Control) across two different cancer types (Colon and Lung) across five different countries (Canada, China, Japan, Mexico, and US). The evaluation for each combination is a percentage weight change of a cancerous mass, i.e., '(wt_end−wt_beg)/wt_beg', over the period of the test or control experiments. We will first example how a user who does not know Pivot Tables and does not know how to program in the embedded programming language would solve the problem. Their challenge is they have access to no capability within their spreadsheet to do repetitive (looped) calculations and therefore must use a more manual approach. We will then example how a user who knows Pivot Tables but not the embedded programming language would solve the problem. The Pivot Table is their one way to create looped calculations however they then need to work around its limitation on singular function analyses and algebraic combinations. This user example will also illustrate some of what you need to know about using a Pivot Table and show some of the Ribbon menus, dropdowns, selections etc. you need to understand to accomplish the task.

FIG. 1A through FIG. 5B examples how a lower skilled user, who like many users does not know how to create a Pivot Table, might do that set of operations in their Excel spreadsheet. FIG. 1A steps one to three are about getting the data from their Information Technology (IT) organization and importing it into their Excel spreadsheet. That data received includes data from December 2020 onward (through January 2022). In step four the user locates the data in their spreadsheet and then in step five sorts the data so they can then remove undesired dates as shown in FIG. 1A. In step six (shown in FIG. 1B) the user then copies the desired data between 1/1/21 and 12/31/21 to a location where they can then use it in further analyses without potentially corrupting the original data.

In FIG. 2A step seven the user resorts the data by cancer, country, test, and type to set up the calculation loops, effectively creating the two-dimensional calculation loops. In step eight (shown in FIG. 2B) the user then creates the formula:

(SUM(*Y*2 which is wt_end)−SUM(*X*2 which is wt_beg))/SUM(*X*2 which is wt_beg)

even though the loop is for a single row. They do that realizing they will then want to adjust it for loops of varying lengths using a single formula with ranges containing one or more cells. In steps ten and eleven (shown in FIG. 2C) they then copy that formula to the other single value loops. In step twelve (exampled in FIG. 3A through FIG. 3C) the user then copies the formula into the first two value loop and modifies the ranges for each of the SUMs to accommodate each of the ranges in the four actions shown and ignores the warning error message shown in the fifth sub-step (shown in FIG. 3C). In steps thirteen through twenty-four the user then copies the formula for each of the two value loops. In this very simple case, the user is done with loop equivalent calculations by step twenty-four in FIG. 4A. However, in more typical situations where there are loops of many varied numbers this is a much more time consuming and more complicated process and in situations with even hundreds of loops largely undoable for the user.

In FIG. 4B step twenty-five the user then moves the results to where they want the output and puts in the vertical headings for the calculation table 462 which involves observing from the data all the combinations of cancers and countries and typing or copying them to the cells. Then in FIG. 4C step twenty-six the user creates the horizontal headings 474. A reasonably doable task with this number of combinations but in a situation with many more combinations it becomes numerous steps by itself. In FIG. 4D step twenty-seven the user then adds the calculation table heading titles 482 by referencing or copying the data headings 496.

In FIG. 5A step twenty-eight the user begins the process of populating the loop calculated values into their 2D table positions. Because there are blanks, and the calculations are not in any transposable setup this is a highly manual process prone to transcription errors done in steps twenty-eight through forty-four. At that point the user has the desired outcome but as shown here for this very small data set it has taken the user forty-four steps. For even this simple data set it is obvious the user needs a much easier way of doing these two-dimensional looped calculations. For larger and more complicated data sets users must have another way as imagine the work involved with just five thousand test results, you are talking thousands of steps.

Figure 6A:
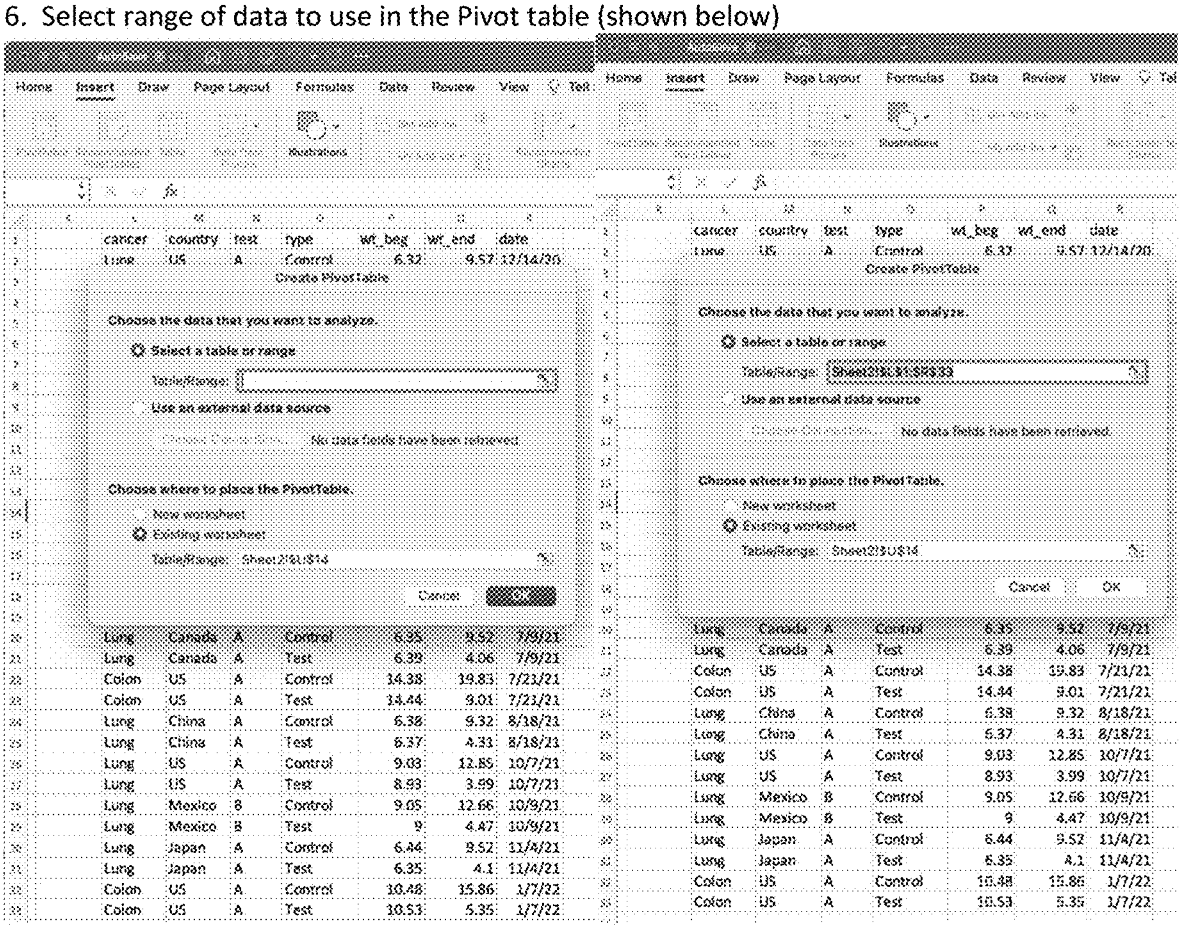
Figure 6B:
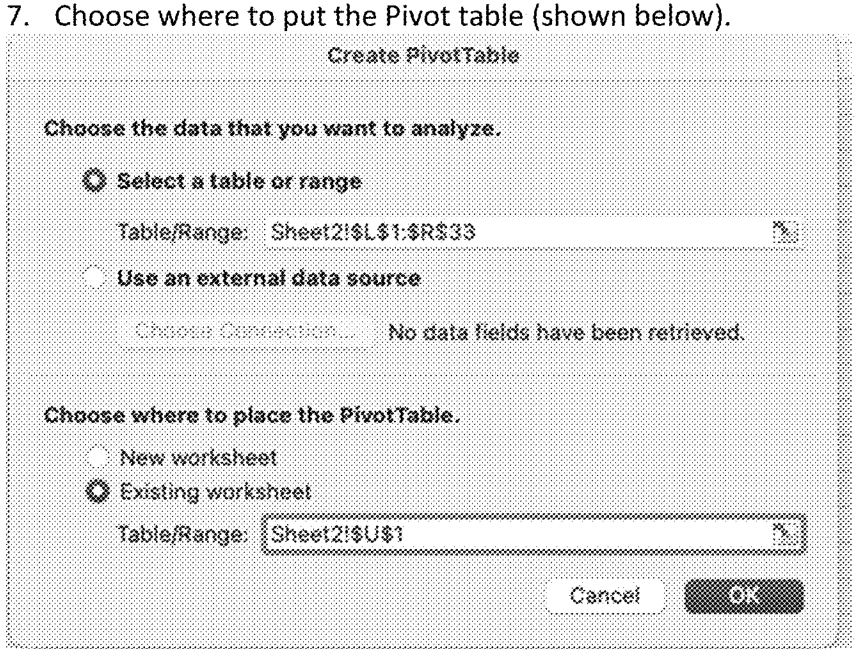
Figure 7A:
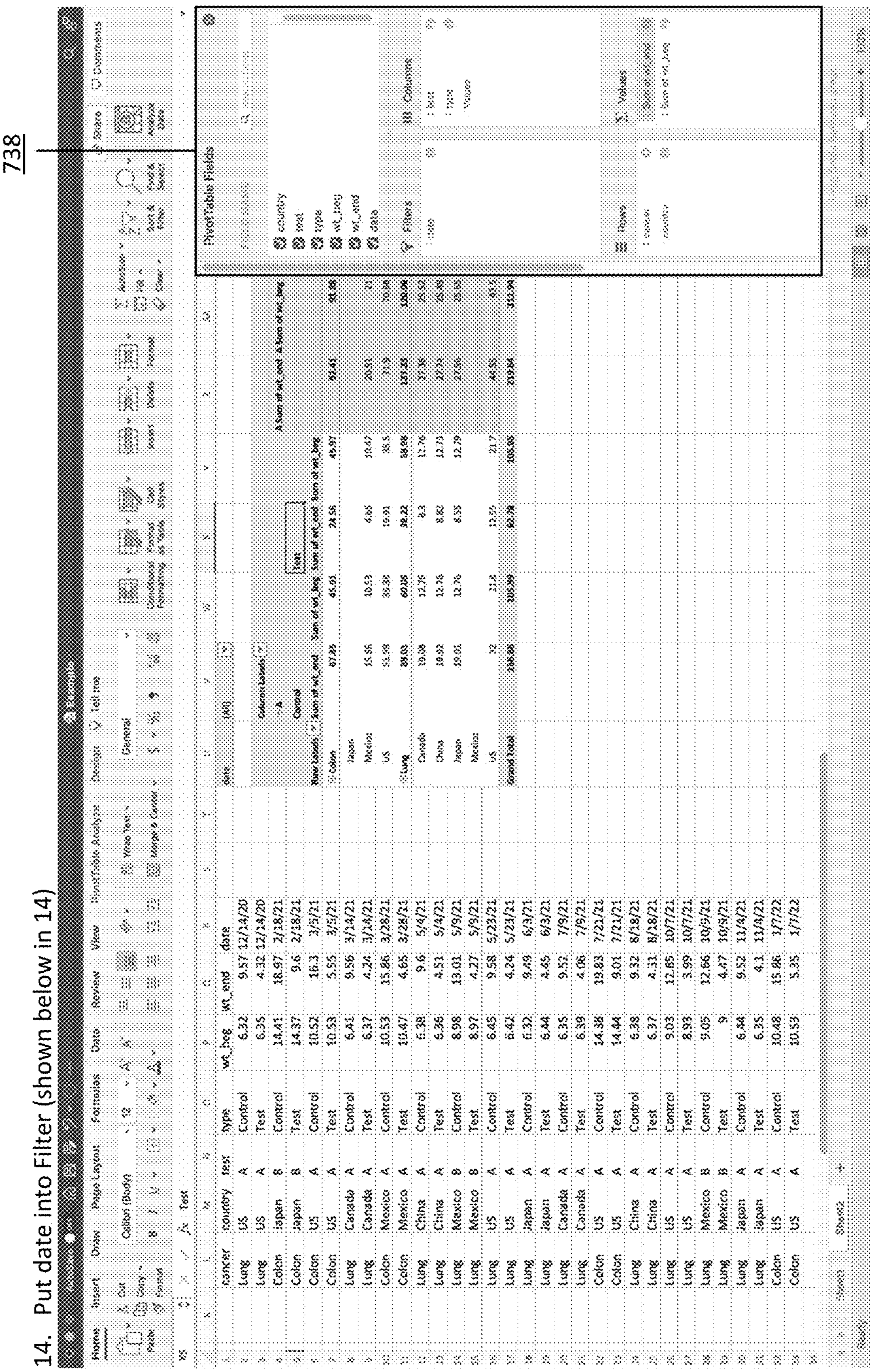
Figure 7B:
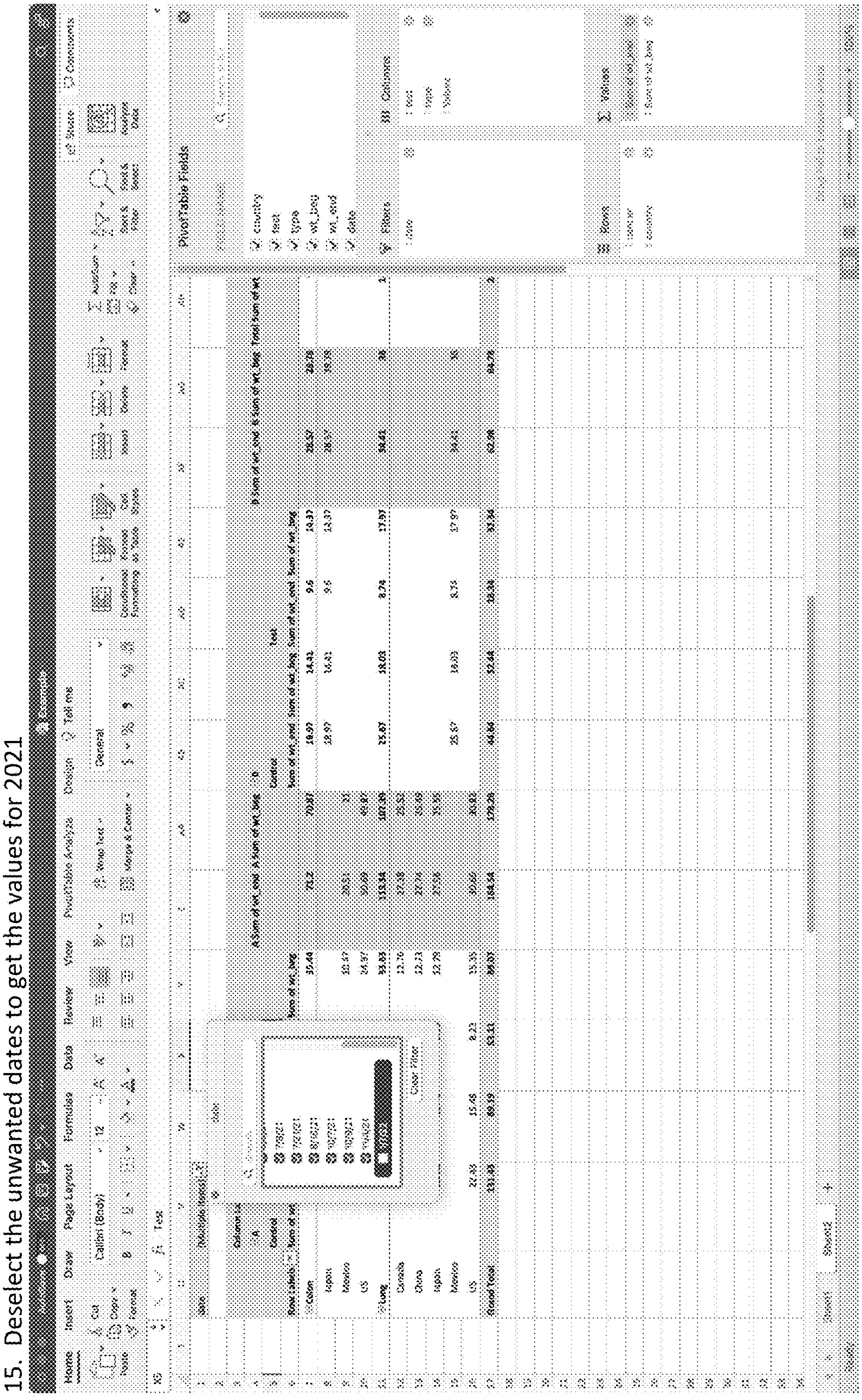

FIG. 6A through FIG. 10 examples how a Pivot table knowledgeable user could do the cancer researcher's calculation. FIG. 6A starts with the same three steps as the previous example of acquiring the data. Steps four through fourteen in FIG. 6A through FIG. 7A are setting up that data in the Pivot Table and positioning the data within the Pivot table setup UI 738. Step fifteen, shown in FIG. 7B, then eliminates (filters) the unwanted data not in the time period '1/1/21 to 12/31/21' by the user deselecting the unwanted dates. The user has now executed the desired sets of cancer, country test and type calculation loops for each of SUM (wt_beg) and SUM(wt_end). Unfortunately, the existing spreadsheets cannot do the desired formula in one pass but instead needed to generate the two data sets required for the formula desired below.

(SUM(wt_end)−SUM(wt_beg))/SUM(wt_beg)

Figure 8A:
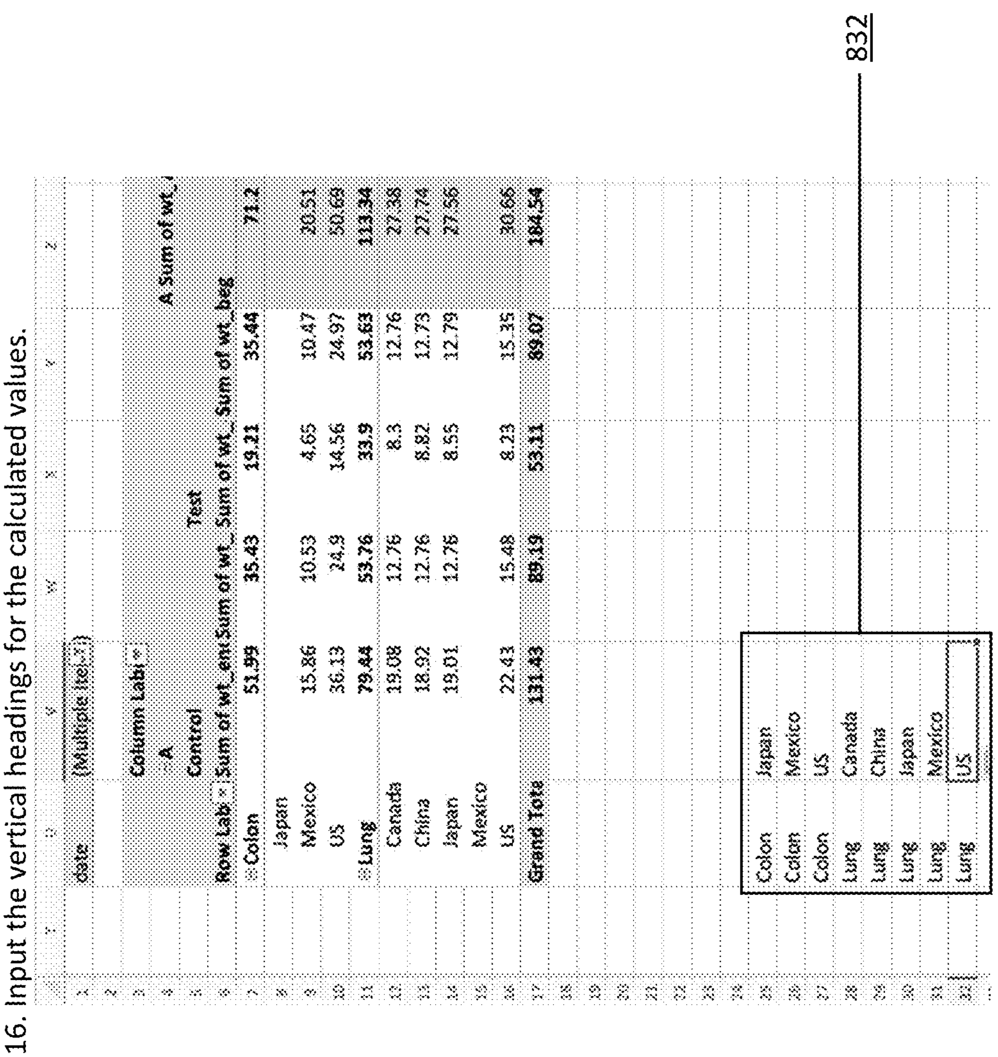
Figure 8B:
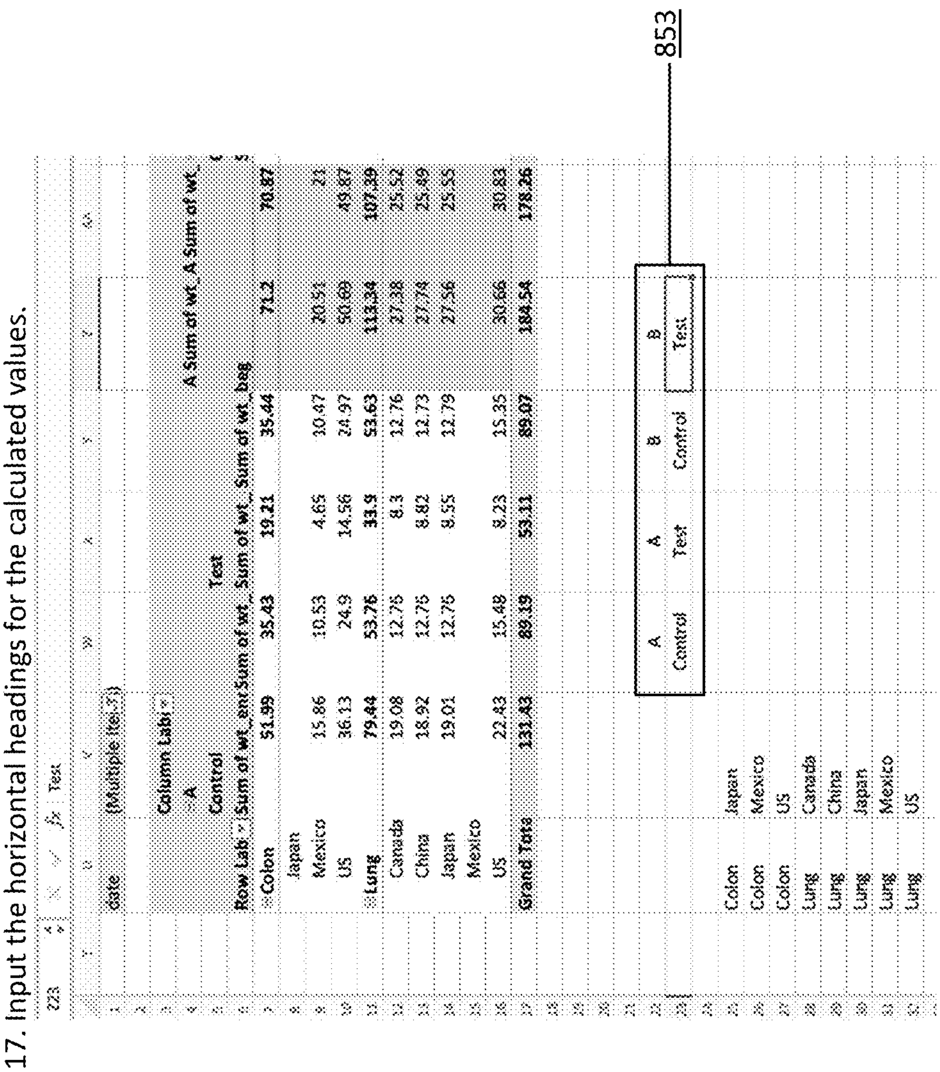
Figure 8C:
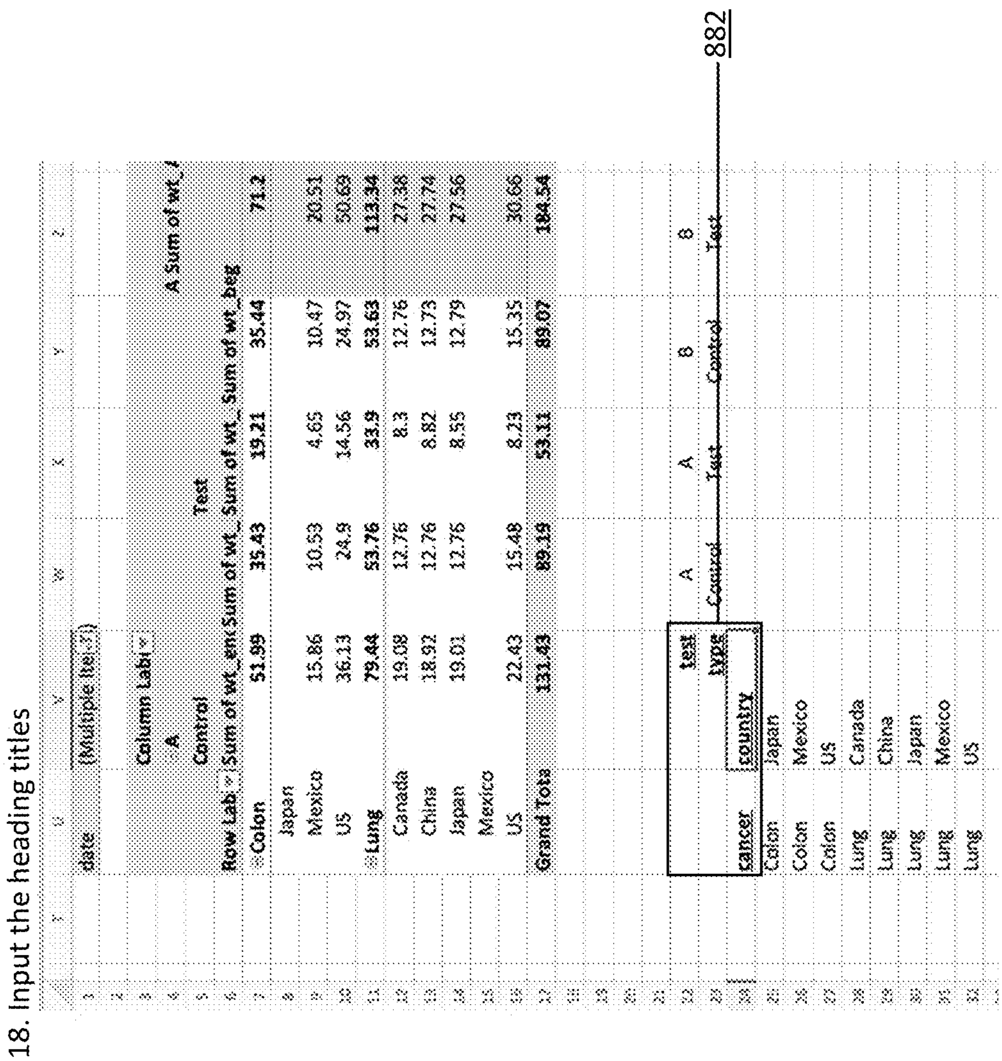

In FIG. 8A step sixteen the user sets up the desired calculation table vertical headings 832 typing in sixteen values. In FIG. 8B step seventeen the user types in the eight horizontal headings 853 and then in FIG. 8C step eighteen the user types in the four calculation table heading titles 882. Then in FIG. 9A step nineteen the user sets up the first calculation of the formula above by clicking on the respective wt_end and wt_beg values in the Pivot tables to get the formula 937:

=(GETPIVOTDATA("Sum of wt_end",$U$3,"cancer","Colon","country","Japan","test","*B*","type","Control")−GETPIVOTDATA("Sum of wt_beg",$U$3,"cancer","Colon","country","Japan","test",="*B*","type","Control"))/GETPIVOTDATA("Sum of wt_beg",$U$3,"cancer","Colon","country","Japan","test","*B*","type","Control")

There is no easy way to copy paste that formula into the other desired cells, so the user opts to create the formula for each desired cell in steps twenty through thirty-four exampled in FIG. 9B and FIG. 10. They could have opted to do a cube formula conversion but that also would not have left with anything that is easy to copy paste to the other desired cells and requires extra steps. In any case they end up with very complicated formulas not easy to modify themselves. Provided the calculation table is now in the location they want it the user is done thirty-four steps later. Having done a process that is very open to making mistakes creating headings, getting the formulas in the wrong place, getting the blanks in the wrong place, and building the formulas correctly. In more complicated settings the number of steps increases and if the data changes the user gets to start again and do it over. Clearly there is a need for a much simpler less error prone process for creating the desired two-dimensional table and altering it as the data changes (e.g., when the next round of experiments shows up).

Contrast the previous examples with our function approach to get the same outcome, where the only step required by the user is to write the following formula using one of our new functions:

=WRITE_GROUP_*2D*(cancer,country|test,type|(SUM(wt_end)−SUM(wt_beg))/SUM(wt−beg)|date{'1/1/21' . . . '12/31/21'}|TITLES[ ])

And our WRITE_GROUP_2D function will have typical spreadsheet prompts to help the user find the function and fill it in (examples to follow). Users will also understand and be very familiar with our Non-Spreadsheet Cell (NSC) formulaic data fields and their designation in this embodiment by the curly braces { }, as well as the specific data fields they are using. So, this one formula replaces the previously exampled forty-four or thirty-four complicated operations previously exampled (in FIG. 1A through FIG. 5B and in FIG. 6A through FIG. 10, respectively), and should the data change, e.g., when more experiments have been completed, our technology requires no changes to the formula or additional steps for an automatic recalculation of the results. Imagine the advantage of an automatic recalculation if more data is added that does not require the user to start again as in a conventional spreadsheet.

With this background and set up, we will now example how our technology works and then solves the problem above and the options that allow it to solve a much broader set of two-dimensional loop or repetitive calculations for users. We will start with how our technology two-dimensionally organizes data for users before going into doing two-dimensional calculations that no conventional spreadsheet Pivot table can do. And then example embodiments of how our technology can much more easily do two-dimensional range or array function table calculations before exampling how it can do more complicated variants of those calculations not done by current spreadsheet Pivot Tables. All of which are not done by todays' spreadsheets via predefined functions, which are readily available to users in any cell and without having to resort to ribbon driven activities with specialized activities and many different repetitive steps.

Two-Dimensional Data Organization Functions

Figure 11:
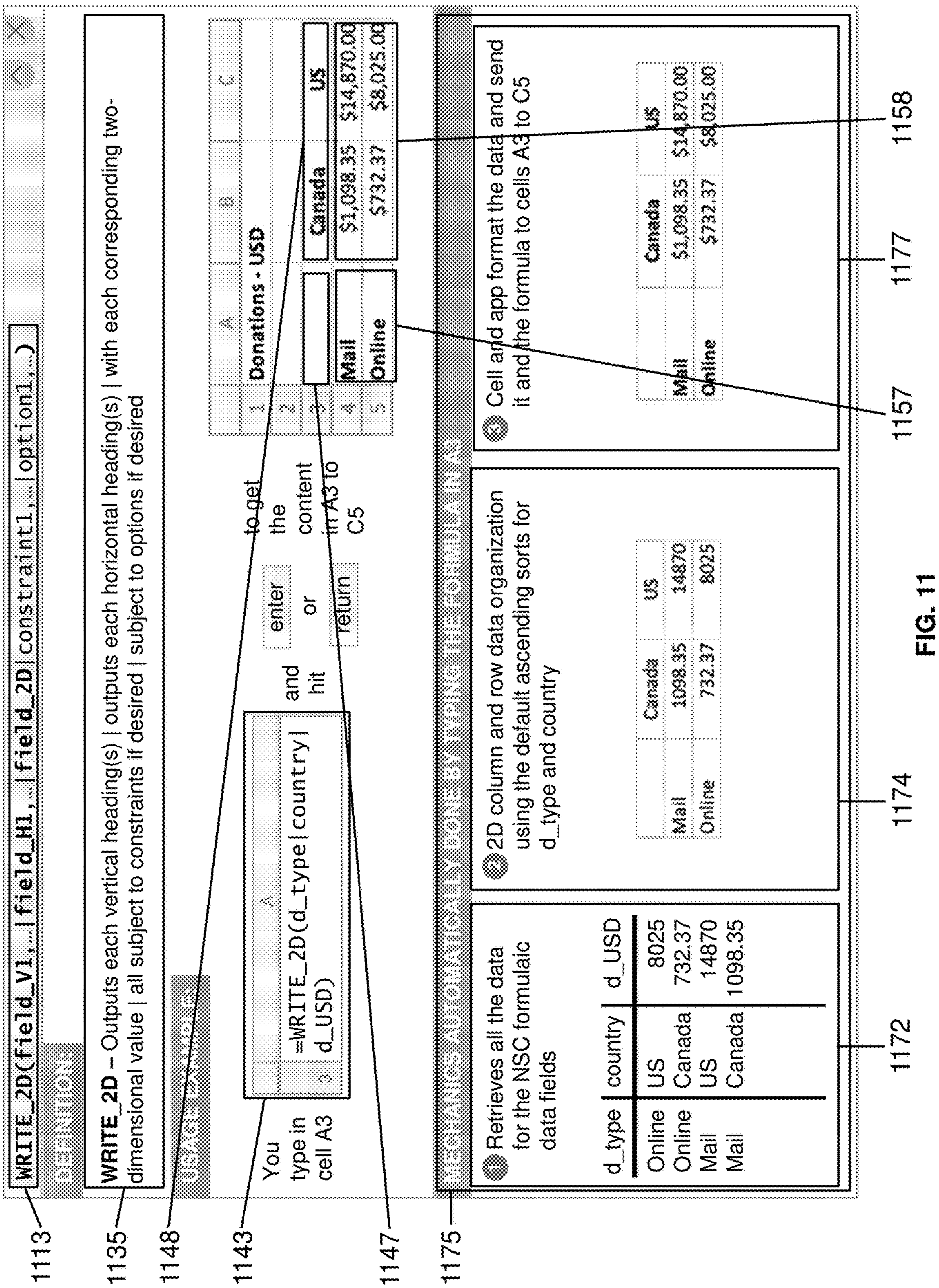
FIG. 11 examples an embodiment of our technology where the user two-dimensionally displays and organizes Non-Spreadsheet Cell (NSC) external data using one of our predefined functions, here called 'WRITE_2D'.

While spreadsheets are typically used for calculations sometimes users would like to easily organize two-dimensionally with helpful vertical and horizontal headings the data that they have somewhere in cells or are accessing externally (e.g., via our Non-Spreadsheet Cell formulaic data). Current spreadsheets have no capability for easily doing that two-dimensional organization. They also lack the ability to do it without disturbing the source data, filtering (constraining) it and two-dimensionally organizing (sorting the data) based on the headings, two-dimensional values and/or calculations done for those two-dimensional values. FIG. 11 examples an embodiment of our technology where the user two-dimensionally displays and organizes Non-Spreadsheet Cell (NSC) external data using one of our predefined functions, here called 'WRITE_2D'. The user is a North American charity worker looking to two-dimensionally organize and present their donations data which is stored in a typical relational database with columns of data fields and rows of data as shown in 1172. They want to organize it vertically by donation type 'd_type' (e.g., Mail and Online) and organize it horizontally by country from which it came 'country' (e.g., Canada and US). We have exampled it with only four combinations (2D repetitions) for simplicity of the steps but imagine a more likely situation with a hundred or more combinations (e.g., 10 vertical headings and 10 horizontal headings).

The 'WRITE_2D' function shown in FIG. 11 has a syntax/argument structure 1113 requiring the user to input three formulaic data fields. In this embodiment of our technology, it does not matter whether external data or cell data is the source, the syntax/argument structure of the function is the same. We have included a 'DEFINITION' 1135 of the function and its syntax/argument structure to help explain it. The three required inputs are 'field_V1' for the first vertical heading, 'field_H1' for the first horizontal heading and 'field_2D' for the two-dimensional field which will be repeated for the heading combinations (repetitions).

The user inputs those into the formula in cell 'A3' 1143, where the input of 'd_type' generates the vertical headings 1157, the input of 'country' generates the horizontal headings 1148 and the input of 'd_USD' generates the two-dimensional repetition values 1158. The formula results are automatically generated by the mechanics 1175 exampled in FIG. 11 by the three steps 1172, 1174 and 1177. These steps example what our technology is doing recognizing the application code may accomplish them in a different manner. Step one 1172 retrieves the formulaic data, in this case NSC formulaic data fields from the external data source. Step two 1174 then two-dimensionally sorts the data using the default sort of ascending values (alphabetical) for both the vertical and horizontal heading values. Step three 1177 then formats the data and presents it in the cells A3 to C5 with the functional formula. In this situation bolding both the vertical and horizontal headings (1148 and 1157) and currency formatting the two-dimensional values with the cell format (1158). In this embodiment the technology does not show the formula 1143 in cell 'A3' 1147 unless the user clicks into the cell, to not distract from the displayed two-dimensional table and its headings. While this has been exampled for a trivially small data set, imagine the value of organizing much larger data sets with a very simple formula as it does not matter to creating the formula whether there are four two-dimensional combinations or four hundred.

Figure 12:
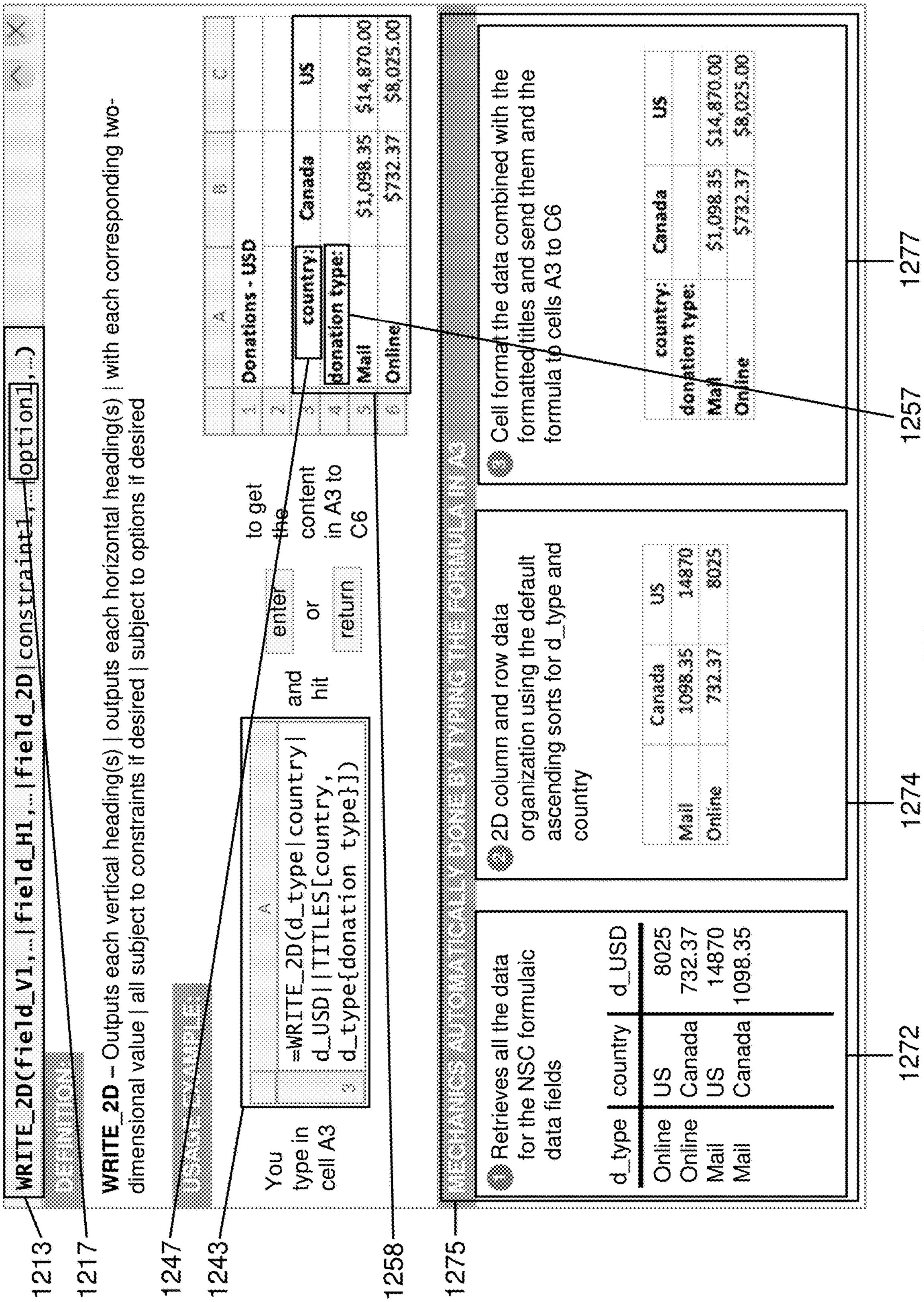
FIG. 12 examples our technology employing an option for creating titles for the vertical and/or horizontal headings (WRITE_2D).

FIG. 12 examples an embodiment of our technology employing an option for creating titles for the vertical and/or horizontal headings. This time the charity worker wants to add titles to the headings, so their audience better understands what is being presented. This has no impact on the function syntax/arguments 1213 as it will use 'option1' 1217 in this example. Those 'TITLES', in this embodiment, default to the formulaic data field names unless otherwise specified. The user specifies an option1 in the formula 1243 of:

'TITLES[country,*d*_type{donation type}]' which uses the default for country outputting a bolded 'country' 1247 while the user overrides the default with 'd_type{donation type}' to get the output of a bolded 'donation type' 1257. Steps one 1272 and two 1274 of the automatically done mechanics are identical to the previous example however step three is different. Step three 1277 in this example adds the heading titles (1247 and 1257) with an additional row for the horizontal heading TITLE 'donation type:' 1257 causing the formula output to take an additional row in cells A3 to C6 1258. In this example the formula then ends up in the cell 'A3' which contains the TITLE 'country:' 1247. However, in other embodiments the formula could be in a different cell with a specification of where to put the output or have some indication that the cell contains the functional formula (e.g., a colored flag). In this embodiment the heading titles have automatically added a colon after the field name or user input and bolded the content however it could do none of that or something different. These capabilities allow users to very easily custom tailor their two-dimensional outputs and make them more self-explanatory.

Figure 13:
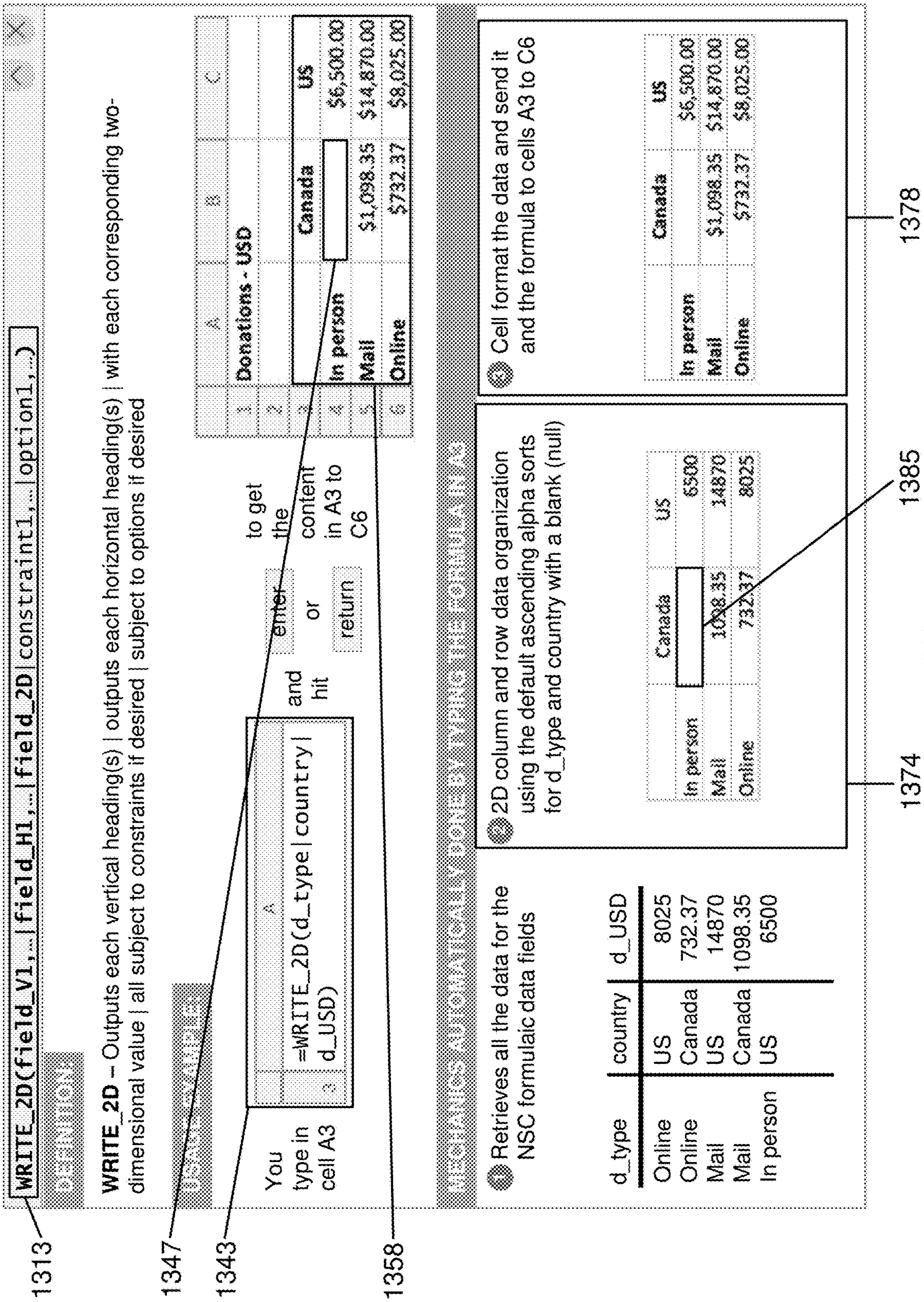
FIG. 13 examples our technology handling data missing from the two dimensions.

FIG. 13 examples our technology handling data missing from the two-dimensional repetition values. In this example the charity worker's external data has one additional type of donation source (In person), which is not used in Canada, and wants to see a similar layout of their donations by type of source and country they came from. The formula 1343 inputted by the user is the same as in FIG. 11, however in this situation there is more data and a missing combination—there is no 'Canada' 'In person' 'd_USD' value. Our technology automatically handles that missing data creating the complete set of two-dimensional repetitions (combinations) as shown in step two 1374. In this example the 'Canada' 'In person' 'd_USD' blank result 1385 is from a database null in the NSC external data, but it could have as easily been the lack of a combination in a source cell data. As a result, step three 1378 sends to the cells A3 to C6 1358 the formula, the headings, and a two-dimensional data set with a blank 1347. That blank could also instead have some indication of a database NULL, NODATA, -, an empty cell, or something else depending on the data source and what presentation users find most helpful. In this embodiment this capability requires no change to the function syntax/arguments 1313 (relative to 1113 in FIGS. 11 and 1213 in FIG. 12) or any user action.

Figure 14:
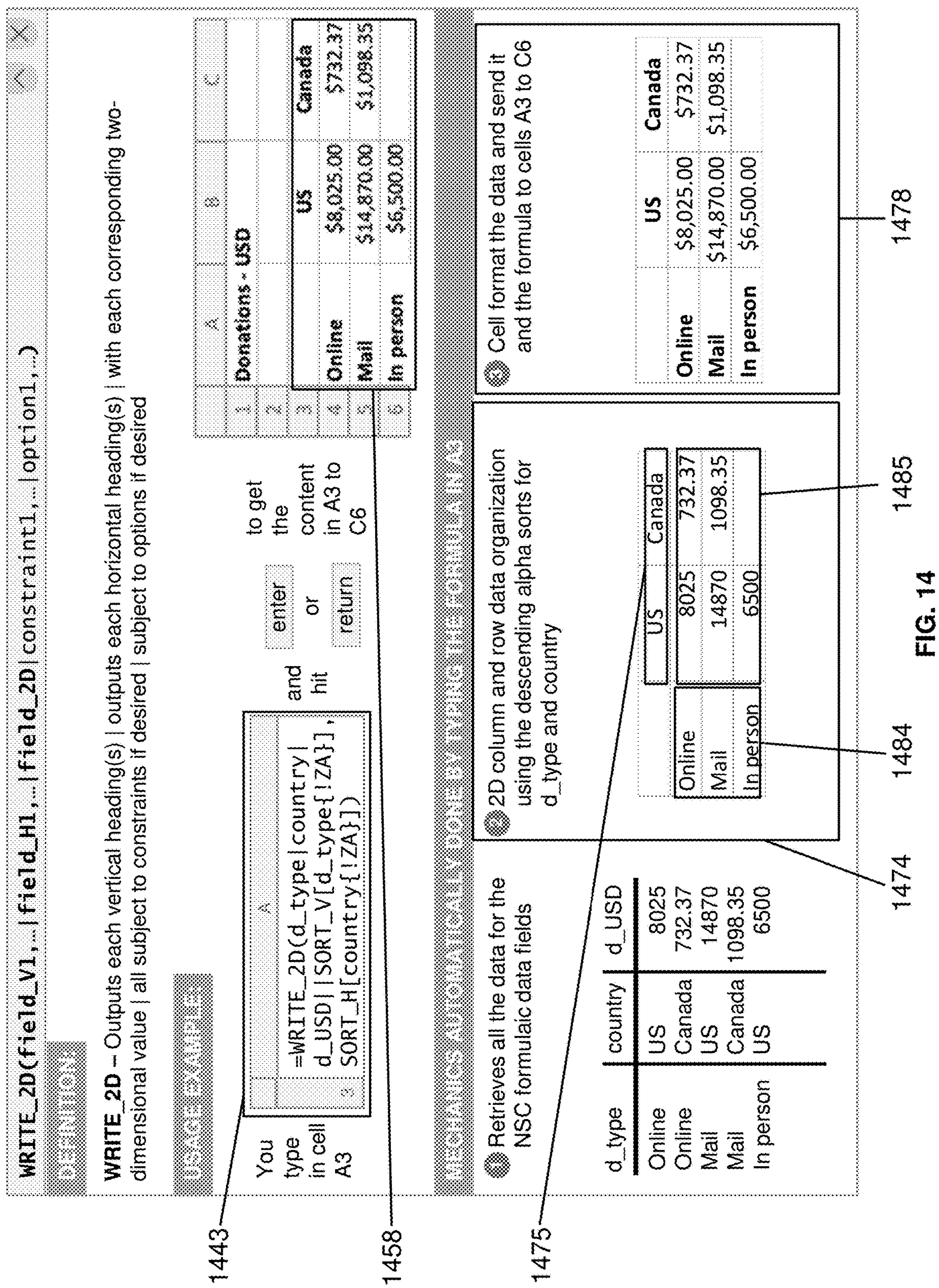
FIG. 14 examples our technology with a user specified option for overriding the default sorting of the vertical and horizontal heading values (WRITE_2D).

FIG. 14 examples an embodiment of our technology with a user specified option for overriding the default sorting of the vertical and horizontal heading values. Our technology supports different sorting based on the vertical and horizontal heading values. In this example the charity user wants the data sorted with 'Online' in the first row and 'US' in the first column. In the formula 1443 the user has put in two options, one a vertical heading sort override 'SORT_V[d_type{!ZA}]' which will alter the sort of the vertical rows to descending values (here denoted by '{!ZA}') of the formulaic field 'd_type' 1484. In this embodiment the sort selection is done field by field to allow users with multiple heading fields the flexibility to individually decide how to sort each field. In this example the user has also put in a second option of 'SORT_H[country{!ZA}] ' which will alter the horizontal sort to descending values of 'country' 1475. The sort differences show up in step two 1474 where our technology sorts the data so that it goes vertically in descending alphabetical order 1484 and horizontally in descending alphabetical order 1475 resorting the related two-dimensional values 1485 before it gets returned by step three 1478 to the cells A3 to C6 1458. Different ways of indicating the sort order are supported by our technology and the sort defaults could also be set differently within our technology or the defaults made customizable by users.

Figure 91:
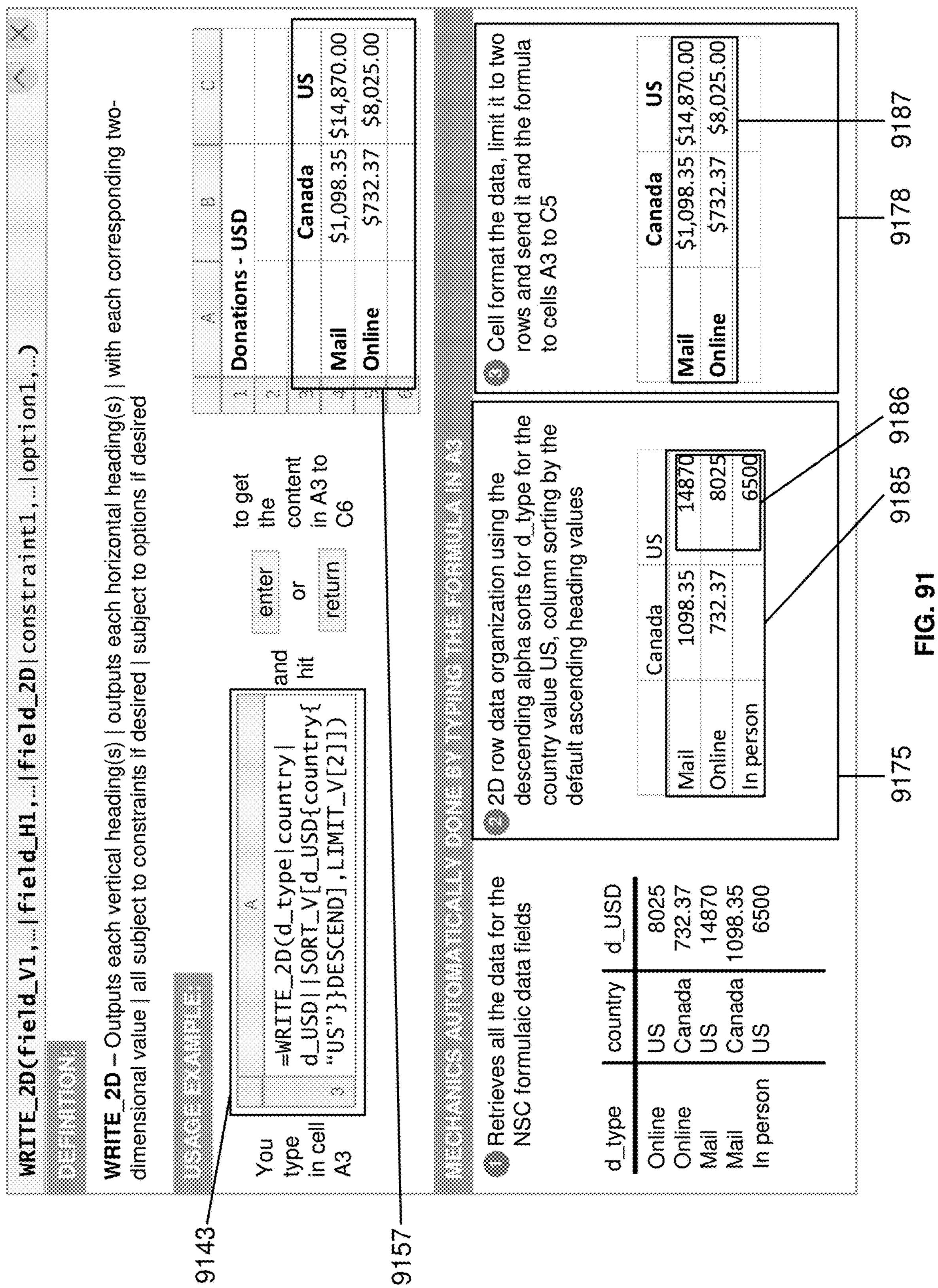
FIG. 91 examples our technology with an option approach for sorting the headings and values based on the two-dimensional field values and having a limit on the rows outputted (WRITE_2D).

FIG. 91 examples an embodiment of our technology with an option approach for sorting the headings and values based on the two-dimensional field values and having a limit on the rows outputted. In this example the charity user wants to see the top two types of donation sources (e.g., Mail, Online or In person) ranked by US donation giving. In this embodiment to base the sort order on the field_2D results the user inputs an option term:

'SORT[*d*_USD{country{"US"}}DESCEND]' into the function formula 9143. This sorts in descending order the two-dimensional field (field_2D) values 'd_USD' for the 'country' US' 9186 vertically sorting the other calculations and the vertical headings as shown in 9185. The number of vertical rows of values are limited to two by the option 'LIMIT_V[2]' term in the function formula 9143 as shown by comparing the two rows 9187 in step three 9178 with the three rows 9185 in step two 9175. This capability is extremely helpful with large amounts of data if the user wants to see their top 10 out of say 5000 combinations.

Figure 96:
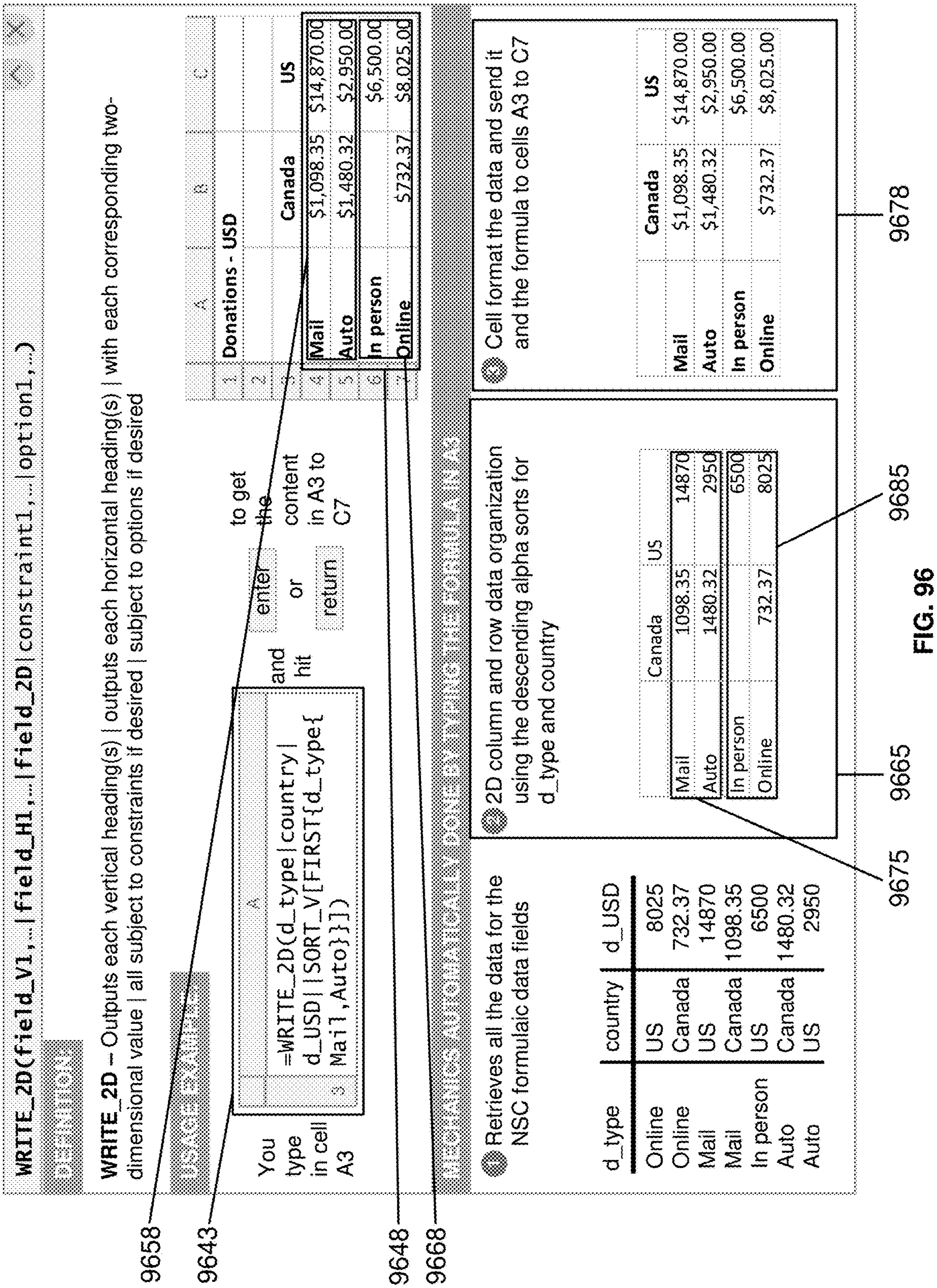
FIG. 96 examples our technology with an option approach for sorting the headings and values based on a user specified custom sort order (WRITE_2D).

Our technology also supports manually selecting one or more values to be first or last as preferred by the user. FIG. 96 examples an embodiment of our technology with an option approach for sorting the headings and values based on a user specified custom sort order. In this example the charity user wants the 'type' value of 'Mail' in the first row followed by the value "Auto" and then does not care the remaining order. There are many ways to specify a custom sort order in our technology, in this embodiment it is done by an option term specifying the field and values to be manually sorted after which the default sorting or a user specified ascending or descending order takes over. Since the charity user wants to vertically see 'Mail' followed by 'Auto' and then does not care about the order they specify in the function formula 9643:

'SORT_*V*[FIRST{*d*_type{Mail,Auto}}]'.

This orders the 'Mail' followed by 'Auto' vertical headings and their related 2D fields 9675 first and second followed by the default ascending alphabetical order of 'In person' and Online' 9685 in the illustrative step two 9665. Step three 9678 then formats the data and returns it to cells A3 to C7 9648 with the two different vertical sorts visible in 9658 and 9668. This custom sortation capability can be done many ways and can be applied to nested headings. It can also be done by giving the user a sortation UI which shows them all their options and allows them to use simple methods like drag and drop to resort from the default order to the desired order. This, like versions of the preceding and following embodiment examples, is applicable to the three different families of two-dimensional functions described in this filing, namely those were the 2D values are repetitive field values, where the 2D values are repetitive calculations and those where the 2D values are loop equivalent (group) range or array function evaluating formula values and would be applicable to any combination of those types.

Figure 15:
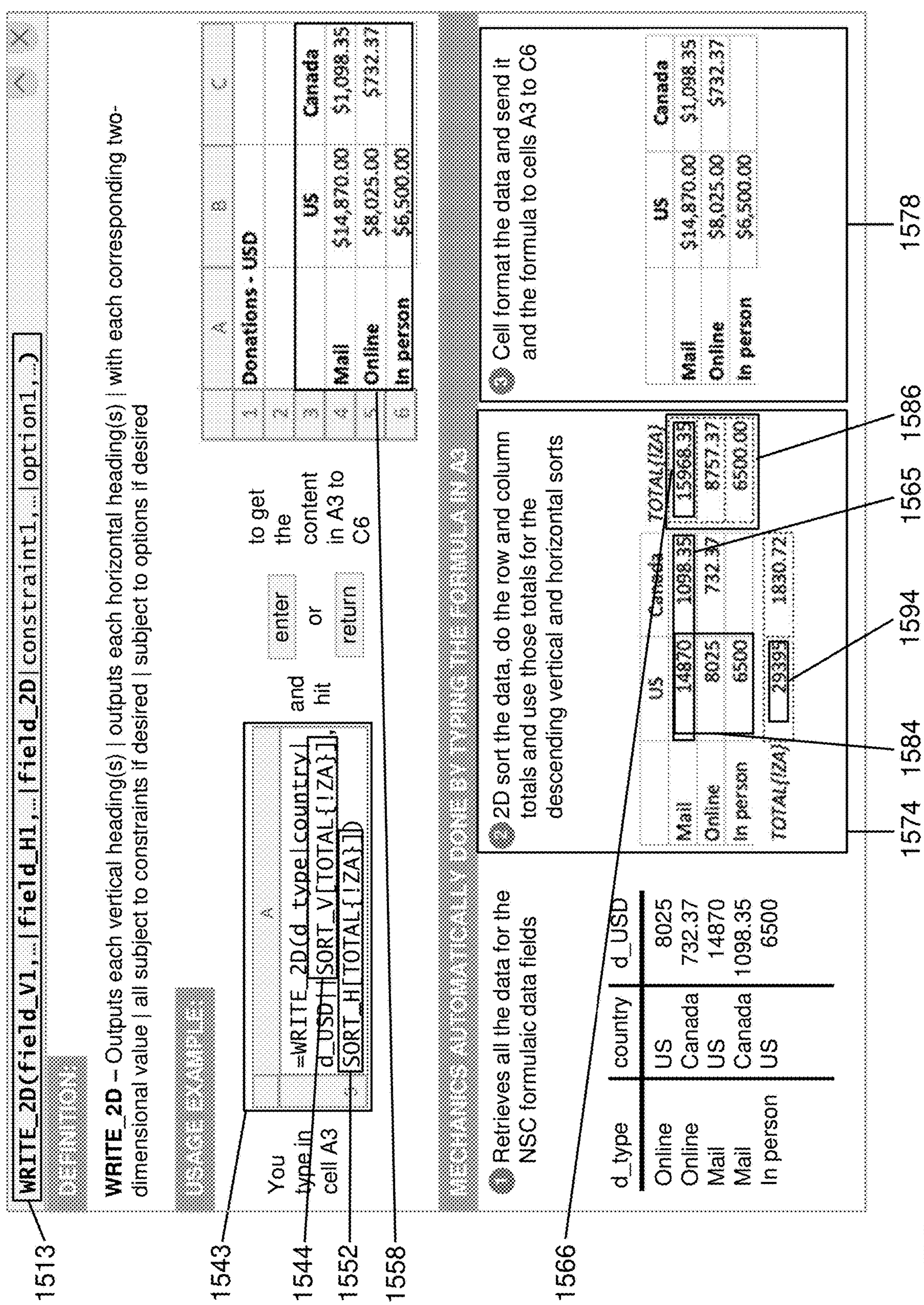
FIG. 15 examples our technology with an option approach for sorting the headings and values based on a calculation done using the two-dimensional field values (WRITE_2D).

FIG. 15 examples an embodiment of our technology with an option approach for sorting the headings and values based on a calculation done using the two-dimensional field values. In this example the charity user wants to sort both the rows and the columns so that the row with the largest total (sum of) donations is on top and the column to the left has the largest sum of donations then going both directions in descending order. In the formula 1543 the user has inputted two SORT option arguments which will then sort the values both vertically and horizontally as shown in step two 1574. The vertical sort term 'SORT_V[TOTAL{!ZA}]' 1544 does the total (SUM) calculation for each row of the field 2D values, exampled for the first row in summing (totalling) the two values 1565 to get the 'TOTAL{!ZA} value '15968.35' 1566, and then sorts the rows vertically descending {!ZA} based on those TOTAL values 1586. The horizontal sort term 'SORT_H[TOTAL{!ZA}]' 1552 does a similar sortation of the horizontal columns, exampled for the first column in summing (totalling) the three values 1584 to get the 'TOTAL{!ZA} value '29395' 1594, and then sorts the columns horizontally descending {!ZA}' resulting in the 'US' column coming before the 'Canada' column (which has a smaller TOTAL). Step three 1578 then automatically returns the formatted values and the cell formula to the cells 'A3' to 'C6' 1558 without the TOTAL values which were used by our technology in this instance to sort the headings and two-dimensional data but not be shown. This allows a user to easily prioritize how their data is presented without changing the data or altering the output (e.g., adding totals).

Figure 16:
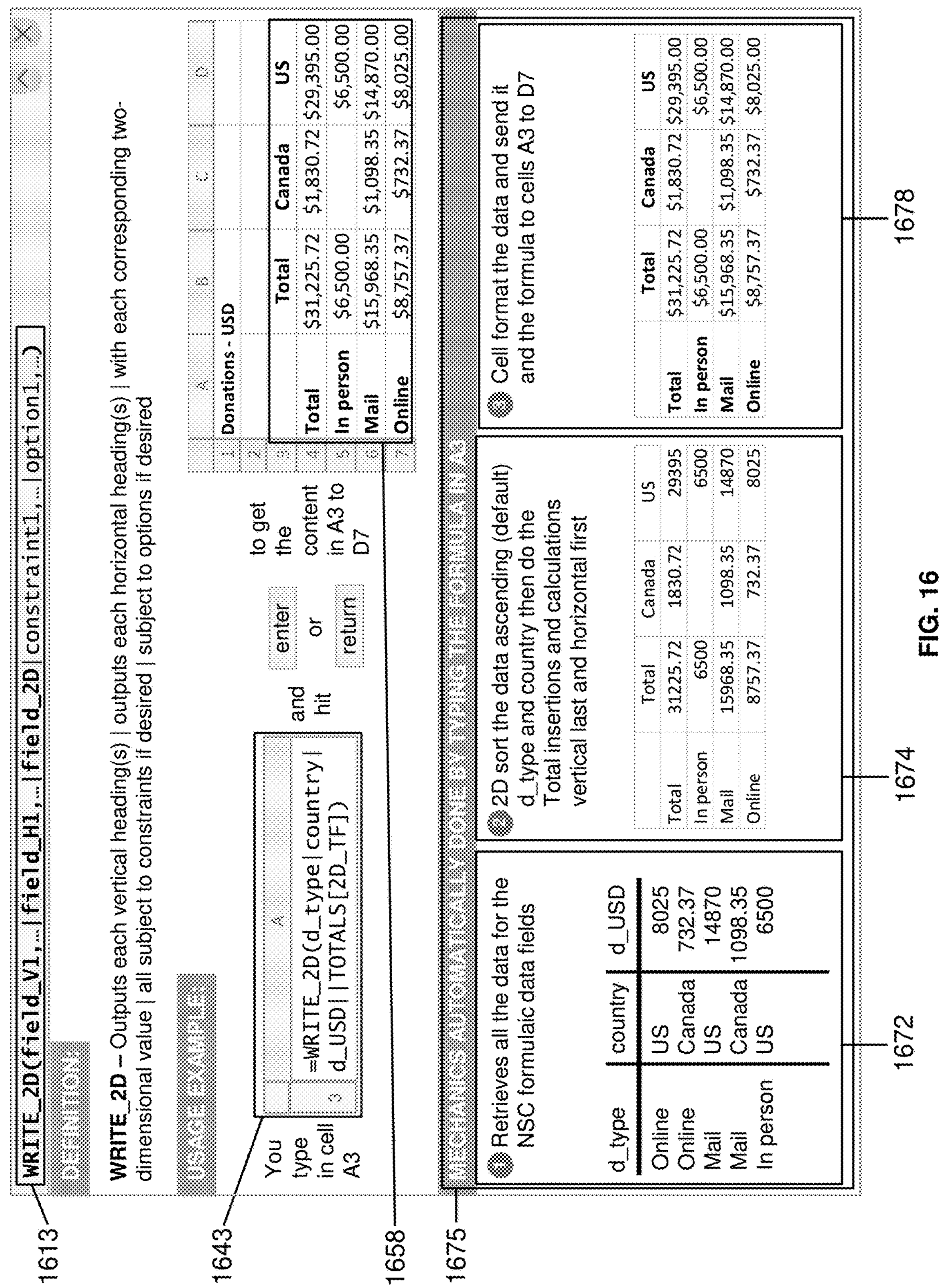
FIG. 16 examples our technology with a capability to calculate and display row and/or column TOTALS (WRITE 2D).

In other settings the user may want to display calculated results, such as the TOTALS (SUMs). FIG. 16 examples an embodiment of our technology with a capability to calculate and display row and/or column TOTALS. In this example our charity user not only wants to present the 2D organized donations data but also show totals. Our technology gives the user many options on how to display those TOTALS, putting them first (above or before) the data, putting them last (below or after) the data and doing it for one or both of the vertical or horizontal dimensions. In this embodiment this capability is instantiated by an option, but it could instead be triggered as a function variation or some other user selection mode. In this example the user inputted an option 'TOTALS[2D_TF]' in the formula 1643 in cell 'A3'. The 'TF' triggers putting TOTALS First and the '2D' specifies to do that for both the horizontal and vertical dimensions as shown in step two 1674. In this example the default sort order is used and for this embodiment that is ascending sorting by the vertical and horizontal heading values (also shown in step two 1674). Also, in this embodiment none of these additional capabilities change the function syntax/arguments 1613 (relative to the other prior examples). Step three 1678 then formats the data including the Totals. which are shown in this embodiment with the heading 'Total', and places the data with the formula in cells 'A3' to 'D7' 1658. All of this was automatically executed 1675 by simply typing the formula in cell 'A3' 1643 using our new function capability. In this example the data was sourced in step one 1672 from NSC data but the formulaic data could have come from cell data stored elsewhere in the spreadsheet.

Figure 17:
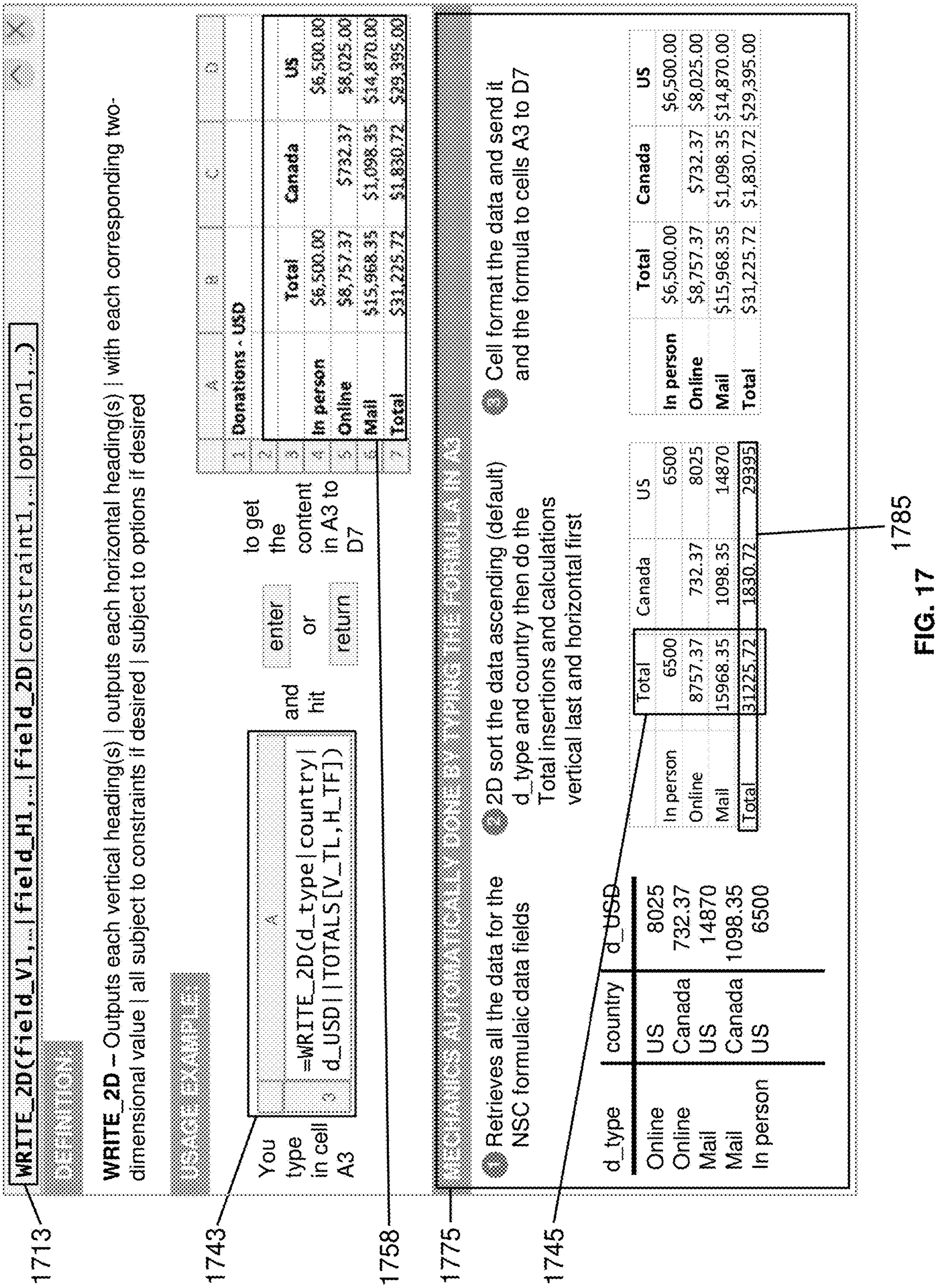
FIG. 17 examples further variants of the TOTALS varying by vertical and horizontal dimensions (WRITE 2D).

FIG. 17 examples further variants of the TOTALS varying by vertical and horizontal dimensions. Here the charity user has decided they want the vertical total first but the horizontal total listed last. In this embodiment the users specifies a 'TOTALS[V_TL,H_TF]' in the formula 1743 in cell 'A3'. The term V_TL specifies that that the function calculates Vertical TOTALS and places those TOTALS Last—which is at the bottom for the Vertical as shown in step two 1785. The term H_TF specifies that that the function calculates Horizontal TOTALS and places those TOTALS First—which is at the left first column for the Horizontal as shown in step two 1745. Otherwise, the automatically executed steps 1775 function as previously described delivering the formatted values and formula to the cells 'A3' to 'D7' 1758 with no changes to the function syntax/arguments 1713.

Figure 18:
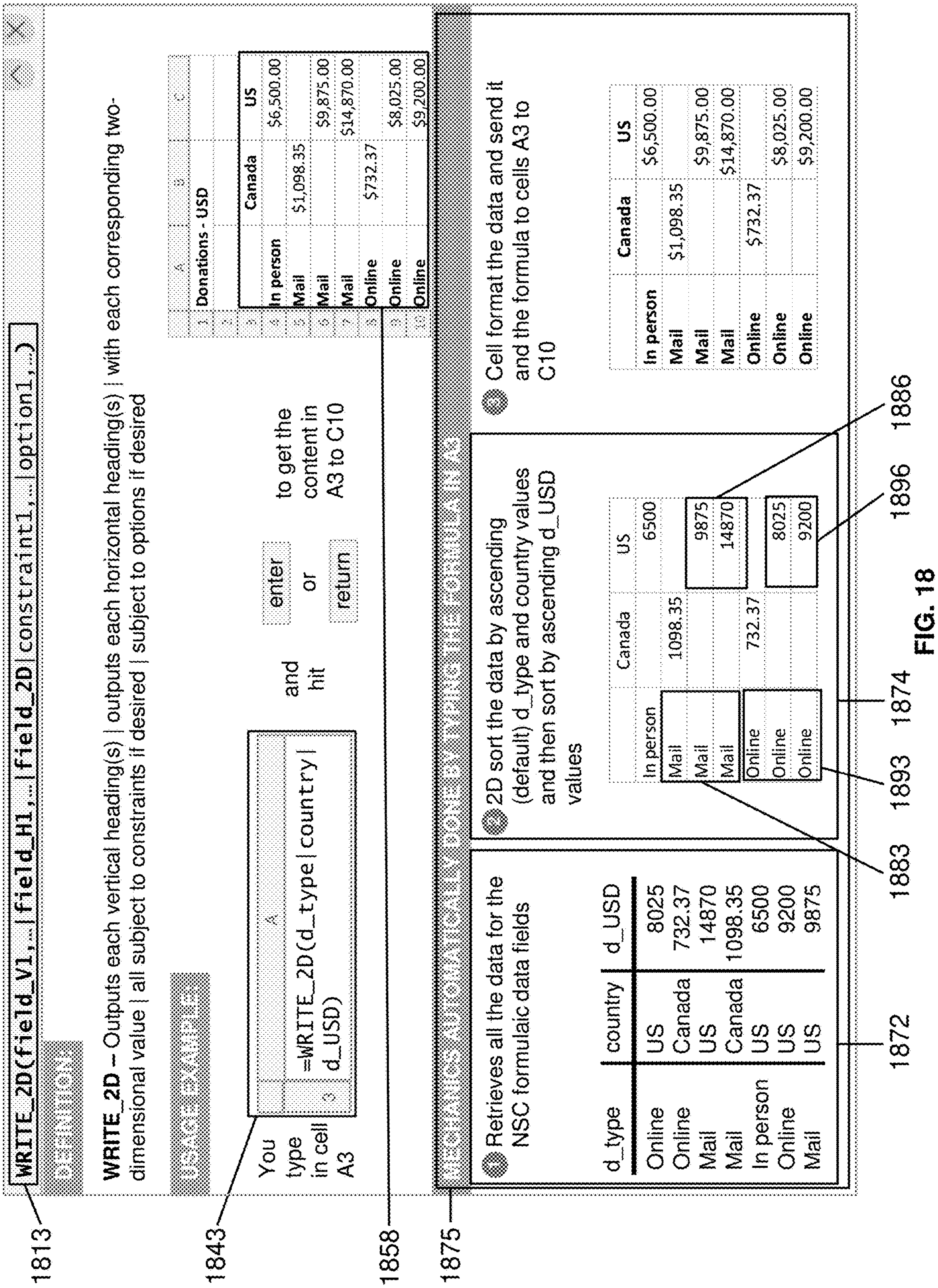
FIG. 18 examples another embodiment of our technology that automatically differentiates (spreads) the output when the two-dimensional results are not unique (distinct), i.e., having duplicate combinations (WRITE_2D).

FIG. 18 examples another embodiment of our technology that automatically differentiates the output when the two-dimensional results are not unique (distinct)—i.e., having duplicate combinations. In this example the charity worker has data with more than one 2D value ('d_USD') for the same heading values (e.g., the combination 'Mail' and 'US'). These duplicate combinations are visible in the step two 1874 two-dimensional sorting of the data where there are two 'Mail' and 'US' combinations (repetitions) 1886 and two 'Online' and 'US' combinations (repetitions) 1896. Instead of arbitrarily collapsing one of those values with the 'Canada' 'Mail' and 'Canada' 'Online', respectively—in this embodiment our technology returns every value by itself on one of the dimensions as shown in this example as a row unto itself 1858. This embodiment uses a default sortation of ascending which first applies to the heading values and then for the duplicate values applies to 'field_2D' values 1886 and 1896. The automatically executed mechanics 1875 of our technology then generate the results from the formula 1843 differentiating the outcome based on whether the result two-dimensional combinations are unique (distinct) or not with no required actions by the user and no change in the syntax/arguments 1813 of the function.

Figure 19:
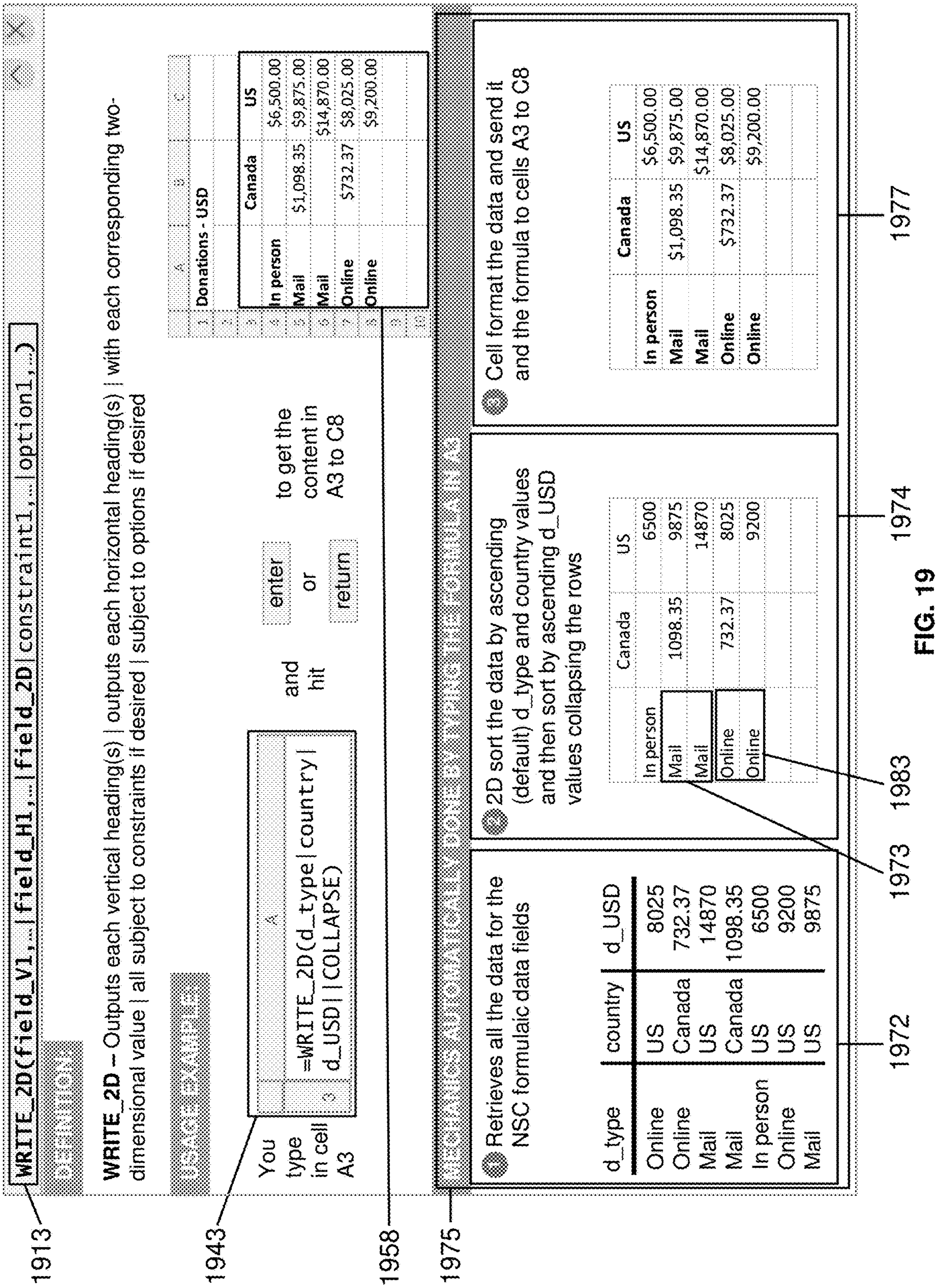
FIG. 19 examples an embodiment of our technology that through user selection or default setting automatically collapses the output when the two-dimensional results are not unique (distinct)—i.e., having duplicate combinations (WRITE_2D).

FIG. 19 examples an embodiment of our technology that through user selection or default setting automatically collapses the output when the two-dimensional results are not unique (distinct)—i.e., having duplicate combinations. This is the same situation as in FIG. 18 however the user has overridden the single row per duplicate to collapse the results. The data set 1972 retrieved in FIG. 19 is identical to 1872 retrieved in FIG. 18 however the step two result 1974 is different than that of FIG. 18 1874 because in the embodiment in FIG. 19 our technology responds to the option 'COLLAPSE' in the formula 1943 which collapses the output non-duplicated values so in this example 'Mail' and 'Online' have two rows 1973 and 1983 each instead of the three rows each in FIGS. 18 1883 and 1893. This gives a result 1958 which is two rows shorter than the result 1858 in FIG. 18 for the same data and same function syntax/arguments 1913 and 1813. Selecting between these different results could be an option as exampled in FIG. 19 or a user preference change to the default. A change to the default could make the collapsed version the default version with an option to SPREAD the results like they are in FIG. 18 1858.

Figure 20:
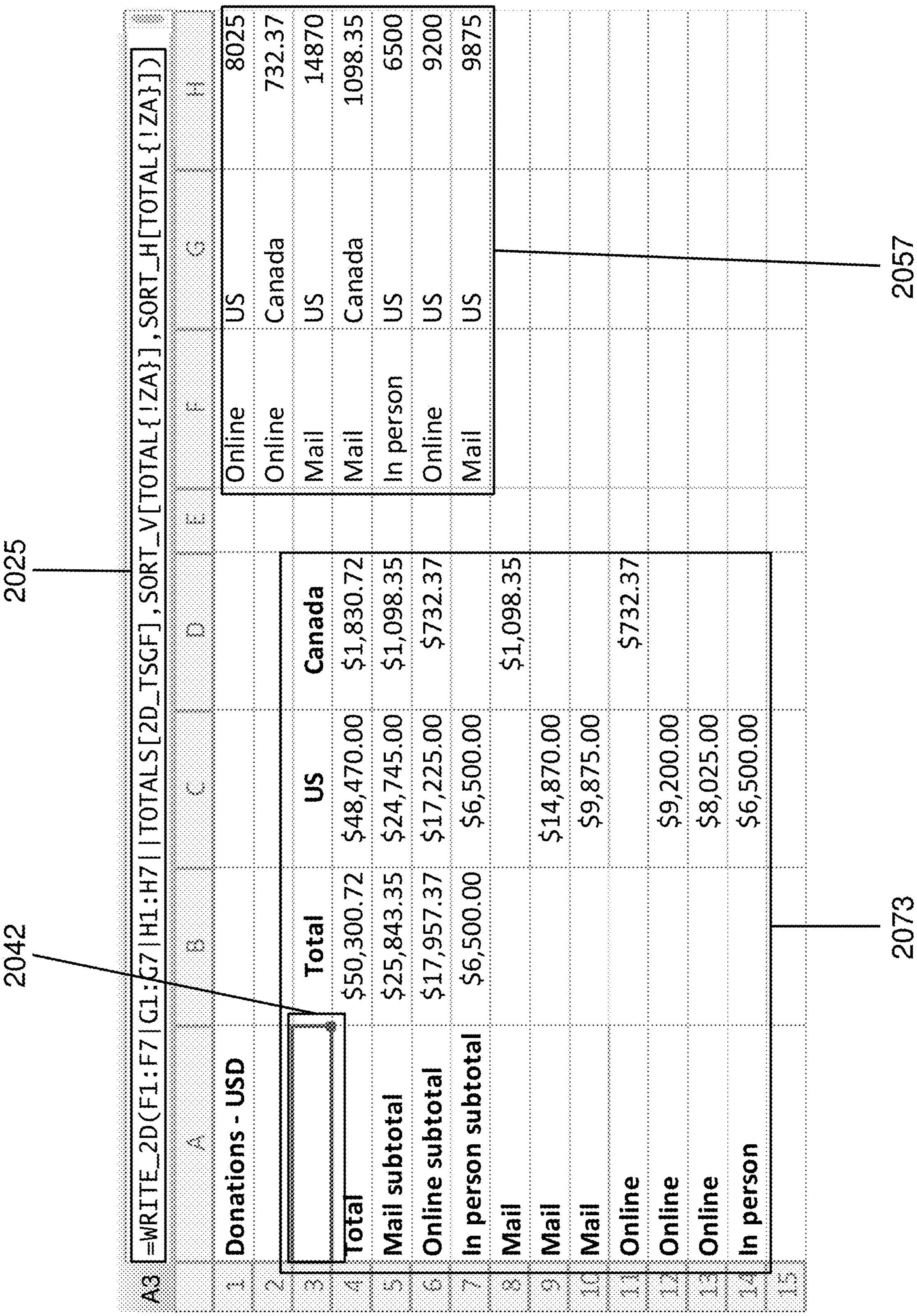

FIG. 20 through FIG. 23 examples the capabilities of several previous embodiments using cell data as the formulaic data source. The charity user has downloaded the external data to their spreadsheet and wants to organize it like exampled previously but this time with totals and subtotals grouped first. FIG. 20 shows the cell data used 2057 and the results 2073 of the formula 2025 in cell 'A3' 2042. The cell data could have been anywhere in the spreadsheet but in this example was shown close by for exampling convenience. In this embodiment the formula syntax/arguments 2113 is unchanged by the formulaic data choice used (relative to the previous examples for NSC formulaic data). Obviously different syntax/argument structures could be used by our technology but for the convenience of users our functions can use either cell or externally sourced data without any differentiation.

Figure 21:
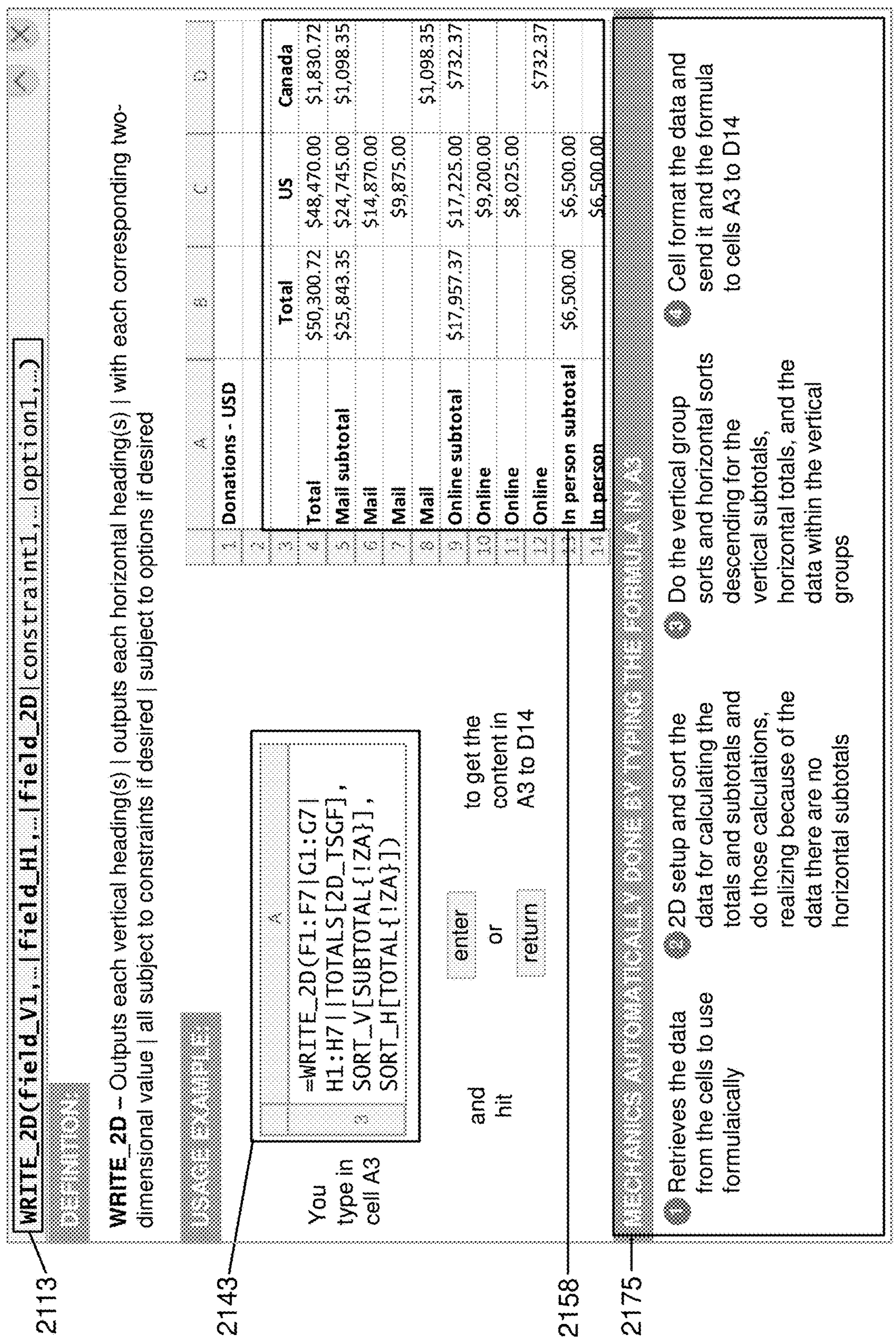
Figure 22:
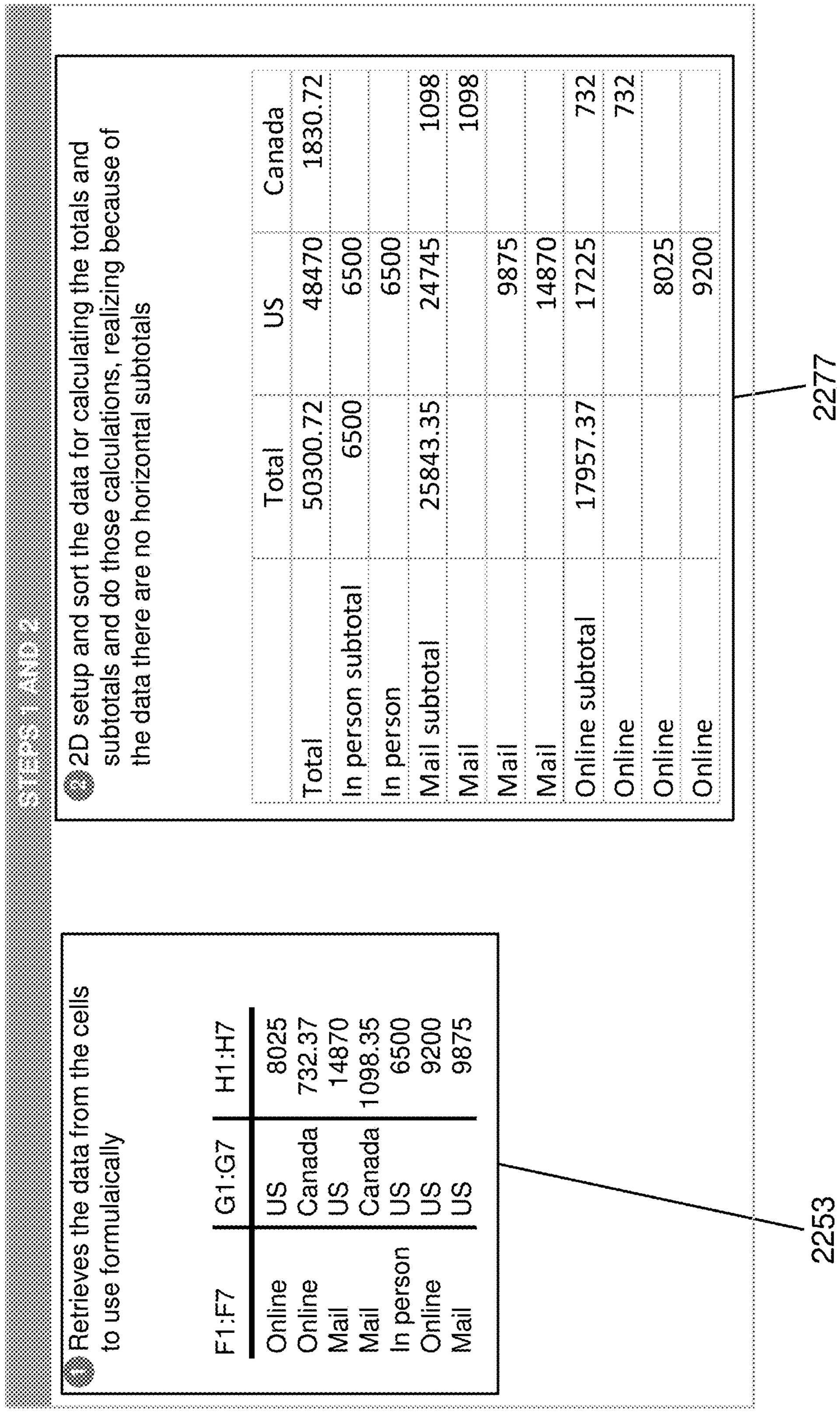

The formula 2143 shown in FIG. 21:

'=WRITE_2D(*F*1:*F*7|*G*1:*G*7|*H*1:*H*7||TOTALS [2*D*_TSGF],SORT_*V*[SUBTOTAL{!*ZA*}], SORT_*H*[TOTAL{!*ZA*}])' uses the cell data ranges as the formulaic data field names but other than that is just like the NSC formulaic data field examples. The 'TOTALS[2D_TSGF]' option creates two-dimensional (2D) totals ('T') and subtotals ('S') and puts them grouped ("G") first ('F') as shown in FIG. 22 step two 2277. In this embodiment our technology automatically realizes there is no need for horizontal subtotals as there are no nested or otherwise subtotal combinations which will be different from the existing columns. The 'SORT_V [SUBTOTAL{!ZA}]' option vertically sorts the data by descending ('{!ZA}') summed subtotal groups (2343, 2373 and 2383) as shown in FIG. 23 step three 2363. That options also sorts the values within those subtotals descending as shown in FIG. 23 2364 in step three 2363. The 'SORT_H [TOTAL{!ZA}]' option horizontally sorts the columns total sums descending ('{!ZA}') putting the 'US' column first because its total 2334 is higher than the 'Canada' sum total 2335. These values are then formatted and sent to the cells 'A3' to 'D14' (2158 in FIGS. 21 and 2073 in FIG. 20) by step four 2367 in FIG. 23.

Figure 25:
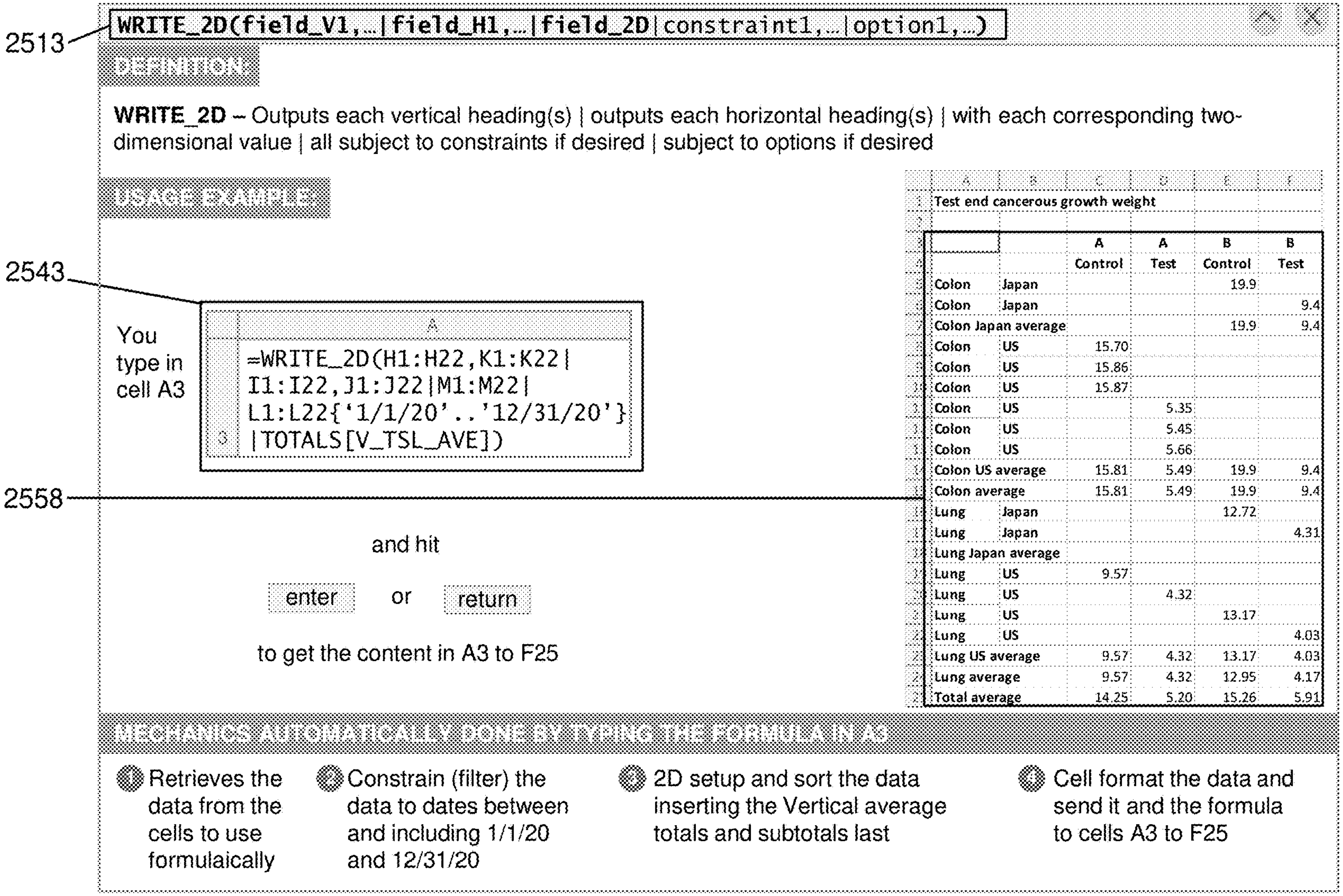
Figure 28:
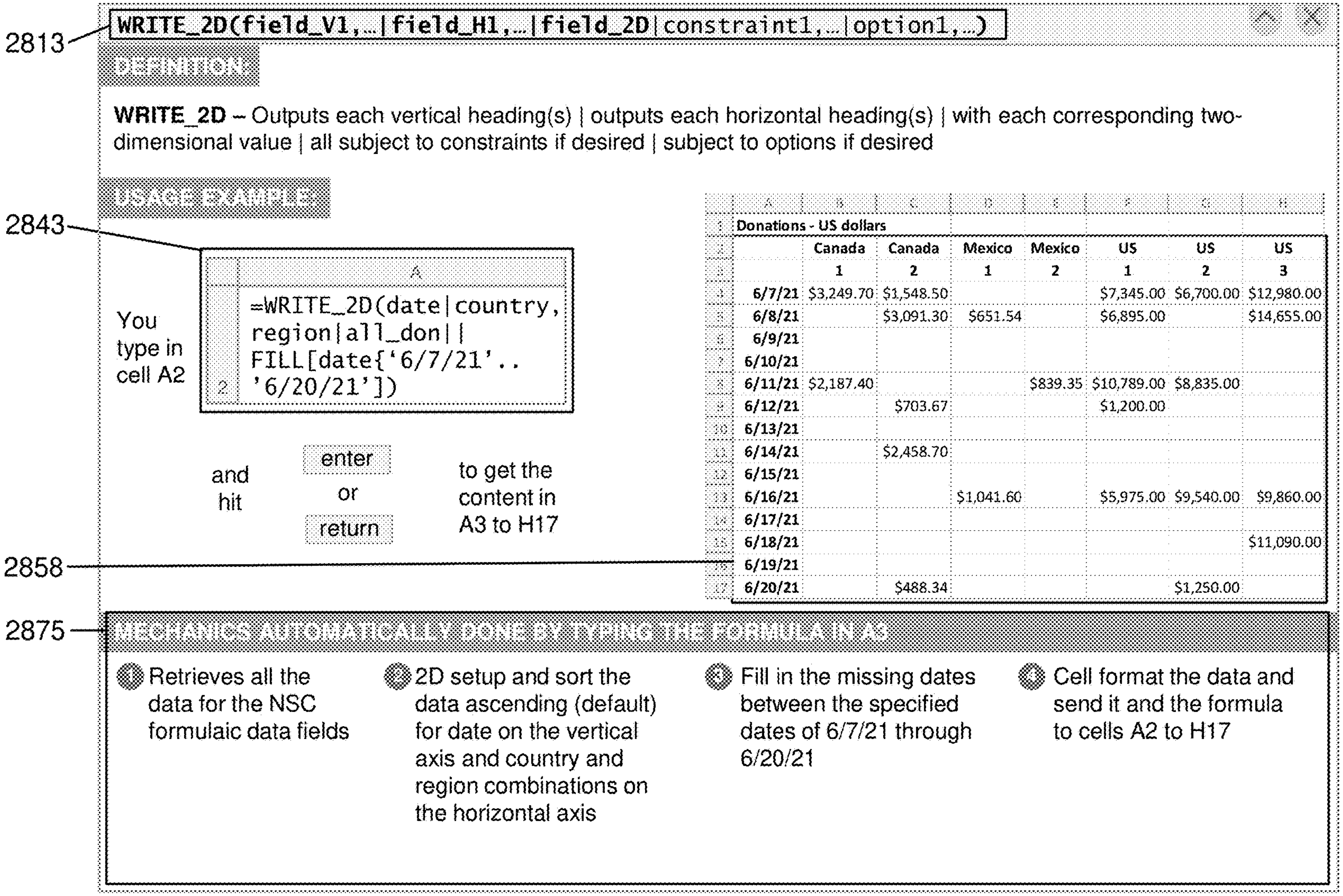

FIG. 24 through FIG. 27 examples our technology creating average value total and subtotal values for a WRITE_2D formula using cell data and a constraint(filter). In this example we have switched back to the cancer researcher who this time is looking to present data on the impact of control and test treatments to cancerous petri dish growths. They are very interested in the average values for the test and control results per cancer and country for the two different treatments A and B. FIG. 24 shows the cell data used 2447 and the results 2463 from the formula 2415 in cell 'A3' 2431. The cell data could have been anywhere in the spreadsheet (e.g., on a different worksheet) but in this example was shown close by for exampling convenience. In this embodiment the formula syntax/arguments 2513 shown in FIG. 25 is unchanged by the formulaic data choice used. The formula 2543 has a constraint (filter) argument 'L1:L22 ('1/1/20' . . . '12/31/20'}' which removes all the data not in the year 2020 2635 and 2685 as shown in step one 2663 and step two 2647 in FIG. 26. In FIG. 27, step three 2753 automatically executes the 'TOTALS[V_TSL_AVE]' option in the formula 2543 inserting vertical ('V') total ('T') averages ('AVE') 2793 and subtotal ('S') averages ('AVE') 2733, 2743, 2753, 2763, 2773, and 2783 rows last ('L') where average calculations ('AVE') are done. These values are then formatted and sent with the formula to cells 'A3' to 'F25' (2463 in FIGS. 24 and 2558 in FIG. 25) by step four 2757.

FIG. 28 through FIG. 31 examples our technology supporting the easy automatic filling of missing dates in a two-dimensional data transformation. In this example a North American charity user has daily donation totals ('all_don') that they would like to present by day ('date') for their three countries ('country') broken by each countries numbered regions ('region'). They want to see every day listed even if there were no donations on that date and therefore no data. In this embodiment the formula in cell 'A2' 2843 uses an option term 'FILL[date{'6/7/21' . . . '6/20/21'}]' to automatically 2875 fill in any missing dates in the formulaic data field 'date' which in this formula is the vertical field ('field_V1') 'date' in the formula 2843. That 'date' filling is done in step three 3057 after the data is retrieved in step one 2954 in FIG. 29 and two-dimensionally organized in step two 3043 in FIG. 30. The missing dates between 6/7/20 and 6/20/20 are filled in as shown by '6/10/21' 3037, '6/13/21' 3047, '6/15/21' 3067, '6/17/21' 3077, and '6/19/21' 3087 in FIG. 30. The results are then sent to the cells 2858 in FIG. 28 with the formula by step four 3155 in FIG. 31. This allows the user to fill in all the days of the week automatically with one simple addition to the function formula for improved presentation or ease of further analysis. This is particularly helpful when users are comparing results across two different tables of information with the same date range and want to match up each day visually across the different outputs.

Figure 32:
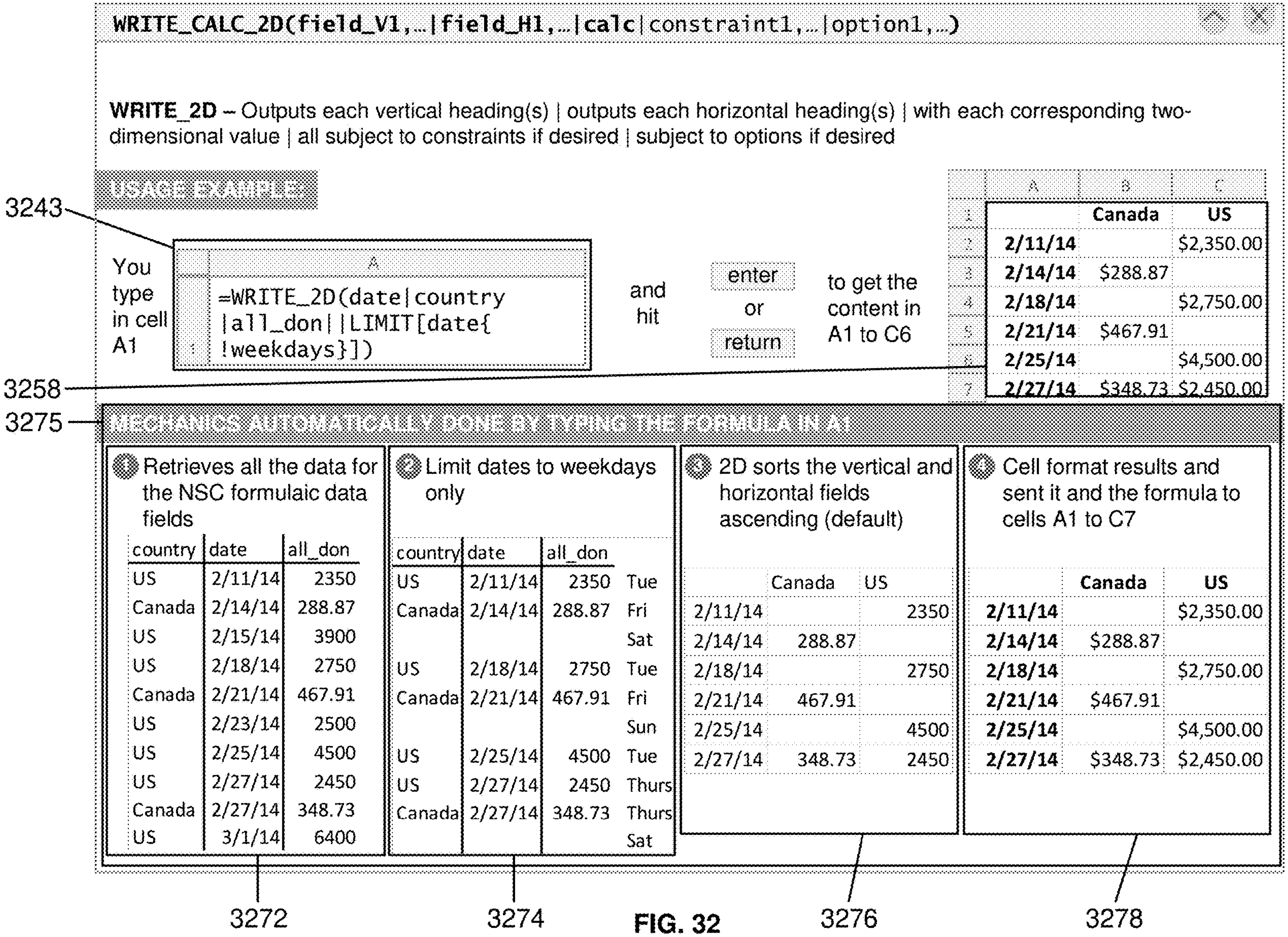
FIG. 32 examples another date related capability of our technology, limiting outputs to weekdays (WRITE_2D).

FIG. 32 examples another date related capability of our technology, limiting outputs to weekdays. In this example the user wants to see only donations made on weekdays. In this embodiment the user inputs the desire to limit dates to weekdays through an option 'LIMIT[date{!weekdays}]' inputted into the functional formula 3243. That input then automatically removes the weekend days in step two 3274 from the data retrieved for use in step one 3272. In step three 3276 our technology then two-dimensional sorts the weekday data for presentation to the cells 3258 by step four 3278. Thus, making it very easy for users to remove the weekend values from their data organization without having to change the data or do anything other than adding the option to our 2D functional formula.

Figure 33:
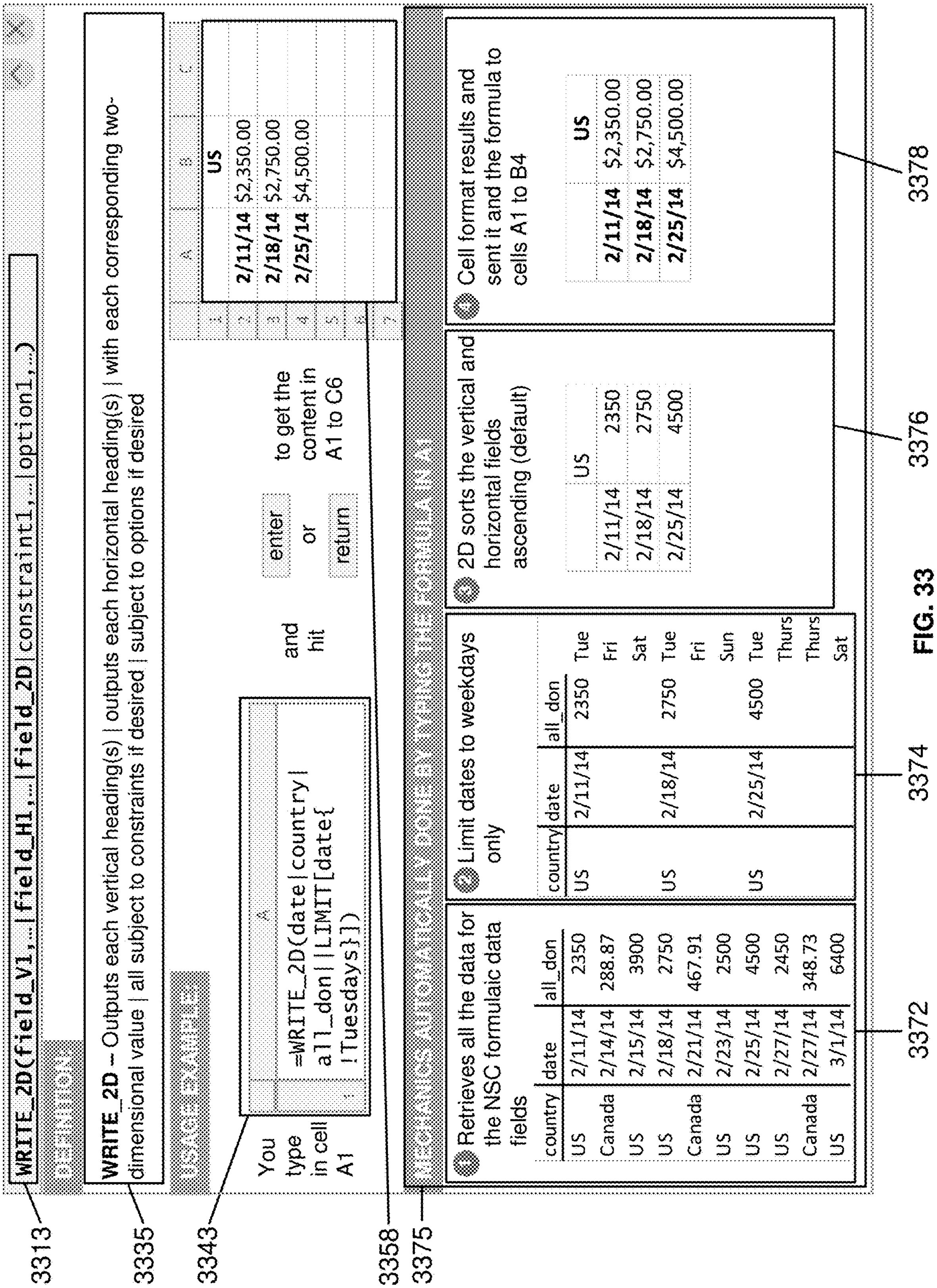
FIG. 33 examples a further date limiting capability of our technology, limiting outputs to a specific day of the week (WRITE_2D).

FIG. 33 examples a further date limiting capability of our technology, limiting outputs to a specific day of the week. In this example the charity user only wants to see donations on Tuesdays. In this embodiment the user inputs the desire to limit dates to Tuesdays through an option 'LIMIT [date{!Tuesdays}]' inputted into the functional formula 3343. That input then automatically removes all the other days of the week in step two 3374 from the data retrieved for use in step one 3372. In step three 3376 our technology then two-dimensional sorts the Tuesday data, which through this limitation has gone from two-dimensional to one-dimensional, for presentation to the cells 3358 by step four 3378. This limitation capability is applicable well beyond days of the week, as a more sophisticated filter that filter types of values not just traditional filters of conditionals or ranges. For example, it could be used to filter months (e.g., 'LIMIT [date{!March}]') or standard quarters (e.g., 'LIMIT [date{!Q1}]') from date data with no month or quarter field. It could be used to differentiate integer values from reals in mixed data sets, it could be used for separating real values with different ending values (e.g., all numbers ending in 0.99).

Figure 92:
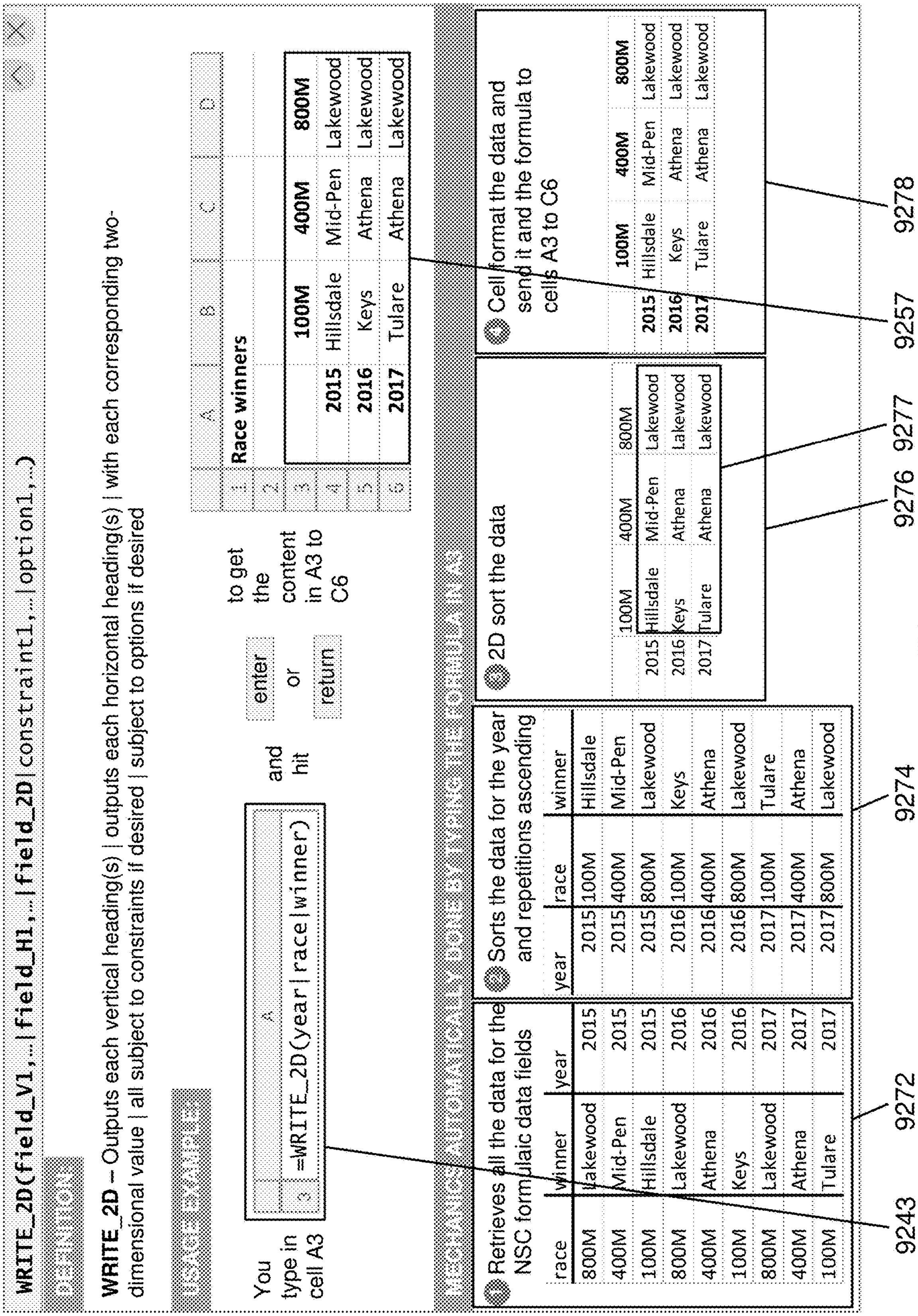
FIG. 92 examples our two-dimensional data organization function organizing text data (WRITE_2D).

While our examples thus far have been for numeric repetitive 2D formulaic data field values, those values are not limited to integer or real values. Text, dates, and Boolean values can just as easily be organized by our technology. FIG. 92 examples our two-dimensional data organization function organizing text data. In this example a school user would like to see a 2D organized table of the running race winning High Schools for the years that they have data in their database. In the functional formula 9243 the field_2D term 'winner' is a text field with the High School of the winner of three different length running races each year. The user has the data in a conventional database setup and would like to see a layout by year and race of the winning school. Our technology, as previously exampled, retrieves the data 9272 and sorts it into the desired repetitions 9274 then 2D sorts it 9276 where the data type of the 2D values 9277 makes no difference. The formatted data is then sent with its formula by step four 9278 to cells 'A3' to 'D6' 9257. While a few of the preceding operations supported by our technology are specific only to numeric 2D data, our technology can support the others over any data type.

We have exampled many ways that our technology supports organizing data two-dimensionally as well as adding different ways to add calculated total and/or subtotal rows and/or columns. We have shown different ways to sort the data based on the table headings, the two-dimensional values or calculated values based on the two-dimensional values. As we will example next our two-dimensional spreadsheet function technology goes beyond just organizing data to doing two-dimensional calculations and we will start with two-dimensional algebraic calculations that existing spreadsheets cannot do in their Pivot tables.

Two-Dimensional Algebraic Calculation Functions

For ease of description, we will differentiate the two-dimensional algebraic calculation functions from the preceding two-dimensional data organization functions by using a different function name and a slightly different syntax/argument layout. However, those functions could easily be integrated into a single function which automatically detects which logic to use based on what is inputted for the two-dimensional input—either a field or an algebraic calculation.

Figure 34:
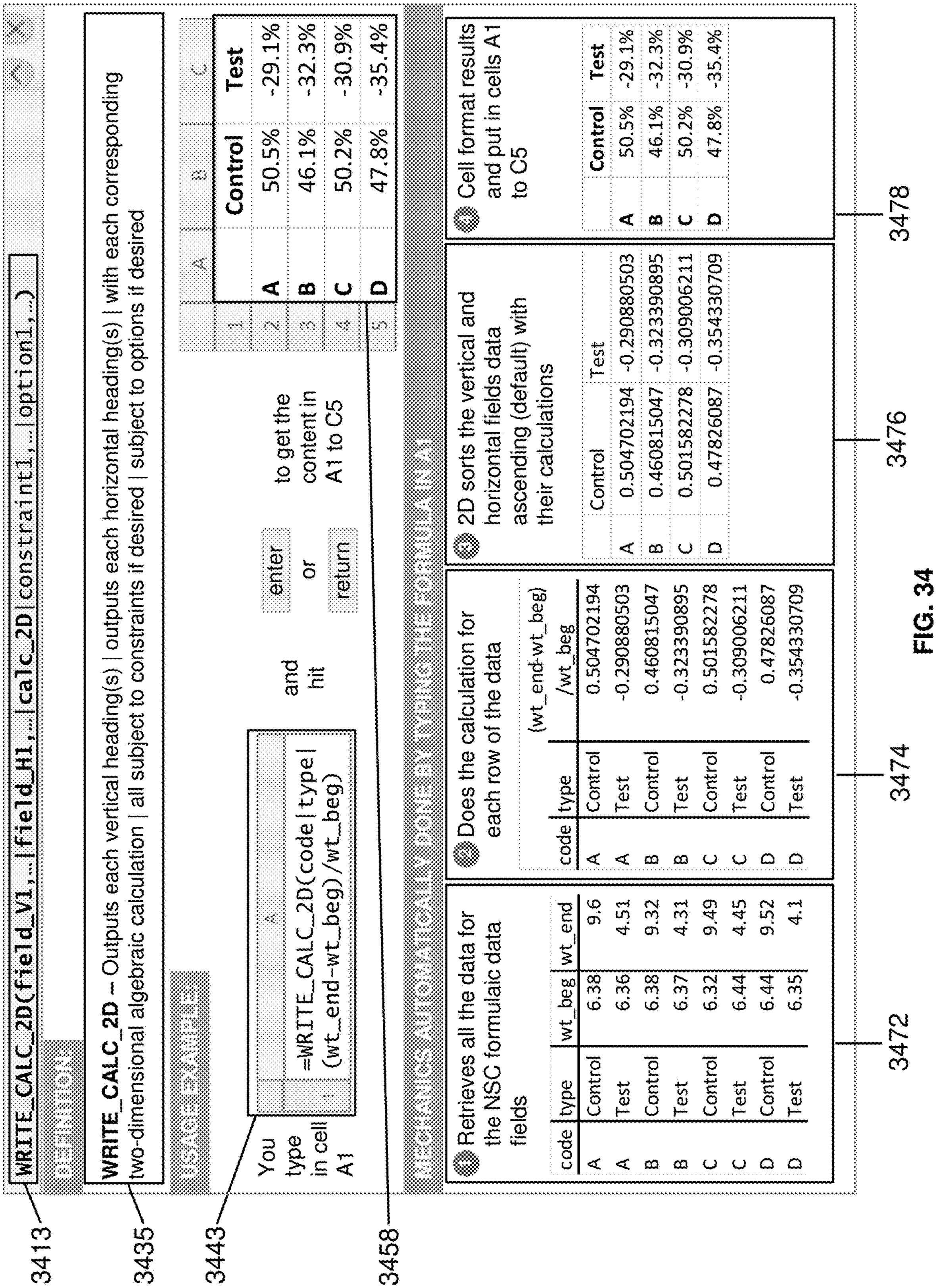
FIG. 34 shows a very simple example of our spreadsheet function technology doing two-dimensional repetitive algebraic calculations, here called 'WRITE_CALC_2D'.

FIG. 34 shows a very simple example of our spreadsheet function technology doing two-dimensional repetitive algebraic calculations. We have returned to our cancer researcher who wants to evaluate and present the effectiveness of different cancer treatments by comparing the growth or shrinking of a cancerous mass (percent weight change) in each tests' control and test petri dishes. This involves repetitive algebraic calculations so they will use our WRITE_CALC_2D function in this embodiment. The syntax/arguments 3413 of the function in this embodiment is:

WRITE_CALL_2*D*(field_*V*1, . . . |field_*H*1, . . . |calc_2*D*|constraint1, . . . |option1, . . . )

with the required fields bolded. The only differences with the two-dimensional data organization functions previously exampled, e.g., 3313 in FIG. 33:

WRITE_2*D*(field_*V*1, . . . |field_*H*1, . . . |field_2*D*|constraint1, . . . |option1, . . . )

is the different name of the function and that the 'calc_2D' argument is 'field 2D'. So, with auto detection by our technology of which input a user puts in the 2D argument a single function could do both capabilities. There are also many different function syntax/argument structures that can be used for either capability or a combined one but to keep the examples simpler we have opted to use one version per all the examples per type of our function.

As before we will example our technology with very small data sets to make more visible what our technology is doing. We will illustrate for explanation purposes steps of what our technology is doing, recognizing this is for understanding of what it is doing and not an exact depiction of how the application code is doing it. FIG. 34 starts with a cancer researcher looking to analyze and then present the results of several test and control experiments. They want a two-dimensional layout of the different alphabetically coded tests and their test and control results. To do that in our technology the user inputs the formula 3443:

'=WRITE_CALC_2*D*(code|type|(wt_end−wt_beg)/wt_beg)'

From the syntax/arguments 3413 'code' is the vertical heading 'field_V1', 'type' is the horizontal heading 'field_H1' and '(wt_end−wt_beg)/wt_beg' does the two-dimensional calculations 'calc_2D'. The data retrieval is done in step one 3472, the two-dimensional calculations are done in step two 3474 and then those calculations and data headings are two-dimensionally sorted in step three 3476. Step four 3478 formats and places the results and formula in cells 'A1' to 'C5' 3458 giving the researcher an organized set of analyses for easy review.

This gives the user a highly scalable analytical and data presentation tool where our function formulas can work through very large sets of data and as we will later discuss screen (limit) the outputs to those results of interest to the user.

Figure 79:
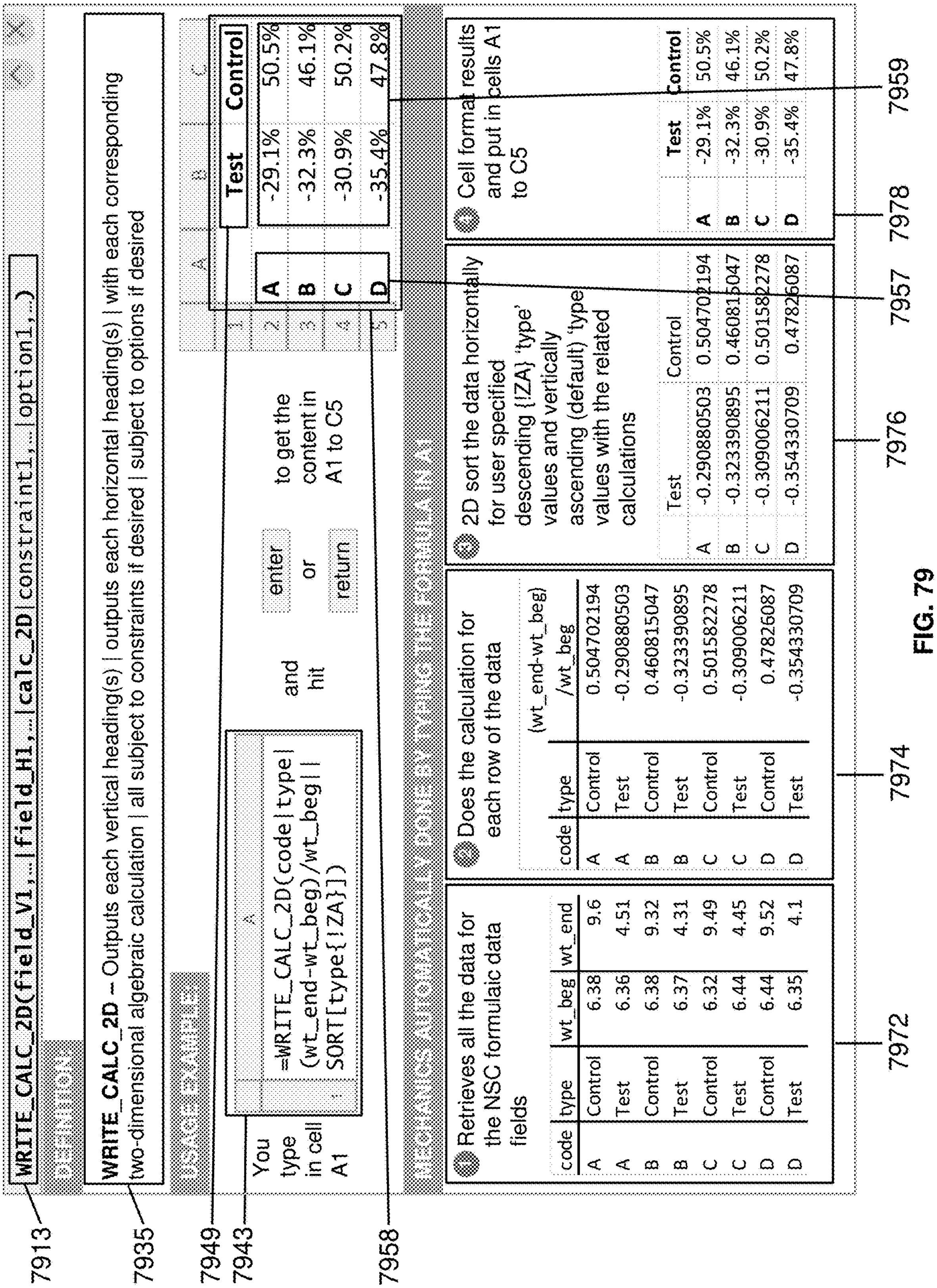
FIG. 79 examples a user selected sorting order for one of the vertical/horizontal headings for our spreadsheet function technology doing two-dimensional algebraic calculations (WRITE_CALC_2D).

FIG. 79 examples a user selected sorting order for one of the vertical/horizontal headings for our spreadsheet function technology doing two-dimensional algebraic calculations. In this example the cancer researcher wants the test results column ordered before the control column because the test results are of foremost interest. In the two-dimensional function formula 7943 the user has specified in this embodiment an option 'SORT[type{!ZA}]' to specify a descending sort order of the horizontal field 'type'. They do this because they would like the 'Test' results ordered before the 'Control' results and the alphabetical default order of AZ ascending values would do the opposite. This does not alter steps one 7972 and two 7974, which are the same as steps one 3472 and two 3474 in FIG. 34. However, in step three 7976 the horizontal data from the field 'type' is then sorted descending, as the user specified in 'SORT[type{!ZA}]' while the vertical sort, which is not mentioned in the option, defaults to an ascending sort. As such the results 7958 show the column headings/labels 7949 and related calculations 7959 are sorted so that the 'Test' values are before the 'Control' values (descending order) while the row headings/labels 7957 and their related values 7959 are sorted in ascending 'code' values.

Figure 80:
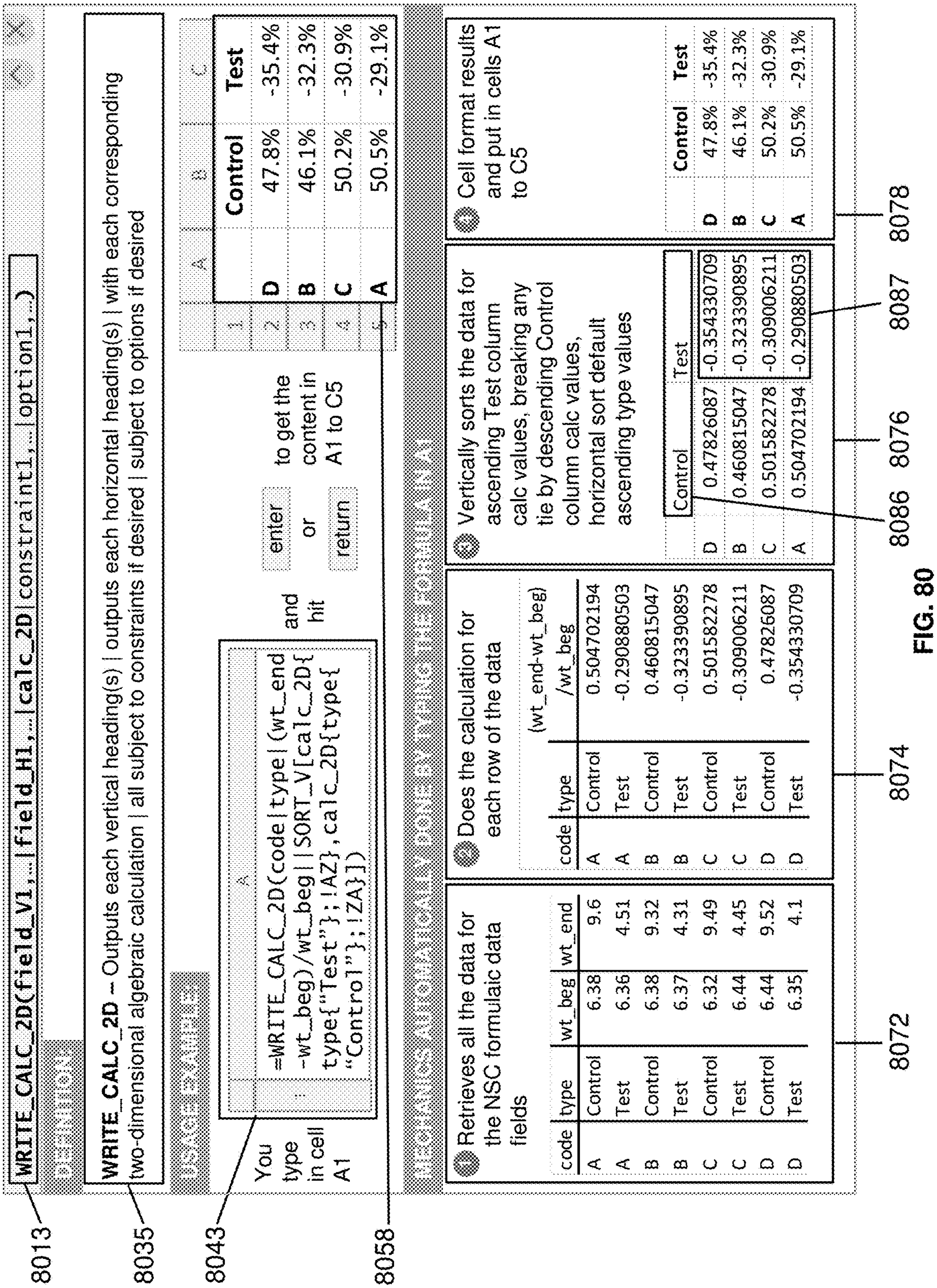
FIG. 80 examples a user selected sorting order ordered by values of repetitive calculations for our spreadsheet function technology doing two-dimensional algebraic calculations (WRITE_CALC_2D).
Figure 81:
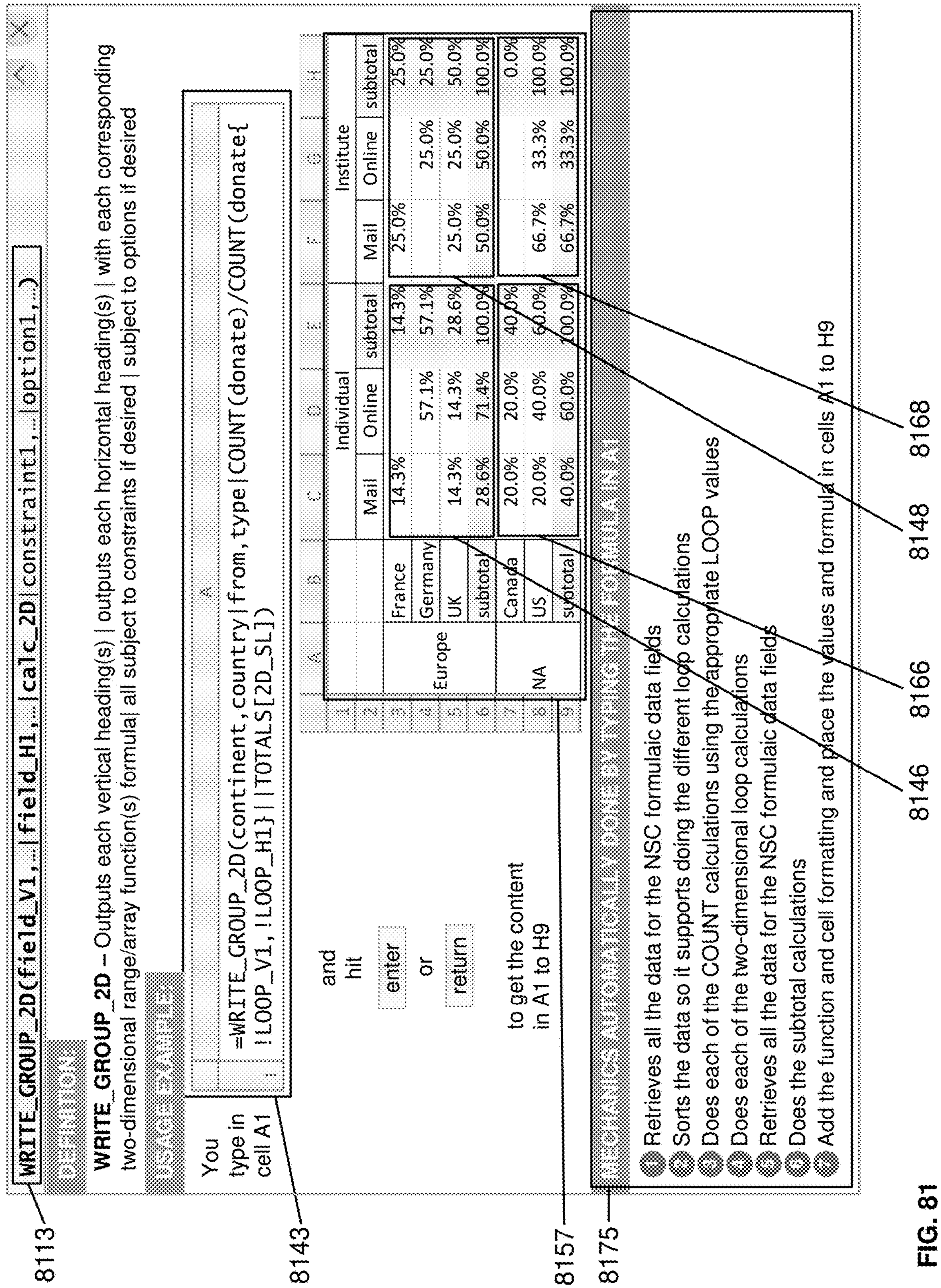
Figure 83:
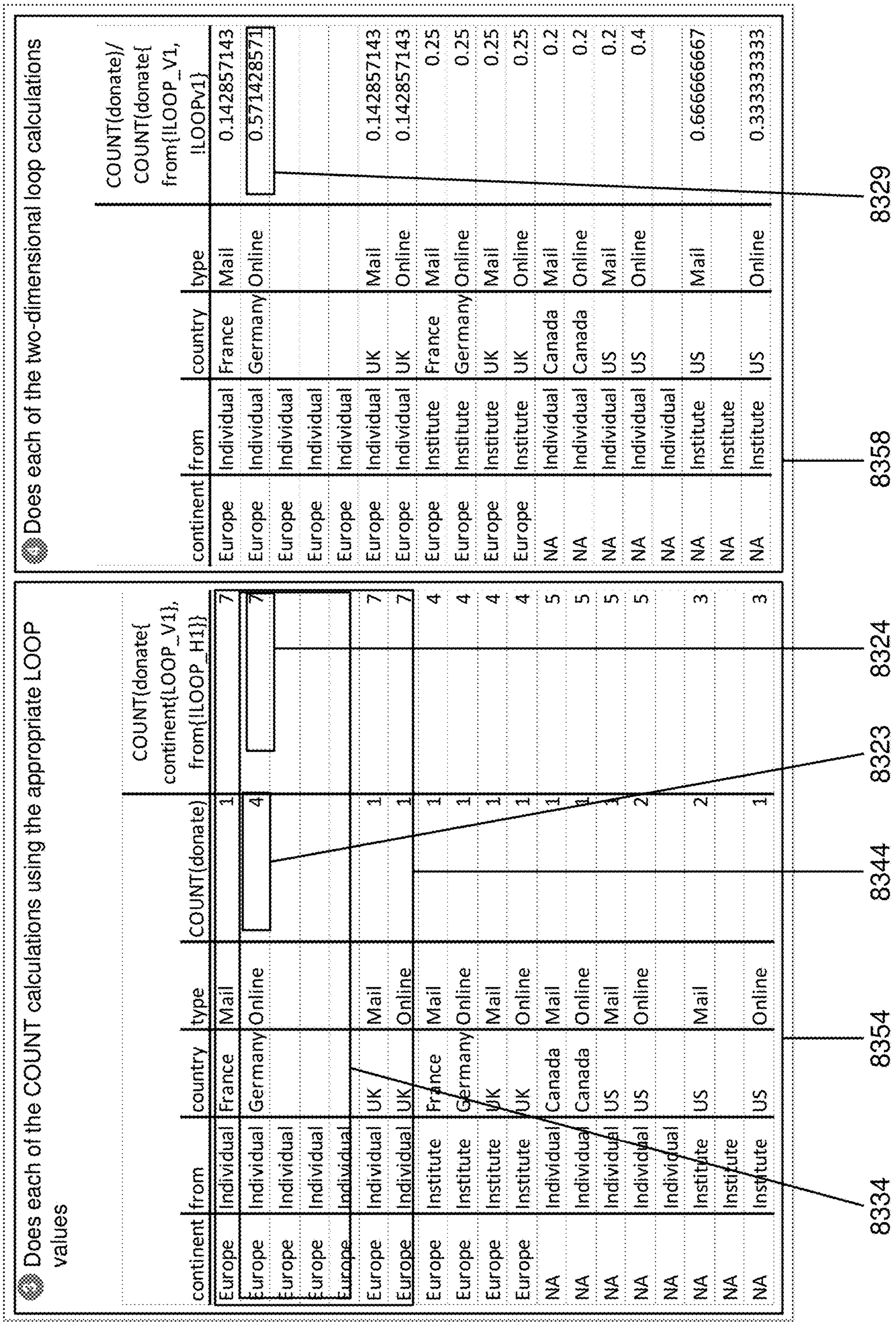

FIG. 80 examples a user selected sorting order ordered by values of repetitive calculations for our spreadsheet function technology doing two-dimensional algebraic calculations. In this example the user wants to sort the two-dimensional results vertically by ascending repetitive calculation values for the 'type' 'Test' column calculated values. In the case of any tied values, they then want those tied values sorted by descending values for the 'type' 'Control' calculated values. In this way the cancer researcher will see the data sorted by the tests with the largest shrinkage of the cancerous mass. In this embodiment they input the formula 8043 with an option term:

'SORT_*V*[calc_2*D*{type{"Test"};!*AZ*}, calc_2*D*{type{"Control"};!*ZA*}]' which tells our technology how to sort. There are many other ways for our technology to get this input from the user (e.g., a sorting UI) provided it defines what to sort and how to sort it. Steps one 8072 and two 8074 retrieve the data and do the repetitive calculations. Step three 8076 two-dimensionally lays out the data and vertically sorts the rows by ascending values of the 'Test' column calculated values 8087. Because there are no tied values it does not invoke the secondary sort of the descending sort of the 'Control' column calculated values, but had there been ties it would have. The columns are sorted by the default ascending values of the headings/labels 8086 which are for the 'field_H1' input of the formulaic data field 'type'. Step four 8078 then cell formats the results and put them and the formula into cells 'A1' to 'A5' 8058 where the user can see the vertical order of the headings/labels is 'D, B, C and A' which is very different than from the previous sorts in FIG. 79 and FIG. 34. In this example it allowed the user to see the experiments in order of best (i.e., largest reduction in cancerous growth) to worst performance. In situations where there are many tests (e.g., hundreds or thousands) this would be of great value to easily see the tests with the best performance.

Figure 97:
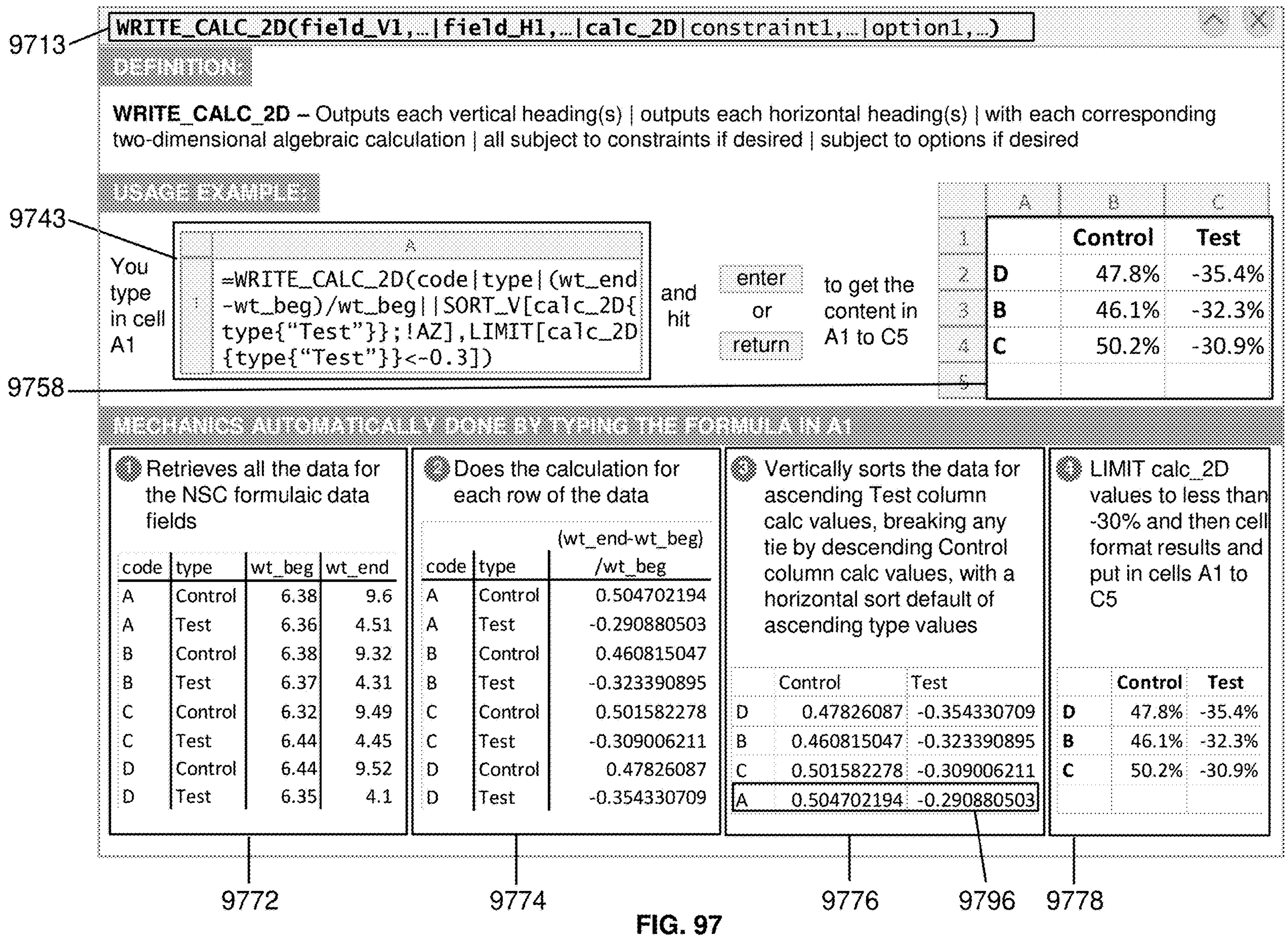
FIG. 97 examples our technology limiting the values based on values of the two-dimensional algebraic calculations (WRITE_CALC_2D).

In situations like the previous example but with a large number of tests our technology would support only showing values which meet some user specified threshold of 'calc_2D' performance, say in this situation all tests with a 'Test' 'calc_2D' value less than negative 30% for the cancer user's test results. FIG. 97 examples our technology limiting the values based on values of the two-dimensional algebraic calculations. The formula 9743 in cell 'A1' executes the same steps with the same results as in FIG. 80 in steps one 9772, two 9774 and step three 9776. However, in step four 9778 the option term:

LIMIT[calc_2*D*{type{"Test"}}<−0.3]

That limits the 'calc_2D' calculated values kicks-in. It checks all the values for the calc_2D formula '(wt_end−wt_beg)/wt_end' for a 'type' value of '{"Test"}' and eliminates them if they are −0.3 or larger. In this example that eliminates the heading and values 9796 which have been removed by step four 9778 before it returns the formatted results with the formula to the cells 'A1' to 'C4' 9758. This capability, which will also apply to the group (loop) equivalent 2D calculations we will discuss later, easily allows users to analytically screen volumes of calculations before presenting only the information they are interested in—in this example tests meeting some performance hurdle.

There are situations where users want to employ a more complicated limitation of the results' using an algebraic formula. Our cancer user wants to evaluate the test results relative to the control results getting the total difference between what the control and the test. FIG. 105 through FIG. 109 examples our technology hiding, sorting and limiting the values based on algebraic calculations using the values of the two-dimensional algebraic calculations—result of a result sorting and limitation. Steps one 10653, two 10657, three 10753, and four 10757 in FIG. 106 and FIG. 107 do the previously exampled types of data retrieval, sorts, calculations and two-dimensional sorting of the results. In step five 10853 in FIG. 108 our technology does the calculations 10864 bolded below used by both the SORT and LIMIT terms in the formula 10543 in FIG. 105:

SORT_*V*[calc_2*D*{type{"Test"}}−calc_2*D*{type{"Control"}};ASCEND]

LIMIT[calc_2*d*{type{"Test"}}−calc_2*D*{type{"Control"}}<−0.85]

In step six 10857 SORT uses those result of a result calculated values 10869 to ascendingly sort the rows ('SORT_V' for vertical). Step seven 10953 in FIG. 109 then uses the calculated values 10869 to eliminate any values not '<−0.85' 10867 to give the smaller set of rows with the values '<−0.85' 10954. Step seven 10953 has also hidden (eliminated from the output) the 'id' data (10866 in FIG. 108) per the option HIDE[id] in the formula 10543 in FIG. 105. Step eight 10957 then formats and returns the data to the cells 'A1' to 'D6' 10547 in FIG. 105 without the result of the result calculation (10954 in FIG. 109). Thus, our technology supports the user sorting and limiting values based on the result of a result and hiding unwanted rows, columns or calculations used for the sorting—in this example hiding the 'id' information which was used to ensure the correct matching of the test and control values and hiding the sort and limit calculations.

Figure 35:
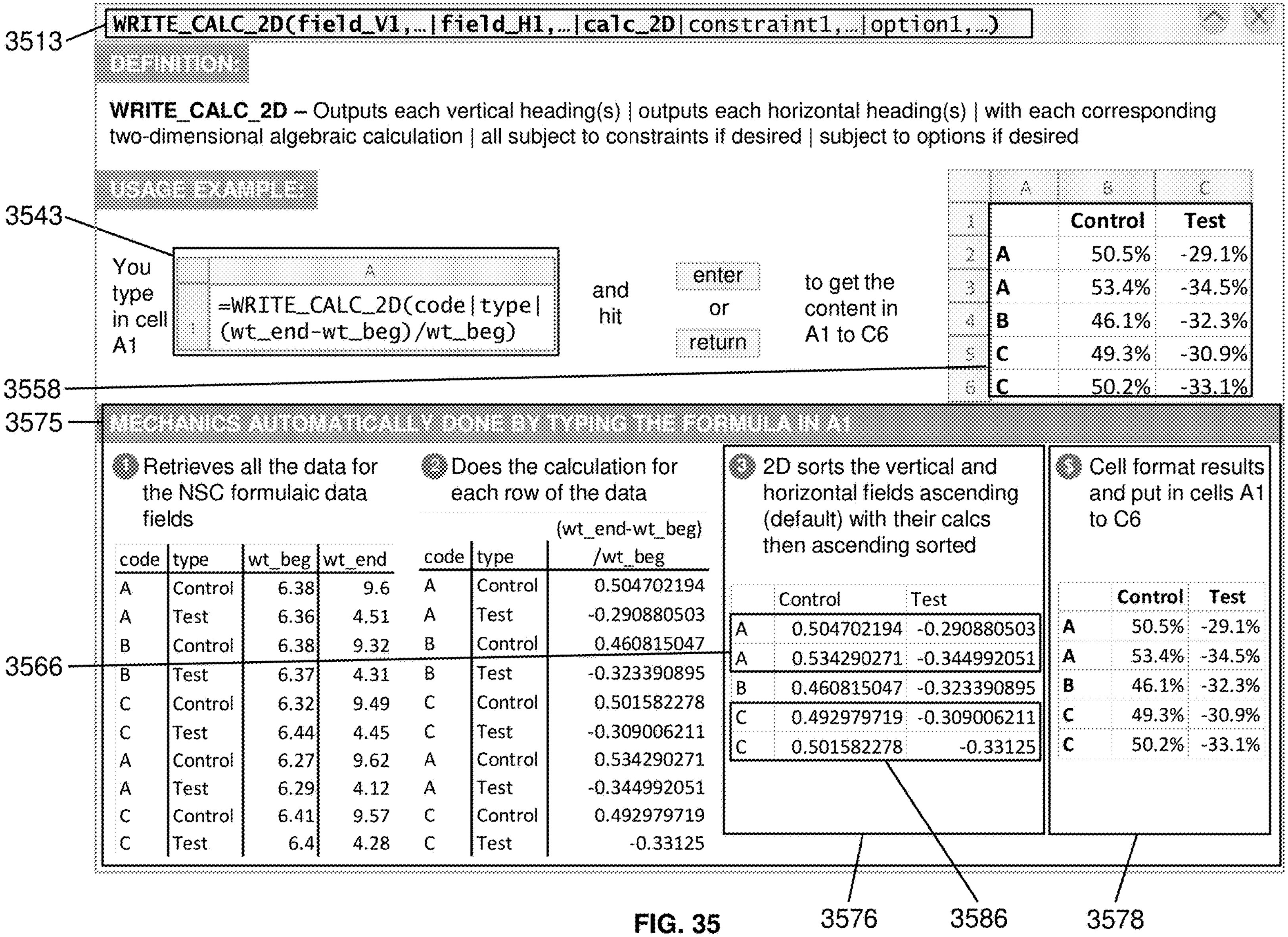
FIG. 35 examples an embodiment of our technology that automatically collapses the output when the two-dimensional results are not unique (distinct)—i.e., having duplicate combinations (WRITE_CALC_2D).

FIG. 35 examples an embodiment of our technology that automatically collapses the output when the two-dimensional results are not unique (distinct)—i.e., having duplicate combinations. In this example our cancer researcher has some test and control results with the same headings (e.g., A and Control) in their data set and unfortunately has not specified enough fields to for sure know how to pair up the tests with their control. The difference is not in the formula 3543 (relative to the same formula 3443 in FIG. 34) but in the data used by the formula. These duplicate combinations are visible in the step three 3576 two-dimensional sorting of the data and calculations where there are two 'A' combinations 3566 and two 'C' combinations 3586. The challenge is that while this data looks to be correctly sorted with matched tests and controls next to each other, but without some other field matching the sets there is no way to be sure. As how data gets stored in database, order is no sure indication of correct pairings. Therefore, the algorithmic ordering and collapsing of the data very likely could pair tests and controls that are not matched to the same experiment as could have happened with the 'C' experiments 3586. In situations where the different values are not related to each other the collapsed results which are returned by step four 3578 to the cells 'A1' to 'C6' 3558 would be fine. As we will further discuss, our technology can automatically flag this issue for users so they can decide whether it is a problem or not.

Figure 36:
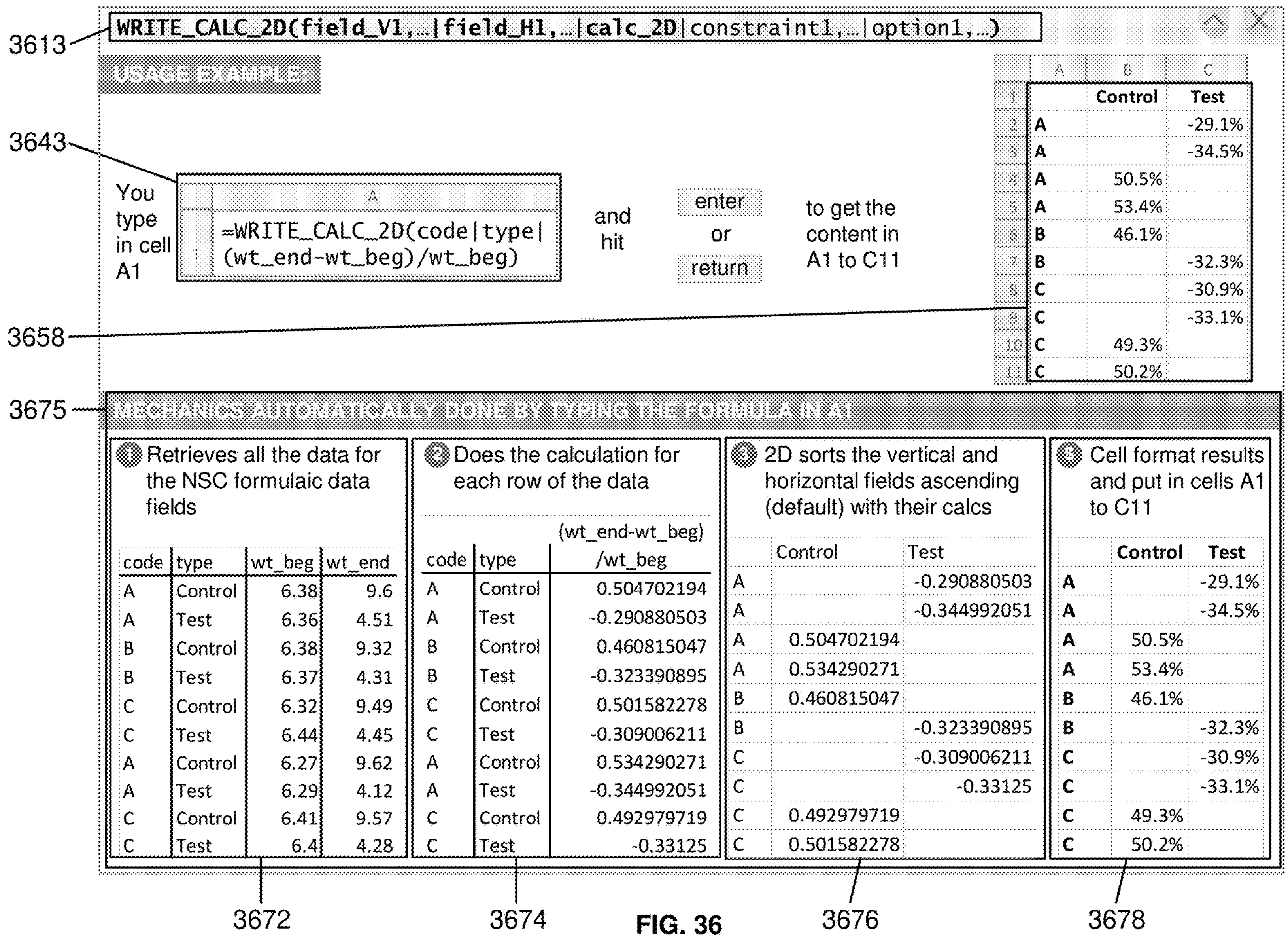
FIG. 36 examples another embodiment of our two-dimensional algebraic calculation technology that automatically differentiates (spreads) the output when the two-dimensional results are not unique (distinct)—i.e., having duplicate combinations (WRITE_CALC_2D).

FIG. 36 examples another embodiment of our two-dimensional algebraic calculation technology that automatically differentiates (spreads) the output when the two-dimensional results are not unique (distinct)—i.e., having duplicate combinations. The user is solving the exact same problem as in FIG. 35 and has written the exact same formula 3643 (as 3543). Instead of arbitrarily collapsing the values—in this embodiment our technology turns every value on one of the dimensions (in this example vertical) into a row unto itself as shown in the result 3658. This embodiment has a default sortation of ascending which is shown in step three 3674 to first work for the heading values and then for the duplicate values to work for the 'calc_2D' values which are generated from the algebraic formulaic data calculation '(wt_end−wt_beg)/wt_beg)' in the cell formula 3643. The automatically executed mechanics 3675 of our technology generate the results 3658 our technology outcome automatically changes the presentation of the results when the result two-dimensional combinations are unique (distinct) or not with no required actions by the user and no change in the syntax/arguments 3613 of our function. Showing the results in this spread form informs the user that there are duplicate combinations at which point they can then decide whether the relationships don't matter and trigger an option to collapse the results or that the relationships do matter, and they should look for another field to ensure correct combinations (in this example pairing) of the calculated results.

FIG. 37 through FIG. 43 examples our two-dimensional algebraic calculation technology supporting compound vertical and horizontal headings, generating titles, sorting by average calculations, limiting outputs and constraining (filtering) results using NSC formulaic data fields. In this example a cancer researcher wants to rank tests by their reduction/shrinkage in the cancer growths for many different tests in many different countries looking only at the best twenty outcomes. The formula in cell 'A1' 3743 ends up being somewhat long because the user has entered two fields for both the vertical and horizontal headings, a multi-field 2D calculation, a date range constraint (filter), and then four different options, all of which are automatically done by the eight steps in the mechanics 3773. FIG. 38 step one 3853 retrieves the NSC formulaic data which is then constrained (filtered) in step two 3857 removing any dates 3825 and 3895 not between and including '1/1/21' and '12/31/21'. FIG. 39 step three 3953 sorts the data into the 2D calc combinations (repetitions) for step four 3957 to then do the percent weight change 'calc_2D' algebraic formula calculations 3959. FIG. 40 step five two-dimensionally sorts the headings and calculations 4054 and then does the 'SORT_V [AVE{!AZ}]' and the 'SORT_H[AVE{!AZ}] average calculations, 4058 and 4094 respectively. The vertical average values are an average of one value because the non-unique (duplicate) values have automatically put the vertical results into the non-collapsed (spread) form, which the user here knew otherwise they would not have used an average ('AVE{!AZ}') sort. Instead, they would have wanted to do a calculation subtracting the control change from the test change to get the differential impact of the cancer treatment. A custom sorting calculation supported by our technology. The horizontal dimension is getting a true average of multiple like situations as the user anticipated. FIG. 41 step six then vertically sorts the rows 4154 from lowest to highest per '{!AZ}' using the 'AVERAGE' values 4158 and horizontally sorts the columns 4154 from lowest to highest per '{!AZ}' using the 'AVERAGE' values 4194. Realizing in this example that the lowest values are the best performance. FIG. 42 step seven then executes 'LIMIT_V[20]' limiting the vertical output to 20 rows 4264 by eliminating the rest 4284 so that step eight in FIG. 43 is ready to add the titles 4323, add the formats 4326/4356 and send the results with the formula to the cells 'A1' to 'F23' 3778 in FIG. 37. All of this supported by HINTs (described in a referenced filing) so the user does not need to remember these various options but can select from a hint listing the relevant options for the formula created thereby allowing the user to easily create highly tailored two-dimensional algebraic calculation tables without having to remember the capabilities (which will be shown to them by the HINTs).

Figure 111:
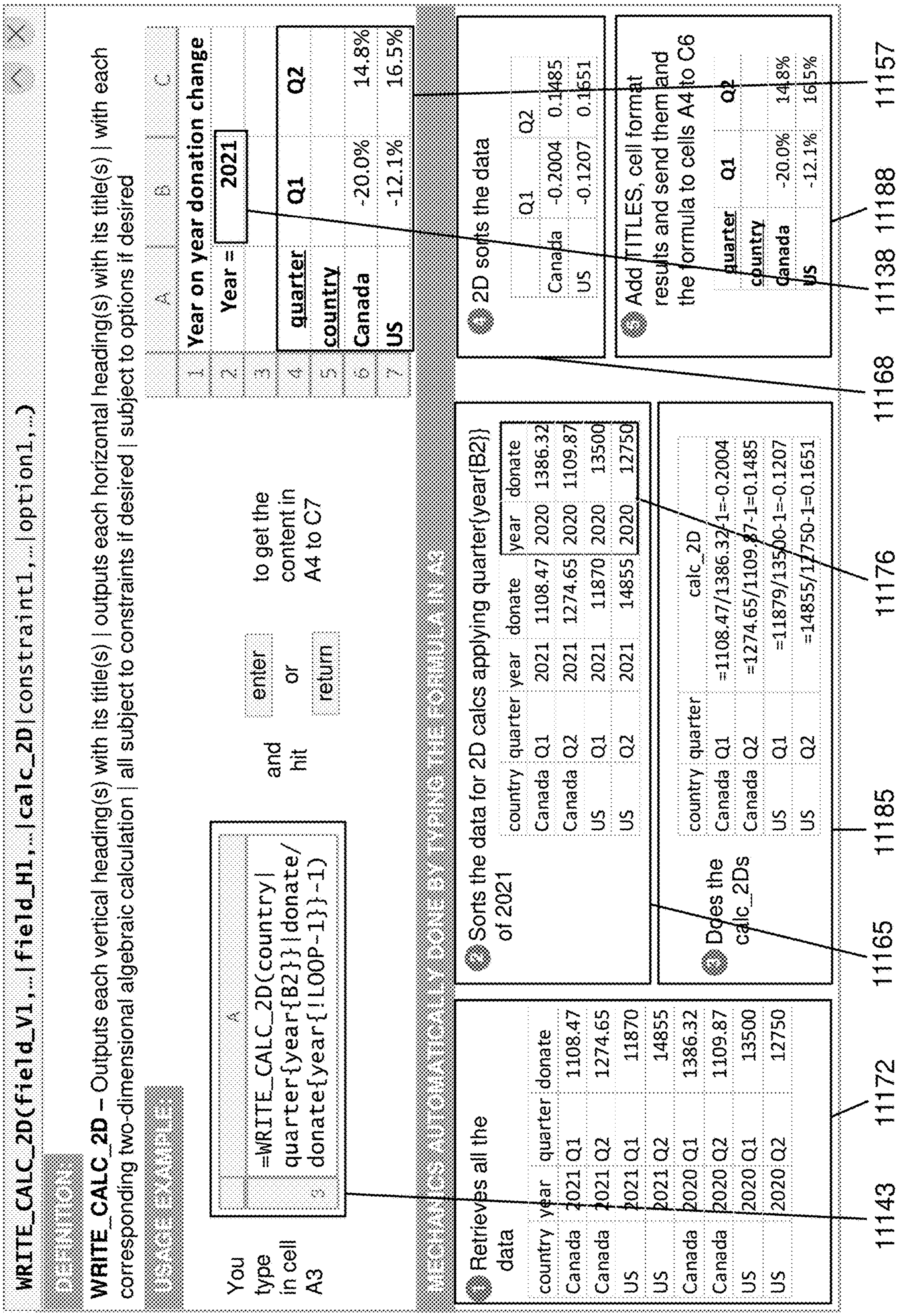
FIG. 111 examples our spreadsheet function technology doing two-dimensional algebraic repetition calculations constraining (filtering) formulaic data values within one of the headings and using a cell reference input and auto generating heading titles (WRITE_CALC_2D).

FIG. 111 examples our spreadsheet function technology doing two-dimensional algebraic repetition calculations constraining (filtering) formulaic data values within one of the headings and using a cell reference input and auto generating heading titles. A charity worker in North America would like to know the growth or decline in their donations by country and quarter for this year (2021) versus last year. To do so they write a formula 11143:

'=WRITE_GROUP_2D (country|quarter{year{B2}}|donate)/ donate{year{!LOOP−1}}−1)'

In that formula the vertical heading values are limited to the 'year{B2}' which is '2021' 11138 which means that the repetitions formed will be for that year. However, the data for the other years has not been filtered away and therefore is available for use in the calc_2D formula and in this situation for the part of the formula 11143 below:

'donate{year{!LOOP−1}}' which uses the year 2020 that is the '!LOOP' (e.g., repetitions) value of '2021' minus '1'. These calculations are shown in step three 11185 using the '2020' values 11176 shown in step two 11165. Step four 11168 then 2D sorts the data for step five 11188 to add heading titles (a formula default in this embodiment), formatting and the formula to send to cells 'A4' to 'C7' 11157. The user constrained the quarter calculations to the year '2021' in this example because it was the only year which had a previous year of data and therefore the only year for which the calc_2D could be done. Thus, we have exampled that our technology supports user constraining (filtering) any field, combinations of fields, results, or combinations of each of them as desired.

FIG. 85 through FIG. 90 examples our two-dimensional algebraic calculation technology using spreadsheet cell sourced data supporting non-nested subtotals (e.g., Months), titles, and the use of non-formulaic data, normal cell ranges in functions, and non-range/array functions. The charity volunteer is analyzing their net donations over three months by country and type of donation (i.e., Mail or online). The fee netting in the formula 8515/8643 involves repetition specific subtraction of fees per donation via the formulaic data field 'fees', subtraction of the 'donate*E1' removing a percentage of the donation via a cell value input in cell 'E1' 8524 and then the removal of some fixed fees. One of those fixed fees is the result of the term 'SUM(E2:G2)' which removes a set of fees that are input in the three cells 8525 using a range function using non repetition (non-loop) data, in this example cell referenced data. Another of those fixed fees examples using a non-range/array function in this case 'SQRT(E3)' using the square root of cell 'E3' 8534. Exampling the support of our technology for use of non-repetition data in the repetitive calculations with any of the numeric functions just like in a normal spreadsheet cell formula. The data used in this example is from the spreadsheet cells 8548 which in this example have a header row 8528 used as the formulaic data field names. This makes the data easier for the user to use by replacing the cell ranges with a more descriptive data field name and can be done in any of our cell sourced formulaic data. Thus, the formula 8515/8643 is more easily readable like our NSC formulaic data field names.

FIG. 85 through FIG. 90 also examples a very useful capability for adding a form of subtotal in non-nested heading situations. In this situation the user has employed our month date total which defaults to doing summations of the data. This allows the user to create monthly totals from data that is just daily dates (i.e., does not have a month field). FIG. 86 examples the 'WRITE_CALC_2D' formula 8643 using the functional syntax 8613 previously described and the automatically executed illustrative steps 8673 automatically done to deliver the results 8657. FIG. 87 step one 8753 retrieves the data, step two 8757 sorts the data for the 2D repetitive calculations which are done in three 8852 in FIG. 88. Step four 8857 then inserts the month total lines 8847, 8867 and 8887. That comes from the option term 'V_MTH_L{date}' which tells our technology that the user wants vertical ('V') month total ('MTH') after the month data, so last ('L'). This option defaults to doing summation totals but had the user specified another range function like AVERAGE, MAX or MEDIAN the total line would be populated by that calculation. The user also specified a regular vertical ('V') total 8897 ('T') last ('L') via 'V_TL' and a horizontal ('H') total 8859 ('T') and horizontal subtotals 8856/8858 ('S') last ('L') via 'H_TSL'. There are many different ways to specify in our function formula these total calculations and many different calculations all of which are supported by our technology. Step five 8956 exampled in FIG. 89 then shows the result of our application doing the month totals for 'April' 8946, 'May' 8966 and 'June' 8986. This capability allows users to easily insert different versions of totals easily for months, weeks, quarters, years and other time intervals. It can also be used with a specified interval to do total type calculations per interval of numbers. Say in this example the vertical axis was numbers a user could specify doing a total very increment of say 100, 500 or 10,000. Thus, giving the user the ability to easily put in interim subtotals to help summarize the information. As described earlier the types of non-nested subtotals/totals created are not limited to summation but can utilize a spectrum of other range functions including AVERAGE, MIN, MAX and others.

Step five 8956 then examples the calculation of the totals (8996 and 8958) and horizontal subtotals (8955 and 8957). Step six 9067 in FIG. 90 then examples adding the heading titles 9022 which because names were used for the cell data can be done in the default mode in this embodiment of 'TITLES[ ]' (shown in the formula 8515/8643). That default mode in this embodiment underlines and bolds the formulaic data field name, left justifies the vertical titles, and right justifies the horizontal titles yielding a readable set of heading titles 8646/9022. This embodiment has a more elaborate default formatting supplied by the function in our technology which adds the outlines for the headings 9062 and 9027. It also merges and centers the nesting heading labels 'Mail' and 'Online' while also centering the other horizontal headings in 9027. It differentially left justifies the vertical heading 9062. And finally, it applies the cell formatting of currency to all the calculated values 9067 before returning all the values and the formula to 8574 in FIGS. 85 and 8657 in FIG. 86. Any combination of these capabilities can be made a formula default so that the user gets it without having to specify an option, as exampled for TITLES in FIG. 110 where the user gets heading titles of bolded, underlined and right or left justified formulaic data fields without specifying anything related to titles.

Figure 110:
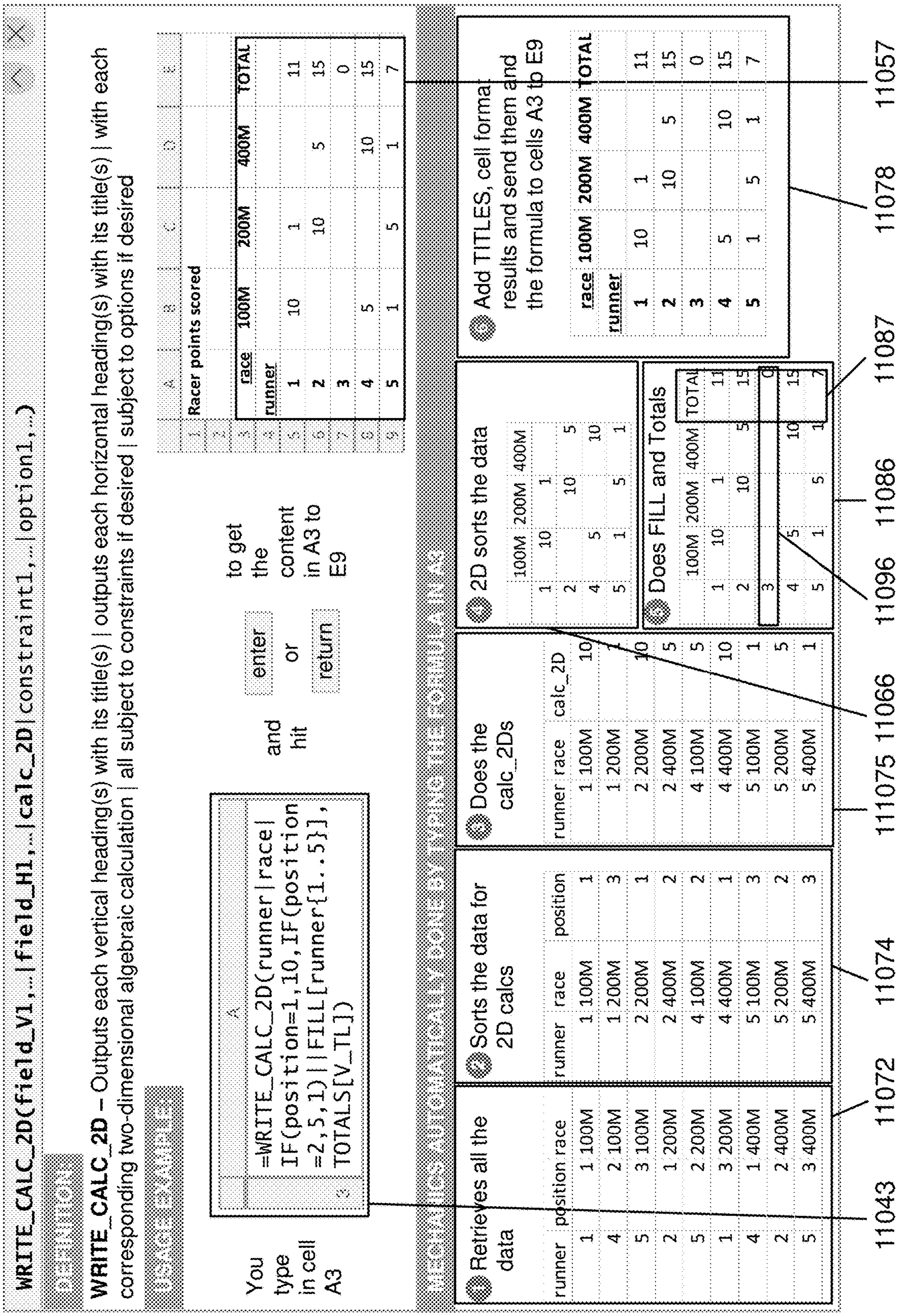
FIG. 110 examples our technology supporting the easy automatic filling of missing integer values in a two-dimensional data transformation (WRITE_CALC_2D).

FIG. 110 examples our technology supporting the easy automatic filling of missing integer values in a two-dimensional data transformation. In this example a High School race volunteer wants to display the points accrued by the five competitors in three different running races. They want to see runner listed even if that runner earned no points and therefore in this data set had no entries (the data set only includes runners scoring points in a race, not those that participated but scored no points). In this embodiment the formula in cell 'A2' 2843 uses an option term:

'FILL[runner{1 . . . 5}]' to automatically fill in any missing integers in the formulaic data field 'runner' which in this formula is the vertical field ('field_V1'). That is done in step five 11086 after the data is retrieved in step one 11072, sorted for 2D calcs in step two 11074, executes the calc_2Ds in step three 11075 and two-dimensionally organized and sorted in step four 11066. The missing runner integer value of '3' 11096 is inserted with its row after which the totals are calculated by executing the option 'TOTALS[V_TL]'. In step six 11087 the TITLES are added as a default for the formula (no option required) delivering in this embodiment the field names bolded and underlined and justified as shown in 11057. Step six then does the additional cell and function formatting and then sends the results with the formula to cells 'A3' to 'E9' 11057. This allows the user to fill in all the values in a progression automatically with one simple addition to the function formula for improved presentation, ease of further analysis or in this situation to show all participants. This filling capability of our technology can be applied to date progressions, text (e.g., letters of the alphabet) progression and as described previously even more complicated progressions.

We could continue to example for our two-dimensional algebraic calculation functions embodiments the date filling and date limiting, and other options exampled previously for the two-dimensional data organization function embodiments as they are applicable. However, instead we will move to the third type of our two-dimensional functions, what we are calling the two-dimensional group (loop) calculation functions. These functional formulas do what is done in a conventional spreadsheet pivot table but then go well beyond what can be done in the current spreadsheet pivot tables with different loop level calculations, using range or array functions not currently supported, supporting two-dimensional calculations with more than one range or array function and supporting the previously discussed options. As with our previous descriptions we will start with simple examples and then example the other embodiments in very small-scale examples using much less data than a typical situation, purposely kept simple for shortness of example purposes.

Two-Dimensional Group (Loop) Calculation Functions

For ease of description, we will differentiate our two-dimensional group (loop) calculation functions from our preceding two-dimensional functions by using a different function name. However, the group functions like the preceding functions could easily be integrated into a single function which automatically detects which logic to use based on what is inputted for the two-dimensional input—either a field, an algebraic calculation or a range/array looped function(s) calculation. And the algebraic and range/array looped function calculations can be combined in a single formula, as desired by users.

Figure 44:
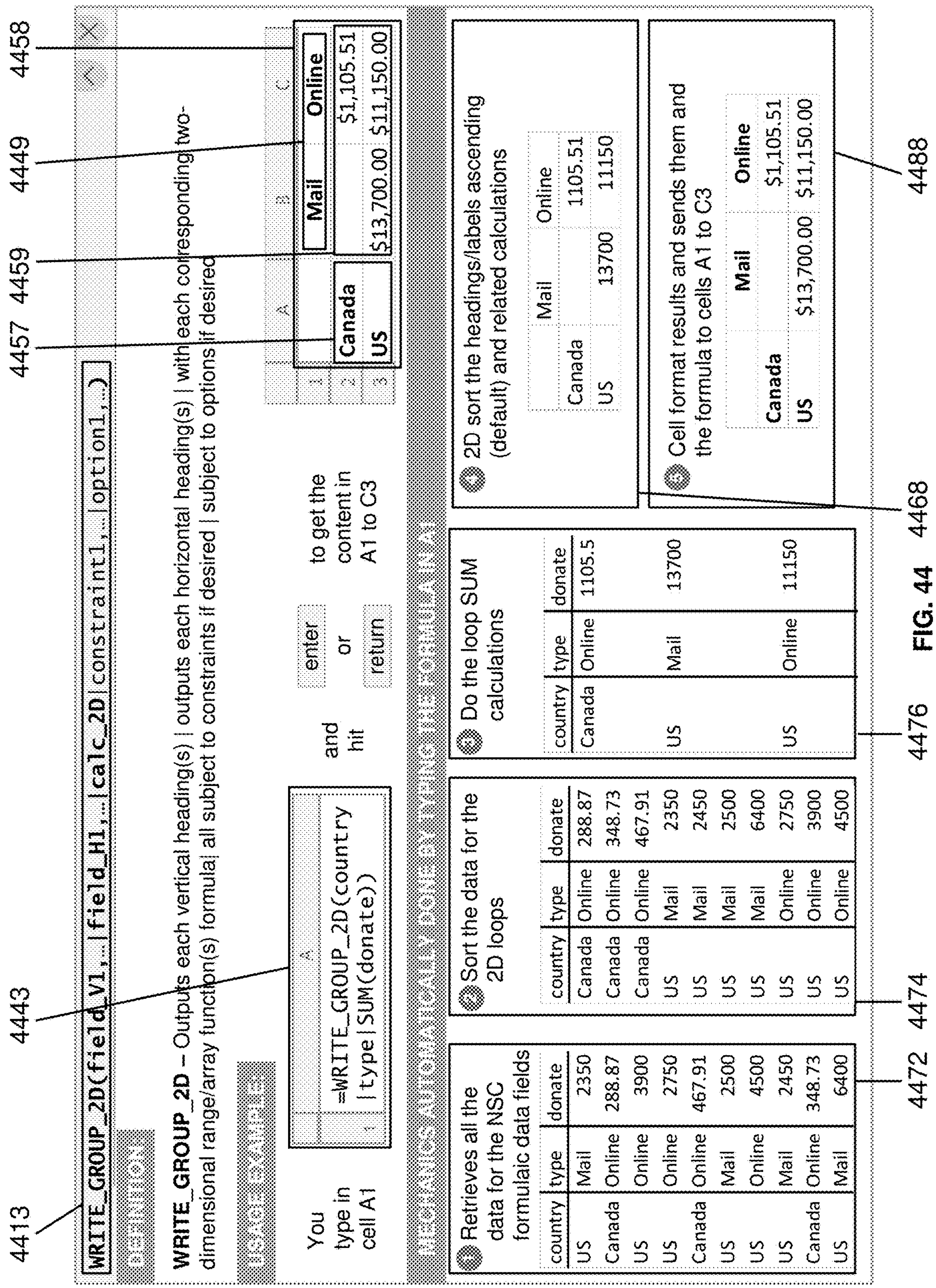
FIG. 44 shows a very simple example of our spreadsheet function technology doing two-dimensional group (loop) calculations (WRITE_GROUP_2D).

FIG. 44 shows a very simple example of our spreadsheet function technology doing two-dimensional group (loop) calculations. The syntax/arguments 4413 of the function in this embodiment is:

WRITE_GROUP_2D(field_V1, . . . |field_H1, . . . |calc_2D|constraint1, . . . |option1, . . . )

with the required fields bolded. The only difference relative to the two-dimensional algebraic calculation functions previously exampled, e.g., 3713 in FIG. 37:

WRITE_CALC_*2D*(field_*V*1, . . . |field_*H*1, . . . |calc_*2D*|constraint1, . . . |option1, . . . )

is the different name of the function. So, with easy auto detection by our technology of what a user puts in the calc_2D argument a single function could do both capabilities and as previously discussed could also do our two-dimensional data organization functions as well. There are also many different function syntax/argument structures that can be used for any of the capabilities or a combined function capability but to keep the examples simpler we have opted to use one version per in our example embodiments.

As before, we will example our technology with very small data sets to make more visible what our technology is doing. We will illustrate for explanation purposes steps of what our technology is doing, recognizing this is for understanding of what it is doing and not an exact depiction of how our application code is doing it. FIG. 44 starts with a charity worker looking to analyze and then present the total donations for Canada and the US coming from Mail and Online in a two-dimensional layout. To do that in our technology the user inputs the formula 4443:

'=WRITE_GROUP_*2D*(country|type|SUM(donate))' where 'country' is the formulaic data field input 'field_V1' that provides the vertical table headings/labels, 'type' is the field input 'field_H1' that provides the horizontal table headings/labels and together they create the loop equivalents. 'SUM(donate)' does the two-dimensional group (loop equivalent) calculations applying the range function SUM to the formulaic data field donate for each loop equivalent. The data retrieval is done in step one 4472, step two 4474 sorts the data for the two-dimensional loops and step three 4476 does the three loop calculations (in this example SUMs). Step four 4468 two-dimensionally sorts the vertical and horizontal fields with ascending values (the defaults) and their related group (loop) calculations inserting a blank for the 'Canada' and 'Mail' combination. Step five 4488 then cell formats the results and sends them and the formula to cells 'A1' to 'C3' 4458 giving the charity worker an organized set of analyses for easy review. Those results are the vertical table headings/labels 4457 from the formulaic data input 'country', the horizontal table headings/labels 4449 from the formulaic data input 'type' and the user specified function and formulaic data field 'SUM(donate)' that generates loop equivalent function results 4459.

This gives the user a highly scalable analytical and data presentation tool where simple formulas can work through very large sets of data doing looped two-dimensional calculations and as we will later discuss sort and limit the outputs to those results of interest to the user.

Figure 77:
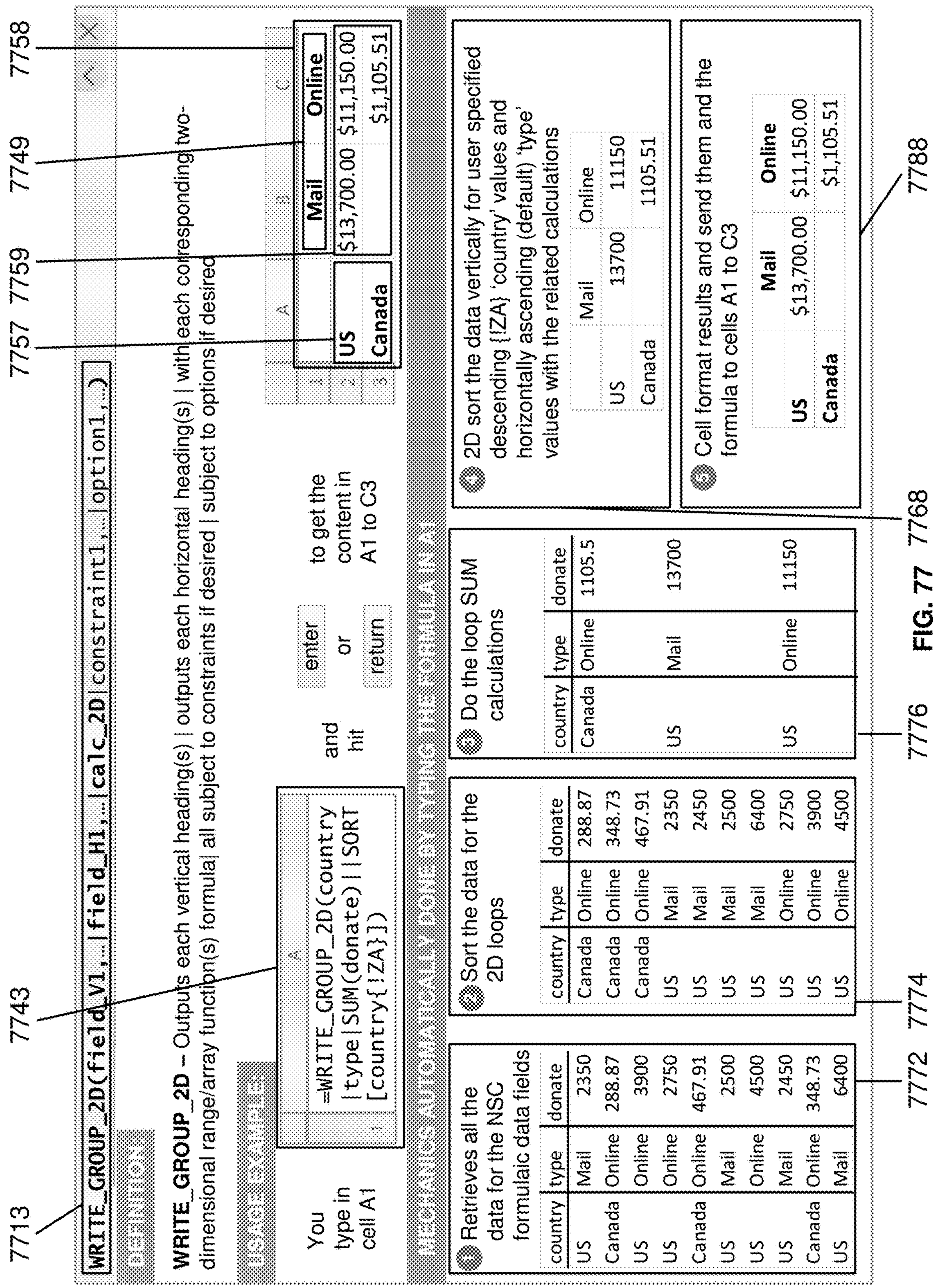
FIG. 77 examples a user selected sorting order for one of the vertical/horizontal headings for our spreadsheet function technology doing two-dimensional group (loop) calculations (WRITE_GROUP_2D).

FIG. 77 examples a user selected sorting order for one of the vertical/horizontal headings for our spreadsheet function technology doing two-dimensional group (loop) calculations. The charity user wants to override the default sorting of the rows of the previous analysis in FIG. 44 so that the 'US' is the top row. To do so in this embodiment the user has specified an option 'SORT[county{!ZA}]' in the two-dimensional function formula 7743 to specify a descending sort order of the vertical field 'country'. This does not alter steps one 7772, two 7774 and three 7776, which are the same as steps one 4472, two 4474 and three 4476 in FIG. 44. However, in step four 7768 the vertical data from the field 'country' is then sorted descending ('{!ZA}'), as the user specified in 'SORT[county{!ZA}]' while the horizontal sort, which is not mentioned in the option, defaults to an ascending sort. As such the results 7758 show the row headings/labels 7757 and related calculations 7759 are sorted so that the 'US' values are above the 'Canada' values (descending order) while the column headings/labels 7749 and their related values 7759 are sorted in ascending 'type' values ('Mail' then 'Online').

Figure 45:
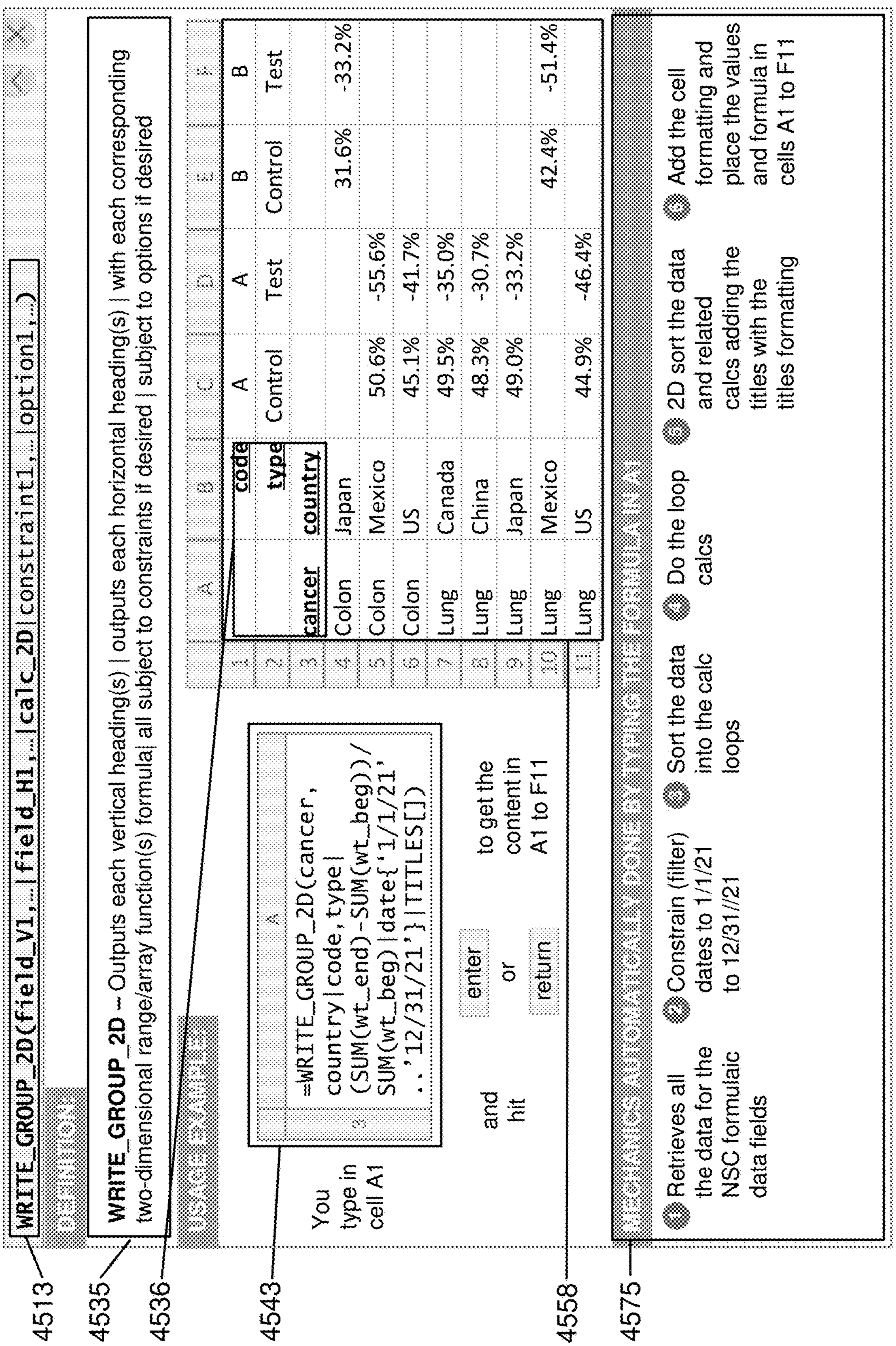

FIG. 45 through FIG. 48 examples our spreadsheet function technology doing two-dimensional group (loop) calculations with compound headings, constraints (filters) and TITLES using NSC formulaic data. In this example our cancer researcher has data for two cancers (Colon and Lung) and five countries (Canada, China, Japan, Mexico and US) for treatment tests of two codes (A and B) each having two types (Test and Control) for which they would like to see the average percent cancerous mass treatment weight impact (negative if it shrank and positive if it grew). FIG. 45 shows an embodiment of our two-dimensional group (loop) calculation function called 'WRITE_GROUP_2D' with a formula 4543 with two NSC formulaic data field inputs for the vertical headings 'cancer,country' and two NSC formulaic data field inputs for the horizontal headings 'code,type'. It has a percentage weight change formula:

(SUM(wt_end)−SUM(wt_beg))/SUM(wt_beg)

that is calculated for each set of nested loops. It has a constraint1 (filter) argument 'date{'1/1/21' . . . '12/31/21'}' and an option1 argument 'TITLE[ ]'. Our technology then automatically executes all those capabilities as illustrated in the six steps 4575 to deliver the results 4558. FIG. 46 examples the retrieval of the formula data in step one 4653 and then in step two 4657 the constraining (filtering) by the 'date' formulaic data field to remove data with dates not within 1/1/21 and 12/31/21 4625 and 4695. FIG. 47 illustrates in step three 4753 the creation of the two-dimensional range function calculation loops and then in step four 4757 does the 'SUM(wt_beg)−SUM(wt_end))/SUM(wt_beg)' formula calculations as exampled for the 'Colon' 'US' 'A' 'Control' 4733 two-dimensional combination with the result 4739 using the data in 4734. FIG. 48 illustrates in step five the two-dimensional sorting of the headings 4843 and 4836 and related calcs 4846 adding the TITLES 4833. In this embodiment the default titles option is used, and it bolds, underlines, and positions the field names in the appropriate cells with the appropriate left or right justification. Step six then adds the additional cell formatting 4875 (centering) and 4885 (percent) and places the values and formula in cells 'A1' to 'F11' 4558.

Figure 50:
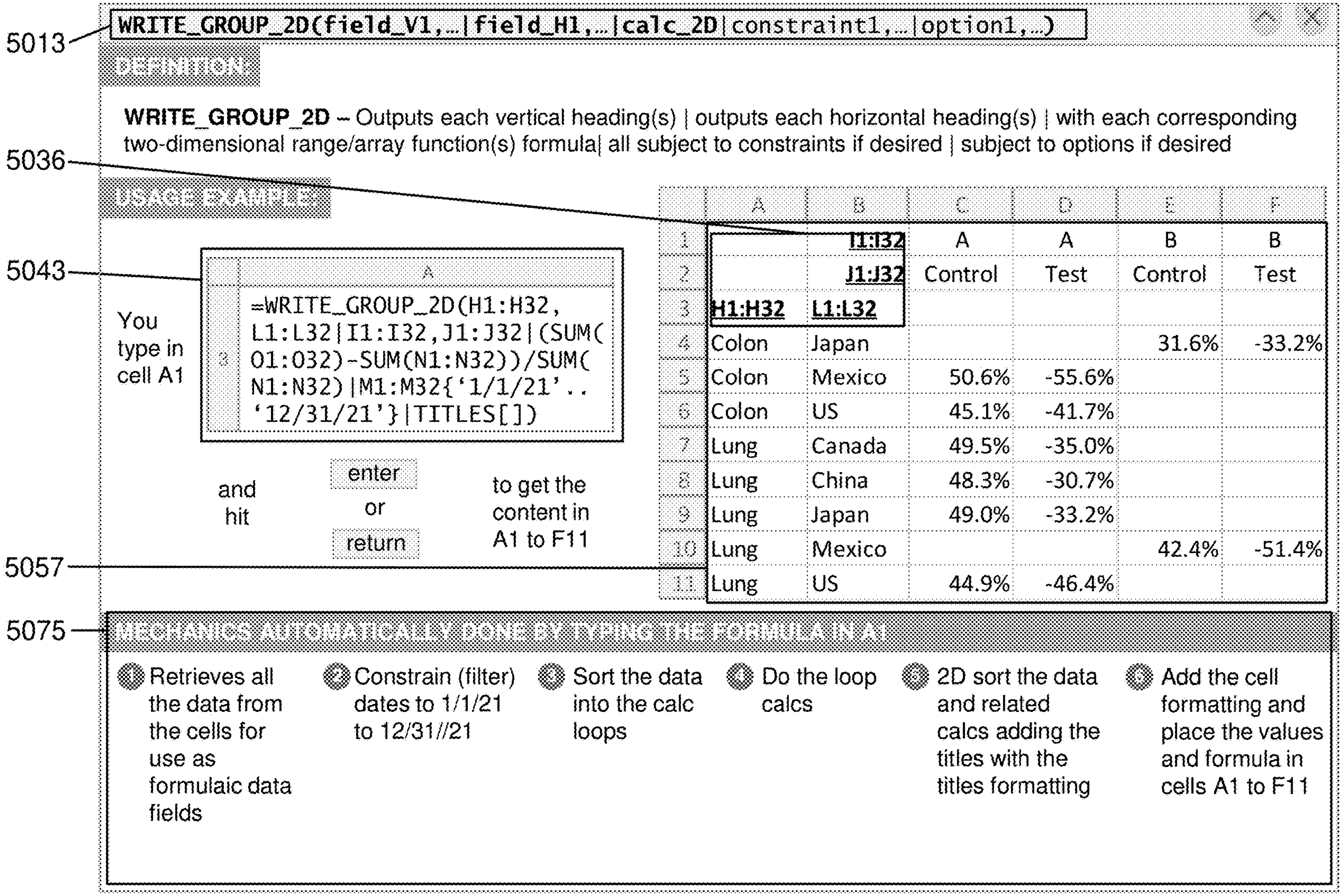

FIG. 49 through FIG. 50 examples our spreadsheet function technology doing two-dimensional group (loop) calculations with compound headings, constraints (filters) and TITLES using cell sourced formulaic data. The cancer researcher is doing the exact same analysis as in FIG. 45 through FIG. 48 except that they have downloaded the data from the external database to cells in their spreadsheet. Therefore, the formula in FIG. 49 4915 and FIG. 50 5043 is identical to the formula 4543 in FIG. 45 except that instead of NSC formulaic data, cell sourced formulaic data is used. The syntax/arguments are unchanged 4513 in FIGS. 49 and 5013 in FIG. 50. Since the data is the same 4967 (cell data) in FIGS. 49 and 4663 (NSC data) in FIG. 46, the results are the same in 4933 (using cell data) in FIG. 49, and 5057 (using cell data) in FIG. 50 as in 4558 (using NSC data) in FIG. 45. The only real difference is the TITLES showing the different formulaic data field names 5036 in FIG. 50 versus 4536 in FIG. 45. The only changes in the automatically done mechanics 5075 (versus those in 4575 in FIG. 45) are the data field names being different and the source of the data, therefore we have not duplicated the detailed steps shown in FIG. 46 through FIG. 48 for the cell sourced formulaic data field names. We showed this example with the TITLES generating the formulaic data field names underlined, as that is the default for this embodiment, realizing they would be the only result difference between the two data sources. In the cell sourced data, the user would then replace the default TITLES with custom titles with the words desired. So, while our technology can be agnostic on its data source delivering the same outcome, it does not mean users might somewhat change what they do based on the data. The same would be true if they did not like the NSC formulaic data field names as the titles. As previously discussed, the beauty of all of this for users of our technology is the formulas are essentially the same across different data sources.

Figure 93:
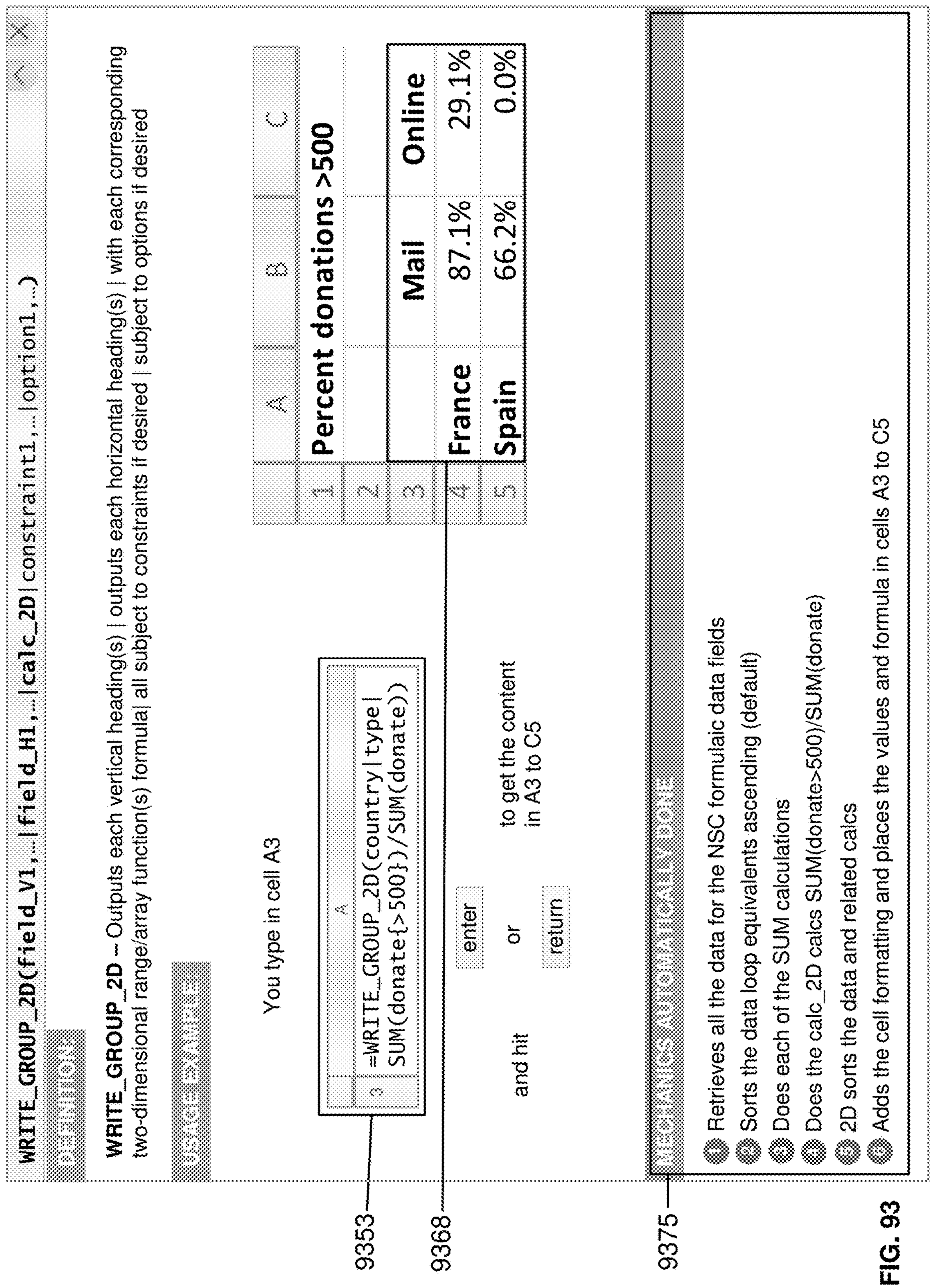
Figure 95:
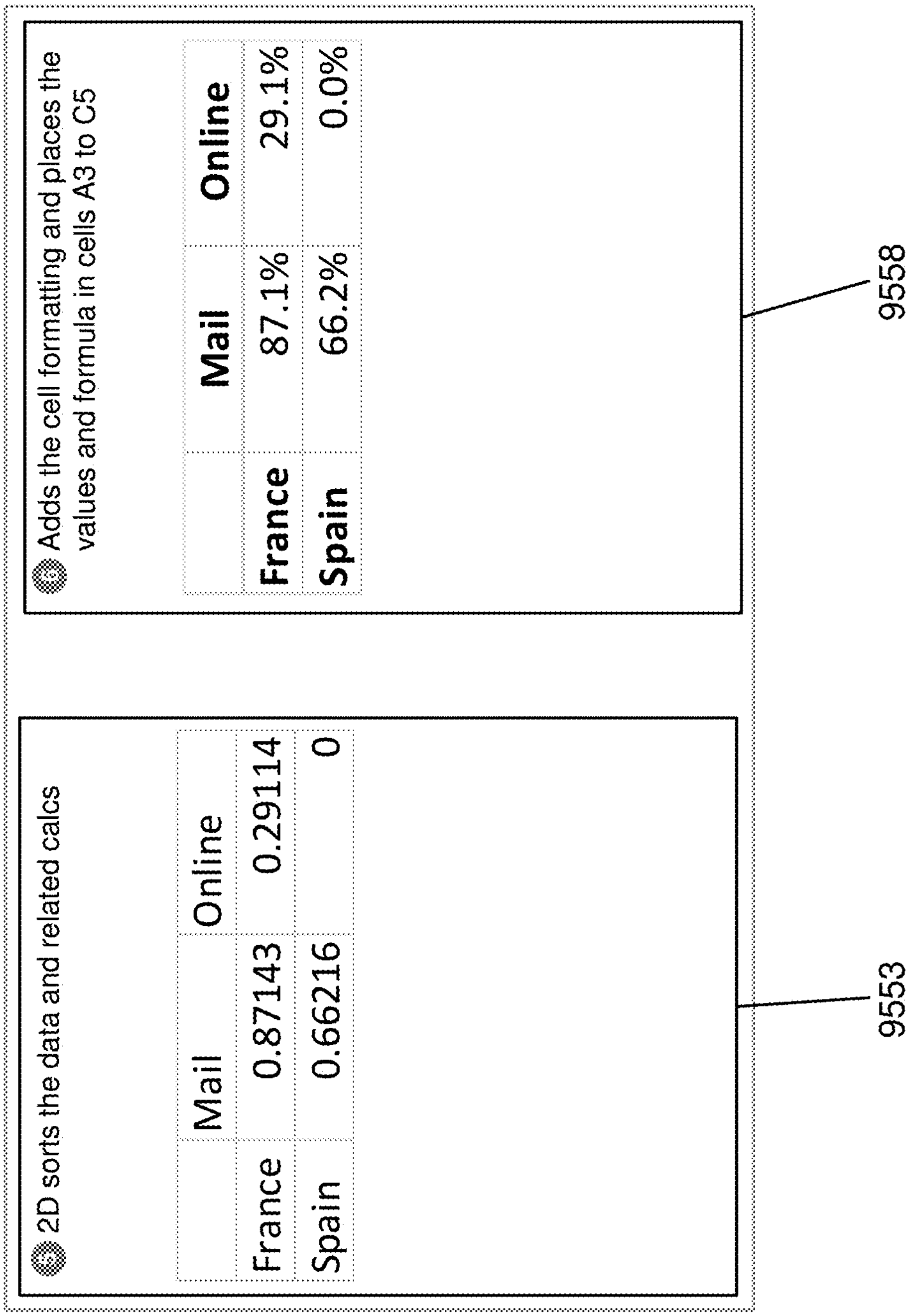

FIG. 93 through FIG. 95 examples our spreadsheet function technology doing two-dimensional group (loop) calculations constraining (filtering) formulaic data values within part of the group equivalent loop calculations. A charity worker in Europe would like to know what fraction of their donations come from donations greater than 500. To do so they write a formula 9353 with a two-dimensional group calculation of:

'SUM(donate{>500})/SUM(donate}'.

Both of the 'donate' summations use the values for the loop equivalents but the numerator eliminates any value of 500 or below as exampled in the calculation 9476 in FIG. 94 while the denominator calculation 9477 uses all of the values 9475. In step four 9458 the division of the numerator by the denominator gives the result 9479. Steps five 9553 and six 9558 in FIG. 95 then 2D organize the data and related calcs and send them with the formatting and formula to cells 'A3' to 'C5' 9368 in FIG. 93.

Our implementations support multiple types of filtering (constraints), for example one or more data field filter that impacts all the function field inputs and then one or more field usage specific filters (constraints) as exampled in the formula below:

=WRITE_GROUP_*2D*(country|type|SUM(donate{>500})/SUM(donate)|date{>'1/1/21')

Where the constraint argument 'date{>'1/1/21'' limits all the 'country' 'type' and 'donate' values to those on or after the date of 1/1/21. Then as exampled in FIG. 93 through FIG. 95 the 'SUM{donate{>500})' calculation further limits the values of 'donate' to over 500 in the numerator of the 'calc_2D' formula. Two separate constraints have been applied, one to all the data (date{>'1/1/21' in the formula above) and another to only one part of the data ('SUM (donate{>500})' in the calculated values).

Figure 112:
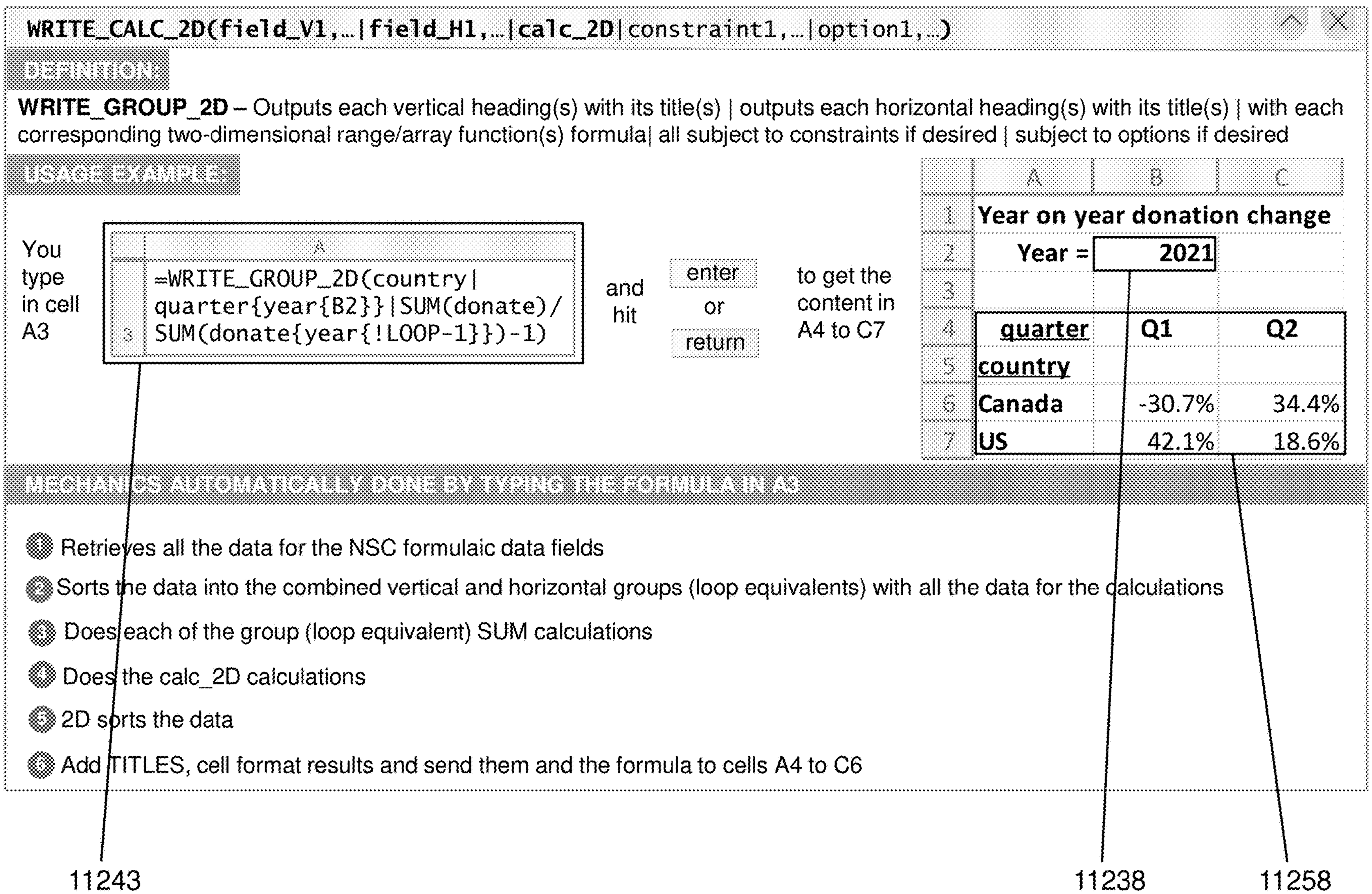
Figure 114:
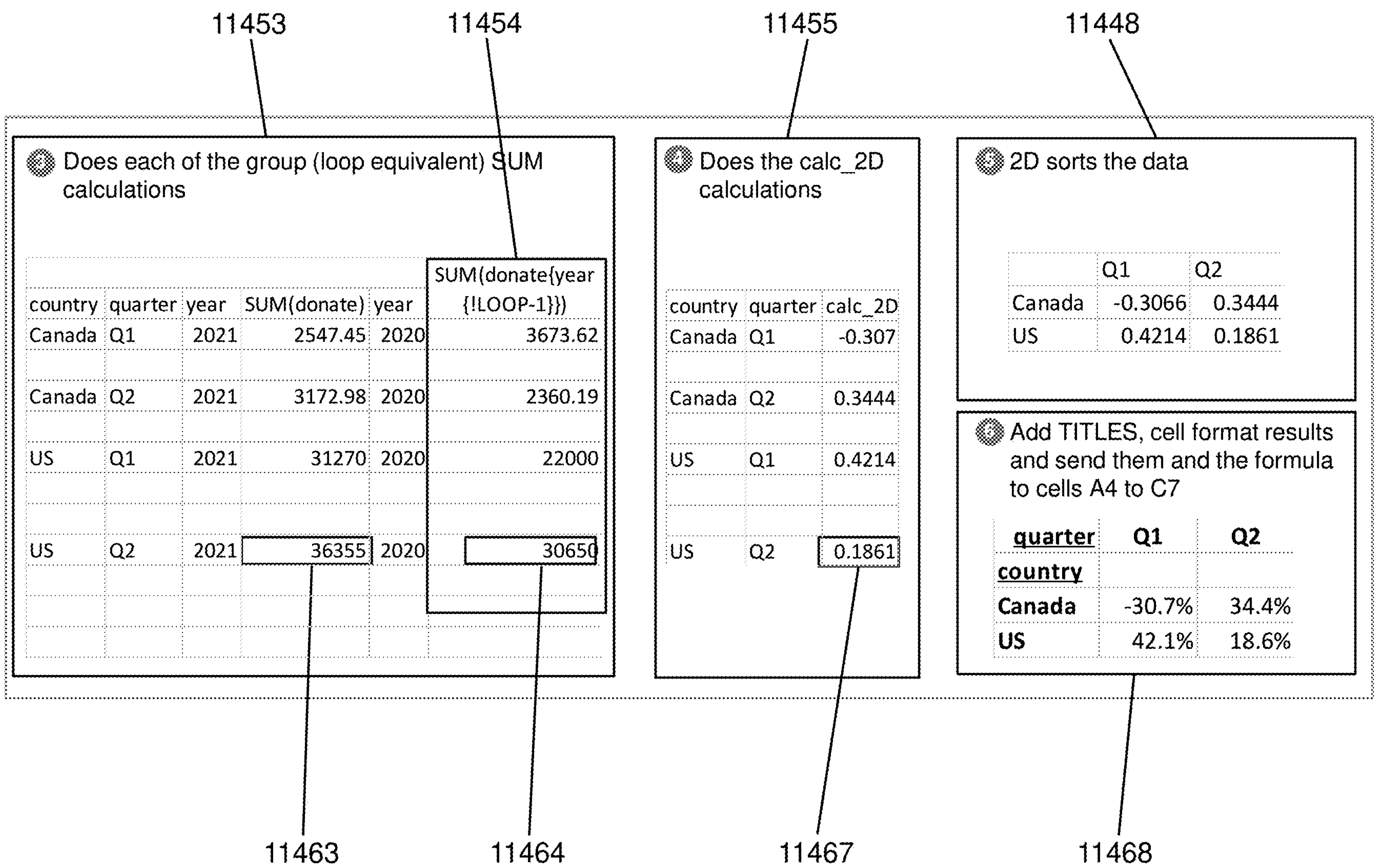

FIG. 112 through FIG. 114 examples our spreadsheet function technology doing two-dimensional group (loop) calculations constraining (filtering) formulaic data values within one of the headings and using a cell reference input and auto generating heading titles. A charity worker in North America would like to know the growth or decline in their donations by country and quarter for this year (2021) versus last year. To do so they write a formula 11243 in FIG. 112:

'=WRITE_GROUP_*2D*
(country|quarter{year{*B*2}}|SUM(donate)/SUM
(donate{year{!LOOP−1}})−1)'

In that formula the vertical heading values are limited to the 'year{B2}' which is '2021' 11238 which means that the groups formed (loop equivalents) will be for that year. This limitation (filter/constraint) is applied by the user because the year '2021' is the only year with a prior year and therefore for which the prior year calculation can be done. By applying the constraint this way the data for the other years has not been filtered away and therefore is available for use in the 'calc_2D' formula and in this situation for the part of the formula 11349 (in FIG. 113) below:

'SUM(donate{year{!LOOP−1}})' which uses the year '2020' that is the !LOOP value of '2021' minus '1'. An example of that calculation is shown in step three 11347 in FIG. 13 for the value '30650' 11359 calculated from summing the values 11355 shown in step two 11344. Our technology automatically takes care of the difference in data in each of the loop equivalents as exampled by the corresponding loop equivalent calculation or '36355' 11358 having more values in its summation of 11354. These calculated values are brought together to complete the 'calc_2D' as shown in FIG. 114 step four 11455 which delivers the value '0.1861' from '36355 (11463)/30650 (11464)−1' completing the calculation of one of the four loop equivalent values. Step five 11448 then 2D sorts the data for step six 11468 to add heading titles (a formula default in this embodiment), formatting and the formula to send to cells A4' to 'C7' 11258 in FIG. 112. Thus, we have exampled that our technology supports user to constraining (filtering) any field, combinations of fields, results or combinations of each of them.

Figure 51:
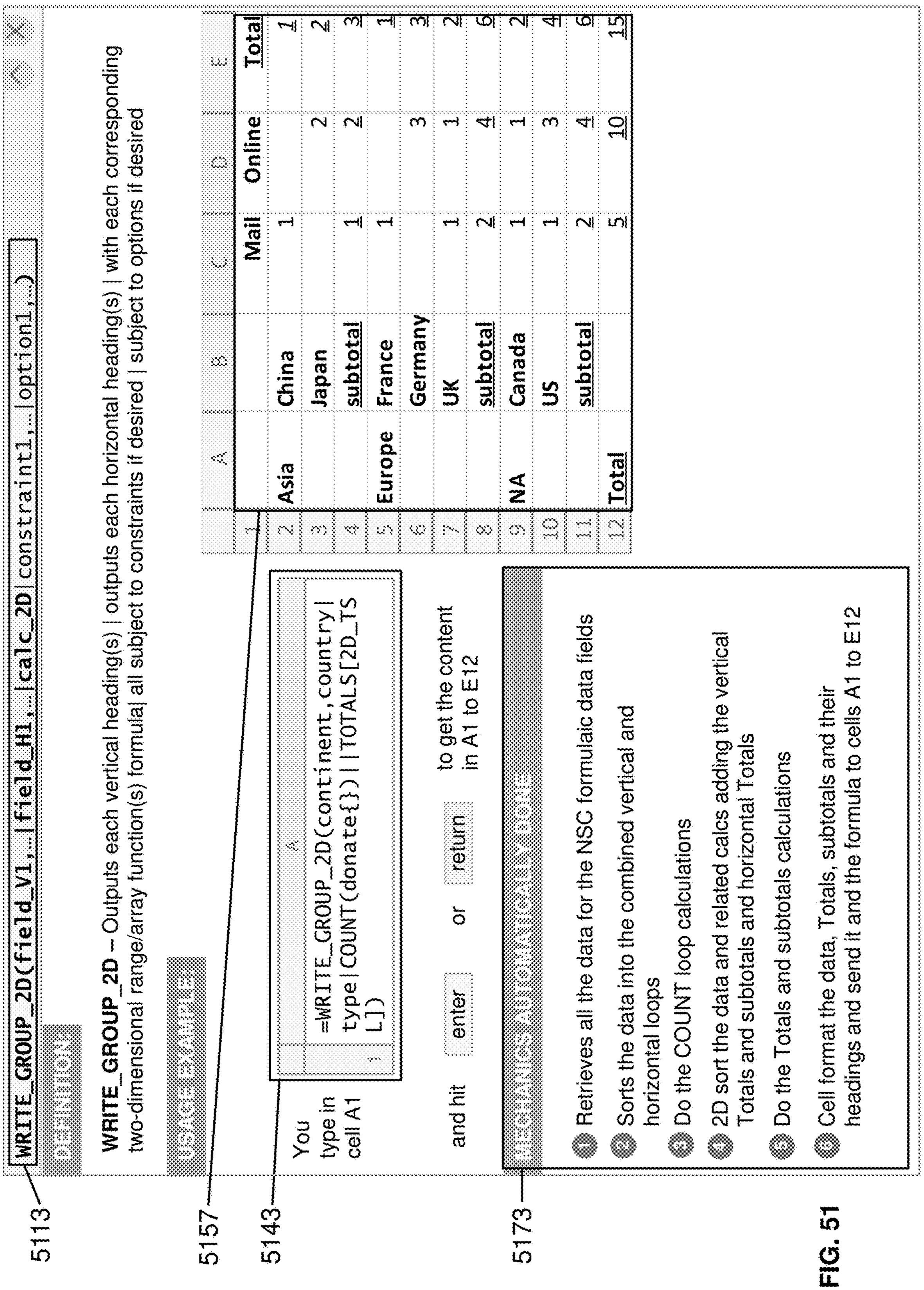
Figure 53:
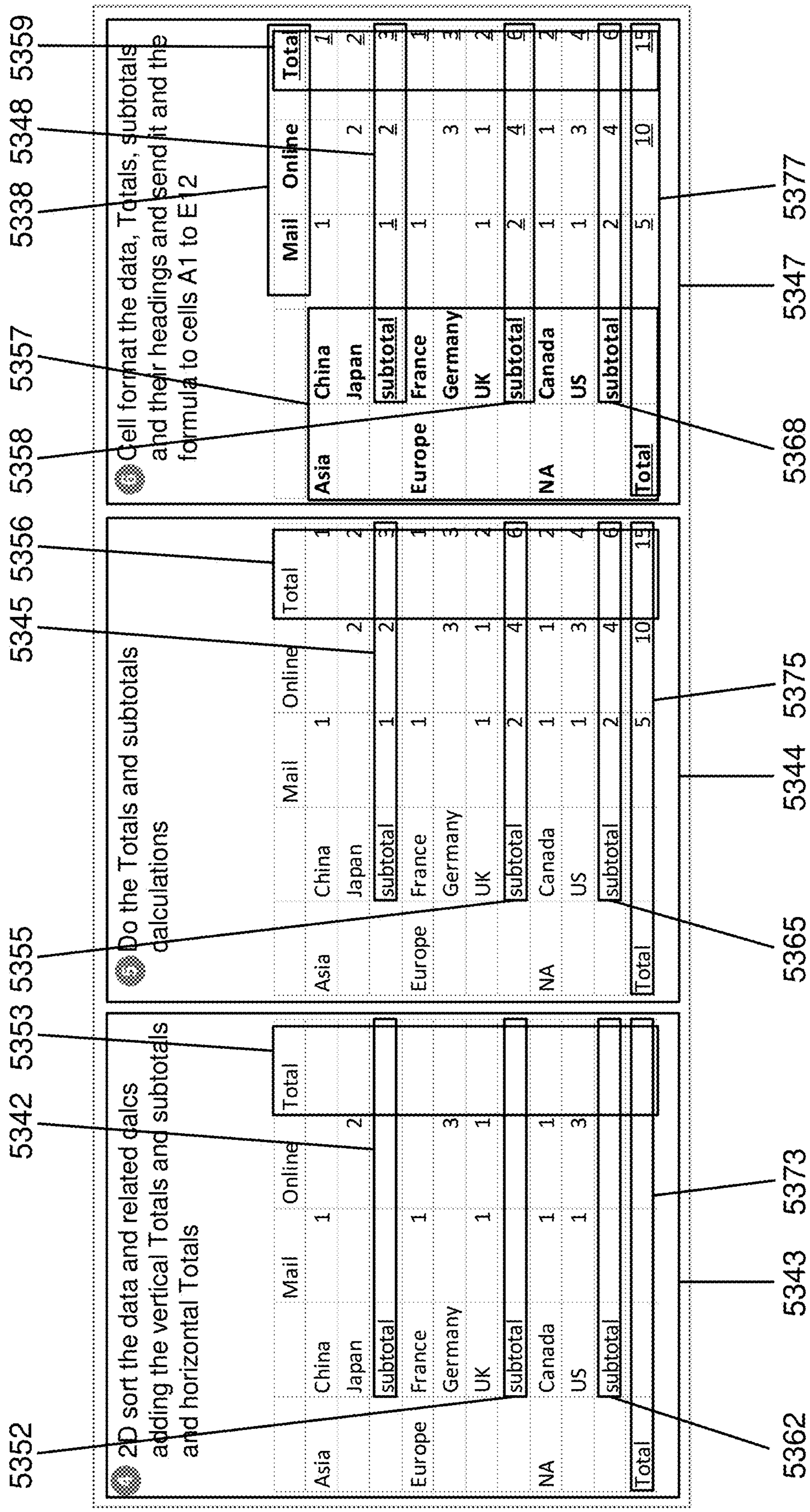
Figure 54:
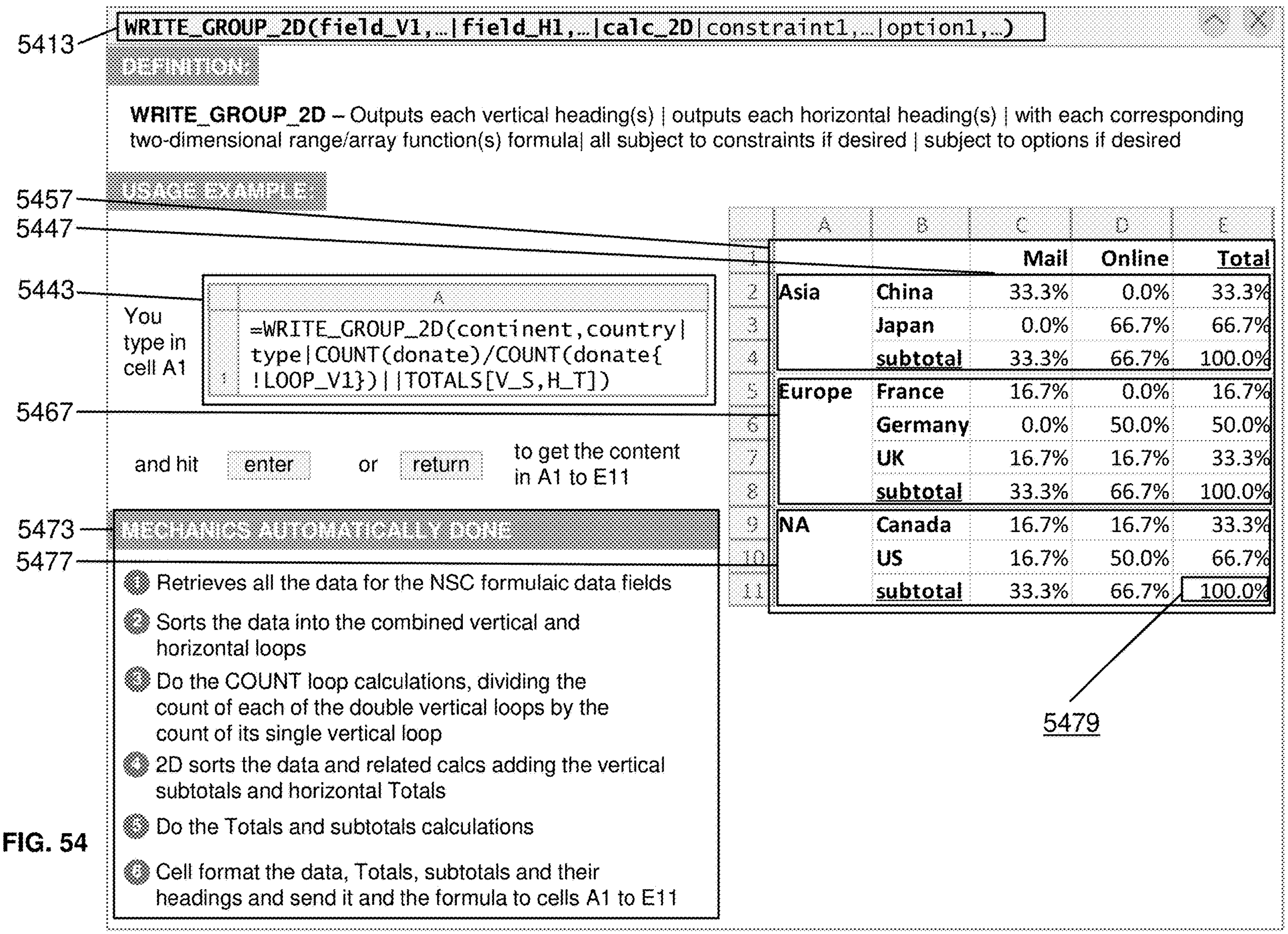

FIG. 51 through FIG. 53 examples our spreadsheet function technology doing two-dimensional group (loop) calculations with compound headings having totals and subtotals. In this example our global charity user wants to present a continent and county by type (Mail or Online) layout of the counts of donations. As discussed with the other two-dimensional variants totals and subtotals can be applied via an option or other mode of the function. In this example an option is used in the formula 5143 with the term 'TOTALS [2D_TSL]' which applies the totals ('T') and subtotals ('S'), where appropriate, last ('L') for both dimensions ('2D'). The automatically done steps 5173 shown in FIG. 51 retrieve the data in step one 5252 (in FIG. 52) then sort it into the two-dimensional loop equivalents in step two 5255 before doing the loop COUNT calculations 5269 in step three 5258 as exampled for the 'Asia; 'Japan' 'Online' combination in 5238 and 5235 to give the 'calc_2D' result of '2' 5239. FIG. 53 step four 5343 then two-dimensionally sorts the data and adds the vertical total 5373 and subtotal rows 5342, 5352 and 5362. Our technology, as previously described, then adds the horizontal total column 5353 and realizes because the horizontal heading is not a compound (nested) heading there are no subtotals to be added. Step five 5344 then does the calculations for the vertical total 5375 and subtotals 5345, 5355 and 5365 and the calculation for the horizontal total 5356. In this example step six then does the cell formatting of the content bolding the headings 5338 and 5357, also doing special underlining of the totals 5359 and 5377 as well as the subtotals 5348, 5358 and 5368 before sending this and the formula to the cells 'A1' to 'E12' 5157 in FIG. 51. There are other Total and Subtotal variants, as exampled previously, and other ways to do them (e.g., grouping the totals and subtotals together then all the values) all of which our technology can support. This example uses the COUNT function, and our technology supports a broad spectrum of range and array functions exampled in FIG. 78. Our technology also supports using more than one function in the two-dimensional calculations, as exampled in FIG. 45, and supports using multiple different range or array functions in those calculations.

FIG. 54 through FIG. 57 examples our spreadsheet function technology doing two-dimensional group (loop) calculations where the range or array functions in the looped calculations use different loop values (i.e., different loops). In this example the global charity user wants to compare the percentage of donations by type totalled to 100% for each continent, comparing the mix of contributions as if they were comparing across three continent specific pivot tables. This allows users to effectively create pivot tables within pivot tables where different sections of the pivot table create their own analysis. This is exampled in the results 5457 in FIG. 54 where each of the continents ('Asia' 5447, 'Europe' 5467 and 'NA' 5477) are showing analyses that subtotal/total to 100% (e.g., 5479) for their 'continent' specific 'country' and 'type' two-dimensional combinations. This allows users with the ease of writing a single formula to create the equivalent of three Pivot tables in this example. This is accomplished in the formula 5443 by our technology supporting loop calculations in the same 'calc_2D' formula using different loops. In this embodiment that is accomplished by a user being able to specify the loop they would like to use for a particular calculation. In the two-dimensional calculation input 'calc_2D' the user has inputted:

COUNT(donate)/COUNT(donate{!LOOP_*V*1})

where the 'donate' with no curly brackets uses the combination loop values but the 'donate{!LOOP_V1}' which has curly brackets with a loop specifier in them uses that specified loop. In this example '!LOOP_V1' specifies using the first vertical loop. In this example that results in the subtotal/total equalling '100.0%' (e.g., 5479) for each of the continents—'Asia' 5447, 'Europe' 5467 and 'NA' 5477. The automatically done calculations that delivers these values are shown in FIG. 55 steps two 5555 and three 5558 where the calculation for 'Asia' 'Japan' 'Online' '0.666666667' 5548 divides the COUNT(donate) value of 2 (from counting the two 'donate' values in 5545) by the COUNT (donate{!LOOP_V1}) value of 3 (from counting the 'donate' values in 5535) to arrive at the '0.666666667' value. Each of the calculations is done that way arriving at the values in 5569.

Figure 56:
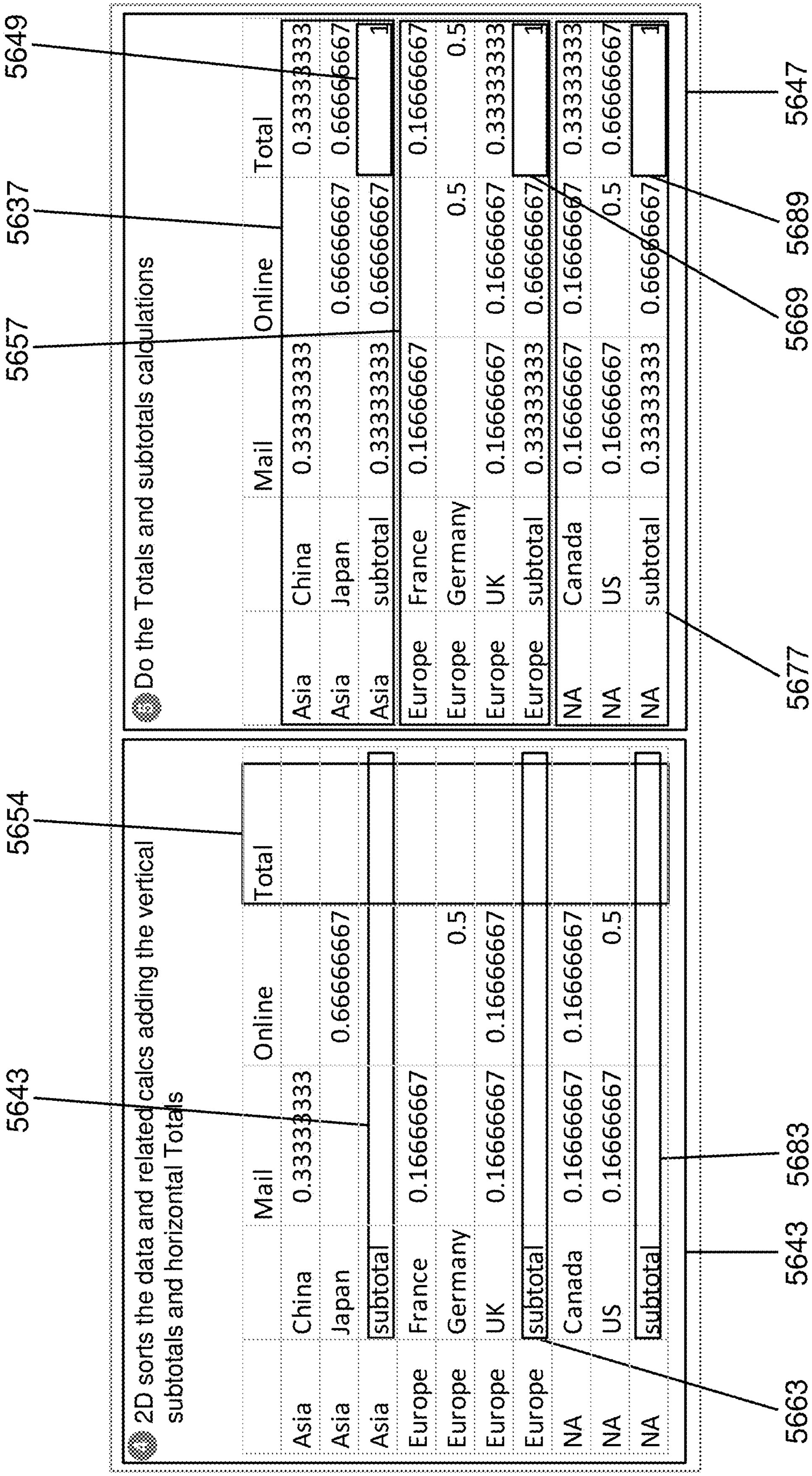
Figure 57:
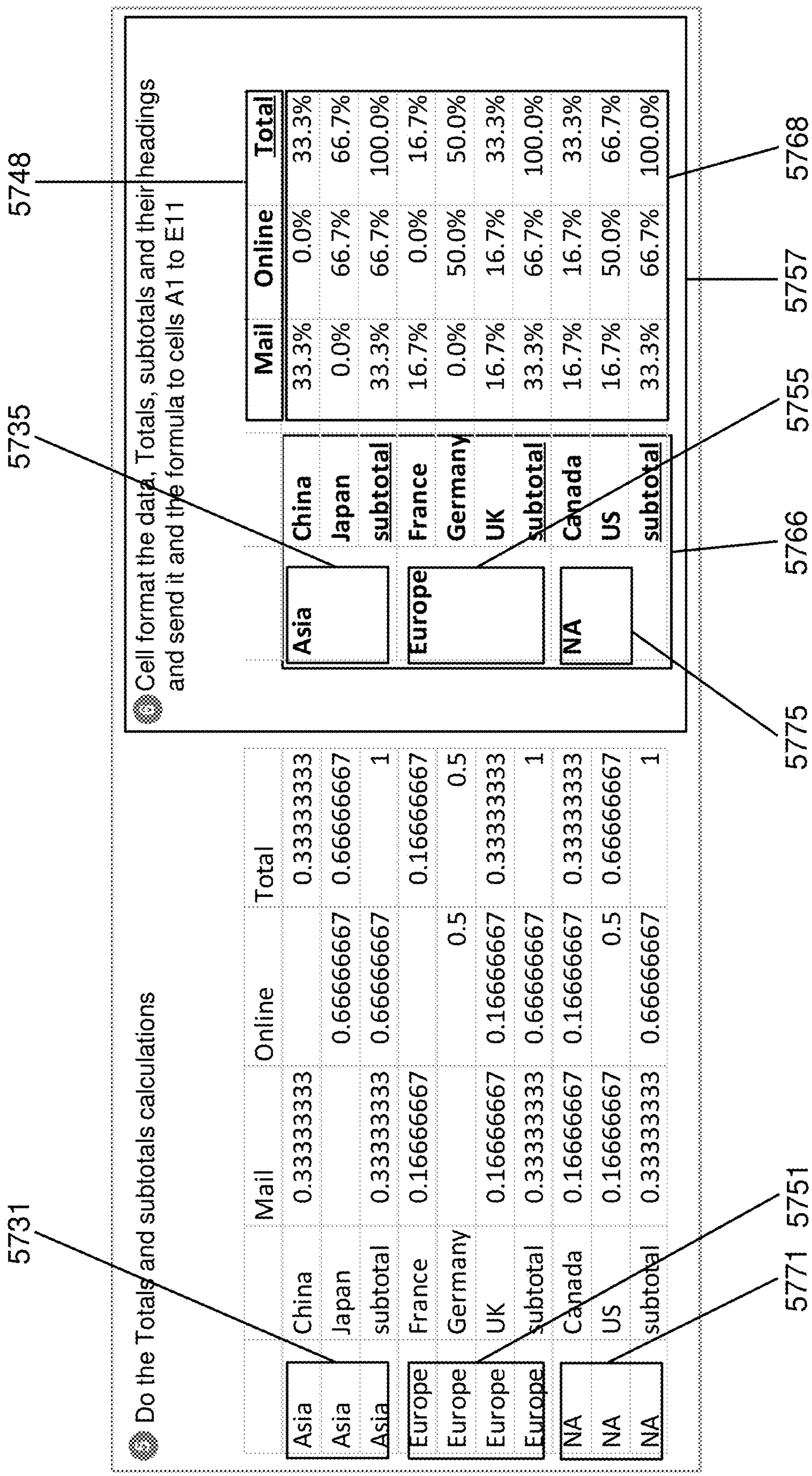

FIG. 56 then adds the vertical subtotals ('V_S') 5643, 5663 and 5683 and the horizontal totals ('H_T') 5654 lines from the option1 input of 'TOTALS[V_S,H_T]'. Step five 5647 then calculates all the totals and subtotals delivering the three pivot table equivalents 5637, 5657 and 5677 each totalling out in this example to '1' 5649, 5669 and 5689. In this embodiment our technology replaces the repetitive headings with a single value as shown in FIG. 57 for 'Asia' 5535 (versus 5731), 'Europe' 5755 (versus 5751), and 'NA' 5775 (versus 5771). Step six 5757 in FIG. 57 then adds the cell and other formatting and then sends the that and the formula to cells 'A1' to 'E11' 5457 in FIG. 54.

FIG. 81 through FIG. 84 examples our spreadsheet function technology doing two-dimensional group (loop) calculations where the range or array functions evaluating the loops use different loops. In this example the global charity user wants to create four pivot table equivalents spanning both axes. This version uses a version of our multi-LOOP syntax exampling a situation where the user effectively creates pivot tables within pivot tables on each axis where the different sections of the pivot table create their own analysis. This is exampled in the results 8157 in FIG. 81 where each of the 'continents' ('Europe' and 'NA') are showing analyses for each of the 'from' ('Individual' and 'Institute') combinations 8146, 8166, 8148 and 8168 that subtotal/subtotal to 100% for each two-dimensional combination. This allows users with the ease of writing a single formula to create four Pivot table equivalents in this example. This is accomplished in the formula 8143 by our technology supporting loop calculations in the same formula using different loops. In this embodiment that is accomplished by a user being able to specify the horizontal and vertical loop values they would like to use for a particular calculation. In the two-dimensional calculation input 'calc_2D' the user has inputted:

COUNT(donate)/COUNT(donate{!LOOP_*V*1,!LOOP_*H*1})

where the 'donate' with no curly brackets uses the full combination loop values but the 'donate{!LOOP_V1,!LOOP_H1}' which has curly brackets with two loop specifiers uses only the combination loop values specified In this example combining the first vertical loop '!LOOP_V1' with the first horizontal loop 'LOOP_H2'. This is exampled in FIG. 83 for the calculation of the value '7' 8324 which does the COUNT of the seven 'donate' values in the 'Europe' ('LOOP_V1') and 'Individual'('LOOP_V1') combination shown in 8247 in FIG. 82 and outlined in 8344 in FIG. 83. As contrasted by the 'COUNT(donate)' value '4' 8323 which uses all four of the loop equivalent values thereby doing the COUNT of four 'Europe' 'Individual' 'Germany' 'Online' 'donate' values shown in 8237 in FIG. 82 and outlined in 8334 in FIG. 83. The division of the '4' 8323 by the '7' 8324 gives the loop equivalent calculated result '0.571428571' 8329. The additional loop equivalent calculations are exampled in step four 8358 using the calculated numerator and denominator values in step three 8354. These calculations were preceded by step one 8253 retrieving the data and step two 8257 sorting the data in a slightly different order to make more visually obvious the loop combination of the first vertical and first horizontal loops 'LOOP_V1,!LOOP_H1}'.

Figure 84:
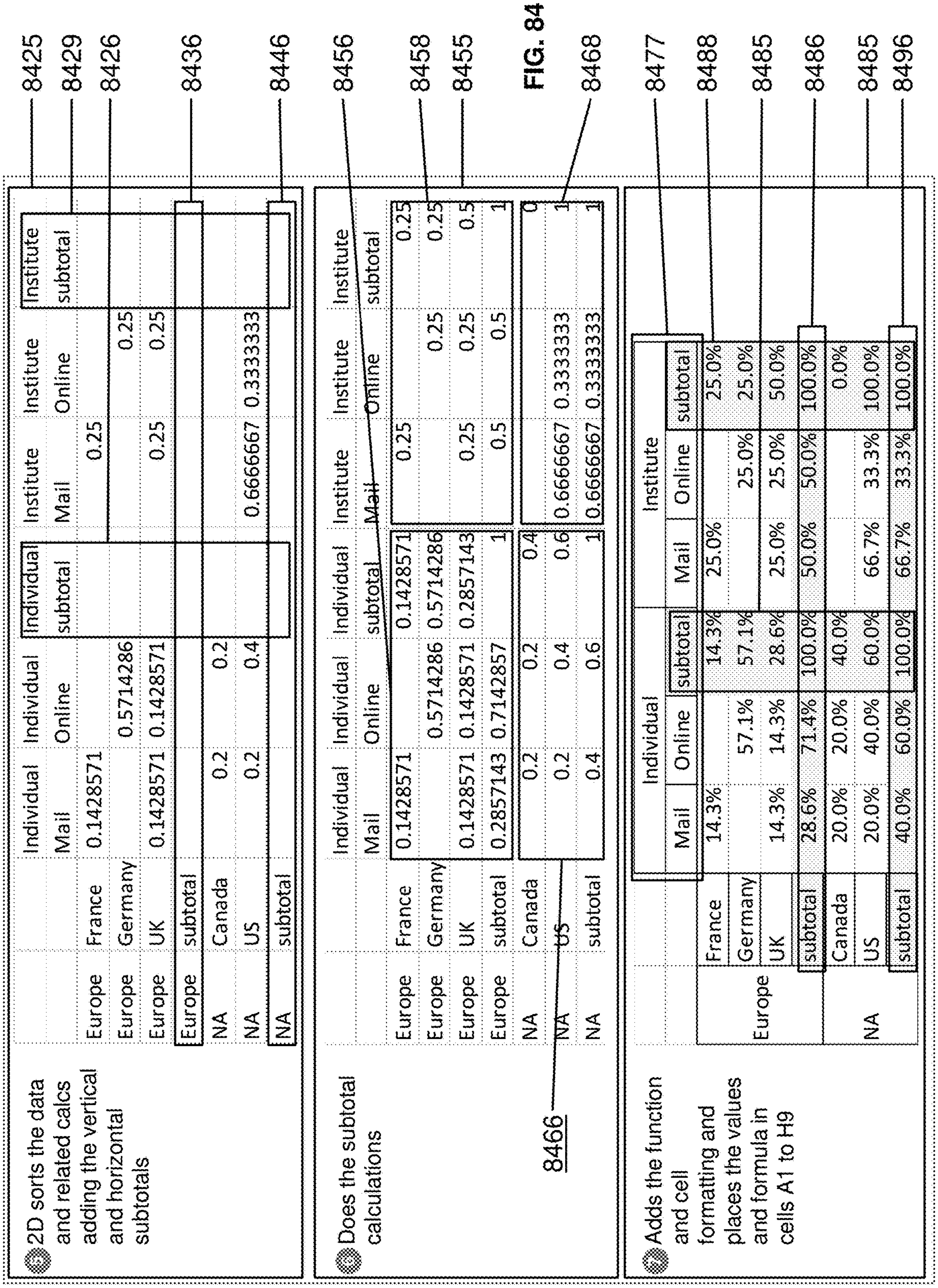

FIG. 84 step five 8425 then examples the two-dimensional sorting of the data headings and related calculations as well as the insertion of the subtotal lines 8426, 8429, 8436 and 8446. Step six 8455 examples the subtotal calculations resulting in the four different analyses 8456, 8458, 8466 and 8468 each with a subtotal/subtotal of '1'. Step seven 8485 then adds the function and cell formatting and places the values with the formula in cells 'A1' to 'H9' 8157 in FIG. 81. It examples a more elaborate automatic function formatting with outlines for the headings (e.g., 8477), collapsing of the Multiple headings (e.g., 'Individual' not 'Individual' 'Individual' 'Individual'), centering of the horizontal headings (e.g., 8477) and accenting of the subtotals (e.g., the gray shading 8488 and 8485). Demonstrating how our technology can allow users to easily do more sophisticated multi-part analyses with our functional formulas and also automatically get more highly formatted results. None of which can be done with done with existing Pivot Tables. This capability of our technology to use different loops in different terms of the 'calc_2D' formula allows users to do many different types of calculations not possible in any existing spreadsheet pivot tables or functions.

FIG. 58 through FIG. 61 examples our spreadsheet function technology doing two-dimensional group (loop) calculations where one range or array function does not use loop values. In this example the global charity user wants to see the donation count for each of their desired combinations as a percentage of the total donation count, but it could have been relative to some value not within any of the loops. This allows users to further broaden the range of analyses they can do with our two-dimensional group (loop) calculation functions with small changes to the functional formulas. In our technology this can be done with no change to the function syntax/arguments as shown by no changes relative to the preceding WRITE_GROUP_2D syntax/arguments 8113 (in FIG. 81), 7713 (in FIG. 77), 5813 (in FIG. 58), 5413 (in FIG. 54), 5113 (in FIG. 51), 5013 (in FIG. 50), 4513 (in FIG. 45), and 4413 (in FIG. 44) as well as the ones that follow.

Figure 58:
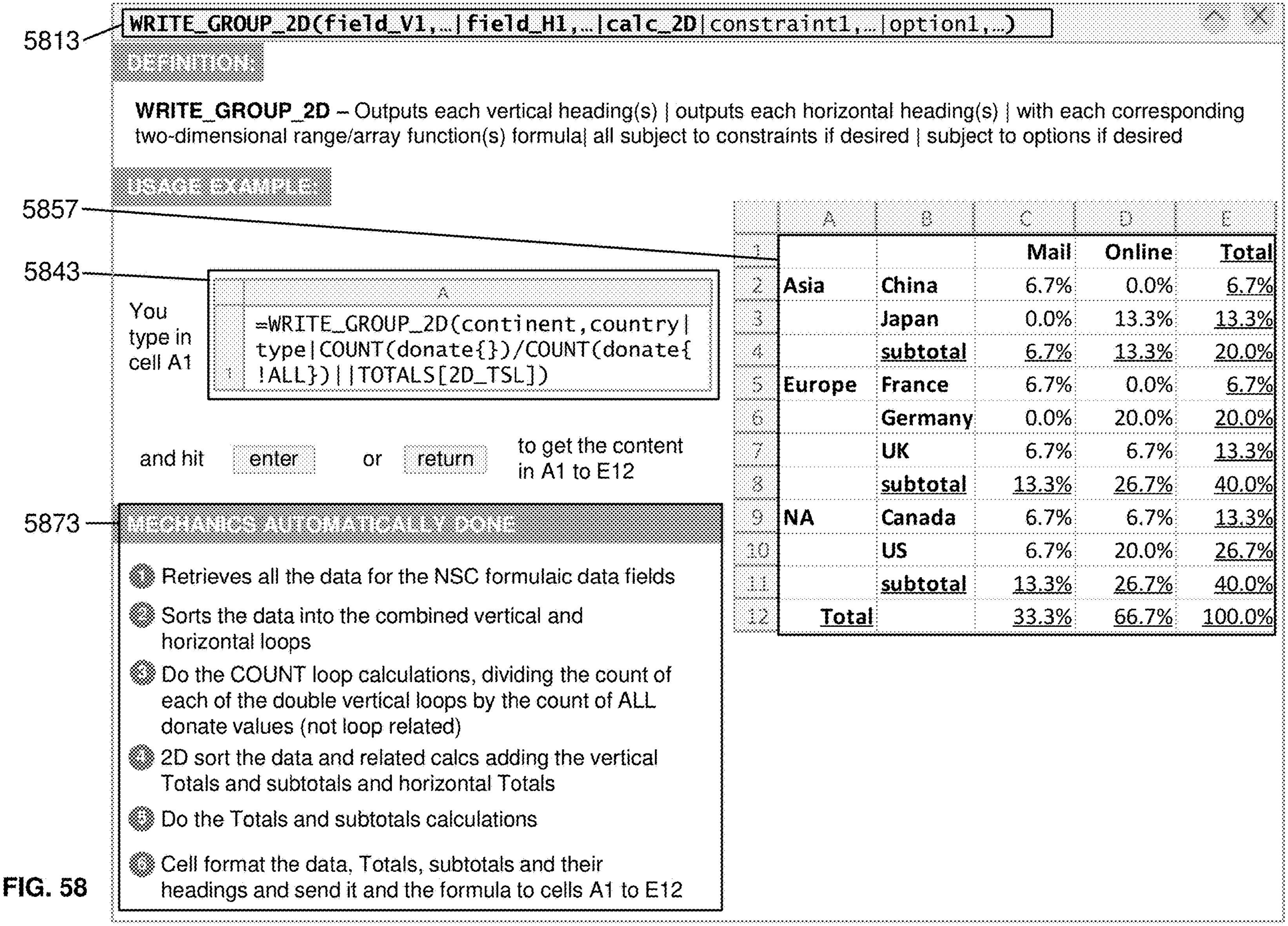
Figure 62:
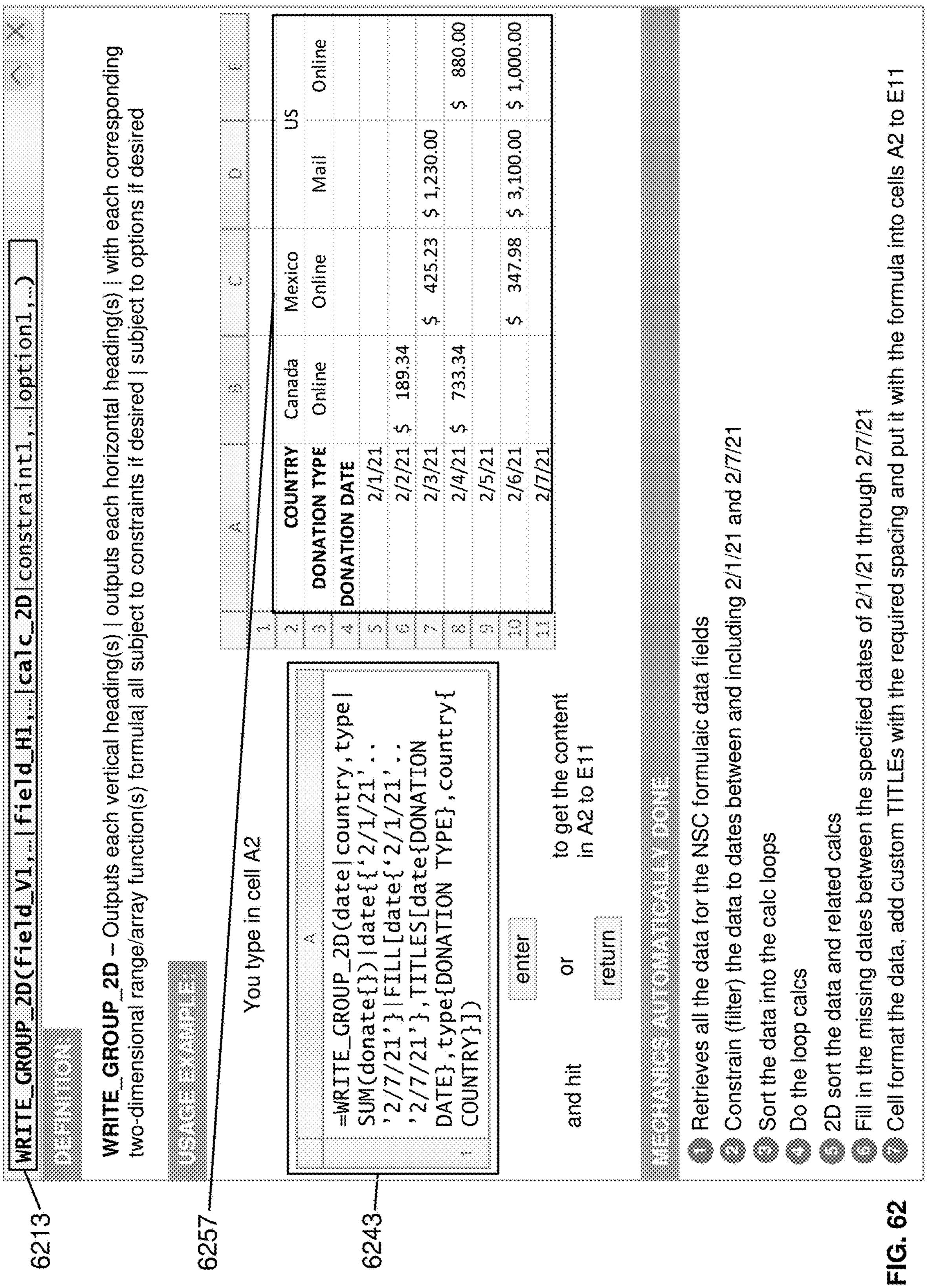
Figure 65:
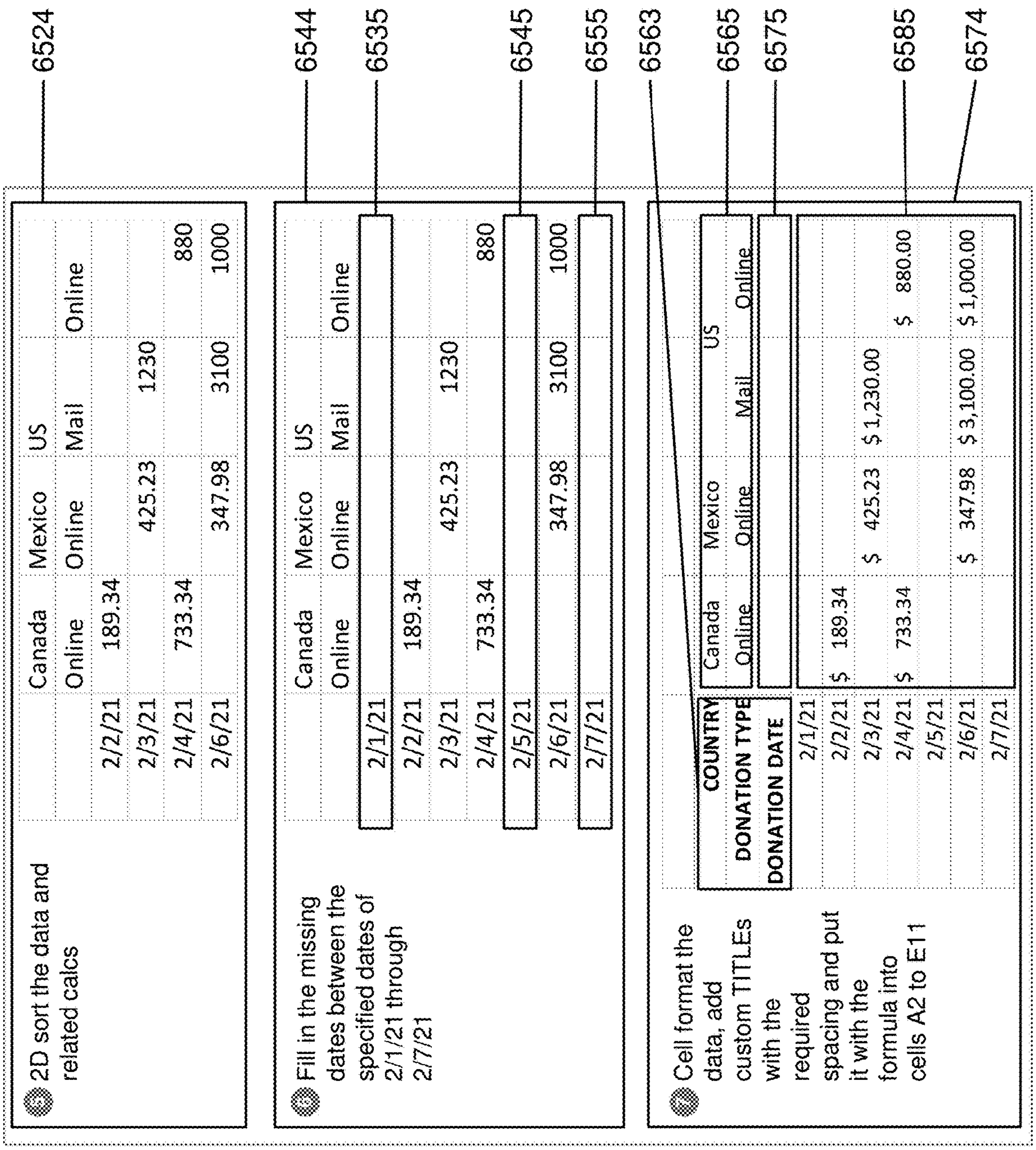
Figure 66:
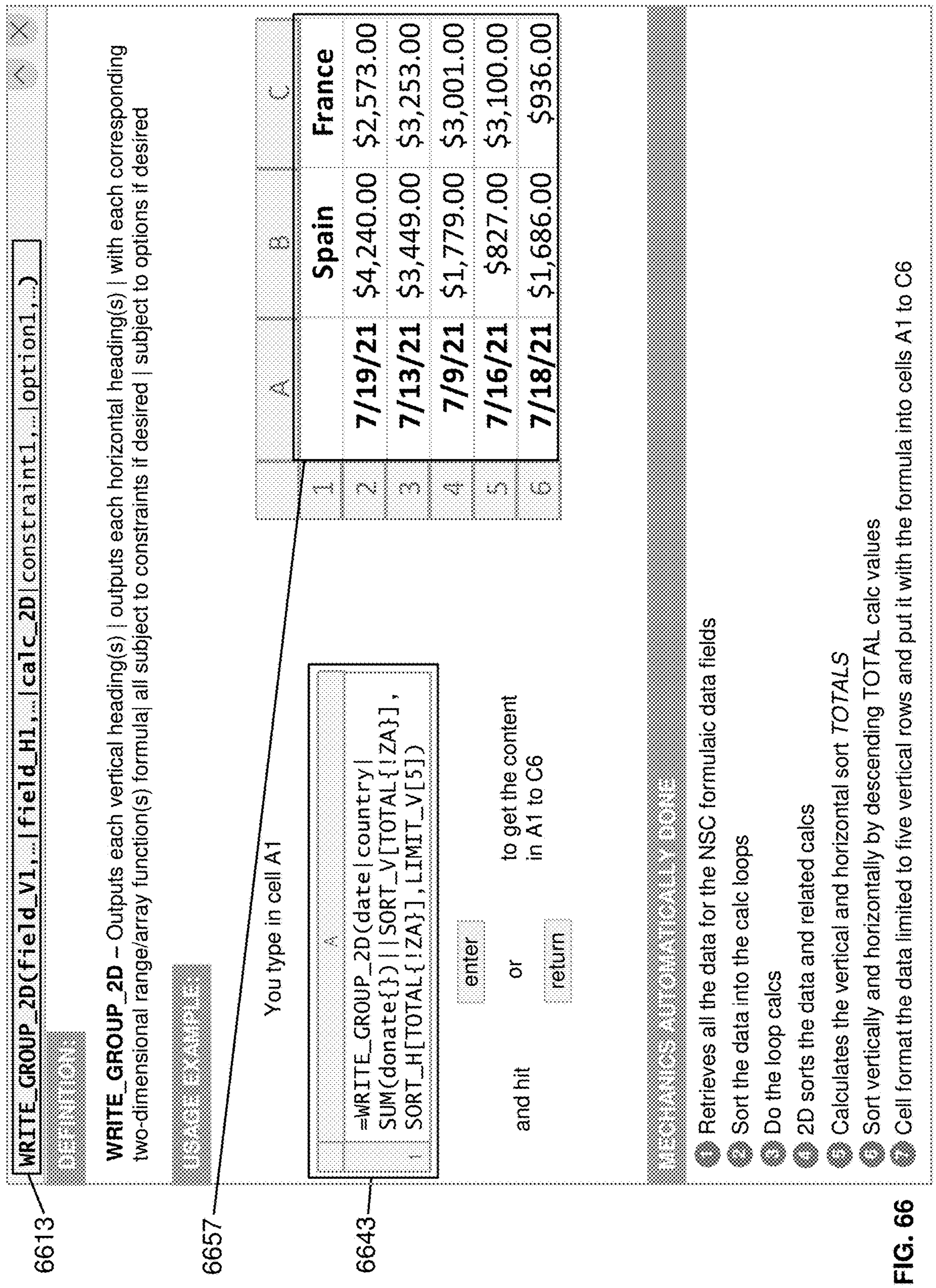

In this example the COUNT function in the two-dimensional calculation formula argument of the inputted formula 5843 in FIG. 58:

COUNT(donate)/COUNT(donate{!ALL})

not using a loop value instead uses one of our formulaic data selectors (retrievers) which is '!ALL'. That retrieves and uses all the values for the specified field so that the exampled calculation in FIG. 59 5948 divides the COUNT of two 'donate' values for the loop of 'Asia' 'Japan' 'Online' 5945 by the COUNT of all the 'donate' values 5966 (which is not one of the loops) that is fifteen to get the value '0.133333333' shown in 5948. That calculation is then replicated for all the calculations as shown in 5969 of step three 5958. FIG. 60 then examples the two-dimensional sorting, adding of the totals and subtotals and their calculations in steps four 6063 and five 6067 like previous discussions. And FIG. 61 examples the formatting and sending the results and the formula to the cells 'A1' to 'E12' 5857 in FIG. 58.

The ability to use any range or array function in these two-dimensional loop calculations expands dramatically the range of problems that can be solved. Our technology also supports non-range or non-array functions used in our two-dimensional calculation WRITE group (loop) functions. Thereby giving user tremendous flexibility to include the functions of their choice.

FIG. 62 through FIG. 65 examples our spreadsheet function technology doing two-dimensional group (loop) calculations supporting date filling and custom heading title creation. In this example the charity user wants to see donations for a specific week, day by day and wants to see every day not just the days with a donation. They therefore write a functional formula 6243 in FIG. 62 that constrains the data to that specific week and fills any days without donations during that week. Step one 6343 and step two 6347 in FIG. 63 retrieve the data and constrain (filter) the data removing 6324 and 6384 with dates not between and including 2/1/21 and 2/7/21 as per the formula 6243 constraint input of 'date{'2/1/21' . . . '2/7/21'}'. Step three 6453 in FIG. 64 then sorts the data into the calc loops and step four 6457 then does the loop calculations. Step five 6524 in FIG. 65 then two-dimensionally sorts the data and related calcs. Step six 6544 fills the dates '2/1/21' 6535, '2/5/21' 6545 and '2/7/21' 6555 without donations per the formula 6243 option input of 'FILL[date{'2/1/21' . . . '2/7/21'}]'. Step seven 6574 then adds the custom titles 6563 per the formula 6243 option input of 'TITLES[date{DONATION DATE},type{DONATION TYPE},country{COUNTRY}]'. Adding the appropriate spacing 6575 to accommodate the row heading title then adding the cell formatting 6565 and 6585 and returning all of this with the formula to the cells 'A2' to 'E11' 6257 in FIG. 62. Thereby, exampling variants of the previously described capabilities for the other functions (WRITE_2D and WRITE_CALC_2D) in the two-dimensional group (loop) WRITE calculation function (as variants described in this section also apply to one or both of the other two-dimensional functions).

FIG. 66 through FIG. 69 examples our spreadsheet function technology doing two-dimensional group (loop) calculations supporting calculated sorting and output limitation. In this example the charity user wants to see the five highest total donation days for Spain and France presenting the country column first that has the most donations. To do so they write the function formula 6643 in FIG. 66:

=WRITE_GROUP_*2D*(date|country|SUM(donate)
||SORT_*V*[TOTAL{!*ZA*}],SORT_*H*
[TOTAL{!*ZA*}],LIMIT[5])

Figure 68:
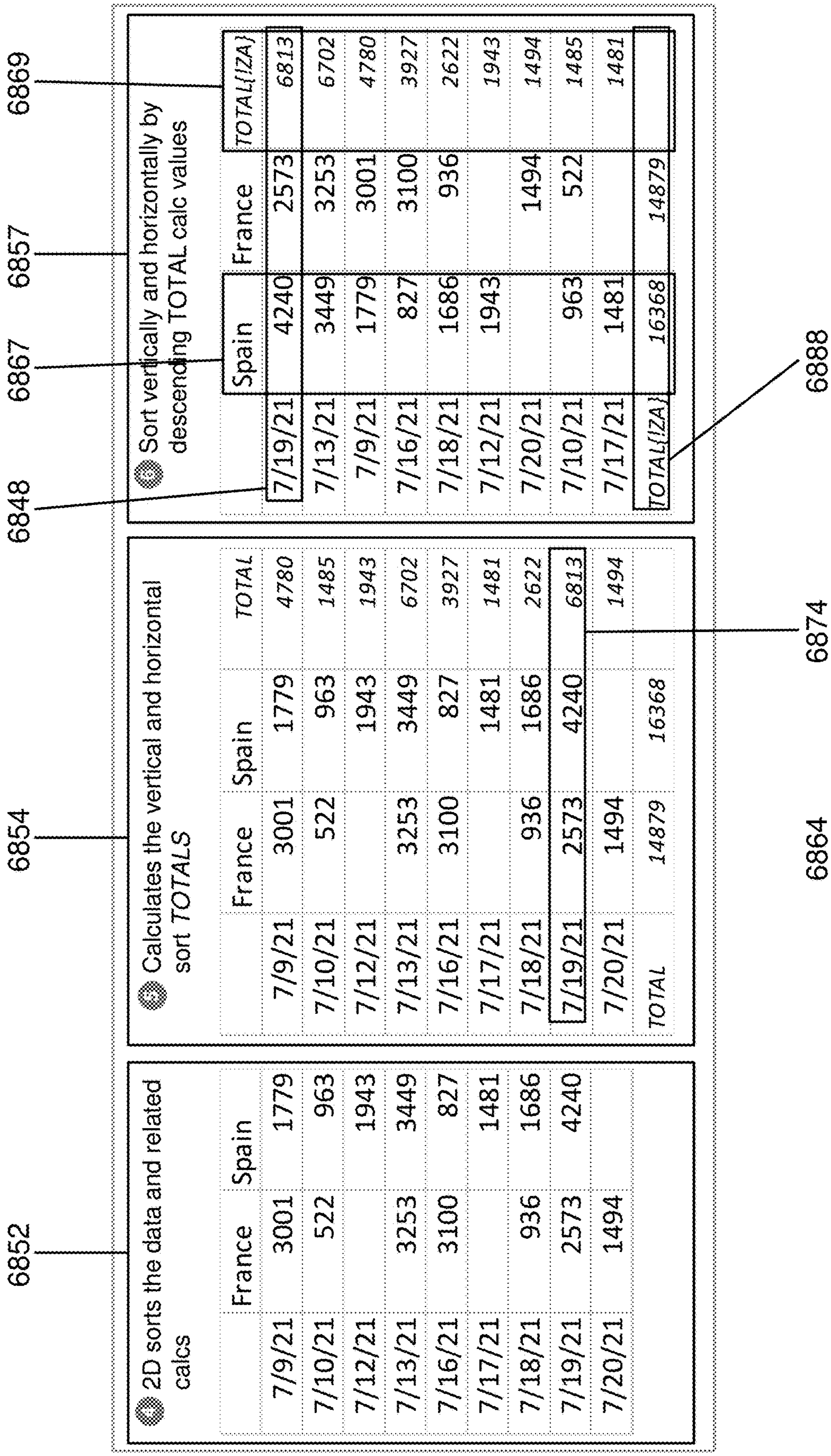
Figure 69:
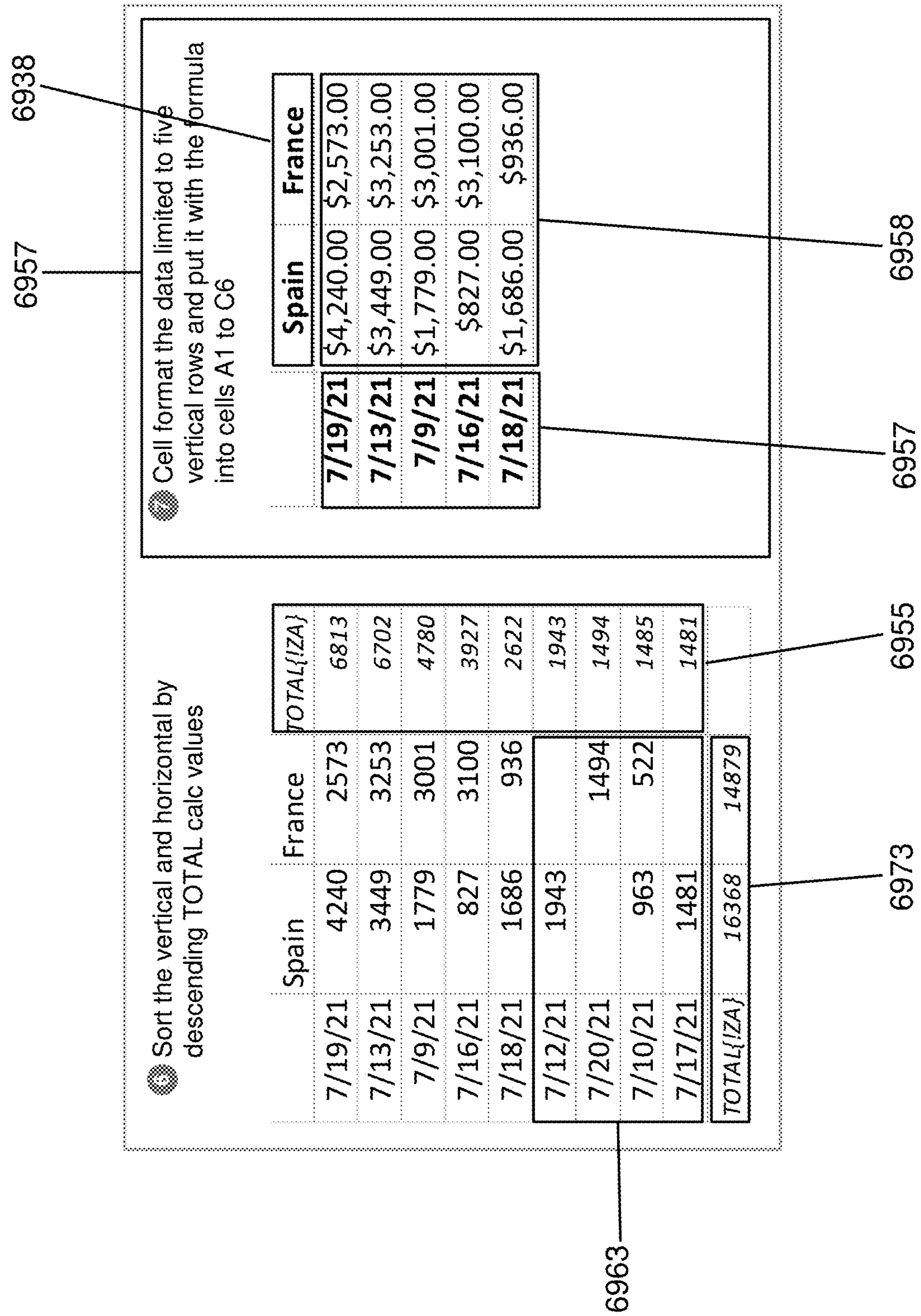

Step one 6753, step two 6755 and step three 6758 in FIG. 67 of the automatically done steps retrieves the formulaic data, sorts it into calc loops and does the loop calculations (as exampled for the first loop 6727). In FIG. 68 step four 6852 two-dimensionally sorts the data and calculations whereupon step five 6854 calculates the vertical and horizontal sort TOTALS (summing values). Step six 6857 then uses those sort TOTAL values to descending sort vertically 6869 and horizontally 6888 as per the formula 6643 option input of 'SORT_V[TOTAL{!ZA}], SORT_H[TOTAL{!ZA}]'. Thereby moving the date '7/19/12' to the top row 6848 (from 6874) and moving 'Spain' to the first column 6867. Step seven 6957 in FIG. 69 then removes the TOTAL values 6955 and 6973 which were only for sorting purposes, adds the cell formatting and LIMITS the vertical output to five rows per the formula 6643 option input of 'LIMIT_V[5] removing the additional rows 6963. After adding the cell formatting 6938, 6957 and 6958 it then sends the values with the formula to cells 'A1' to 'C6' 6657 in FIG. 66.

Figure 70:
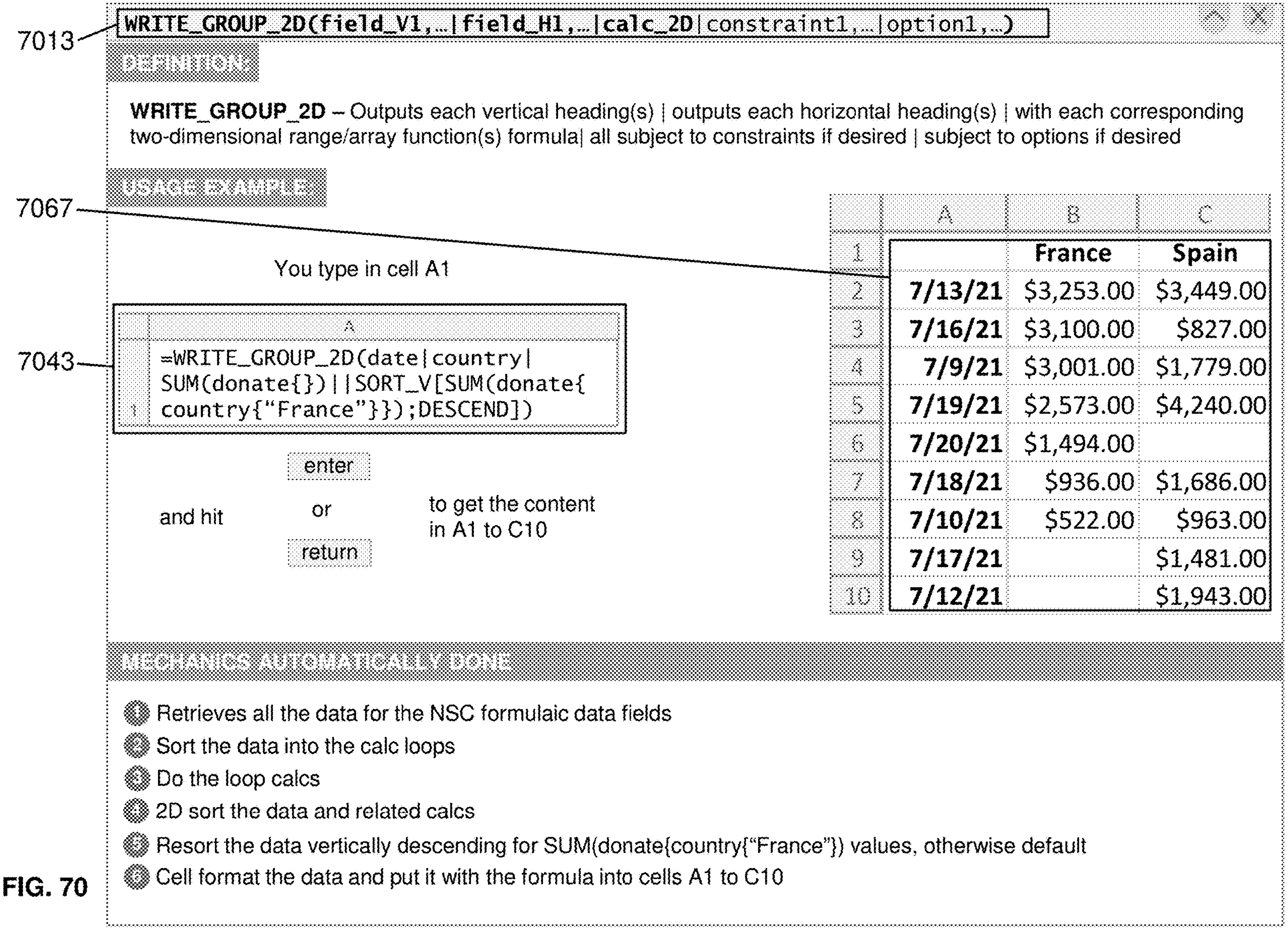
Figure 73:
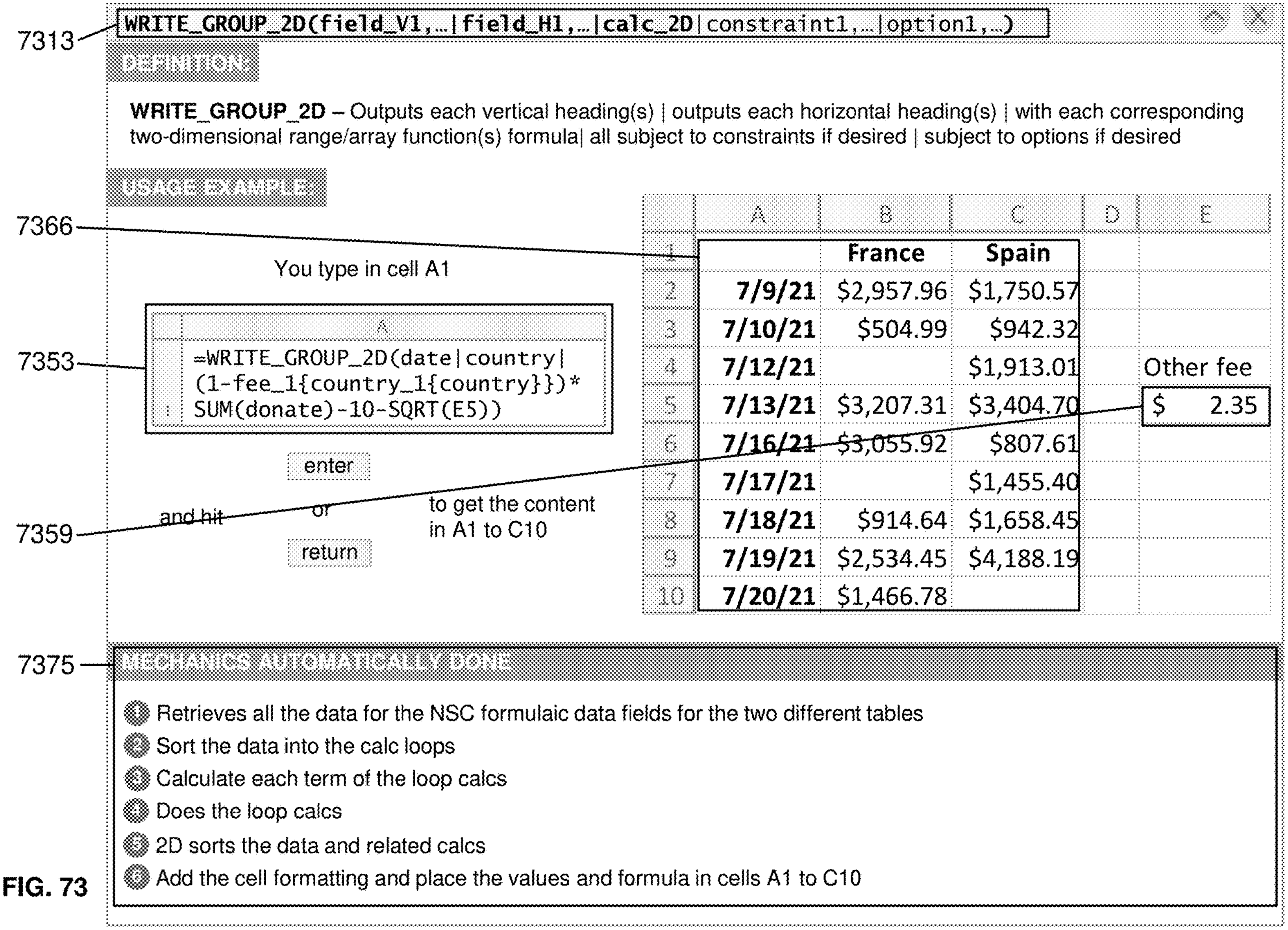

FIG. 70 through FIG. 72 examples our spreadsheet function technology doing two-dimensional group (loop) calculations supporting sorting by the calc_2D values. The charity worker doing the previous analysis changed their mind and decided to sort the values in descending order based of France daily donations. This sorting of the calculated values capability can be applied to rows or columns and all our variants of two-dimensional functions. In the loop variant it involves sorting loop calculations, in the algebraic variant it involves sorting algebraic formula results and in the data organization two-dimensional function variant it involves sorting data values. In this embodiment the capability is triggered by an option input, however other methods of triggering the capability would also work.

In this example the user wants to sort the two-dimensional results vertically by descending group (loop) calculation values for the country France. In FIG. 70 they input the formula 7043 with an option term 'SORT_*V*[SUM(donate{country{"France"}});DE-
SCEND]' which tells our technology how to sort. There are many other ways to accomplish this such as 'SORT_V[calc_2D, country{"France"};!ZA]' or an entirely different type of argument as long as it tells the technology what to sort. Steps one 7153, two 7155 and three 7157 in FIG. 71 and step four 7252 in FIG. 72 work as previously described retrieving the data, sorting, calculating and then two-dimensionally positioning the information. Step five 7254 re-sorts the vertical rows based on the descending calculated values for France 7253 then reverting to a default of ascending values for the remaining columns which in this example is Spain 7256. The final automatically done step seven 7258 then completes the mechanics of the formula formatting and sending the values and the formula to the cells required by the output 'A1' to 'C10' 7067 in FIG. 70.

Figure 98:
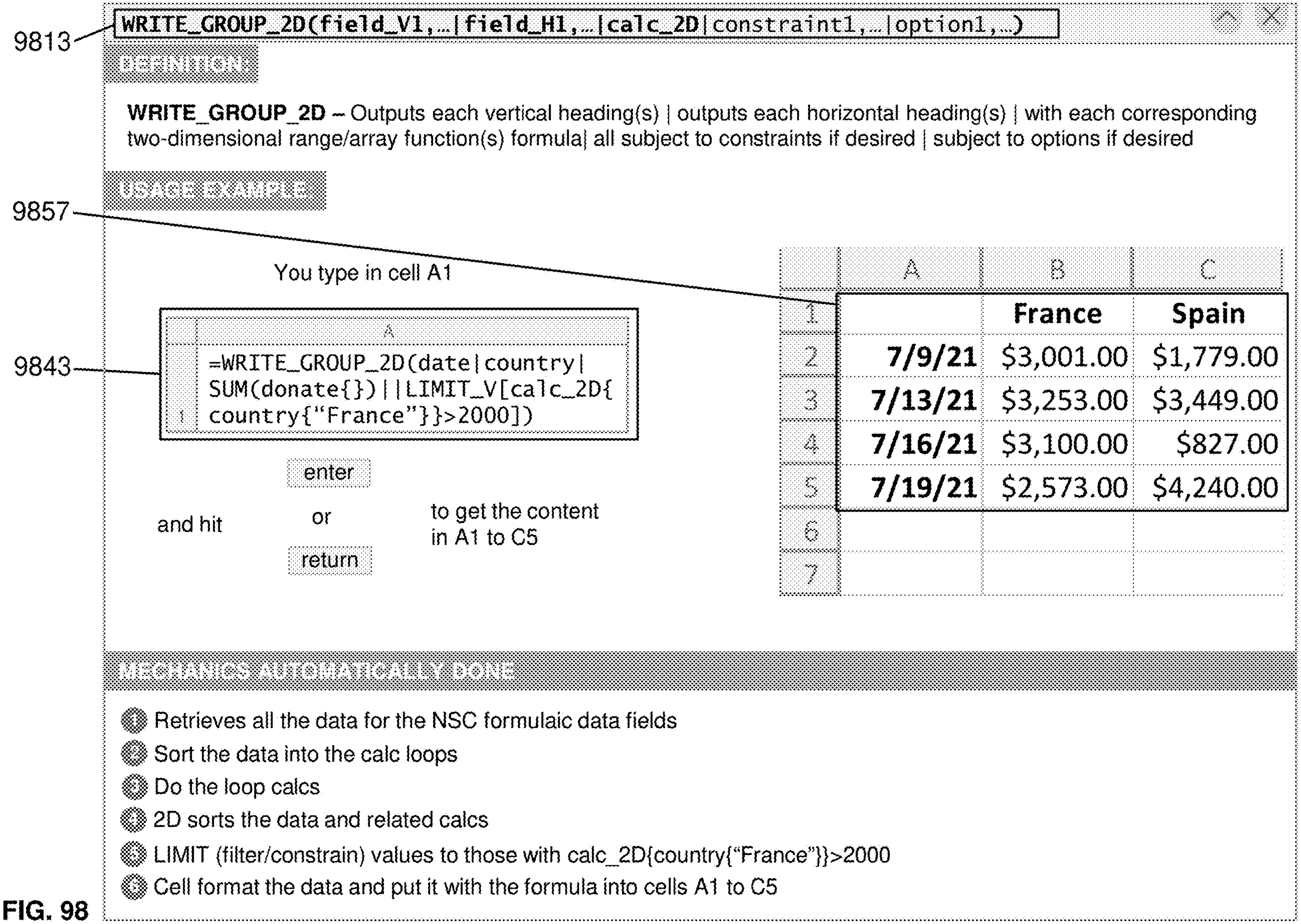
Figure 100:
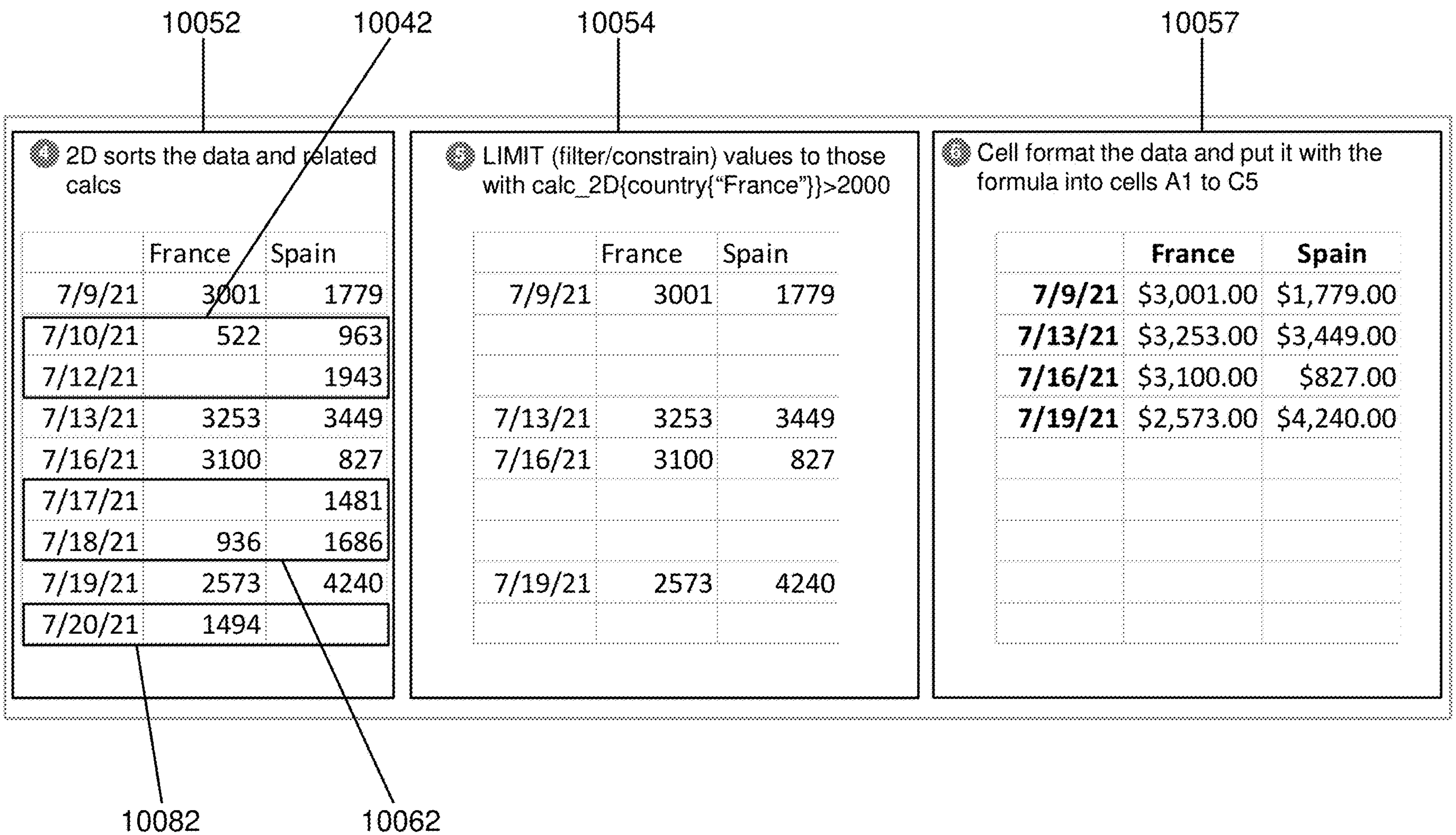
Figure 101:
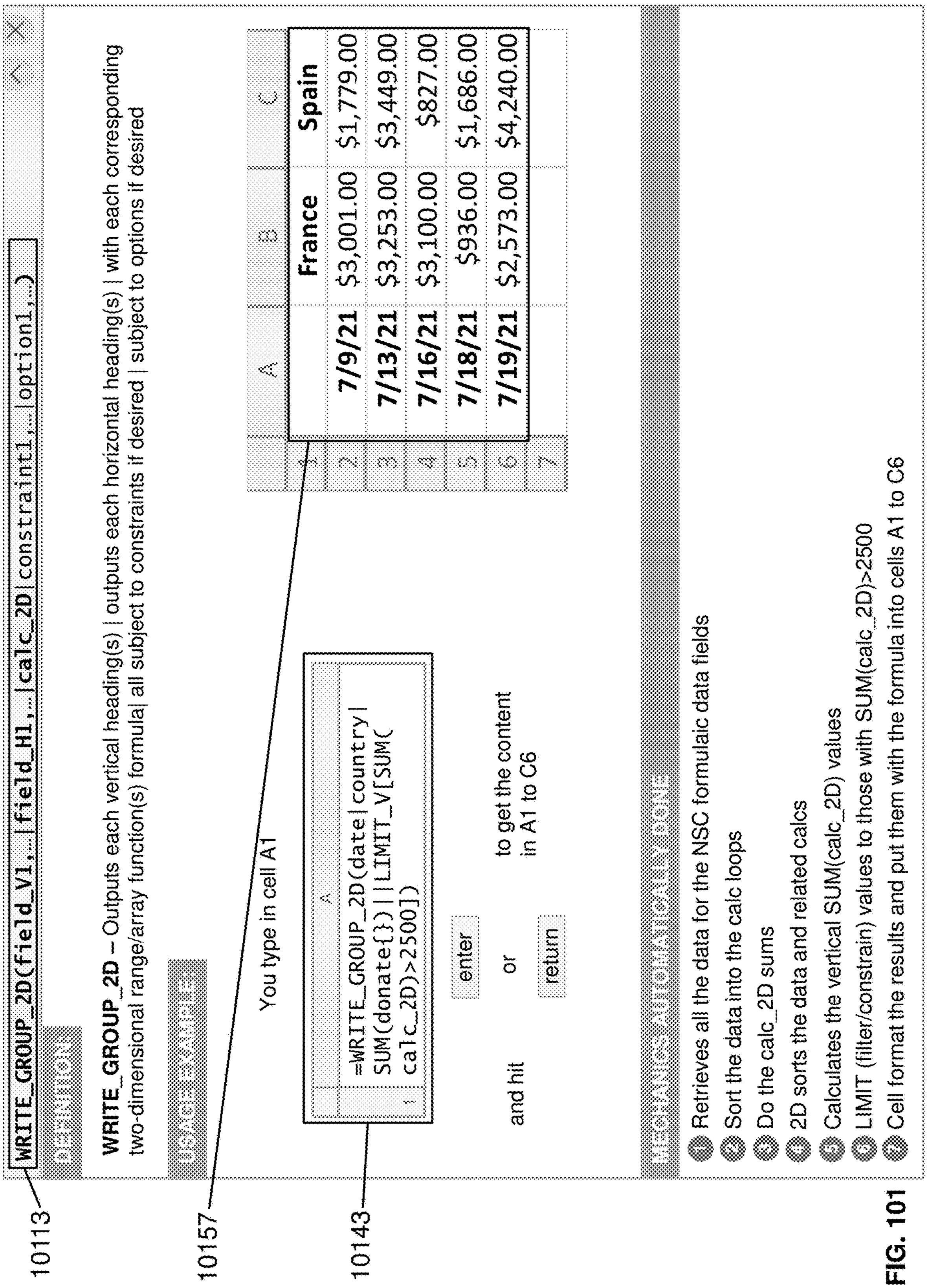
Figure 105:
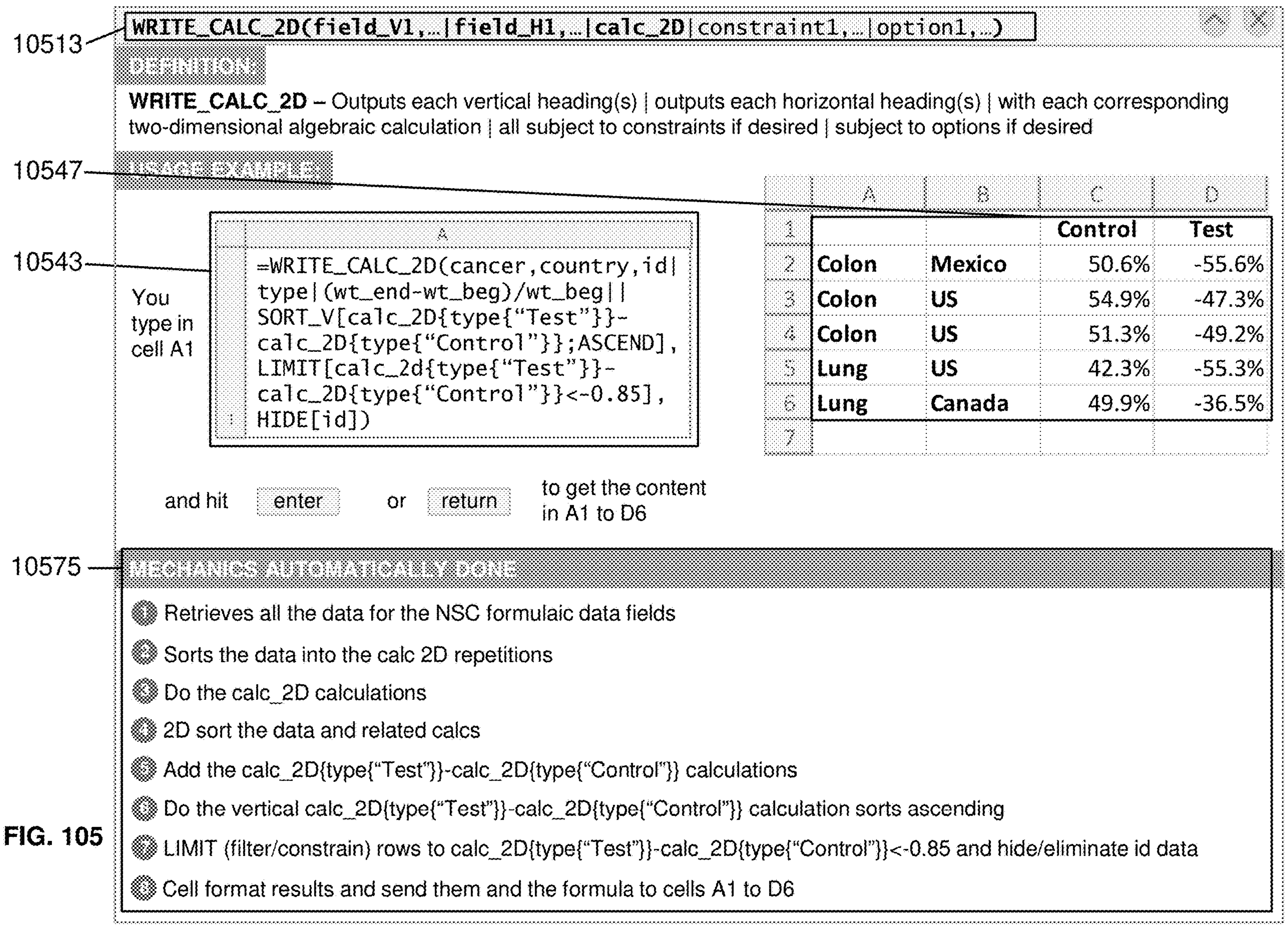

In some situations, particularly those with large numbers of results, users employ our technology's ability to show only values which meet some user specified threshold of 'calc_2D' performance. We will example this for our charity worker who wants to see France and Spain daily total donations only for those days where France had donations greater than 2000. FIG. 98 through FIG. 100 examples our technology limiting the group (loop equivalent) 2D calculated values to a user specified value. In this embodiment that is accomplished by the option term:

LIMIT[calc_*2D*{country{"France"}}>2000]

In the formula 9843 inputted in cell 'A1'. The full formula 9843 retrieves the data in step one 9953 in FIG. 99, sorts the data in the calc loops in step two 9955, and does the loop equivalent calculations in step three 9958. In step four 10052 in FIG. 100 our technology automatically 2D sorts the data and related calcs before limiting (filtering/constraining) the 'calc_2D values to eliminate rows 10042, 10062, and 10082 where the 'calc_2D' summed donations for 'France' are less than 2000. Then step six 10057 returns the formatted results with the formula to the cells 'A1' to 'C5' 9857 in FIG. 98. This capability easily allows users to analytically screen volumes of calculations to present only the information they are interested in—in this example French daily donations meeting some performance hurdle.

In some situations, users want to limit the values seen by applying a user specified range function evaluation of the 'calc_2D' group (loop equivalent) results. In this example our charity user evaluating the donations in France and Spain only wants to see days where the total of both countries' donations is greater than 2500. FIG. 101 through FIG. 104 examples our technology limiting the rows based on a summation of the calc_2D values (result of a result limitation). In this embodiment that is accomplished by the option term:

LIMIT_*V*[SUM(calc_*2D*)>2500]

in the formula 10143 inputted in cell 'A1'. The automatically executed steps one 10253, two 10255, and three 10258 in FIG. 102 retrieve the data, sort it into the groups (loop equivalents) and do the 'calc_2D sums before FIG. 103 step four 10352 2D sorts the headings and 'calc_2D values ready to do the SUM(calc_2D)' calculations 10374 for the LIMIT term in step five 10354. In step six 10357 our technology automatically removes the rows ('V') 10348, 10378, and 10388 with a SUM(calc_2D) not greater than 2500. Step seven then formats and puts the results with the formula in cells 'A1' to 'C6' 10157 in FIG. 101. Thereby allowing users an easy way to create two-dimensional analyses that screen results based on a result (some range function evaluation with a conditional) of result (of a 2D group evaluation).

FIG. 73 through FIG. 76 examples our spreadsheet function technology doing two-dimensional group (loop) calculations supporting joining data across data sets or tables and in the calculations using non-range/array functions, using cell references, using constant inputs and algebraic operators. The charity worker previously mentioned wants to create a two-dimensional layout of their donations net of all fees which requires them to use data from two different NSC external data tables. They also need to remove some day specific fees requiring more terms in the net donation value. In our technology they do not need to join the data from the two different tables using table joining tools figuring out whether they are right or left joins, inner or outer or other considerations. Instead, they simply write the calc_2D argument below:

'(1−fee_1{country_1{country}})*SUM(donate)−10−SQRT(*E*5)' into our function formula 7353. In this embodiment any formulaic data field from the table which contain the vertical and horizontal headers that does not have a different argument, e.g., {!ALL}, uses the loop value. So, country in the formulaic data evaluation 'fee_1{country_1{country} }' uses the loop value which then gets used by 'country_1' to select the correct value of 'fee_1'. This simple construct has matched/joined the data across tables to get the desired loop specific value.

Like all our previous embodiments inputting the formula 7353 automatically does all the steps 7375 to deliver the results 7366. Step one 7453 in FIG. 74, in this example, is different in that it is retrieving formulaic data from two different NSC (Non-Spreadsheet Cell) tables. Those could have been from two different cells sourced data tables or data sets. And it could be more than two tables depending upon the formula written, as our technology supports using data from many tables in a single formula. Step two 7458 then sorts the data from the table containing the vertical and horizontal heading for the loop calculations. For ease of showing what is happening, step three 7554 in FIG. 75 shows the calculation of each part of the calc_2D loops and step four 7557 shows the completed loop calculations. In addition to the data table match/join those calculations include using a non-range function 'SQRT', a cell reference 'E5' (7359 in FIG. 73) and a constant value the number '10'. It also includes multiple algebraic operators '*' and '-' all of which examples the huge breadth of calculations supported by our two-dimensional spreadsheet calculation technology. Step five 7653 FIG. 76 then two-dimensionally sorts the headings and related calcs with step six 7658 adding the cell formatting and placing the values and formula into cells 'A1' to 'C10' 7366 in FIG. 73.

In each of the preceding sections we have examples embodiments of our technology that would work for the other types of our 2D functions. Rather than doing many more examples we note the interchangeability where applicable as we have noted that a single function of our technology could do all three types of situations—2D data organization, 2D calculation repetitions and 2D group loop equivalent calculations and any combinations of those types. All of these are supported by today computer technologies as described next.

Computer System

FIG. 115 is a block diagram of an example computer system, according to one implementation. Computer system 11510 typically includes at least one processor 11514 which communicates with a number of peripheral devices via bus subsystem 11512. These peripheral devices may include a storage subsystem 11524 including, for example, memory devices and a file storage subsystem, user interface input devices 11538, user interface output devices 11520, and a network interface subsystem 11516. The input and output devices allow user interaction with computer system 11510. Network interface subsystem 11516 provides an interface to outside networks, including an interface to communication network, and is coupled via communication network to corresponding interface devices in other computer systems or in the cloud and usable for cloud applications.

User interface input devices 11538 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 11510 or onto communication network.

User interface output devices 11520 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 11510 to the user or to another machine or computer system.

Storage subsystem 11524 stores programming and data constructs that provide the functionality of some or all of the modules and methods described herein. These software modules are generally executed by processor 11514 alone or in combination with other processors.

Memory 11526 used in the storage subsystem can include a number of memories including a main random-access memory (RAM) 11530 for storage of instructions and data during program execution and a read only memory (ROM) 11532 in which fixed instructions are stored. A file storage subsystem 11528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 11528 in the storage subsystem 11524, or in other machines accessible by the processor.

Bus subsystem 11512 provides a mechanism for letting the various components and subsystems of computer system 11510 communicate with each other as intended. Although bus subsystem 11512 is shown schematically as a single bus, alternative implementations of the bus subsystem may use multiple busses.

Computer system 11510 can be of varying types including a workstation, server, computing cluster, blade server, server farm, or any other data processing system or computing device. Due to the ever-changing nature of computers and networks, the description of computer system 11510 depicted in FIG. 115 is intended only as one example. Many other configurations of computer system 11510 are possible having more or fewer components than the computer system depicted in FIG. 115.

Some Particular Implementations—Two Dimensional Looped Calculation Tables

Some particular implementations and features are described in the following discussion.

One implementation of our technology provides the user with a two-dimensional table with range function calculations (e.g., Pivot table equivalent) through the simplicity of writing a single function formula. It generates a table with two-dimensionally labelled results from a formula in a regular spreadsheet cell. That function includes: receiving three or more data field inputs from user specified Non-Spreadsheet Cell (NSC) formulaic data fields (descriptive terms) or cell ranges; using at least two of the user defined data field inputs to create loop equivalents; evaluating for each loop equivalent at least one formula containing a range or array function with at least one of the user defined data fields; and outputs results sequenced and listed by function specification or user selection as exampled in FIG. 44 for NSC formulaic data and FIG. 49 and FIG. 50 for cell range sourced data.

In one implementation, each sequenced set of vertical and horizontal output results (headings and calculated values) is listed by their sequenced order of loop input values as exampled in FIG. 44 and FIG. 77. The loop equivalent function results are ordered by the distinct values in the first and second user specified fields as exampled in FIG. 44. In one implementation the data is ordered by default sorting (e.g., ascending) as exampled in FIG. 44. In another implementation each sequenced set of outputs is listed by their sequenced order of loop input values ordered by user selected sorting (e.g., !AZ for ascending or !ZA for descending ordering) as exampled in FIG. 77.

In another implementation of our technology the loop equivalent function results are vertically and/or horizontally ordered by values of the loop equivalent function results as exampled in FIG. 70 through FIG. 72. This mode of sorting in our technology could have an accompanying default sort or as in this example a user specified sort. In another implementation further range or array function formula calculations are applied to the to the loop equivalent calculated function results and those additionally calculated values are used to order the results as shown in FIG. 66 through FIG. 69 for a TOTAL (i.e., SUM) of values. FIG. 37 through FIG. 42 examples an AVERAGE (AVE) value calculation and other user specified range or array functions are supported by our technology (e.g., MAX, MIN, MEDIAN, AVEDEV or other functions in FIG. 78).

In another implementation, the user inputs a fourth data field input to be used to create nested loop equivalents within the loop equivalents for either of the first (e.g., vertical) or second (e.g., horizontal) user specified fields that create the table headings. FIG. 45 through FIG. 50 examples fourth and fifth user specified fields used to create nested (compound) loops equivalents for both the vertical and horizontal table headings. Our technology supports any number of nesting's on either table axis.

Many user situations benefit from the addition of Totals and subtotals, where those totals and nested loop equivalent subtotals in our technology can be SUMs of the respective values, averages or other range/array function calculated values (see FIG. 78). An implementation with different examples of positioning and inclusion of those totals and subtotals is exampled in FIG. 51 through FIG. 61. The vertical and horizontal axis may have very different combinations either automatically driven by the situation as in FIG. 51 through FIG. 53 where differences in nesting automatically alter the usage of subtotals, or user specification driven differences as in FIG. 54 through FIG. 57 where the user decides what to include (i.e., subtotals only vertically and totals only horizontally). Our technology supports different calculations as for those total and subtotal groups with user specification of instead average (AVE of AVERAGE function evaluation), maximums (MAX), minimums (MIN) or other range function formula evaluation (see FIG. 78).

Our technology also supports creating of non-nested subtotals using our technology as is exampled in FIG. 85 through FIG. 90. While those examples were for our two-dimensional repetitive calculation tables technology, the non-nested field subtotals equally works for results generate by our two-dimensional looped calculation table technologies. While the date example shown was for months our technology also supports quarterly, annual, decade and other custom period capabilities. Similar subtotals can be done in our technology for user specified periods such as every 100 for numbers, or every starting letter for alphabetical text (e.g., all the last names starting with A, then B . . . ), starting character for alphanumeric. The vertical and horizontal table axes may have different combinations of nested or non-nested subtotals and can be combined with totals.

In situations where the user only wants to see a limited listing of the output, the output can be limited vertically and/or horizontally in an implementation of our technology as exampled in FIG. 66 through FIG. 69. This implementation allows users only interested in a certain number or results or concerned that they will get a huge number of outputs to limit outputs. The limit can also be a number range such as '6:10' if what the user wants to see is the sixth through the tenth rows (in Vertical settings) or columns (in Horizontal settings) of values.

For any of our implementations there are settings where the user would like to limit or filter the date values for specific days of the week (e.g., Tuesday as shown in FIG. 33) or combinations of those days. Our technology also supports where those limitations or filters limit the values to weekdays (e.g., as shown in FIG. 32) or weekends. This can also be applied to other date related values like months, quarters, or years without having to use a field with those values or in situations where those fields do not exist. These implementations can also apply to filtering for decimal endings (e.g., all prices ending in 0.99).

In any of our implementations there are settings where users would like to limit or filter/constrain the calc_2D values to specified values or ranges of values as exampled in FIG. 98 through FIG. 100 where calc_2D donation calculations are limited to those over 2000. Our technology supports more than one of those type of limitations, which in the FIG. 98 through FIG. 100 would be exampled by also having a minimum limitation on the Spain donations as well. Our same technology can be used to limit (filter/constrain) the results based on calculations done with the calc_2D values as exampled in FIG. 101 through FIG. 104. Those calculations can be range or array calculations on multiple calc_2D values as exampled in FIG. 101 through FIG. 104 or can be algebraic calculations as done in FIG. 105 through FIG. 109 with range functions for the calc_2D fields as shown below:

LIMIT[SUM(calc_2*d*{type{"Test"}})−SUM(calc_2*D*{type{"Control"}})<−0.85]

or could be combinations of both.

For any of the implementations' constraints (filters) can be applied to the data sets, as exampled by the date range constraints in FIG. 45 through FIG. 50. This allows users to easily transform an analysis from one period of time (or other subset of data) to another and can be done via a referenced regular spreadsheet cell or cells supplying all or part of the constraint input. Also, for any of the implementations' constraints (filters) can be applied in the 2D calculations, such as a 'calc_2D' formula 'SUM(donate{>500}/SUM(donate)' exampled in FIG. 93 through FIG. 95. Our technology supports using simultaneously the different constraint (filter) and limit capabilities described herein.

For any of the implementations of our two-dimensional table function employing range or array functions our technology supports formulas including two or more spreadsheet range or array functions as exampled in FIG. 45 through FIG. 50. There is a broad set of these range or array functions support by our technology using the loop equivalent values as exampled in FIG. 78.

An implementation of our technology allows users to create the equivalent of multiple two-dimensional Pivot Tables within a single of our two-dimensional calculation tables through loop equivalent calculations where the loop data field values are selectively applied within a formula as exampled in FIG. 54 through FIG. 57. FIG. 81 through FIG. 84 examples another implementation delivering the equivalent of multiple pivot tables in our technology using a two-dimensional selective loop syntax resulting in the equivalent of four different pivot tables 8146, 8166, 8148 and 8168 in FIG. 81.

Another implementation of our technology for doing two-dimensional group (loop) calculations substantially broadens the range of analyses that can be done by using data not within the loop equivalents. FIG. 58 through FIG. 61 examples our spreadsheet function technology where one range or array function in the loop evaluated calculations does not use loop values. Additional implementations further broaden the set of functions and algebraic equations that can be used in our two-dimensional group (loop) calculations as exampled in FIG. 73 through FIG. 76 showing our technology can use any applicable numeric function with constant values, cell reference values and all combinations of algebraic operators. We already have a materially larger set of range or array functions, exampled in FIG. 78, that our loop equivalent technology could use relative to spreadsheet Pivot tables, but with these capabilities add substantially to user options with the large set of non-range or non-array functions which our technology can use in loop equivalent or repetitive calculations as well as constant, cell reference values and combinations of functions and algebraic operations.

Another implementation of our technology supports cross data set joining directly in our family of new functions. When using our Non-Spreadsheet Cell (NSC) formulaic data this supports using data from different external data tables as is exampled in FIG. 73 through FIG. 76. When using sets of data from spreadsheet cells our technology supports using different data sets that are entirely separate. They work as laid out in in FIG. 73 through FIG. 76 with the only substation being the cell ranges as formulaic data fields rather than the NSC formulaic data. These separate cell data sets could be anywhere within the spreadsheet, e.g., on different worksheets. Out technology allows users to join the data cell sourced data without the need of VLOOKUPs and for external data not adding the many complications of importing and joining tools like Microsoft Power Query, all of which requires a lot of additional work done very simply in our technology with a single functional formula. The user could also join data sets from different sources, one data set from NSC formulaic data and one from cell sourced formulaic data.

Another implementation of our technology allows users to specify a formula argument to trigger the automatic filling of any missing dates or integer values within a data field. That data field can then be used as an input to create loop equivalents thereby allowing users to create a full set of outputs as exampled in FIG. 62 through FIG. 65. This capability can work to fill all the values (e.g., dates or integers) from the first/lowest to the last/highest (or vice versa) in a data set. Our technology also supports the function filling a range specified by the user as exampled in FIG. 62 through FIG. 65, which therefore may start before the data set first value and/or end after the data set last value.

Our technology supports the generation of vertical and/or horizontal label titles for the headings as exampled in FIG. 45 through FIG. 50 and FIG. 62 through FIG. 65. In an embodiment these titles can default to using the formulaic data field names (e.g., FIG. 45 through FIG. 50) unless the user specifies a replacement as exampled in FIG. 62 through FIG. 65. These titles could also automatically include default formatting such as ending with a colon (FIG. 12), underlining (e.g., FIG. 45 through FIG. 50), bolding (e.g., FIG. 45 through FIG. 50) or other mode of differentiation. Our technology also supports electing to have title generation be automatic requiring no user input as exampled in FIG. 111.

Existing spreadsheet Pivot Tables cannot do the following long list of capabilities supported by our technology. They cannot order by the calculated content across nested loops, cannot use a broad spectrum of range functions, cannot use non-range functions, cannot do totals other than summations, cannot be sorted by those totals or subtotals, cannot be limited vertically or horizontally, cannot be limited by day of week or type of day (e.g., weekday, weekend, holiday, non-holiday etc.), cannot be constrained (filtered) within the calculation without filtering the headings, cannot filter part of the calculation, cannot do loop specific calculations, create pivot tables within pivot tables, cannot do calculations for non-loop data (for loop fields, cell reference values or constants), join data from different data sets, and fill missing date or integer progressions. They also cannot create a pivot table from the simplicity of writing one functional formula. However, there is an entire set of repetitive calculations not supported by pivot tables or any functions in existing technologies that do not employ loop equivalent range function calculations that we will disclose next. This allows users to simply do a large set of two-dimensional repetitive calculations with the ease of a single functional formula.

Some Particular Implementations—Two Dimensional Repetitive Calculation Tables

One implementation of our technology generates a table with two-dimensionally labelled repetitive calculated results from a formula in a regular spreadsheet cell. That function includes: receiving four or more data field inputs from user specified Non-Spreadsheet Cell (NSC) formulaic data fields (descriptive terms) or cell ranges; using at least two of the user defined data field inputs to create two-dimensional repetitions; evaluating for each repetition at least one formula containing at least two of the user defined data fields in an algebraic formula; and outputs sequenced and listed by function specification or user selection as exampled in FIG. 34 for NSC formulaic data and FIG. 85 through FIG. 90 for cell range sourced data.

In one implementation each sequenced set of vertical and horizontal output results (headings and calculated values) is listed by their sequenced order of repetition input values as exampled in FIG. 34. The repetition algebraic calculated results are ordered by the first and second user specified fields as exampled in FIG. 34. In one implementation the data is ordered by default sorting (e.g., ascending) as exampled in FIG. 34. Although the default could be descending or some custom ordering. In another implementation each sequenced set of outputs is listed by their sequenced order of repetition input values ordered by user selected sorting (e.g., !AZ for ascending or !ZA for descending ordering) as exampled in FIG. 79. And the sorting can be a combination of default and user specified ordering as also exampled in FIG. 79.

In another implementation of our technology the loop equivalent function results are vertically and/or horizontally ordered by values of the repetition algebraic calculated results as exampled in FIG. 80. This mode of sorting in our technology could have an accompanying default sort or as in this example a user specified sort. In another implementation range or array function formula calculations are applied to the to the repetition calculated algebraic formula results and those additionally calculated values are used to order the results as shown in FIG. 37 through FIG. 42 for an AVE (i.e., AVERAGE) of values. Other user specified range or array functions are supported by our technology (e.g., SUM, MAX, MIN, MEDIAN, AVEDEV or other function in FIG. 78) for the calculations that provide the sortation values. In another implementation algebraic formula calculations are applied to the to the repetition calculated algebraic formula results and those additionally calculated values are used to order the results as shown in FIG. 105 through FIG. 109.

In another implementation, the user inputs a fifth data field input to be used to create nested repetitions vertically or horizontally. FIG. 37 through FIG. 43 examples fifth and sixth user specified fields used to create nested (compound) repetitions for both the vertical and horizontal table headings. Our technology supports any number of nesting's on either table heading axis. The vertical and horizontal table axes may have very different combinations either automatically driven by the situation where differences in nesting automatically alter the usage of subtotals (e.g., no nested or repeated headings therefore eliminating the value of subtotals) or user specification driven as in FIG. 54 through FIG. 57 where the user decides what to include (i.e., subtotals only vertically and totals only horizontally).

Many user situations benefit from the addition of totals and nested subtotals, where what we are calling totals and subtotals are not restricted to summation but can be evaluated with one of the range or array functions (e.g., MIN, MAX, AVERAGE etc. see FIG. 78).

Our technology also supports creating of non-nested subtotal fields using our technology as is exampled in FIG. 85 through FIG. 90. In this example monthly subtotals are created from a non-nested column of dates and our technology supports quarterly, annual and other custom period capabilities. Similar subtotals can be done in our technology for user specified periods such as every 100 for numbers, or every starting letter for alphabetical text (e.g., all the last names starting with A, then B . . . ), starting character for alphanumeric and beyond text.

In situations where the user only wants to see a limited listing of the output, the output can be limited vertically and/or horizontally in an implementation of our technology as exampled in FIG. 37 through FIG. 43. This implementation allows users only interested in a certain number or results or concerned that they will get a huge number of outputs to limit outputs. The limit can also be a number range such as '6:10' if what the user wants to see is the sixth through the tenth rows (in Vertical settings) or columns (in Horizontal settings) of values.

For any of our implementations there are settings where the user would like to limit or filter the date values for specific days of the week (e.g., Tuesday as shown in FIG. 33) or combinations of those days. Our technology also supports where those limitations or filters are limited the values to weekdays (e.g., as shown in FIG. 32) or weekends.

In any of our implementations there are settings where users would like to limit or filter/constrain the calc_2D values to specified values or ranges of values as exampled in FIG. 97 where calc_2D donation calculations for the field 'type' values of 'Test' are limited to those less than '0.3'.

In any of our implementations there are settings where users would like to limit or filter/constrain the calc_2D values to specified values or ranges of values as exampled in FIG. 105 through FIG. 109 where calc_2D calculations are limited by an algebraic calculation using the calc_2D values to be under '-0.85' in the function formula 10543. Our technology supports more than one of those type of limitations, for example the SUMS of calc_2D values exampled in the FIG. 101 through FIG. 104 is also supported in our two-dimensional repetitive calculation functions. Combinations of the different types are also supported by our technology.

For any of the implementations' constraints (filters) can be applied to the data sets, as exampled by the date range constraints in FIG. 37 through FIG. 43. This allows users to easily transform an analysis from one period of time (or other subset of data) to another and can be done via a referenced regular spreadsheet cell or cells supplying all or part of the constraint input. Filters (constraints) can be done for any type of data in our technology, e.g., integers, reals, text, dates, and Booleans.

Any of the implementations of our two-dimensional repetition calculation table function supports algebraic formulas including two or more algebraic operations per repetition as exampled in FIG. 35 through FIG. 43 and in FIG. 85 through FIG. 90. Thus, supporting a very broad spectrum of calculations and numbers of data inputs. The calculations supported is further broadened by supporting data values not in the user specified formulaic data inputs and functions evaluating those values as well as the formulaic data values as exampled in FIG. 85 through FIG. 90.

An implementation of our technology automatically spreads the data on one table axis when the two-dimensional results are not unique as exampled in FIG. 36 through FIG. 43. This indicates to users that there is insufficient specificity in the heading repetitions to confidently collapse the data into fewer rows or columns because there is insufficient data to know which data to collapse with which. Some users may recognize this issue and want to set the default mode to collapse the data anyway and our technology can support that as exampled in FIG. 35. Or user may wish to have an option to collapse, e.g., adding an option 'COLLAPSE' that gives the result 3558 in FIG. 35 like is exampled in FIG. 19.

Another implementation of our technology supports cross data set matching/joining directly in our family of new functions. When using our Non-Spreadsheet Cell (NSC) formulaic data this supports using data from different external data tables as is exampled in FIG. 73 through FIG. 76. While that example is for a 'WRITE_GROUP_2D' function formula the same concept applies to the 'WRITE_CALC_2D' situations. And the part of the formula in 7353 that joins the data '(1−fee_1{country_1{country}' is an algebraic term that could be used in a 'WRITE_CALC_2D' formula (two-dimensional repetitive calculation table functions). Recognizing that in our technology those matched/joined data sets could be NSC (external) or cell sourced formulaic data and the formulas could join data from two or more data sets/tables. The user could also match/join data sets from different sources, one data set from NSC formulaic data and one from cell sourced formulaic data.

Another implementation of our technology allows users to specify a formula argument to trigger the automatic filling of any missing dates or integer values within a progression in a data field input used to repetitions, thereby allowing users to create a full set of outputs as exampled in FIG. 110 for filling integer values. This capability can work to fill all the progressive values (e.g., dates, integers letters and can even be applied to more complicated progressions with a specification of the progression) from the first/lowest to the last/highest (or vice versa) in the data set. Our technology also supports the function filling a range specified by the user as exampled in FIG. 110 and FIG. 62 through FIG. 65. Thereby allowing the user to fill values before the first value or after the last in the data set or in the constrained data of the functional calculations.

Any of the previous embodiments can automatically (i.e., have the function default include the capability) or user optionally (e.g., through some form of input in the functional formula) include the generation of vertical and/or horizontal label titles for the headings as exampled in FIG. 37 through FIG. 43. In an embodiment these titles can default to using the formulaic data field names (e.g., FIG. 37 through FIG. 43) unless the user specifies a replacement as exampled in FIG. 62 through FIG. 65. These titles can also automatically include default formatting such as ending with a colon (FIG. 12), underlining (e.g., FIG. 45 through FIG. 50), bolding (e.g., FIG. 45 through FIG. 50) or other mode of differentiation. And some version of this can be set as a default not requiring any input by the user.

Existing spreadsheet Pivot Tables cannot do any of the preceding repetitive algebraic calculation two-dimensionally labelled tables capabilities. However, there is another large set of two-dimensional data capabilities that users cannot do in existing spreadsheets, which is automating 2D data organization, filtering, sorting and display.

Some Particular Implementations—Two Dimensional Data Organization Functions

One implementation of our technology generates a table with two-dimensionally labelled results from a formula in a regular spreadsheet cell. That function includes: receiving three or more data field inputs from user specified Non-Spreadsheet Cell (NSC) formulaic data fields (descriptive terms) or cell range formulaic data; using at least two of the user defined data field inputs to create two-dimensional repetitions; evaluating for each repetition one data field input; and outputs sequenced and listed by function specification or user selection as exampled in FIG. 11 and FIG. 13 for NSC formulaic data and FIG. 20 through FIG. 23 for cell range sourced data.

Our two-dimensional data organization technology can two-dimensional sort all types of data as exampled in FIG. 92 where the two-dimensionally sorted values 9277 are text. However, they could just as easily be dates, Booleans and of course as already extensively exampled integers or reals. They could also be web links, images, or any other form of storable data.

In one implementation each sequenced set of vertical and horizontal output results (headings with their related calculated values) is listed by their sequenced order of repetition input values (e.g., field_V1, field_H1) as exampled in FIG. 11. The repetition 2D results are ordered by the first and second user specified fields as exampled in FIG. 11. In one implementation the data is ordered by default sorting (e.g., ascending or descending) as exampled in FIG. 11. In another implementation each sequenced set of outputs is listed by their sequenced order of repetition input values ordered by user selected sorting (e.g., !AZ for ascending or !ZA for descending ordering) as exampled in FIG. 14.

In another implementation of our technology the repetition results are vertically and/or horizontally ordered by values of the repetition 2D data field results as exampled in FIG. 91 for vertical ordering based on the values of the 'field 2D' in a sort term 'SORT_V[d_USD{{"US"{!ZA}}]' in the formula 9143. This mode of sorting in our technology could have an accompanying default sort or as in this example a user specified sort. In another implementation applicable to situations where the 2D data field repetition values are numeric, range or array function formula calculations are applied to the to the 2D data field repetition results and those additionally calculated values are used to order the results as shown in FIG. 15 for calculated TOTALS (SUMs) of the repetition values. FIG. 24 through FIG. 27 examples an AVE (i.e., AVERAGE) of the 2D repetitive values used for sorting. Other user specified range or array functions are supported by our technology (e.g., SUM, MAX, MIN, MEDIAN, AVEDEV or other function in FIG. 78) for the calculations that provide the sortation values. Our technology supports sortation happening at the repetition level as in FIG. 15 or at the total or subtotal level as exampled in FIG. 21 through FIG. 23.

In another implementation, the user inputs a fourth data field input to be used to create nested repetitions within the repetitions for either of the first (e.g., vertical) or second (e.g., horizontal) user specified fields that create the table headings. FIG. 24 through FIG. 27 examples fifth and sixth user specified fields used to create nested (compound) repetitions for both the vertical and horizontal table headings. Our technology supports any amount of nesting's on either table axis.

Many user situations benefit from the addition of totals and subtotals, where those totals and nested repetition subtotals in our technology can be SUMs of the respective values, averages or total or nested repetition values evaluated with one of the many other range or array functions. FIG. 16, FIG. 17 and FIG. 20 through FIG. 23 example different variants of summation totals and subtotals. FIG. 24 through FIG. 27 examples an average version of totals and subtotals. The vertical and horizontal axis may have very different combinations either automatically driven by the situation where differences in nesting automatically alter the usage of subtotals (e.g., no nested or repeated headings therefore eliminating the value of subtotals) or user specification driven as in FIG. 24 through FIG. 27 where the user decides what to include (e.g., Only vertical totals and subtotals).

Our technology also supports creating of non-nested subtotal fields using our technology for data repetitions similar to that exampled in FIG. 85 through FIG. 90. In this example monthly subtotals are created from a non-nested column of dates and our technology supports quarterly, annual, decades, centuries, and other custom period capabilities. Similar subtotals can be done in our technology for user specified periods such as every 100 for numbers, or every starting letter for alphabetical text (e.g., all the last names starting with A, then B . . . ), starting character for alphanumeric and beyond text. These non-nested subtotals can support evaluating non-numeric data using functions such as our COUNT_TEXT, COUNT_DATE, or COUNT_TRUE for the subtotalling.

In situations where the user only wants to see a limited listing of the output, the output can be limited vertically and/or horizontally in an implementation of our technology as exampled in FIG. 91. This implementation allows users only interested in a certain number or results or concerned that they will get a huge number of outputs to limit outputs. The limit can also be a number range such as '6:10' if what the user wants to see is the sixth through the tenth rows (in Vertical settings) or columns (in Horizontal settings) of values.

For any of our implementations there are settings where the user would like to limit or filter the date values for specific days of the week (e.g., Tuesday as shown in FIG. 33) or combinations of those days. Our technology also supports where those limitations or filters are limited the values to weekdays (e.g., as shown in FIG. 32) or weekends. This same approach can be used to limit values to specific months, quarters, years. In text data it can be used to limit to words starting with specific letters or characters. In numeric fields it can be used to limit data to numbers starting with specific numbers (e.g., starting with 1 or 20) or ending with specific numbers (e.g., 99 or 0.99). With many more related applications for limiting formulaic data values used.

For any of the implementations' constraints (filters) can be applied to the data sets, as exampled by the date range constraints in FIG. 24 through FIG. 27. This allows users to easily transform an analysis from one period of time to another and can be done via a referenced regular spreadsheet cell or cells supplying all or part of the constraint input. Filters (constraints) can be done for any type of data, integers, reals, text, dates, and Booleans in our technology.

An implementation of our technology automatically spreads the data on one table axis when the two-dimensional results are not unique as exampled in FIG. 18. This indicates to users that there is insufficient specificity in the heading repetitions to confidently collapse the data into fewer rows or columns because there is insufficient data to know how to collapse the data (i.e., the correct pairings of the data). Some users may recognize this issue and want to collapse the data anyway and our technology can support that as exampled in FIG. 19 or have an option to for the user to set the default mode to collapse as exampled in FIG. 35.

Another implementation of our technology allows users to trigger the automatic filling of any missing dates, integer or other progression of values used to create repetitions. This allows users to create a full set of outputs as exampled in FIG. 28 through FIG. 31. This capability can work to fill all the progressive values (e.g., dates or integers) from the first/lowest to the last/highest (or vice versa). Our technology also supports the function filling a range specified by the user as also exampled in FIG. 28 through FIG. 31. Thereby allowing the user to fill values before the first value or after the last in the data set.

Any of the previous embodiments can automatically generate vertical and/or horizontal label titles for the headings as exampled in FIG. 12. In an embodiment these titles can default to using the formulaic data field names (e.g., FIG. 12 'country' with added colon at end) unless the user specifies a replacement as exampled in FIG. 12 with 'd_type' replaced by 'donation type'. These titles could also automatically include default formatting such as ending with a colon (FIG. 12), underlining (e.g., FIG. 45 through FIG. 50), bolding (e.g., FIG. 45 through FIG. 50) or other mode of differentiation. Our technology can also support generating a default version of the titles with no need for terms from users, e.g., where the formulaic data field names are used with or without formatting.

Existing spreadsheet Pivot Tables cannot do any of the preceding function driven automatic two-dimensional data organization, filtering, sorting and display which our technology makes as simple as a function formula.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

Clauses

Further to the Particular Implementations, the technology disclosed is exampled in the following clauses.

Clause 1. A method of evaluating data in a spreadsheet using a table generator function that applies a user specified formula to a user specified data field inputs, including:

- accessing from the spreadsheet the table generator function entered in a first spreadsheet cell;
- receiving for the table generator function at least first, second, third and fourth user specified data field inputs including user specified formulaic data description terms for accessing a non-cell source or a data cell range;
- using at least the first user and the second specified data field input to create data repetitions over items in the first and the second user specified data field input;
- receiving the user specified formula, including an algebraic operator applied to items in the third and fourth data field inputs for each data repetition;
- evaluating items in the third and fourth data field inputs in each data repetition by applying the user specified formula to generate repetition results; and
- outputting from the table generator function the repetition results and outputting adjacent thereto at least related labels from the first and the second user specified data field.

Clause 2. The method of clause 1, further including primarily ordering the repetition results by a default sorting of ascending or descending.

Clause 3. The method of clause 1, further including primarily ordering the repetition results by a user selected sort order.

Clause 4. The method of clause 1, wherein outputs are listed by user selection of an ordered set of one or more data repetition results and/or formula calculated value each with a default or selected sortation.

Clause 5. The method of clause 1, further including receiving at least a fifth user specified data field input and using the fifth user specified data field input to create nested repetitions within the repetitions created responsive to the first or second user specified data field.

Clause 6. The method of clause 1, further including outputting from the table generator repetition total and/or subtotal formula calculations vertically and/or horizontally over the repetition calculation results.

Clause 7. The method of clause 1, further including outputting from the table generator function non-nested subtotal formula calculations vertically and/or horizontally over the repetition function results.

Clause 8. The method of clause 1, further including limiting output of the repetition results responsive to a user selected count of items to output.

Clause 9. The method of clause 1, further including limiting output of the repetition results responsive to a user selected day of week limitation to output.

Clause 10. The method of clause 1, further including limiting or filtering the output of repetition calculation results responsive to a user selected limitations of the repetition calculation results values to output.

Clause 11. The method of clause 1, further including limiting or filtering the output of repetition calculation results responsive to a user selected limitations of calculations using the repetition calculation results values to output.

Clause 12. The method of clause 1, further including applying constraints to the first and/or second user specified data fields to filter data evaluated by the user specified formula.

Clause 13. The method of clause 1, further including evaluating more than one algebraic operation for each repetition calculation.

Clause 14. The method of clause 1, further including using at one or more data values not in the user specified formulaic data inputs in the user specified formula.

Clause 15. The method of clause 1, further including the automatic SPREAD of the data on one axis when two-dimensional results are not unique (distinct).

Clause 16. The method of clause 15, wherein the SPREAD data can be collapsed automatically or by user selection.

Clause 17. The method of clause 1, further including joining data values from different data sets, either different NSC data tables or different cell range data sets, for use in the user specified function.

Clause 18. The method of clause 1, further including a data filling mechanism adding in date or integer values missing within a progression.

Clause 19. The method of clause 43, wherein the user specifies the range of the progression to be filled.

Clause 20. The method of clause 1, further including the generation of vertical and/or horizontal label titles.

Clause 21. The method of clause 21, wherein the label titles are field names or user specified values.

Clause 22. A method of evaluating data in a spreadsheet using a table generator function that applies a user specified formula to user specified data fields, including:

- accessing from the spreadsheet the table generator function entered in a first spreadsheet cell, wherein the table generator function applies at least one user specified data field to generate a table of two-dimensionally labelled results;
- receiving for the table generator function at least first, second and third user specified data fields inputs including user specified formulaic data description terms for accessing a non-cell source or a data cell range;
- using at least the first and the second user specified data field input to create data repetitions over items in the first and the second user specified data field input;
- receiving the user specified two-dimensional data field third data field input;
- evaluating data in the third data field input for each data repetition to generate repetition results; and
- outputting from the table generator function the repetition results and outputting adjacent thereto at least related two-dimensional labels from the first and the second user specified data fields.

Clause 23. The method of clause 22, further including primarily ordering the repetition results by a default sorting of ascending or descending.

Clause 24. The method of clause 22, further including primarily ordering the repetition results loop equivalent function results by a user selected sort order.

Clause 25. The method of clause 22, wherein outputs are listed by user selection of an ordered set of one or more data repetition results and/or formula calculated value each with a default or selected sortation.

Clause 26. The method of clause 22, further including receiving at least a fourth user specified data field input and using the fourth user specified data field input to create nested loop equivalents within the loop equivalents created responsive to the first or second user specified data field.

Clause 27. The method of clause 22, further including outputting from the table generator function total and/or subtotal formula calculations vertically and/or horizontally over the loop equivalent function results.

Clause 28. The method of clause 22, further including outputting from the table generator function non-nested subtotal formula calculations vertically and/or horizontally over the repetition function results.

Clause 29. The method of clause 22, further including limiting output of the repetition results responsive to a user selected count of items to output.

Clause 30. The method of clause 22, further including limiting output of the repetition results responsive to a user selected day of week limitation to output.

Clause 31. The method of clause 22, further including applying constraints to the first and/or second user specified data fields to filter data evaluated by the user specified formula.

Clause 32. The method of clause 22, further including the automatic SPREAD of the data on one axis when two-dimensional results are not unique (distinct).

Clause 33. The method of clause 32, wherein the SPREAD data can be collapsed automatically or by user selection.

Clause 34. The method of clause 22, further including a data filling mechanism adding in date or integer values missing within a progression.

Clause 35. The method of clause 34, wherein the user specifies the range of the progression to be filled.

Clause 36. The method of clause 35, further including the generation of vertical and/or horizontal label titles.

Clause 37. The method of clause 36, wherein the label titles are field names or user specified values.

We claim as follows:

1. A method of evaluating data in a spreadsheet using a table generator prebuilt function that applies a user specified formula to user specified data fields, including:

accessing from the spreadsheet the table generator prebuilt function entered in a first spreadsheet cell, wherein the table generator prebuilt function applies at least one user specified formula to generate a table of two-dimensionally labeled results;

wherein the table generator prebuilt function is included when the spreadsheet is installed;

wherein the user specified formula includes at least one user specified range or array function;

receiving as arguments in a structured argument list of the table generator prebuilt function, which structured arguments list has a predetermined ordering of argument groups separated by delimiters and which arguments are grouped within argument groups, at least first, second and third user specified data fields including user specified formulaic data description terms for accessing a non-cell source or a data cell range;

using at least the first and the second user specified data fields to create loop equivalents over distinct combinations of values in the first and the second user specified data fields, wherein a loop equivalent groups two or more records or cell ranges that have matching values that match the values in the first and second user specified data fields;

evaluating data in the third data field for each of the loop equivalents by applying the user specified range or array function to generate results for the loop equivalents; and outputting from the table generator prebuilt function the results and outputting adjacent thereto labels for rows and columns from the first and the second user specified data fields.

2. The method of claim 1, further including primarily ordering the loop equivalent range or array function results by ordering the distinct combinations of values of the first and second user specified fields based on specification of the table generator prebuilt function entered in the first spreadsheet cell.

3. The method of claim 1, further including primarily ordering the loop equivalent range or array function results by a default sorting of ascending or descending row and column labels.

4. The method of claim 1, further including primarily ordering the loop equivalent range or array function results vertically and/or horizontally by a user selected sort order.

5. The method of claim 1, further including primarily ordering the loop equivalent range or array function results by ordering values of the loop equivalent calculated range or array function results.

6. The method of claim 1, further including primarily ordering the loop equivalent range or array function results by ordering by range or array functional evaluation of the horizontal and/or vertical values of the loop equivalent calculated range or array function results.

7. The method of claim 6, wherein the range or array functional evaluation of the horizontal and/or vertical values of the loop equivalent calculated range or array function results totals (SUMS) the values for ordering.

8. The method of claim 1, further including receiving a fourth user specified data field input and using the fourth user specified data field input to create nested loop equivalents within the loop equivalents created responsive to the first or second user specified data field.

9. The method of claim 1, further including outputting from the table generator prebuilt function total and/or subtotal formula calculations vertically and/or horizontally over the loop equivalent range or array function results.

10. The method of claim 1, further including outputting from the table generator function non-nested subtotal formula calculations vertically and/or horizontally over the loop equivalent range or array function results.

11. The method of claim 1, further including limiting output of the loop equivalent range or array function results vertically and/or horizontally responsive to a user selected count of items to output.

12. The method of claim 1, further including limiting or filtering the output of loop equivalent range or array function results responsive to a user selected day(s) of week limitation to output.

13. The method of claim 1, further including limiting or filtering the output of loop equivalent range or array function results responsive to a user selected limitations of the loop equivalent function results values to output.

14. The method of claim 1, further including limiting or filtering the output of loop equivalent range or array function results responsive to a user selected limitations of calculations using the loop equivalent range or array function results values to output.

15. The method of claim 1, further including applying constraints to the first, second and/or third user specified data fields to filter data evaluated by the user specified formula.

16. The method of claim 1, further including applying constraints to the loop equivalent function results to filter the outputting.

17. The method of claim 1, wherein the user specified formula includes two or more spreadsheet range or array functions.

18. The method of claim 1, further including:
at least one of the user specified formulaic data description terms accepting a data selection parameter; and
receiving a user specification of the data selection parameter to vary selection of data responsive to the user specified formulaic data description terms.

19. The method of claim 1, further including:
at least one of the user specified formulaic data description terms accepting a data selection parameter; and
receiving a user specification of the data selection parameter to vary selection of data responsive to data not within the loop equivalents.

20. The method in claim 1, further including using at least one or more data values not in the first, second or third user specified data fields.

21. The method of claim 1, further including joining data values from different data sets, either different non-cell sources, different data cell ranges, or a combination of non-cell sources and data cell ranges for use in the user specified function.

22. The method of claim 1, further including a data filling mechanism adding in date or integer values missing within a progression.

23. The method of claim 22, wherein the user specifies the range of the progression to be filled.

24. The method of claim 1, further including the generation of vertical and/or horizontal label titles.

25. The method of claim 24, wherein the label titles are field names or user specified values.

* * * * *